PRINT READ-OUT IN COMPUTER SYSTEMS USING STORED PROGRAMS

Original Filed Dec. 15, 1959 76 Sheets-Sheet 1

INVENTORS
T. P. HOLLORAN
P. B. CLOSE
F. R. GOLDAMMER
BY
THEIR ATTORNEYS

PRINT READ-OUT IN COMPUTER SYSTEMS USING STORED PROGRAMS

Original Filed Dec. 15, 1959

PRINT READ-OUT IN COMPUTER SYSTEMS USING STORED PROGRAMS

Original Filed Dec. 15, 1959 76 Sheets-Sheet 5

PRINT READ-OUT IN COMPUTER SYSTEMS USING STORED PROGRAMS

Original Filed Dec. 15, 1959 76 Sheets-Sheet 7

PRINT READ-OUT IN COMPUTER SYSTEMS USING STORED PROGRAMS

Original Filed Dec. 15, 1959

Dec. 13, 1966 T. P. HOLLORAN ETAL 3,291,040

PRINT READ-OUT IN COMPUTER SYSTEMS USING STORED PROGRAMS

Original Filed Dec. 15, 1959

76 Sheets-Sheet 19

Dec. 13, 1966 T. P. HOLLORAN ETAL 3,291,040

PRINT READ-OUT IN COMPUTER SYSTEMS USING STORED PROGRAMS

Original Filed Dec. 15, 1959

76 Sheets-Sheet 20

Dec. 13, 1966 T. P. HOLLORAN ETAL 3,291,040

PRINT READ-OUT IN COMPUTER SYSTEMS USING STORED PROGRAMS

Original Filed Dec. 15, 1959 76 Sheets-Sheet 24

PRINT READ-OUT IN COMPUTER SYSTEMS USING STORED PROGRAMS 4037
4036
3015
955
4039
4038
3123
4040
4041
3016
951
952
953
954
956
957
958
959
DDF
SHA
4028
4030
4032
4027
3010
4029
3011
3012
4031
3013
4033
4034
4035
938
939
940
941
942
943
944
945
946
947
948
949
950
4024
4026
3008
4023
3009
4025
929
930
931
932
933
934
935
936
937

Dec. 13, 1966 T. P. HOLLORAN ETAL 3,291,040

PRINT READ-OUT IN COMPUTER SYSTEMS USING STORED PROGRAMS

Original Filed Dec. 15, 1959 76 Sheets-Sheet 34

PRINT READ-OUT IN COMPUTER SYSTEMS USING STORED PROGRAMS

Original Filed Dec. 15, 1959

Dec. 13, 1966 T. P. HOLLORAN ET AL 3,291,040

PRINT READ-OUT IN COMPUTER SYSTEMS USING STORED PROGRAMS

Original Filed Dec. 15, 1959

76 Sheets-Sheet 40

Dec. 13, 1966 T. P. HOLLORAN ETAL 3,291,040

PRINT READ-OUT IN COMPUTER SYSTEMS USING STORED PROGRAMS

Original Filed Dec. 15, 1959

76 Sheets-Sheet 49

PRINT READ-OUT IN COMPUTER SYSTEMS USING STORED PROGRAMS

Dec. 13, 1966 T. P. HOLLORAN ETAL 3,291,040

PRINT READ-OUT IN COMPUTER SYSTEMS USING STORED PROGRAMS

Original Filed Dec. 15, 1959

76 Sheets-Sheet 60

PRINT READ-OUT IN COMPUTER SYSTEMS USING STORED PROGRAMS

Dec. 13, 1966 T. P. HOLLORAN ETAL 3,291,040

PRINT READ-OUT IN COMPUTER SYSTEMS USING STORED PROGRAMS

Original Filed Dec. 15, 1959 76 Sheets-Sheet 69

PRINT READ-OUT IN COMPUTER SYSTEMS USING STORED PROGRAMS

Dec. 13, 1966 T. P. HOLLORAN ET AL 3,291,040

PRINT READ-OUT IN COMPUTER SYSTEMS USING STORED PROGRAMS

Original Filed Dec. 15, 1959

76 Sheets-Sheet 74

Dec. 13, 1966 T. P. HOLLORAN ETAL 3,291,040

PRINT READ-OUT IN COMPUTER SYSTEMS USING STORED PROGRAMS

Original Filed Dec. 15, 1959 76 Sheets-Sheet 75

United States Patent Office 3,291,040

Patented Dec. 13, 1966

3,291,040

PRINT READ-OUT IN COMPUTER SYSTEMS USING STORED PROGRAMS

Thomas P. Holloran, Brookville, and Patrick B. Close, Dayton, Ohio, and Freeland R. Goldammer, Yorktown Heights, N.Y., assignors to The National Cash Register Company, Dayton, Ohio, a corporation of Maryland Original application Dec. 15, 1959, Ser. No. 859,598, now Patent No. 3,112,394, dated Nov. 26, 1963. Divided and this application Oct. 7, 1963, Ser. No. 314,093

5 Claims. (Cl. 101—93)

The present application is a division of copending application Serial No. 859,598, filed December 15, 1959, by P. B. Close et al., now Patent No. 3,112,394, patented November 26, 1963, and assigned to the same assignee as the present divisional application and related generally to a unique general purpose type of electronic digital computing system.

With the ever increasing enormity and complexity of record keeping and accounting systems in the business world of today, there is accordingly an ever increasing demand, by necessity, for the adaptation and utilization of high-speed mechanization techniques compatible with such systems. Even though the installation of large scale data processors and electronic computing equipment has partially satisfied the needs of the larger business establishments, unfortunately they are not economically within the realm of practical usage by the smaller business establishments. Consequently, the long-felt need by smaller businesses is yet to be satisfied.

It is a principal object of the present invention to devise a new and improved print-out technique for use in a computing system of the general type above set forth and particularly claimed in the above referred-to Patent No. 3,112,394.

The features of the present invention which are believed to be novel are set forth with particularity in appended claims. The organization and manner of operation of the invention, together with further objects and advantages thereof, may best be understood by reference to the following description taken in connection with the accompanying drawings, in the several figures of which like reference characters identify like elements, and in which:

Figure 3A:
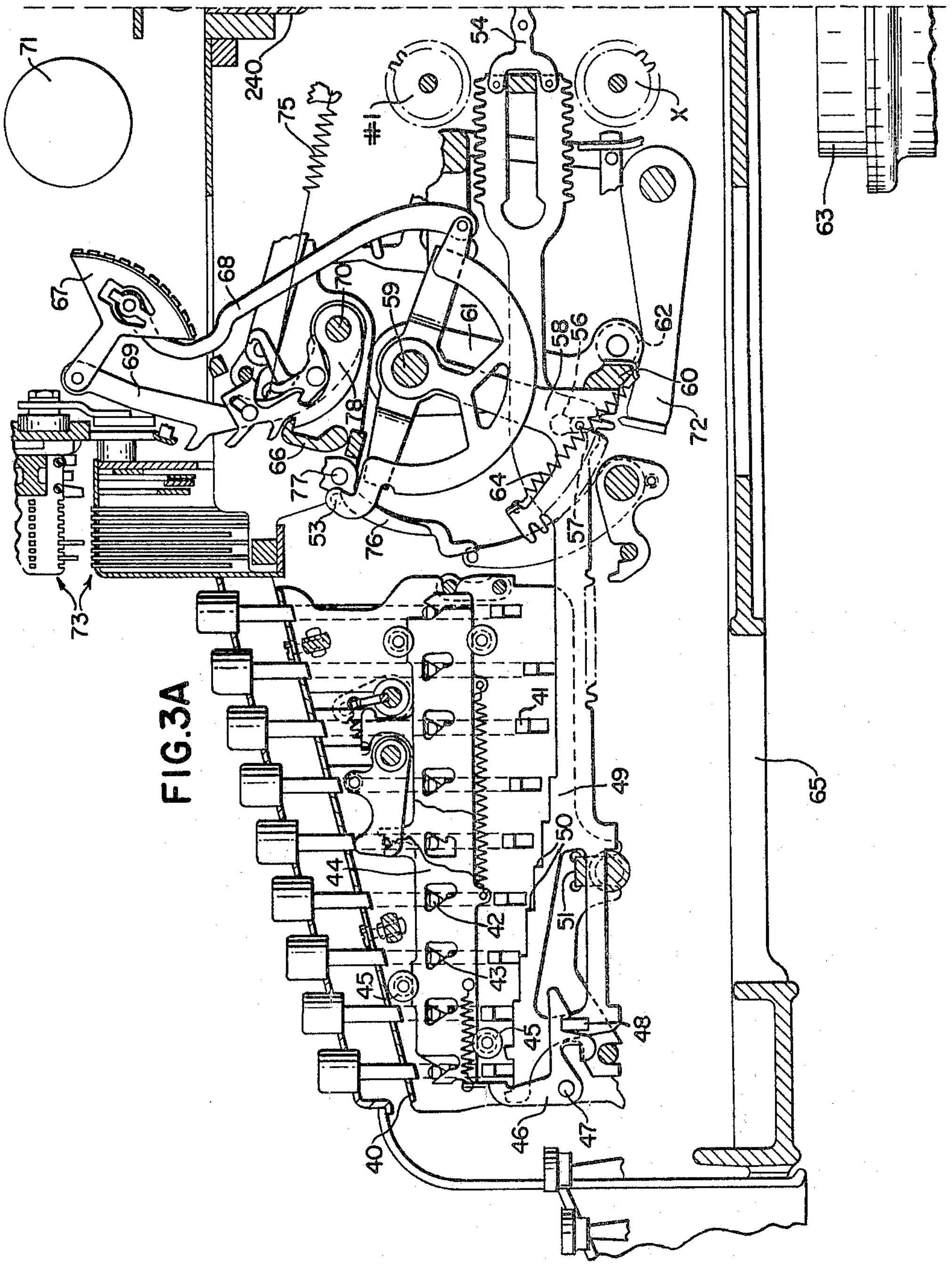
Figure 3B:
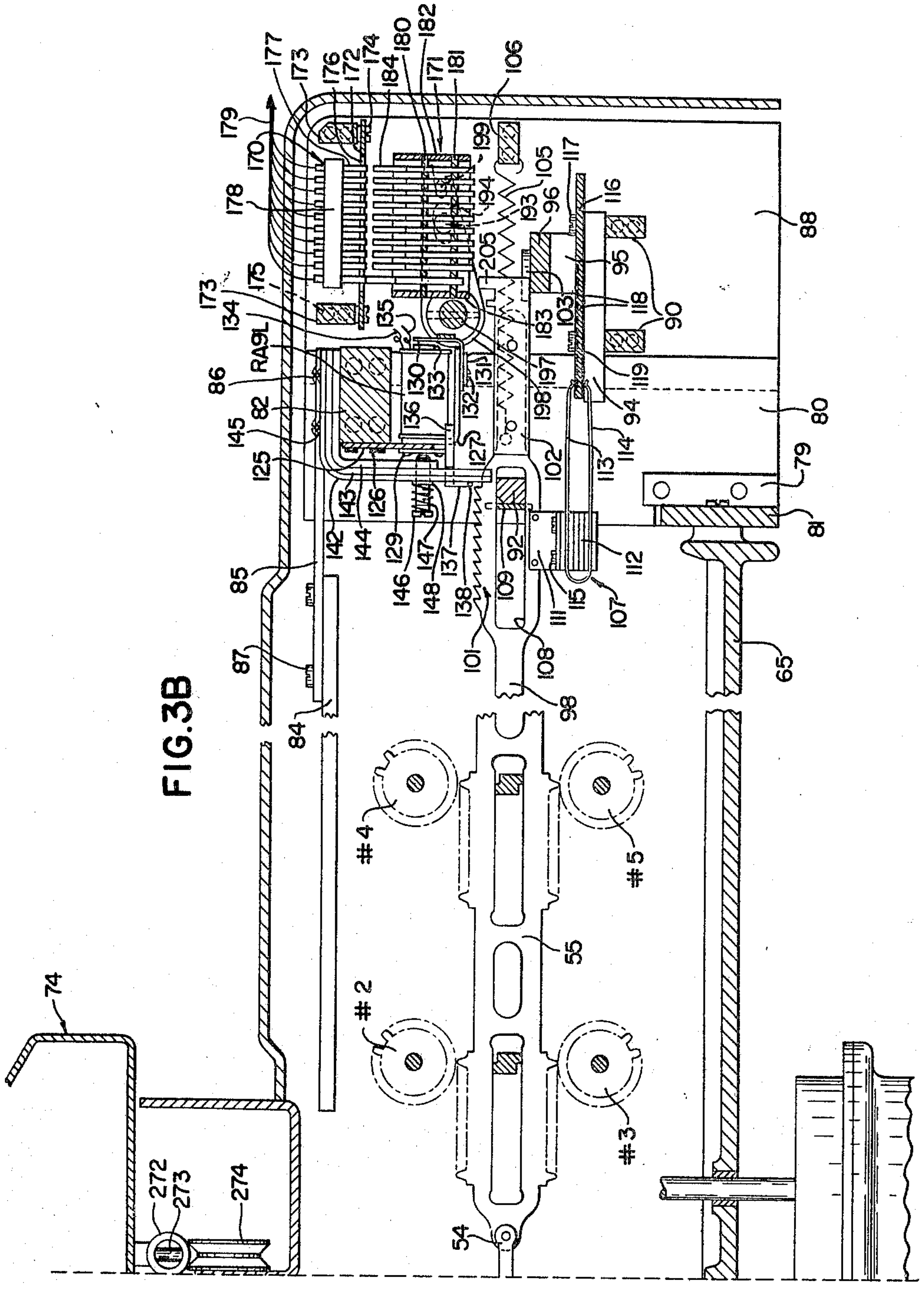
Figure 4:
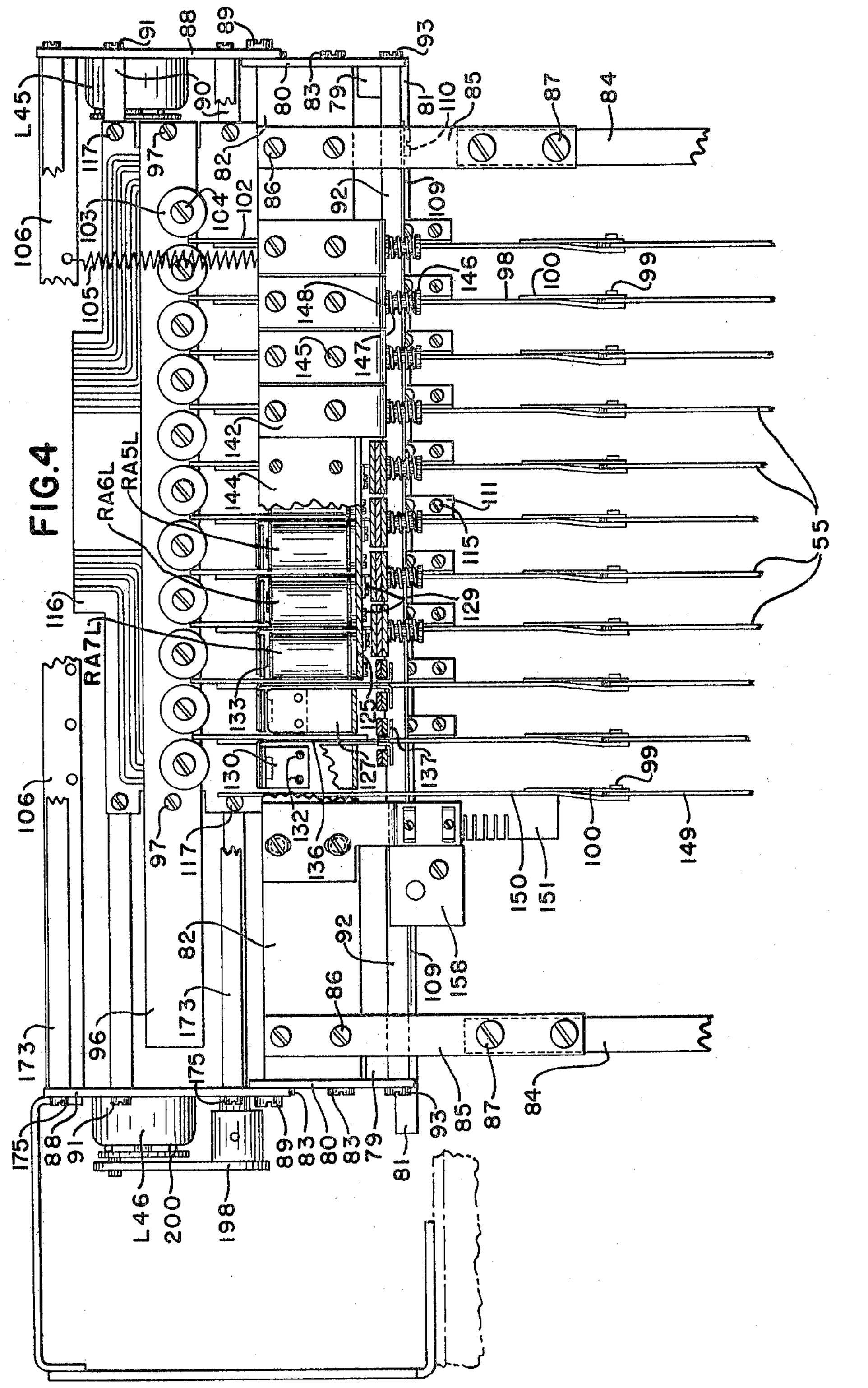
Figure 5A:
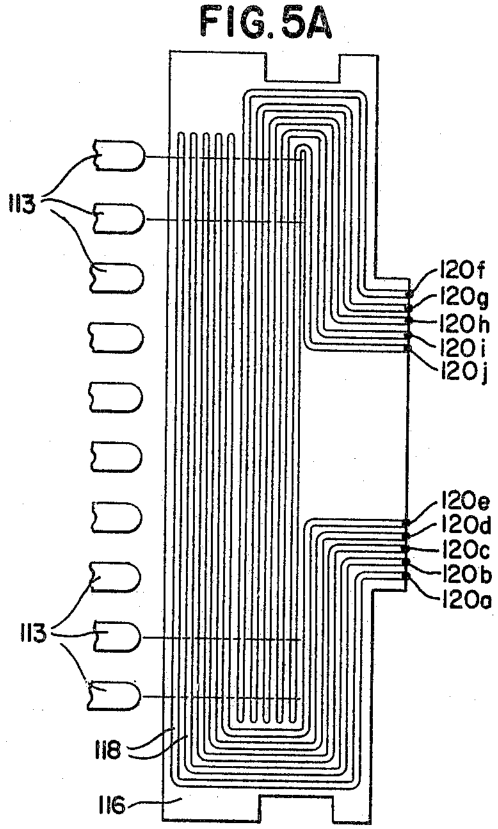
Figure 5B:
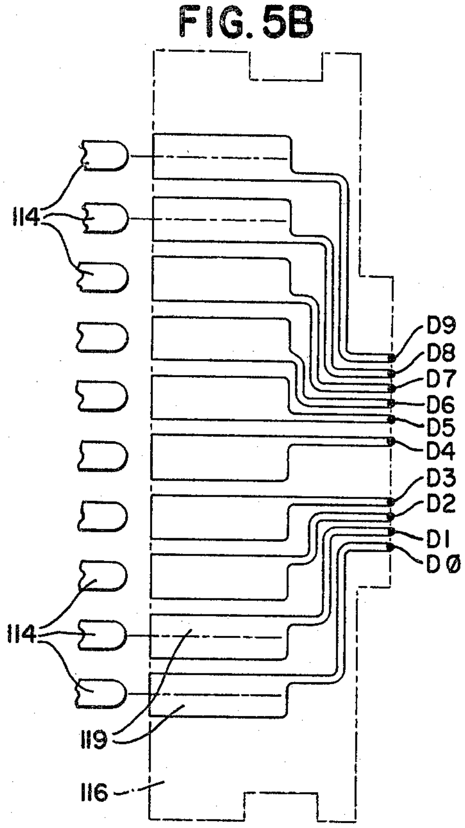

FIGS. 3A and 3B, when joined together at the dashed lines, form a longitudinal cross-sectional view of the accounting machine portion of the computer;

FIG. 4 is a plan view, partly in section, of the mechanism utilized in accordance with the present invention for stopping the amount racks of the accounting machine portion;

FIG. 5A is a plan view showing the conductor pattern disposed on the top surface of the printed-circuit board utilized for determining the stopped positions of the amount racks;

FIG. 5B is a plan view showing the conductor pattern disposed on the bottom surface of the printed-circuit board shown in FIG. 5A.

Figure 1:
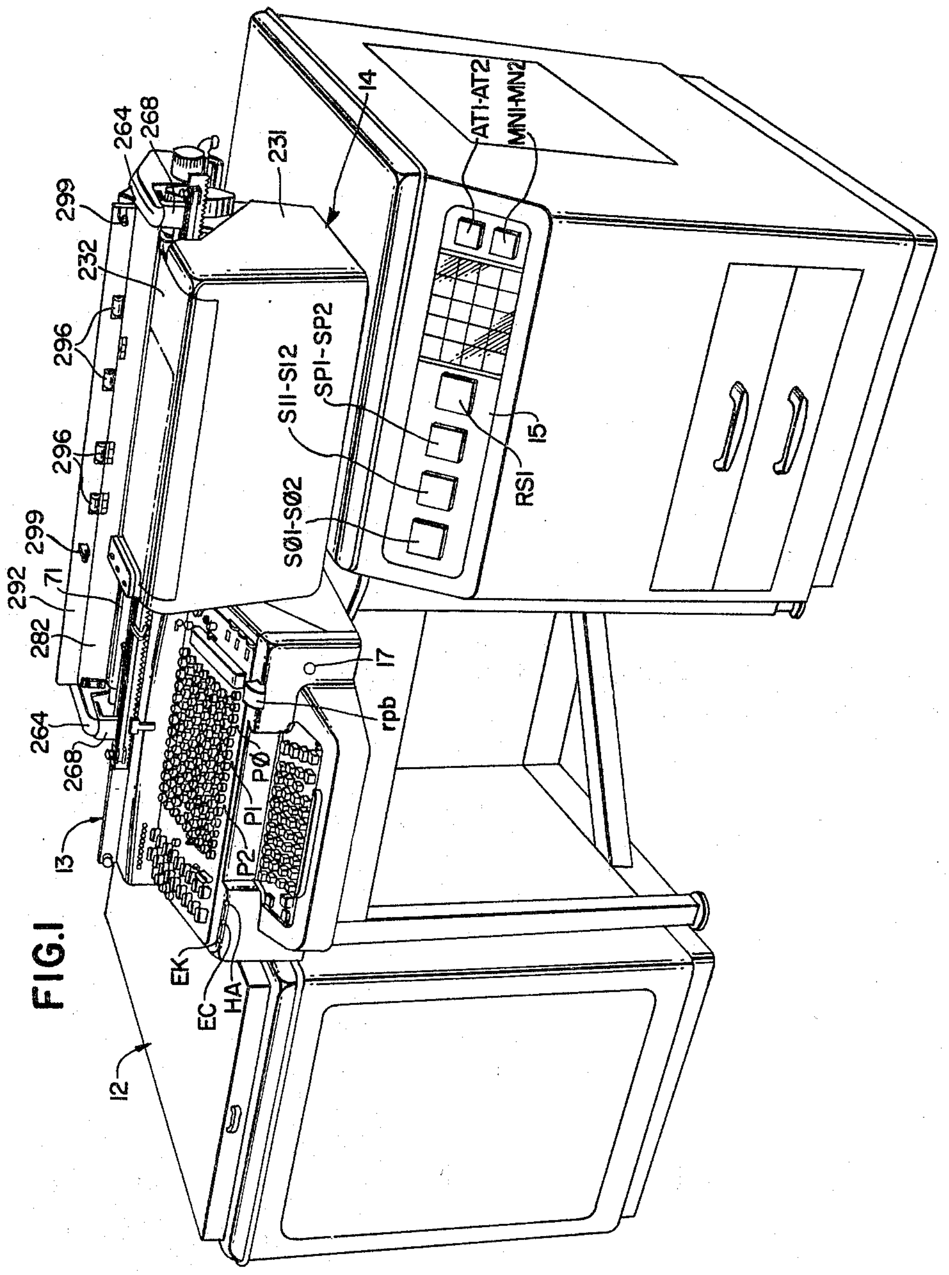
FIG. 1 is a perspective view of the novel computer disclosed and claimed in said Patent 3,112,394.
Figure 6:
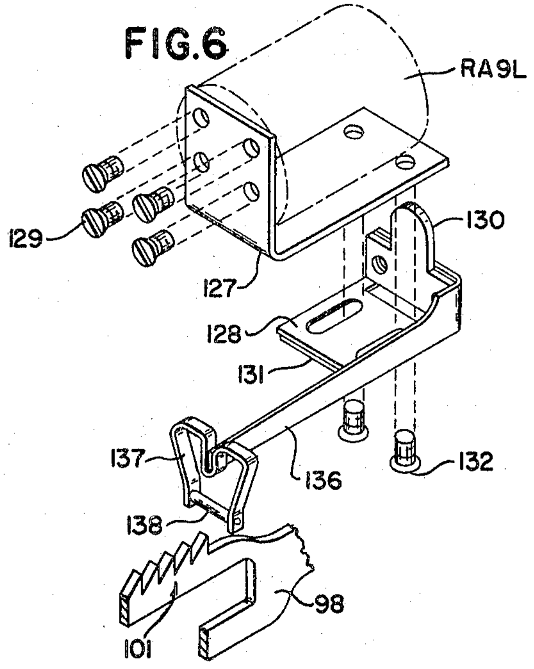
Figure 7:
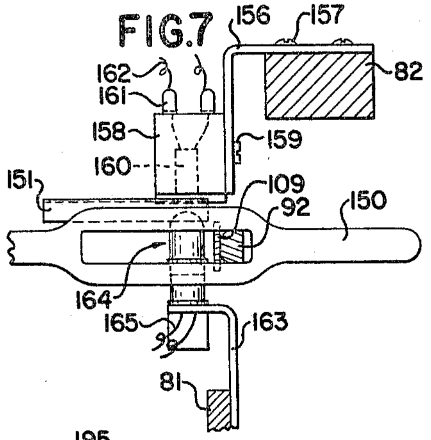
Figure 8:
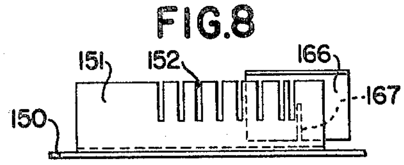
Figure 10:
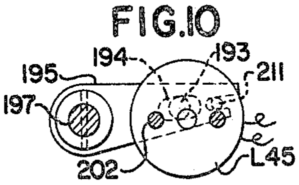
Figures 9, 11, 12:
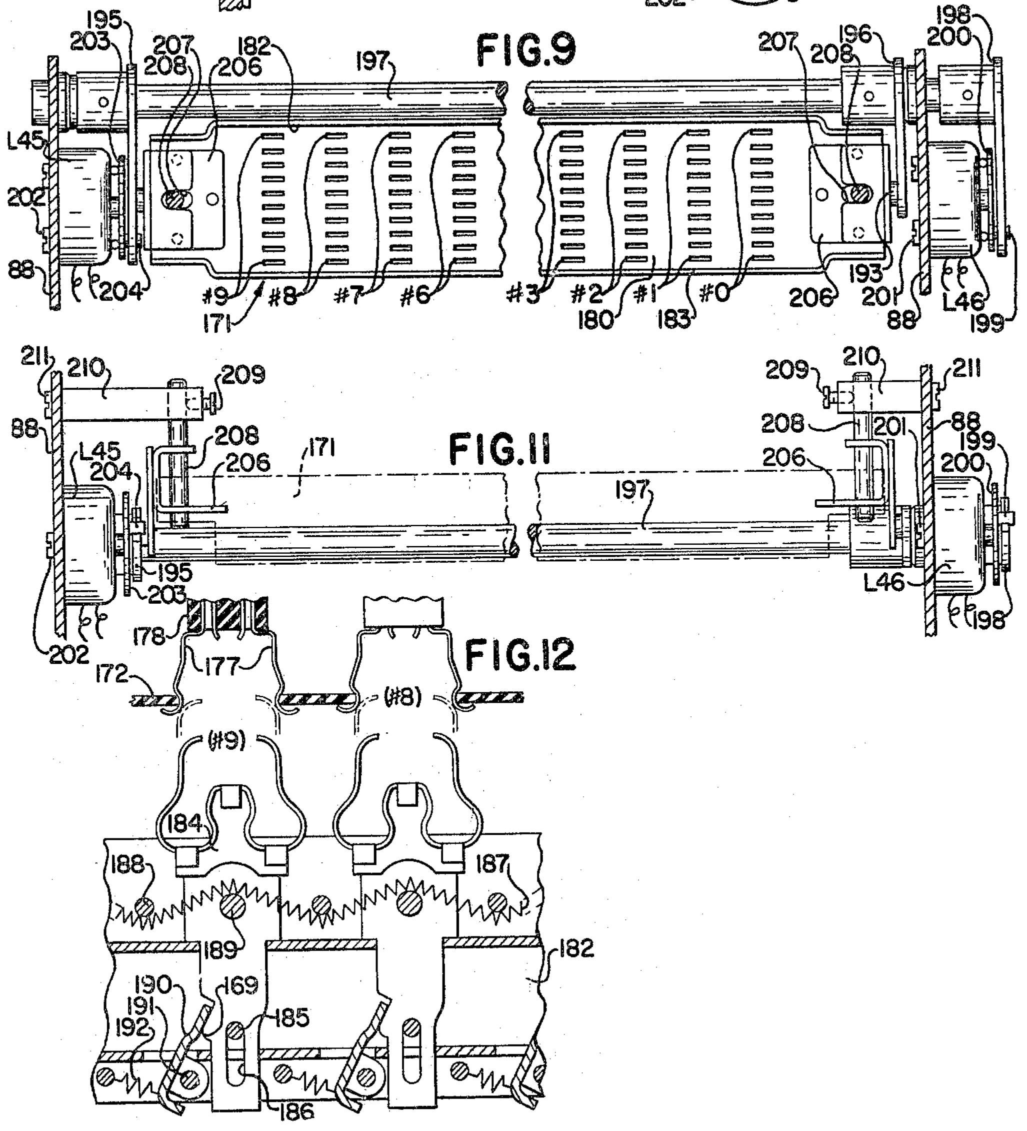
Figure 13:
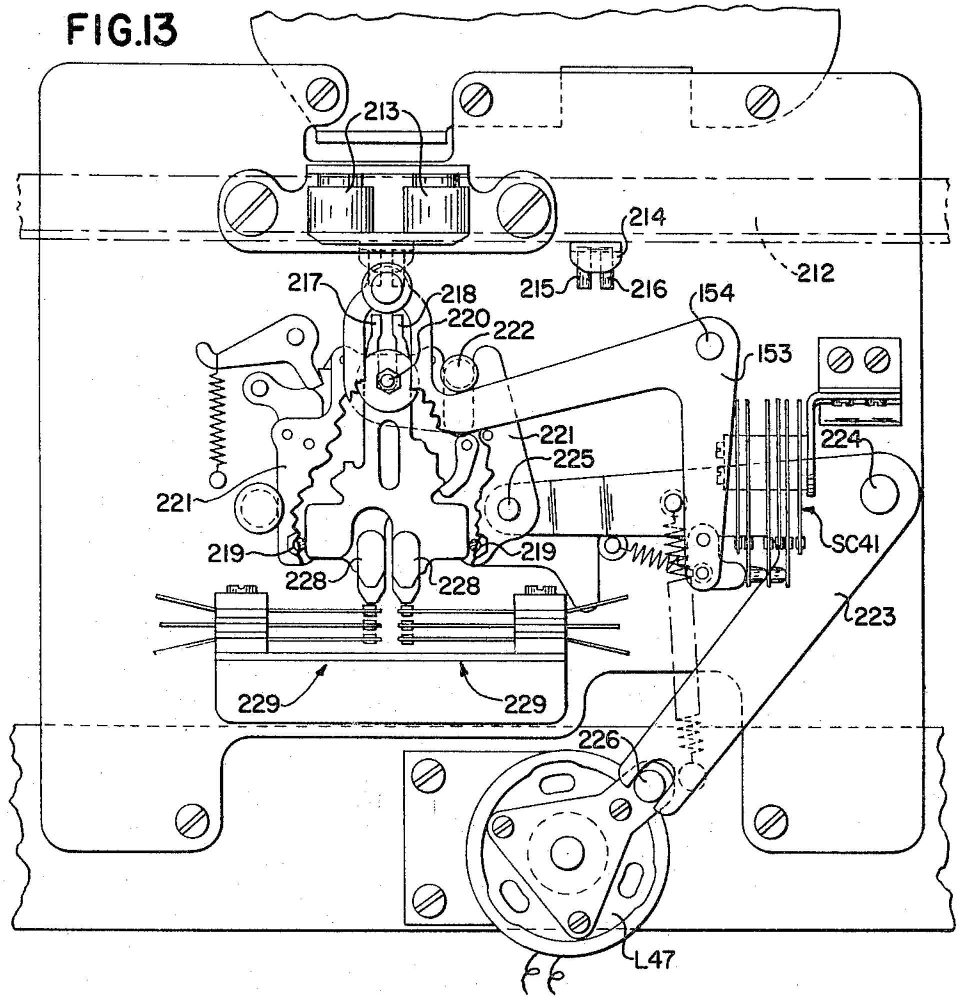
Figures 14, 15, 16:
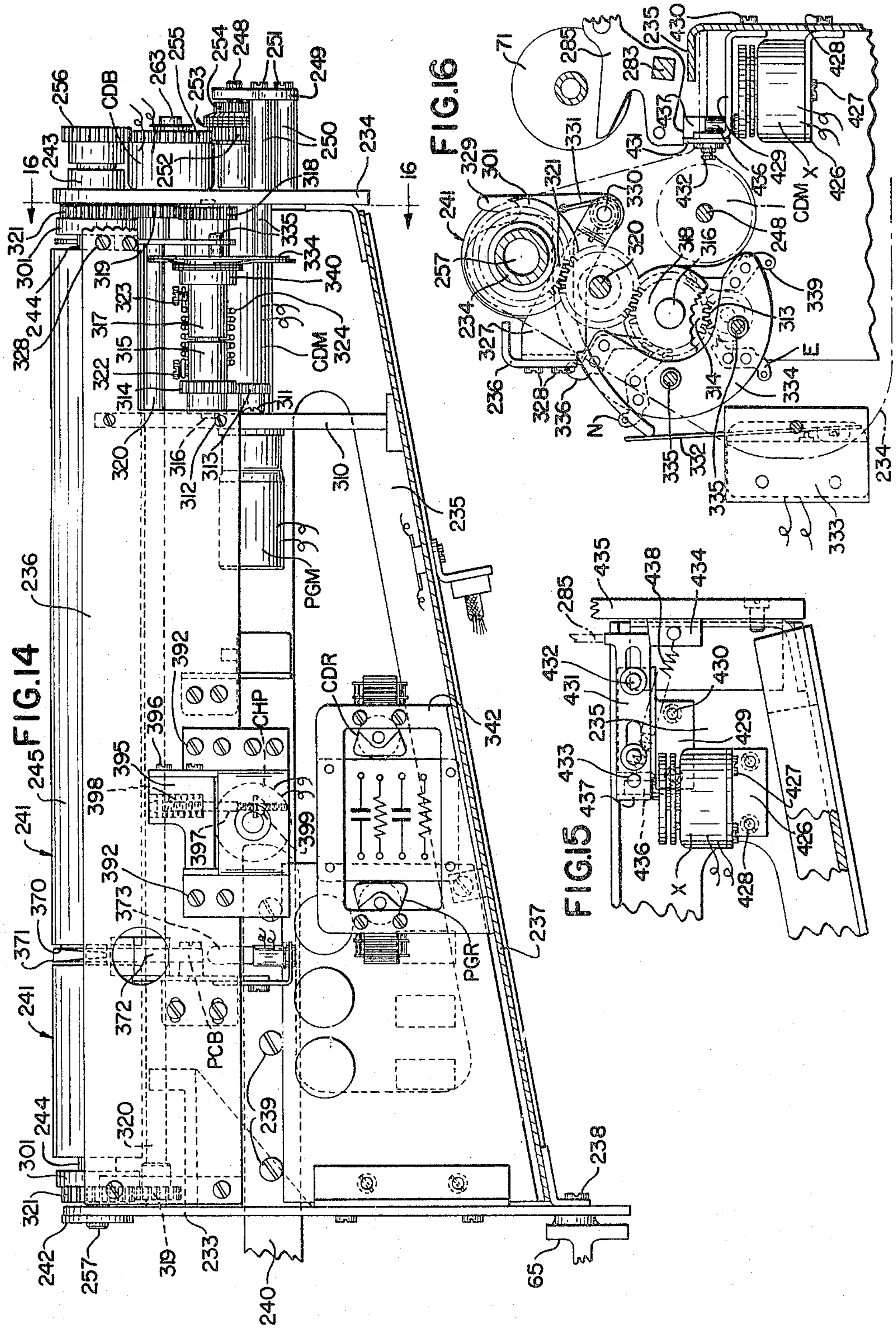

FIG. 6 is an exploded view of one of the various solenoid actuated mechanisms utilized for selectively stopping an amount rack;

FIG. 7 is a fragmentary view of the photoelectric means utilized for indicating the instantaneous point-by-point digital positions of the various amount racks;

FIG. 8 is a plan view of the timing rack comb utilized by the photoelectric means of FIG. 7;

FIG. 9 is a plan view of the solenoid-actuated switch basket means utilized for determining the stopped positions of the various amount racks;

FIG. 10 is a partial end view of the mechanism shown in FIG. 9;

FIG. 11 is a partial front view of the mechanism shown in FIG. 9;

FIG. 12 is a fragmentary cross-sectional view of the basket portion of FIG. 9;

FIG. 13 is a plan view of the solenoid-actuated rear form-bar readout mechanism utilized by the card and paper tape punching mechanisms for sensing the position of the accounting machine carriage;

FIG. 14 is a front view of the ledger card handling mechanism shown in FIG. 1 with the cover and table portions thereof removed;

FIG. 15 is a partial front view of the solenoid-actuated mechanism shown in FIG. 16 which is utilized for selectively preventing the lower compression rolls from being disengaged from the accounting machine platen;

FIG. 16 is a partly cross-sectional view taken along lines 16—16 of FIG. 14.

Figures 17, 18, 19, 20, 21:
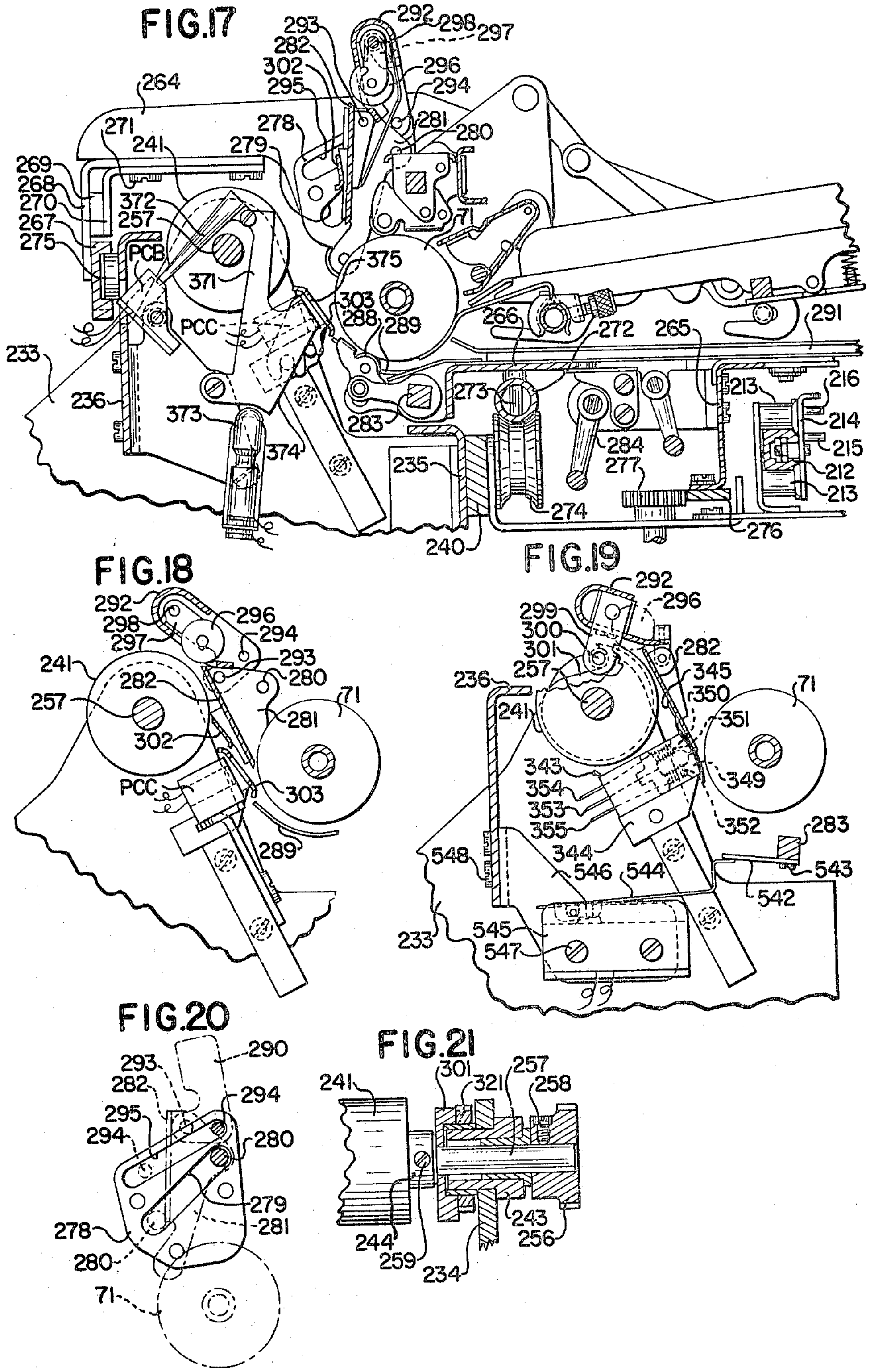
Figures 22, 23:
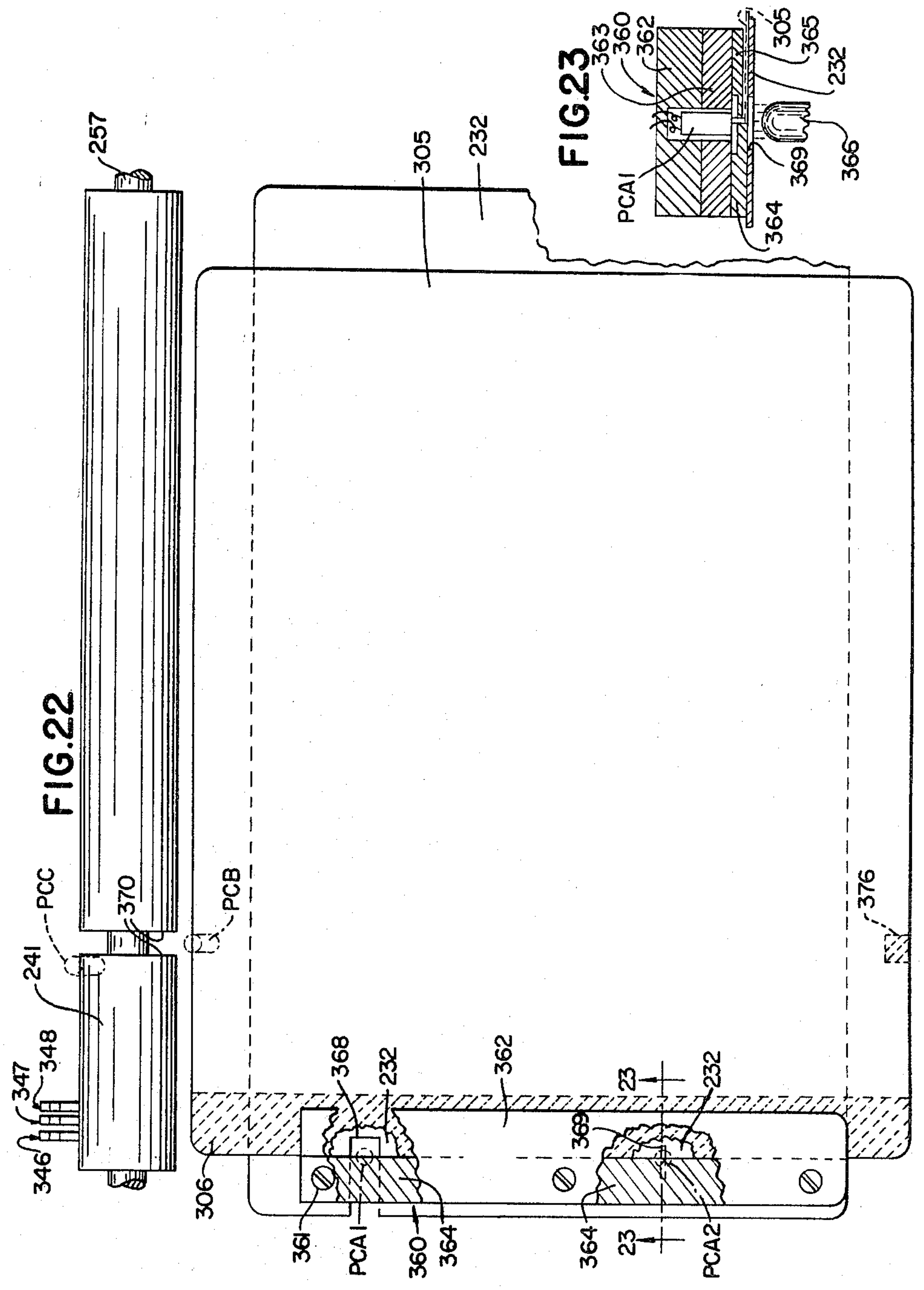
Figure 24:
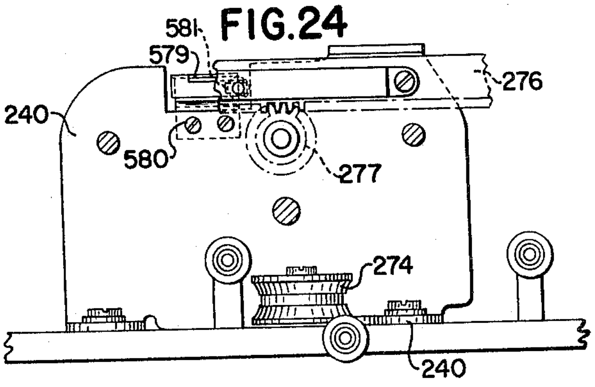
Figure 25:
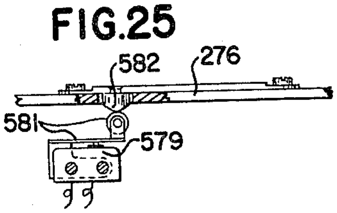
Figure 27:
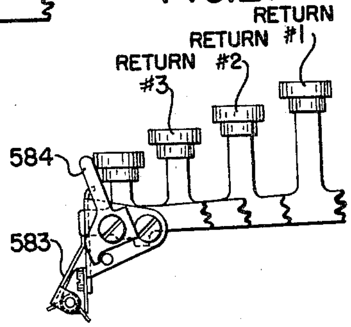
Figure 26:
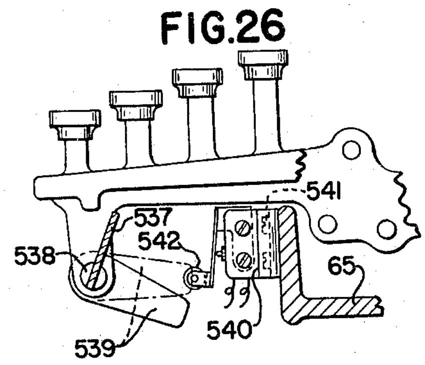
Figure 28A:
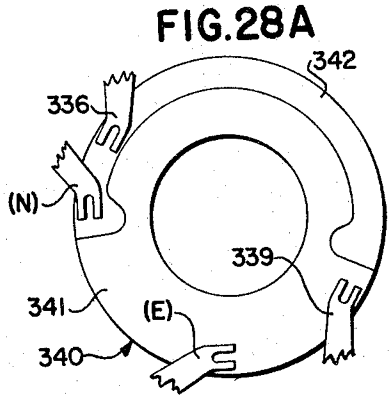
Figure 28B:
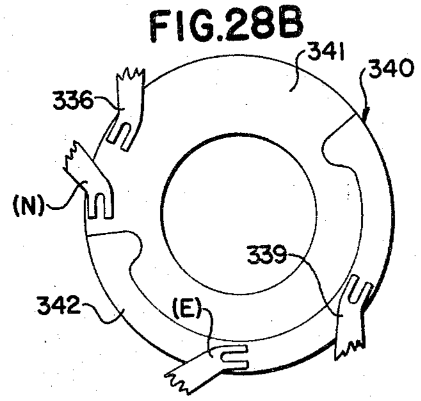
Figure 29:
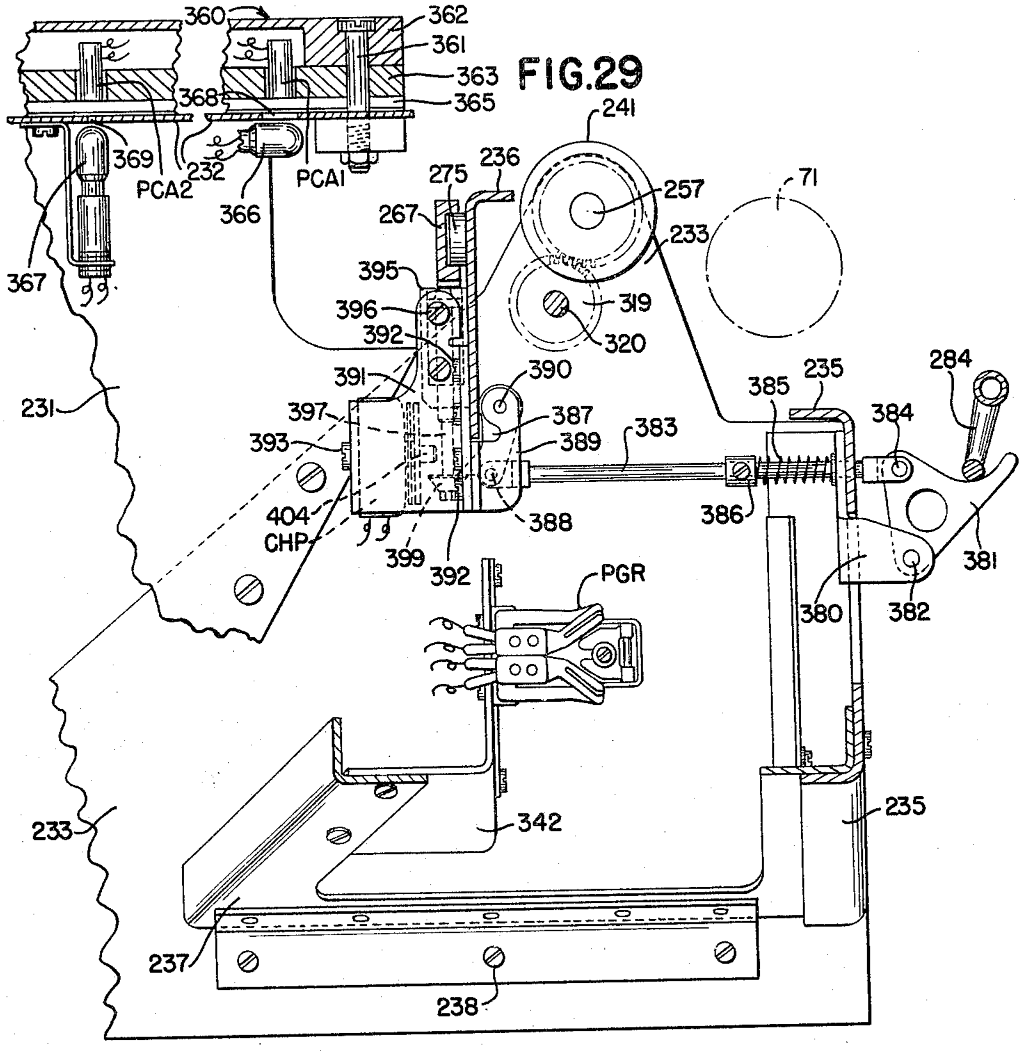
Figure 30:
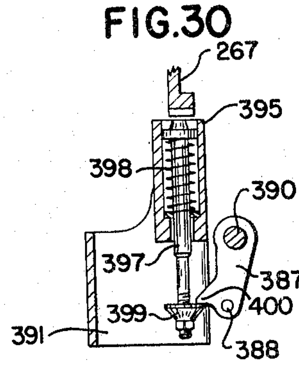
Figure 31:
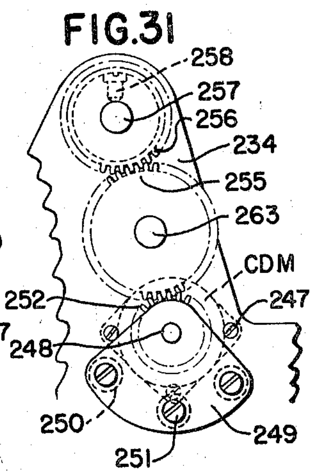
Figures 32, 33, 34, 35, 36:
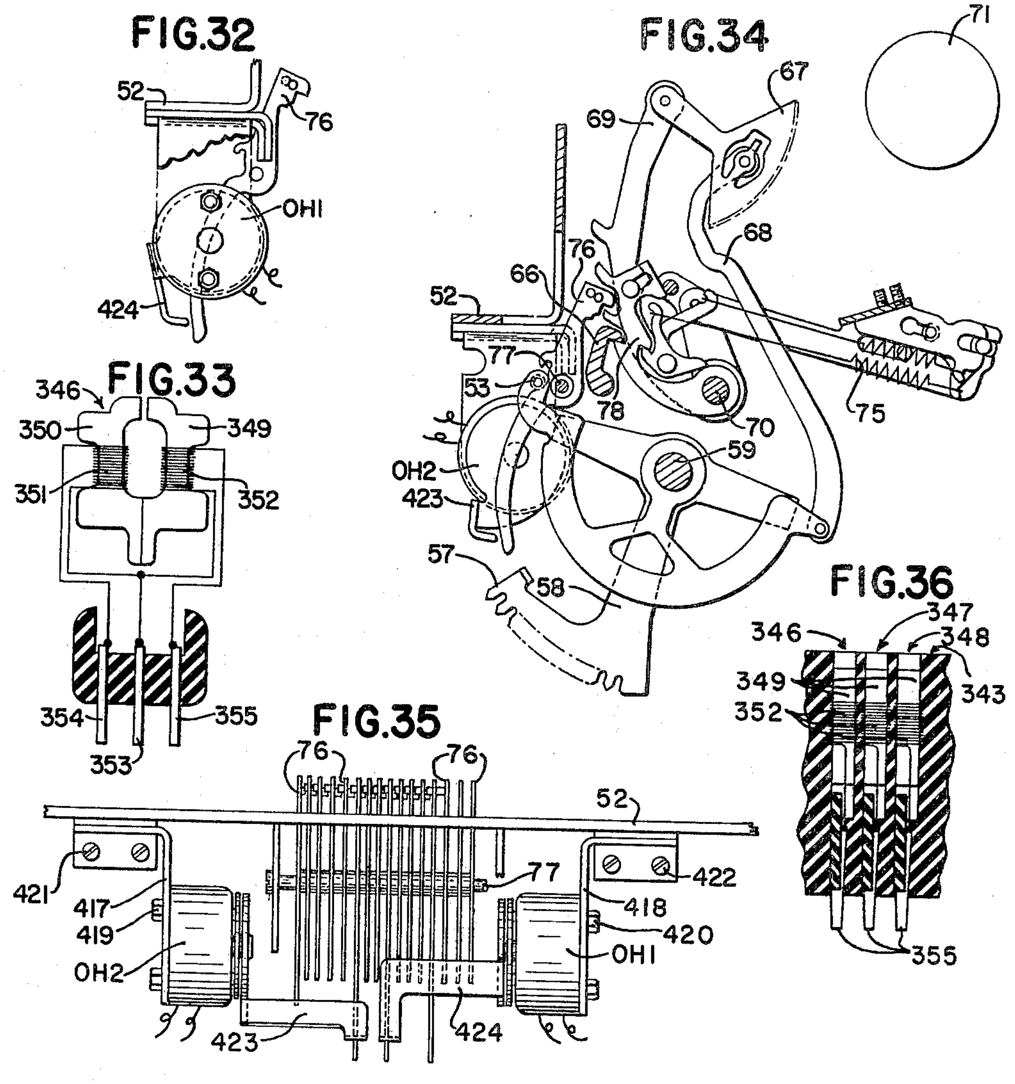
Figure 37:
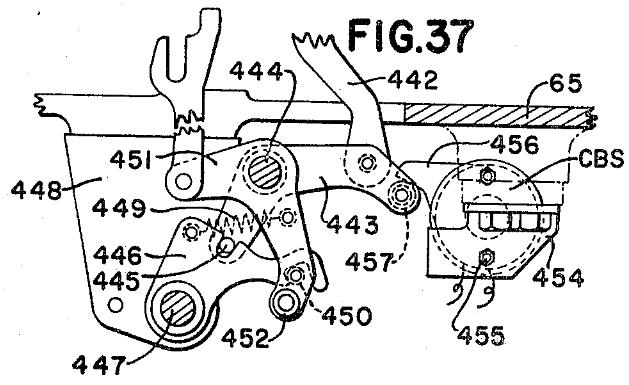
Figures 38, 39, 40:
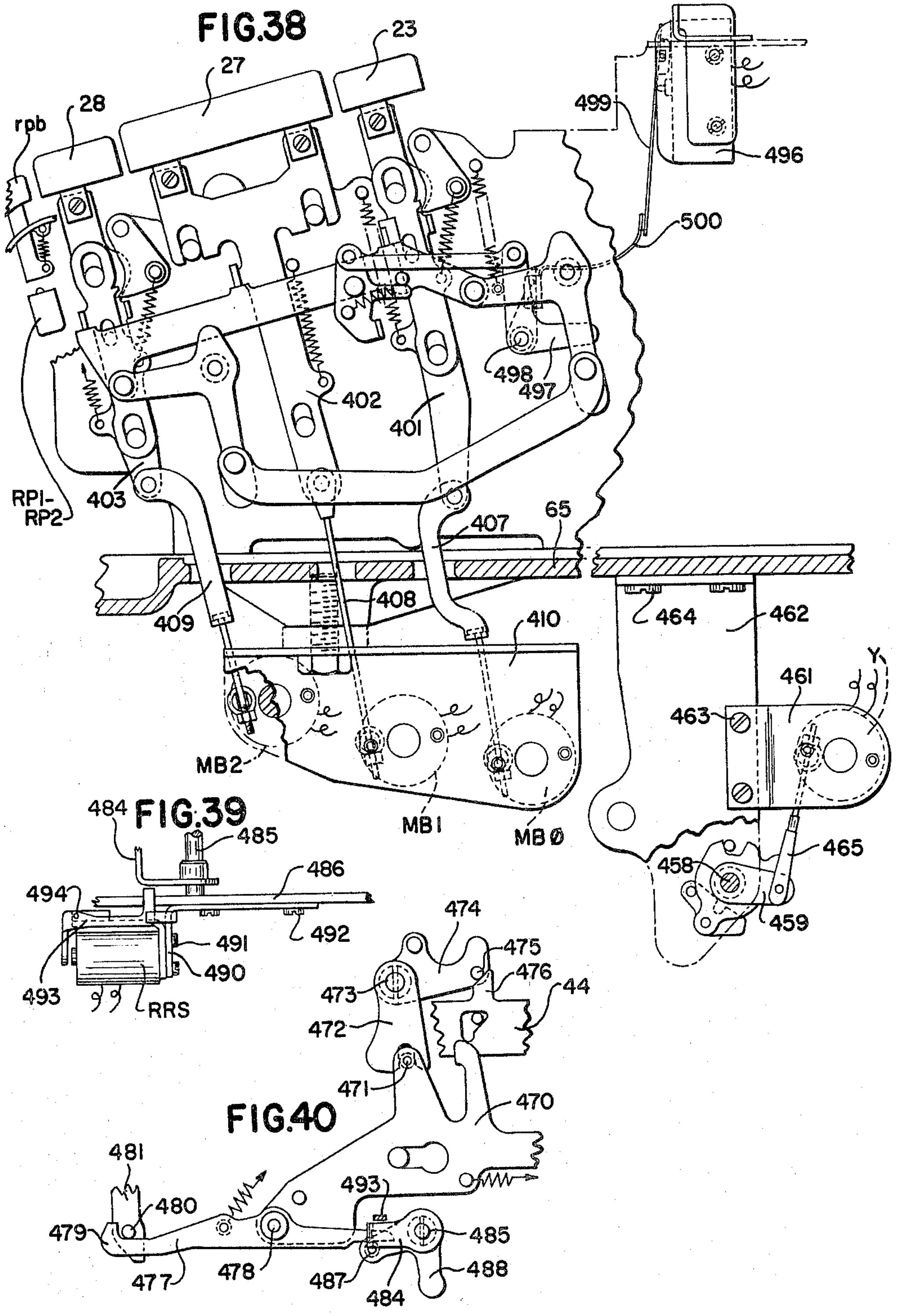
Figures 41, 42:
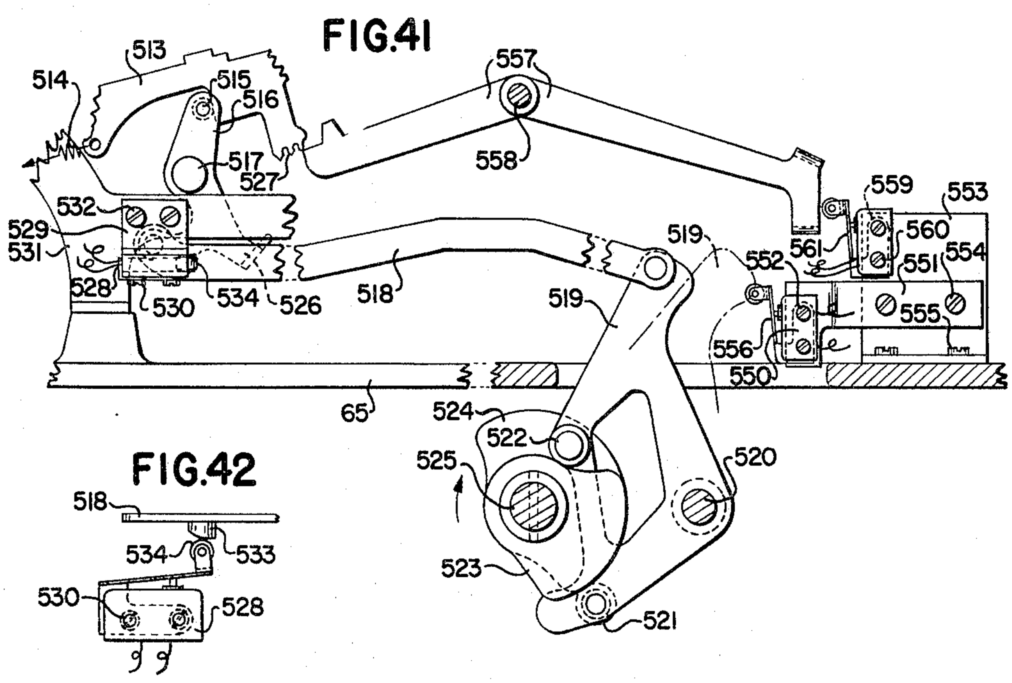
Figure 43:
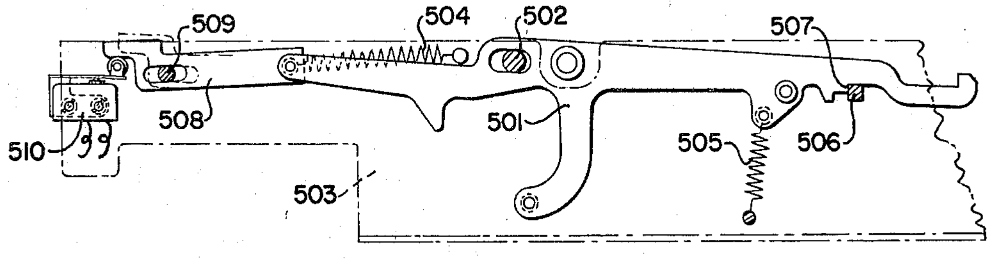
Figure 44A:
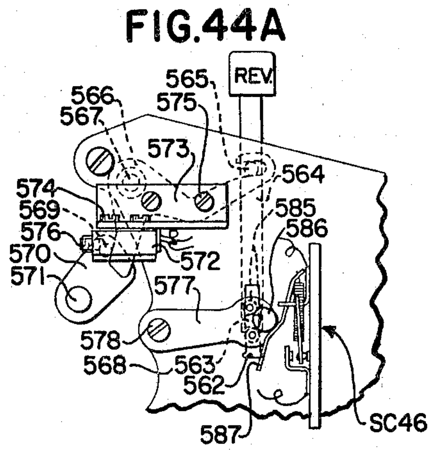
Figures 44B, 44C, 44D, 44E, 44F, 44G:
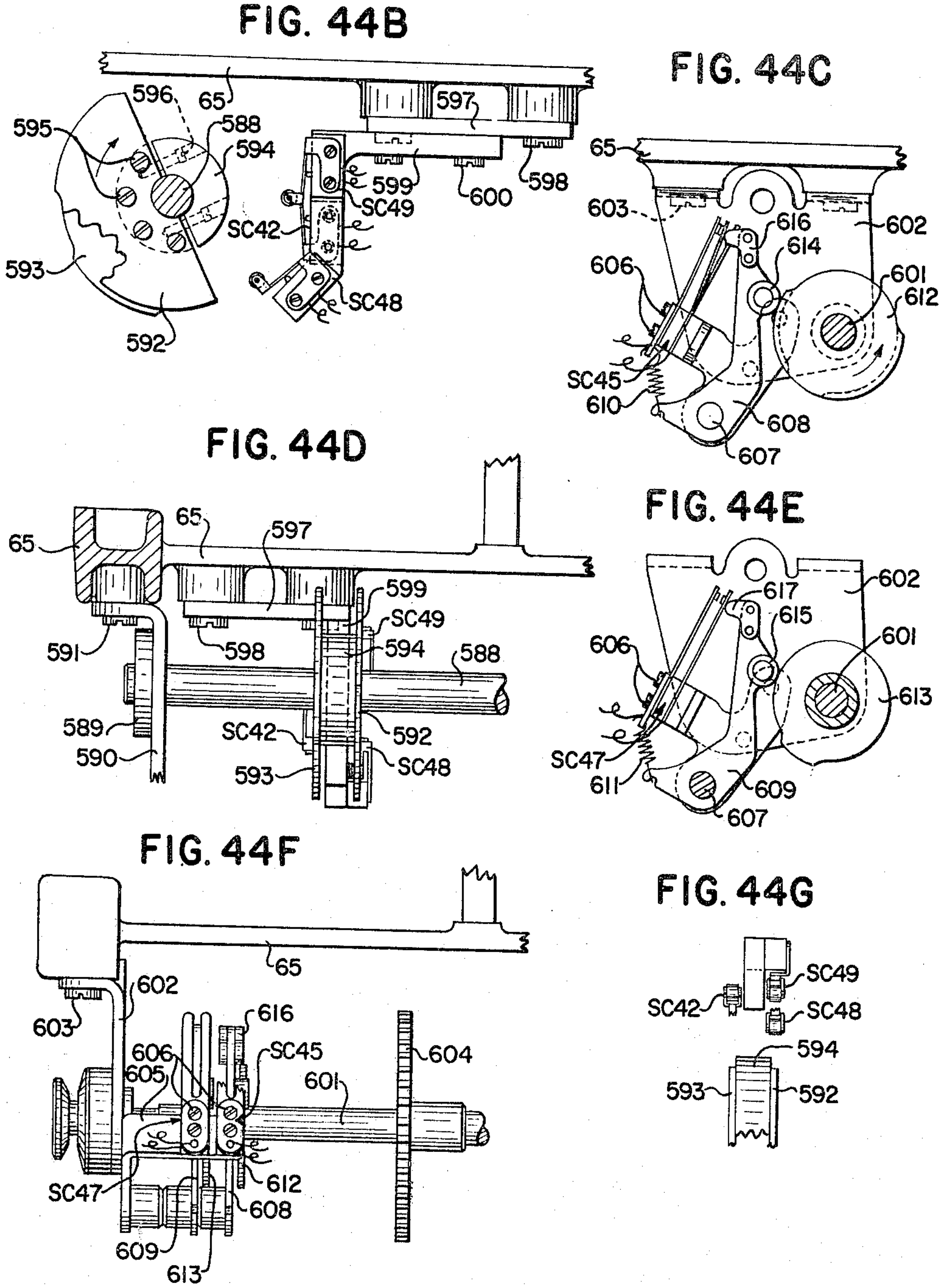
Figure 44H:
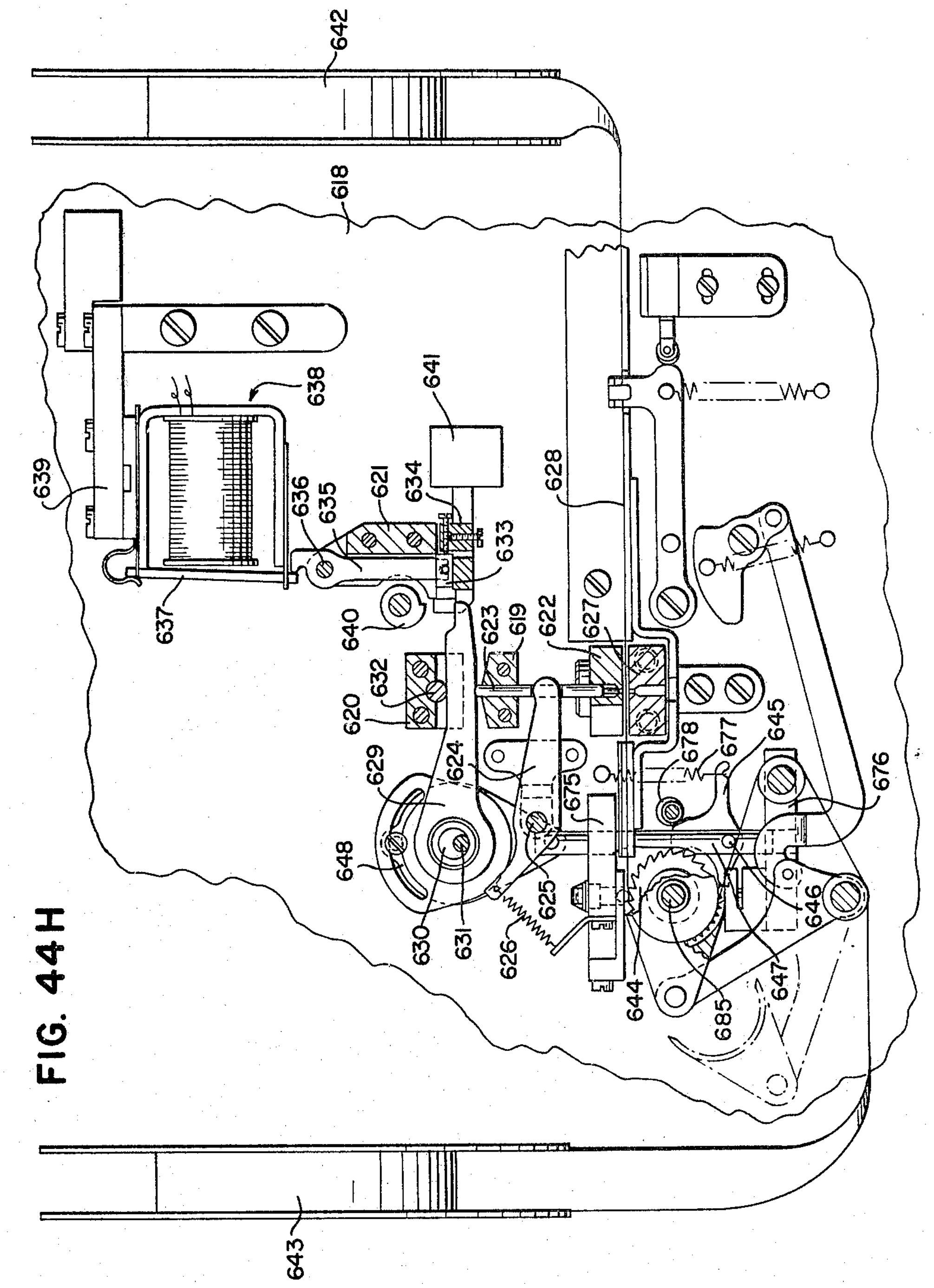
Figure 45A:
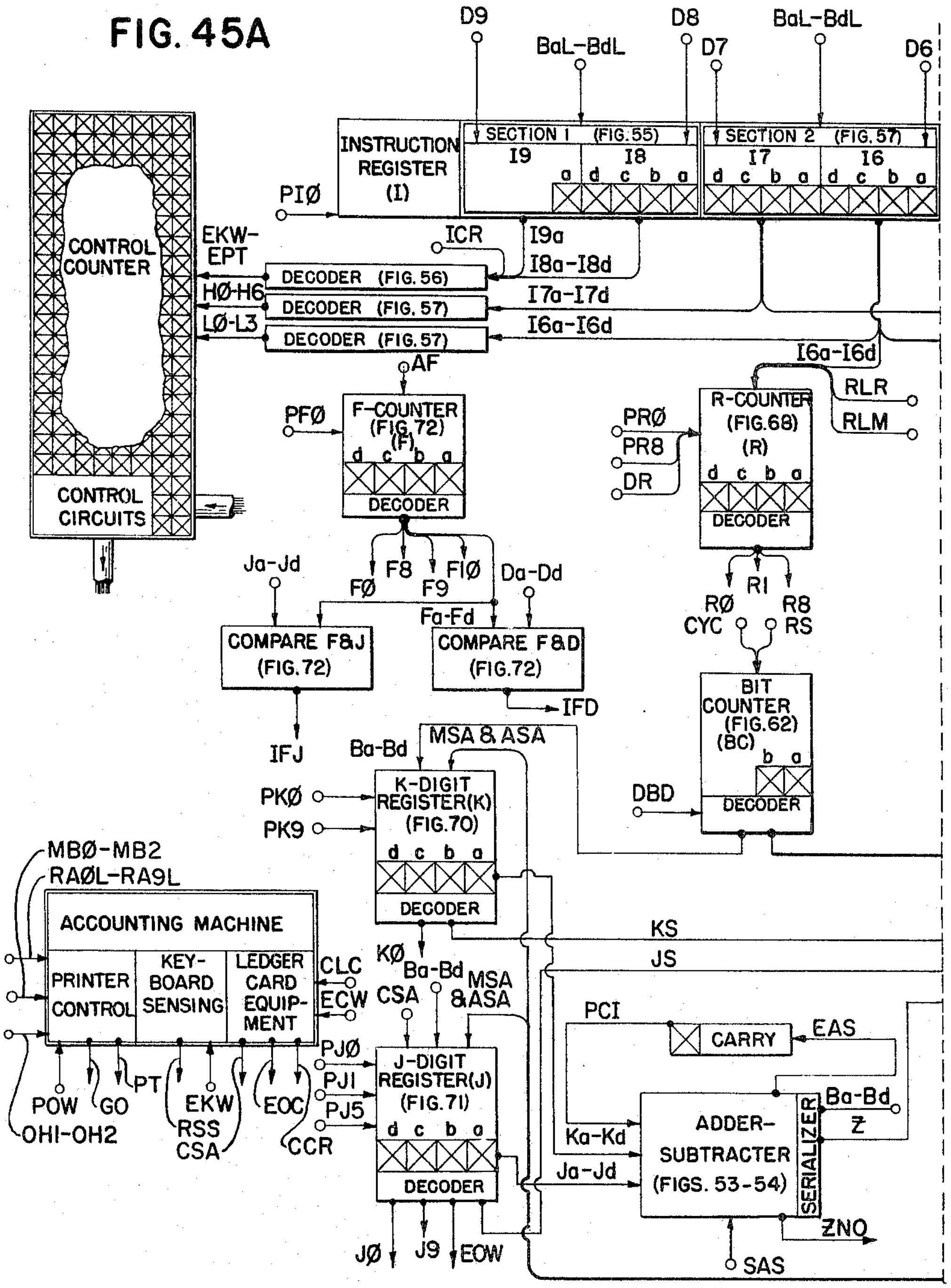
Figure 45B:
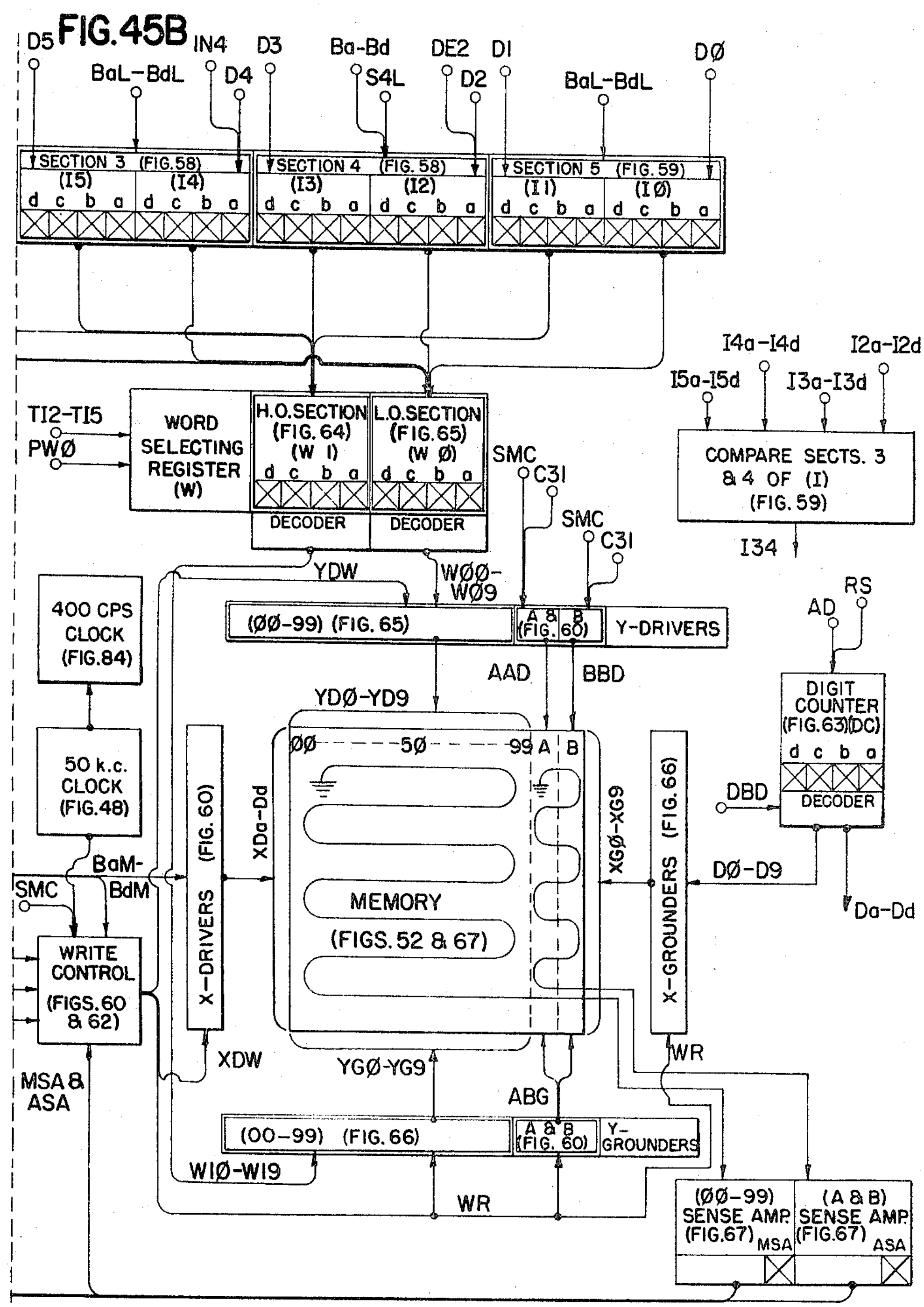
Figure 45C:
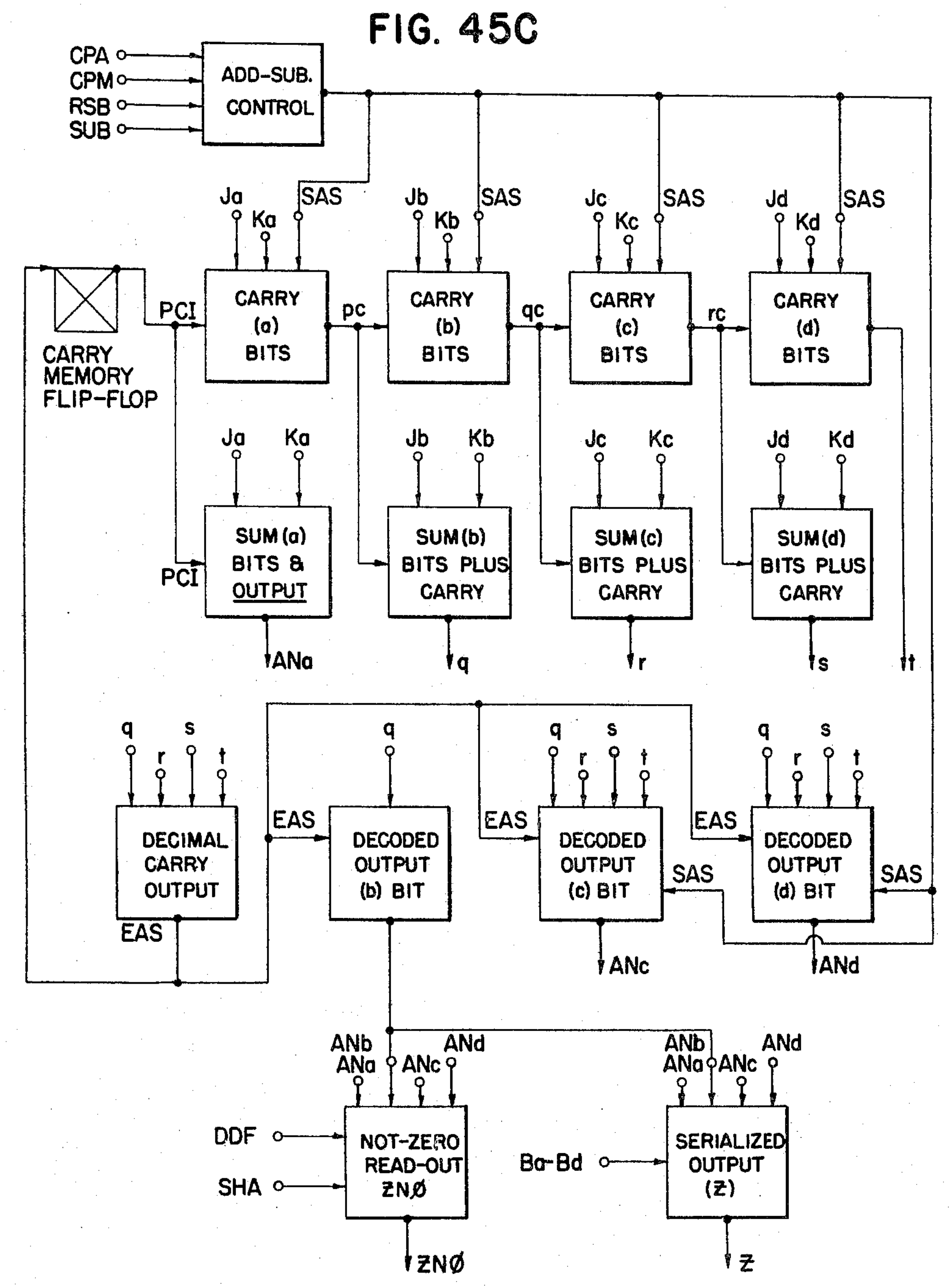
Figure 45D:
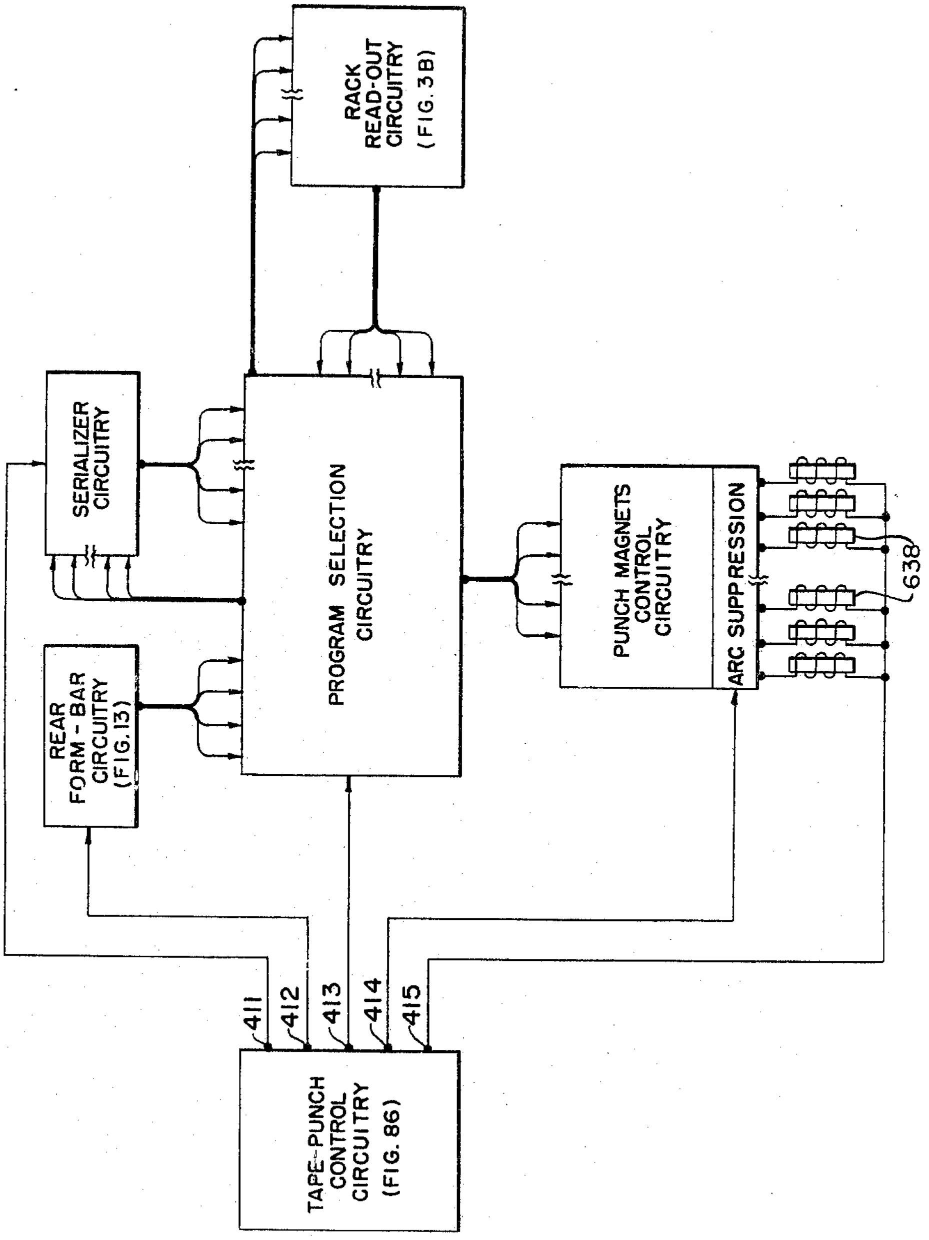
Figure 46:
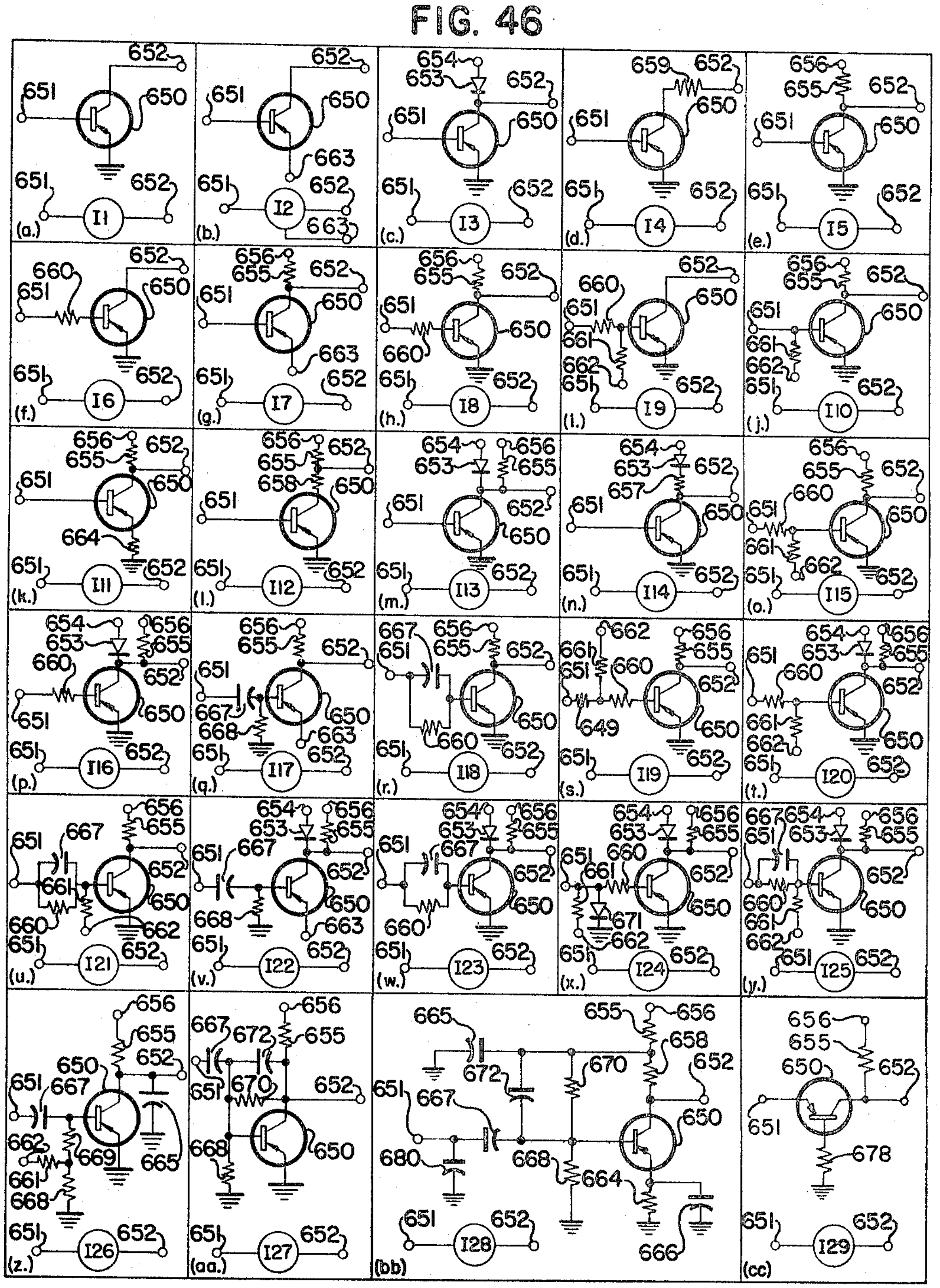
Figure 47A:
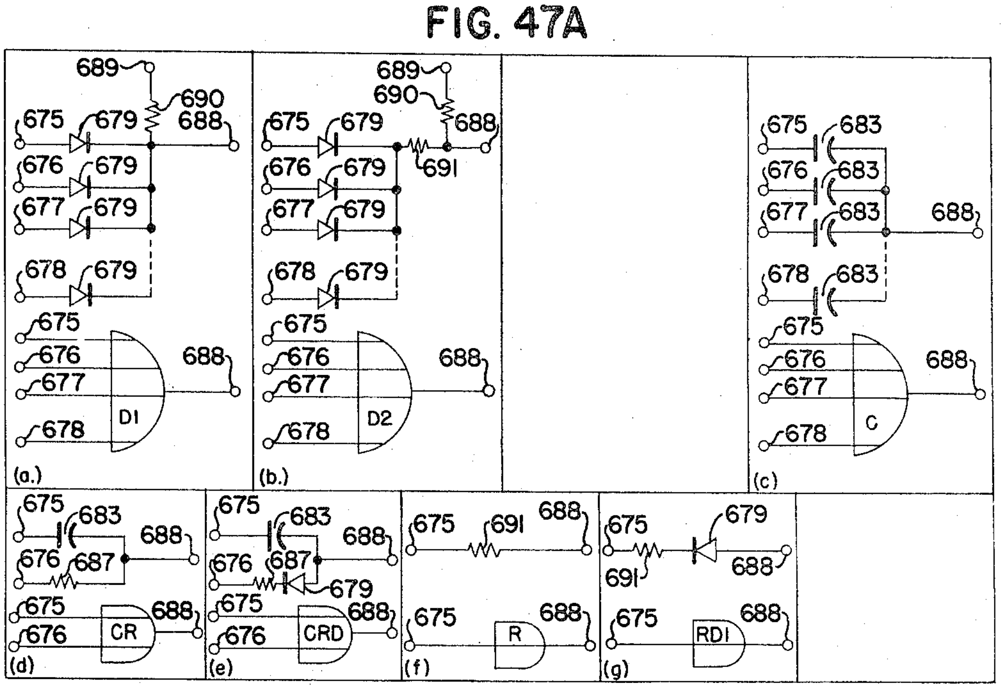
Figure 47B:
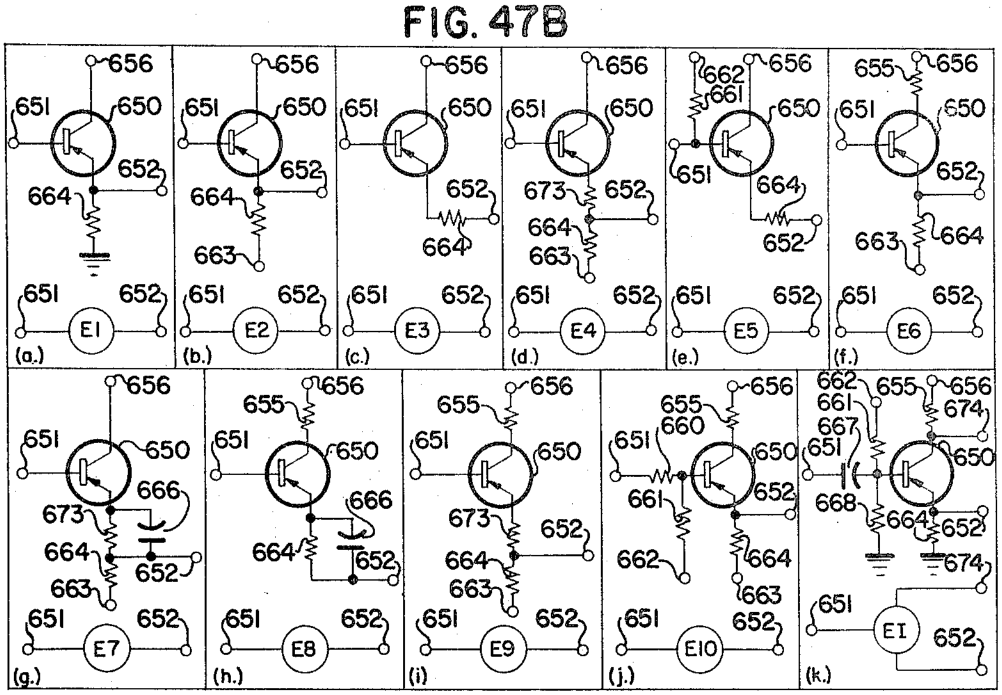
Figure 48:
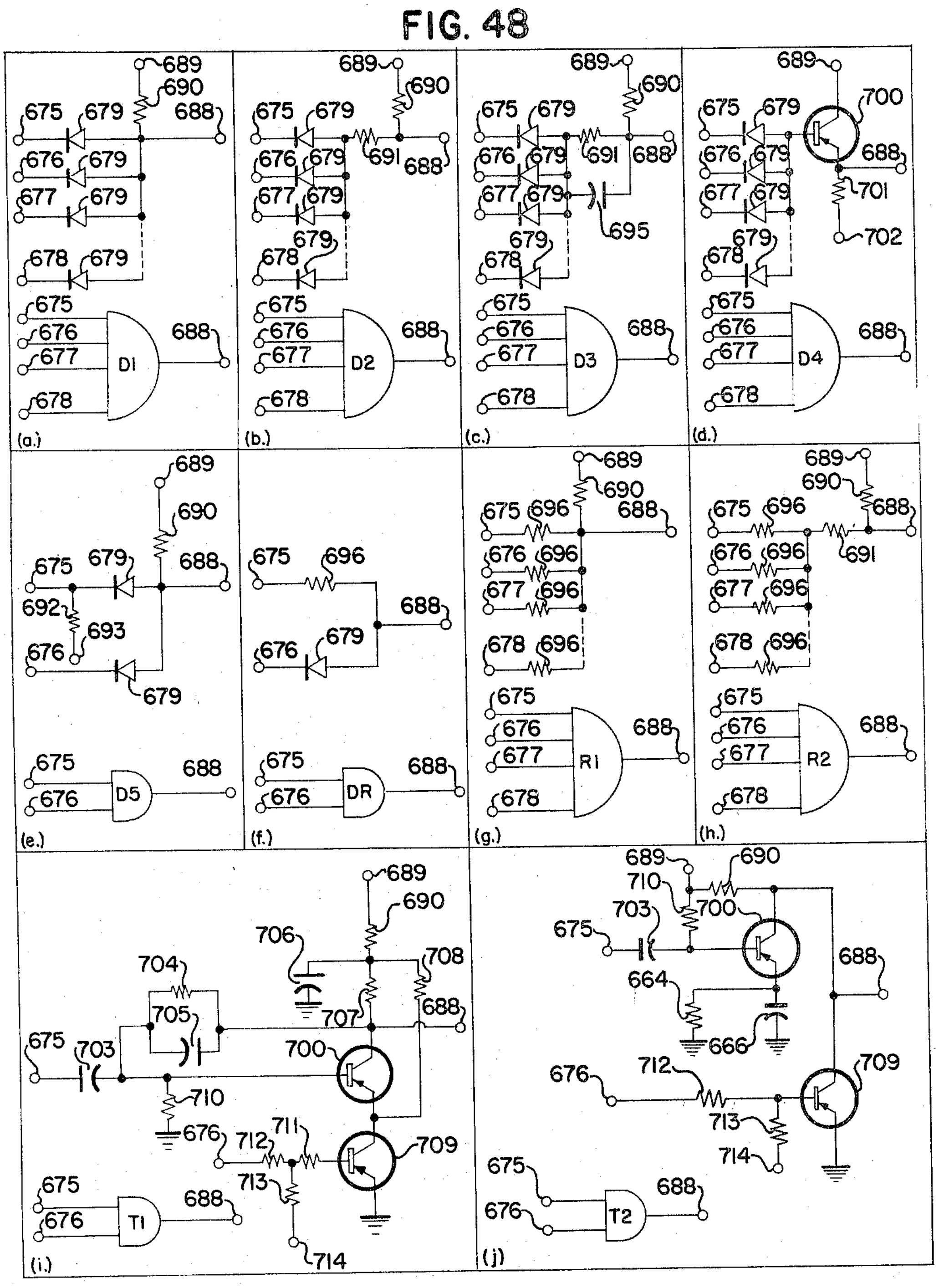
Figure 49:
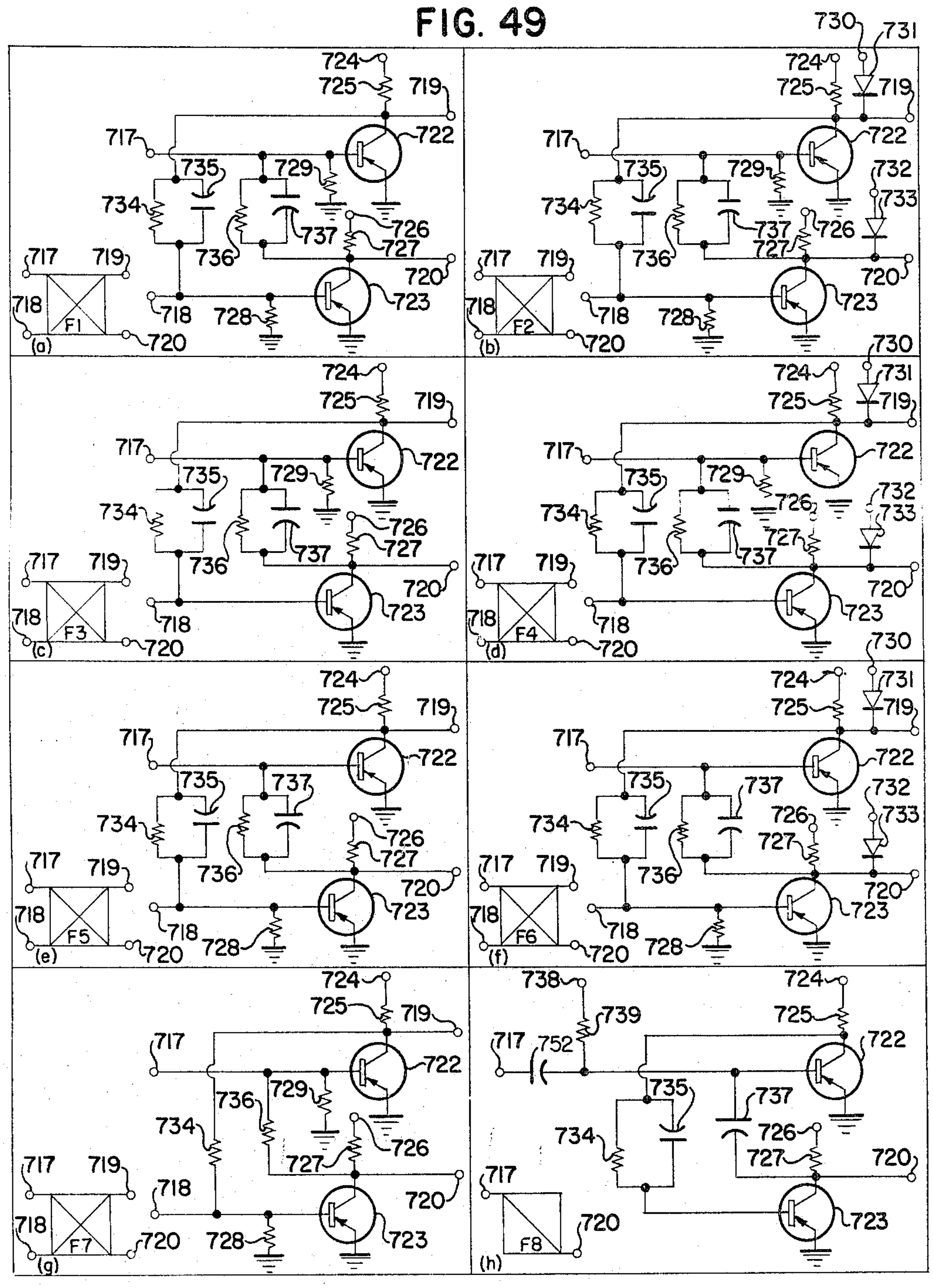
Figure 52A:
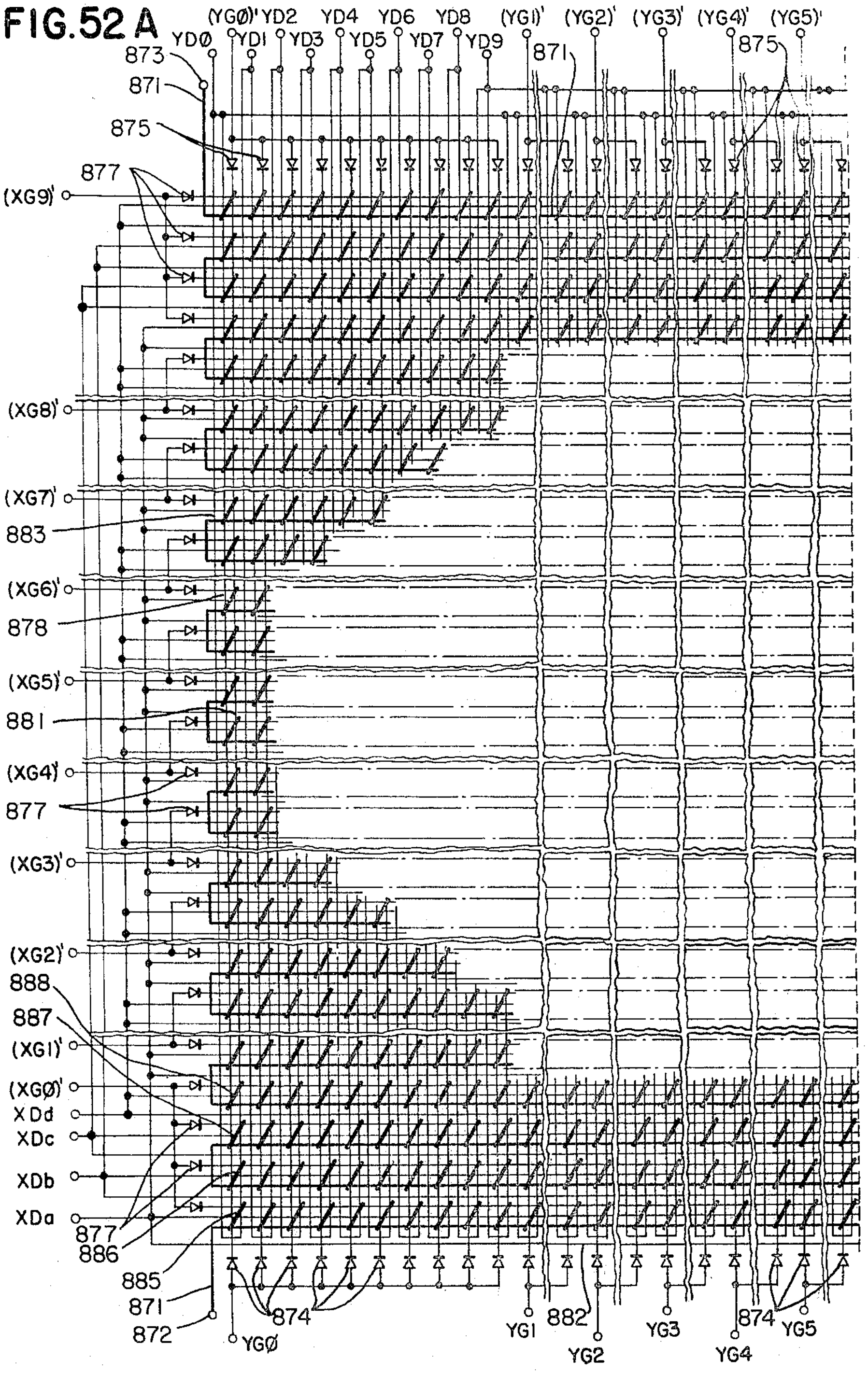
Figure 52B:
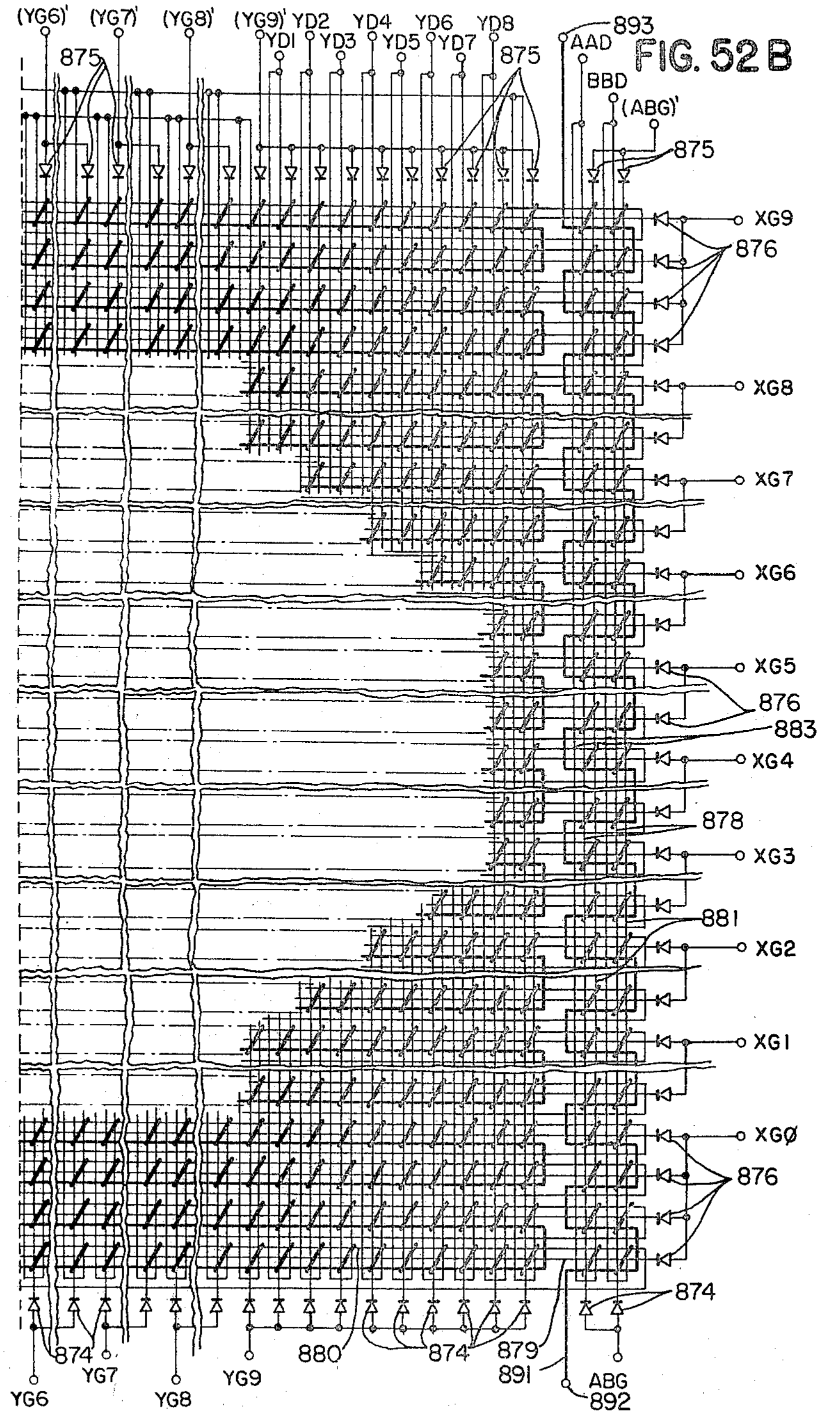
Figure 53:
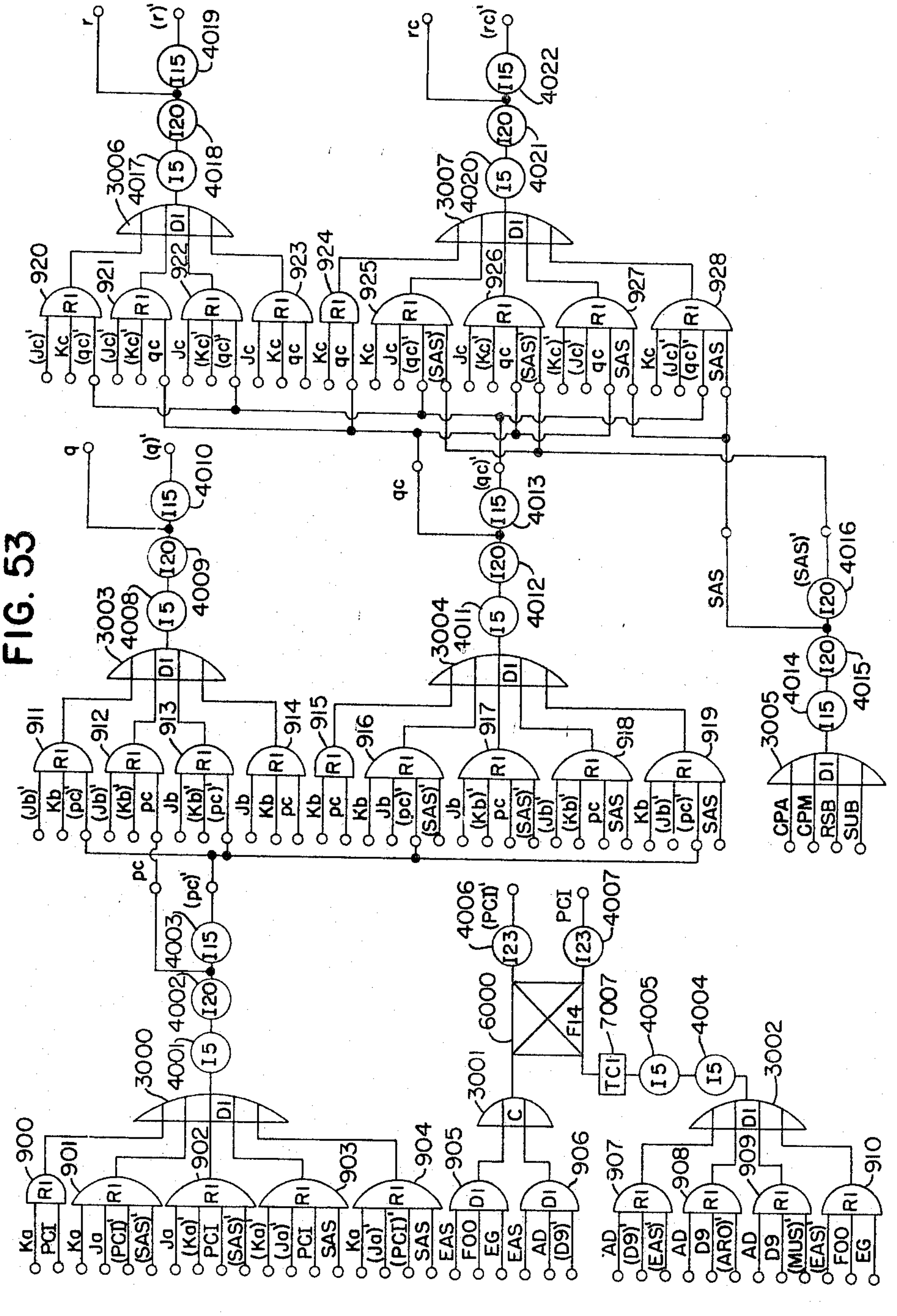
Figure 54:
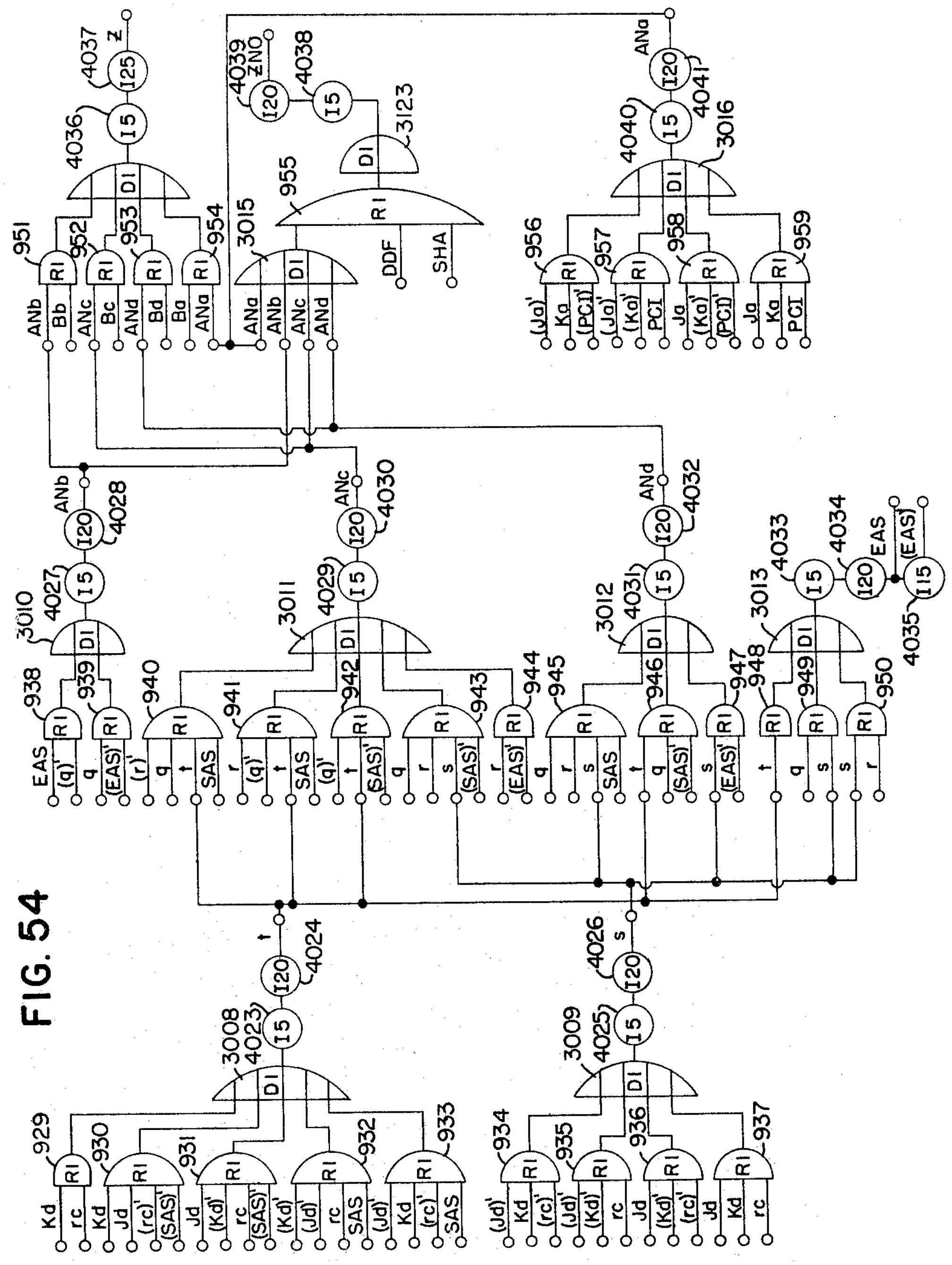
Figure 55:
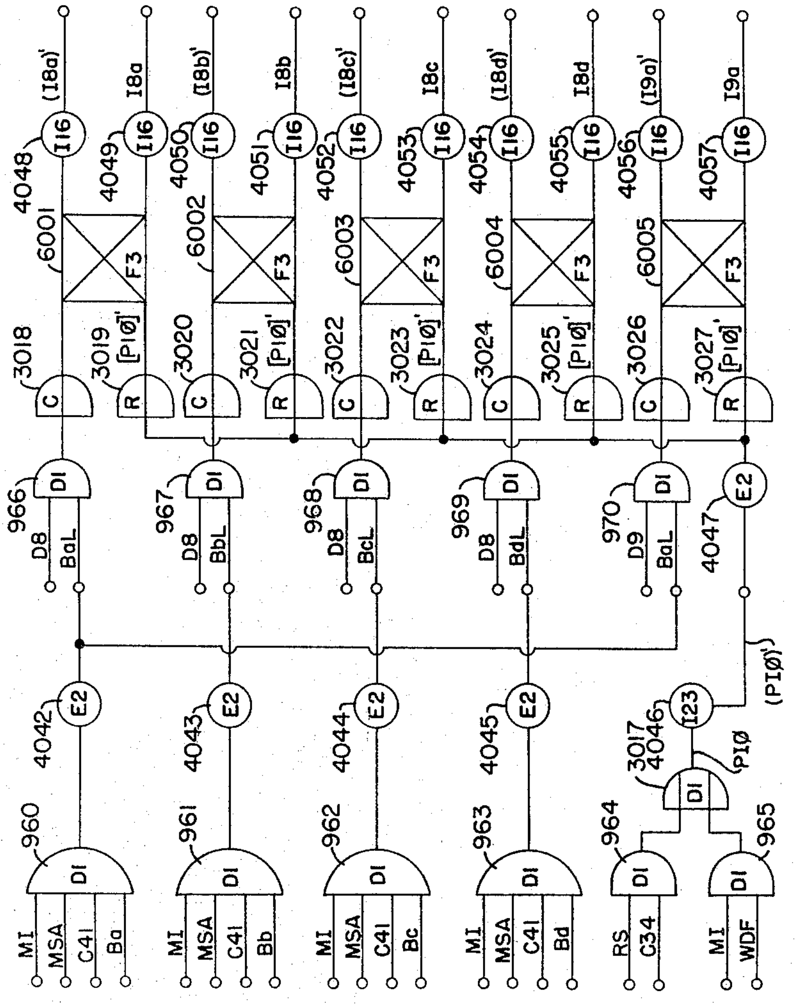
Figure 56:
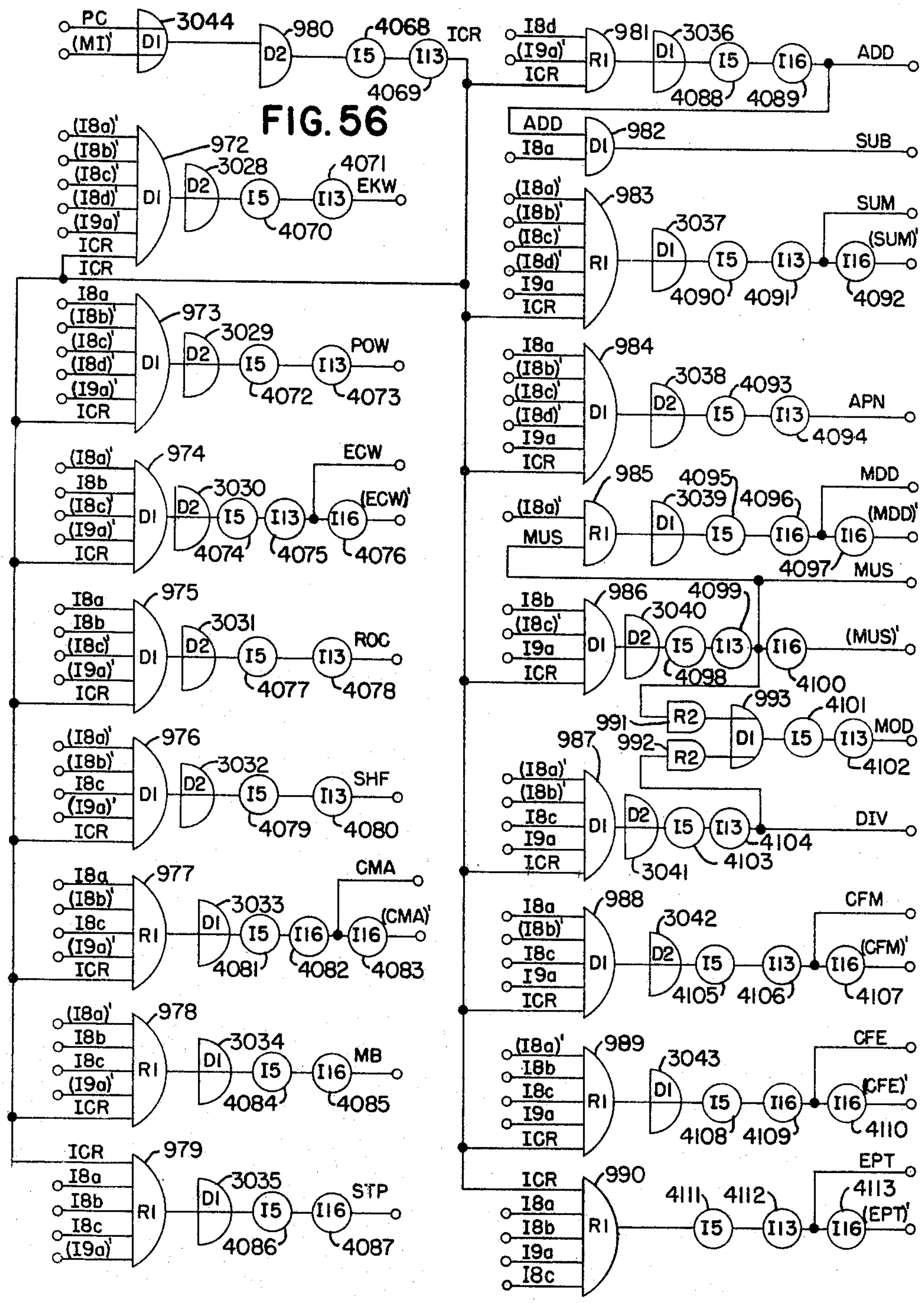
Figure 58:
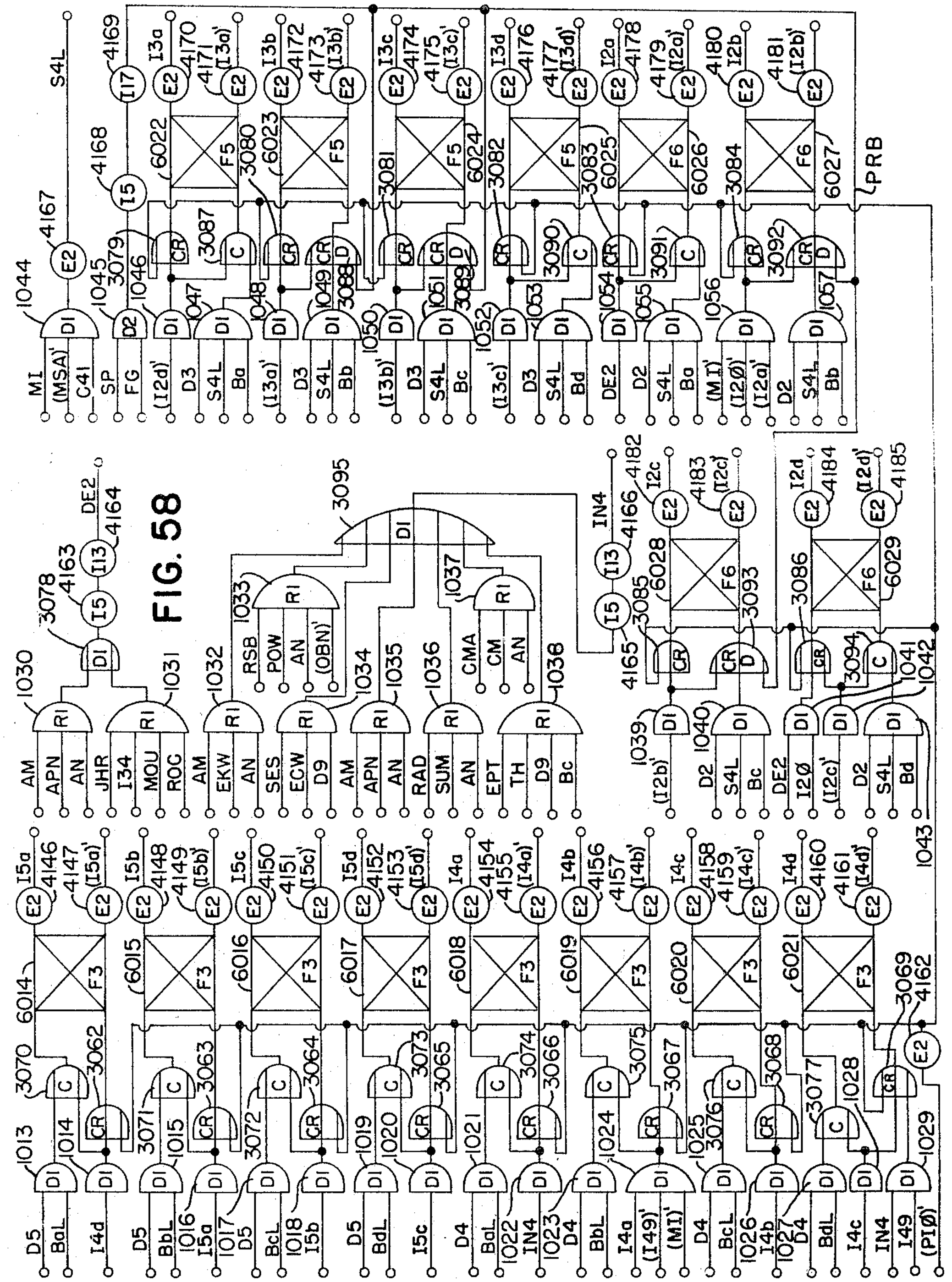
Figure 59:
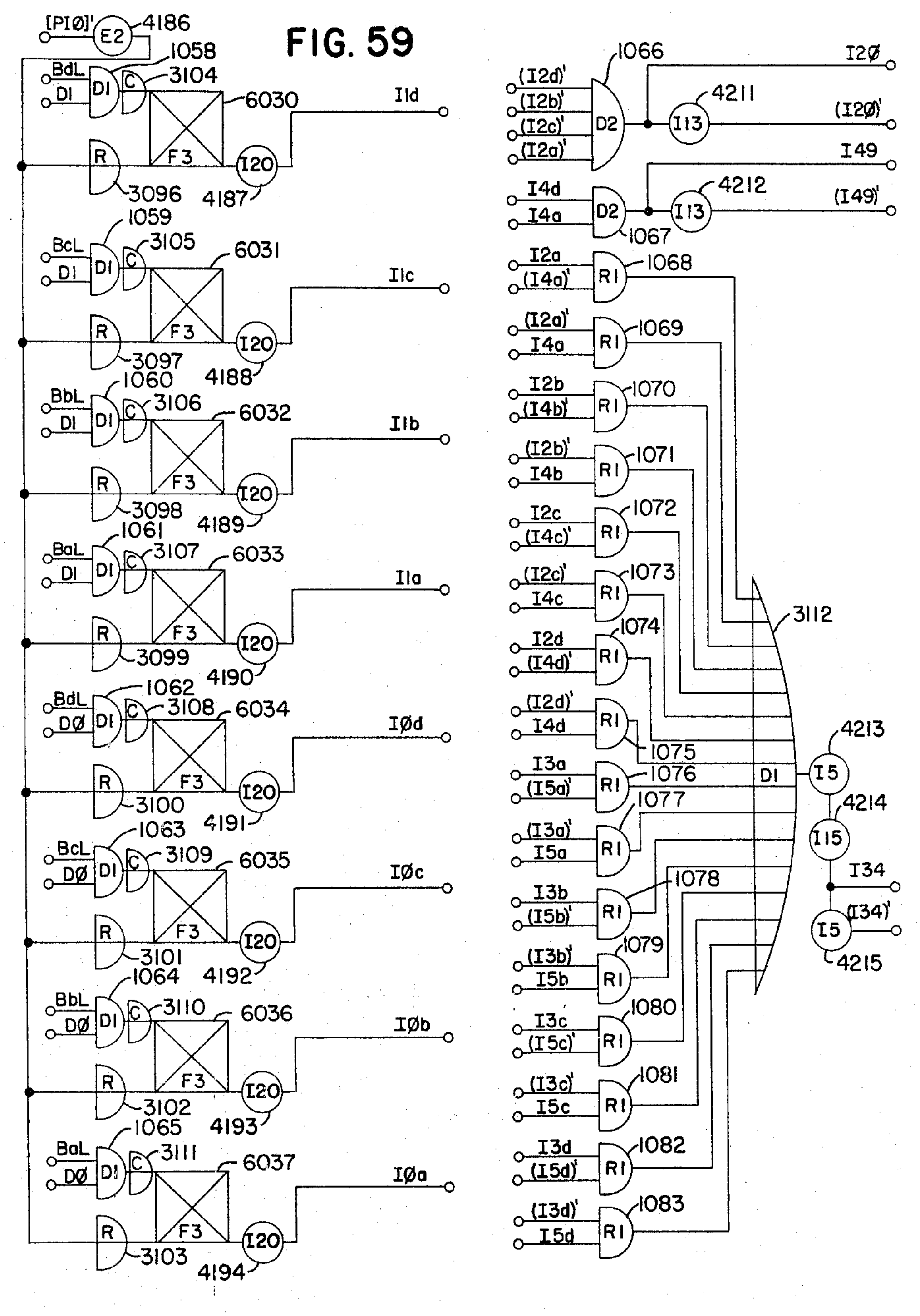
Figure 60:
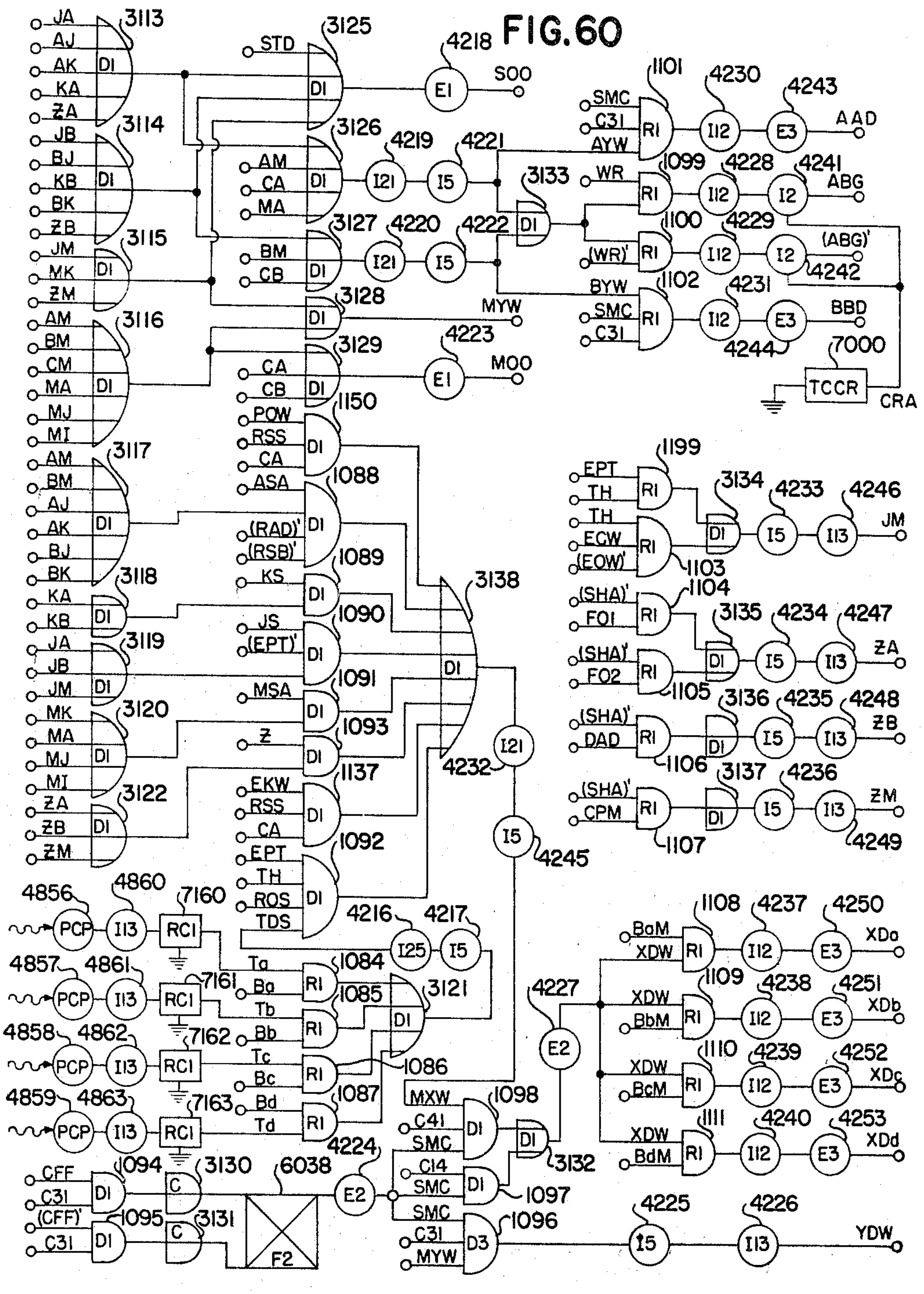
Figure 61:
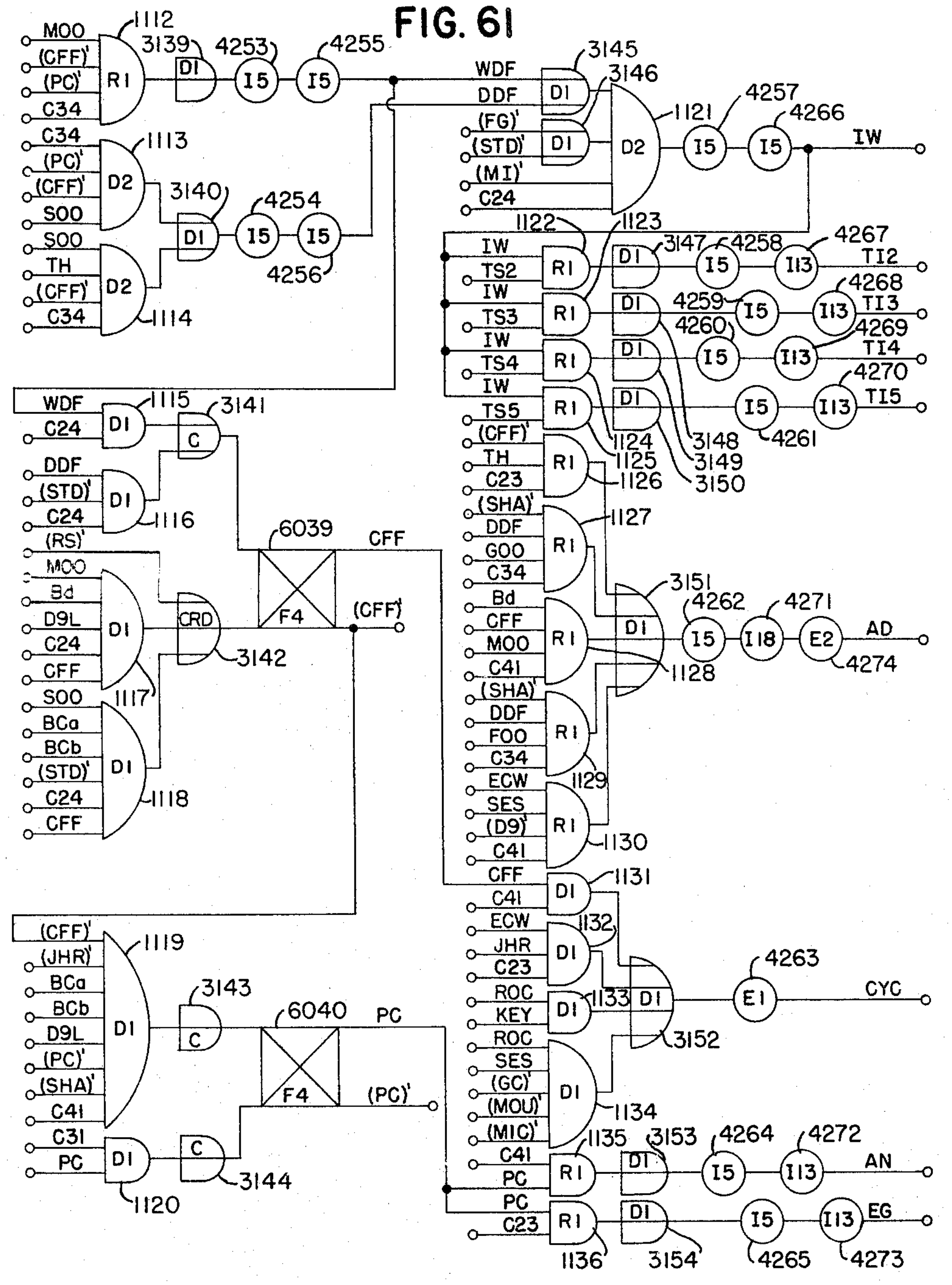
Figure 62:
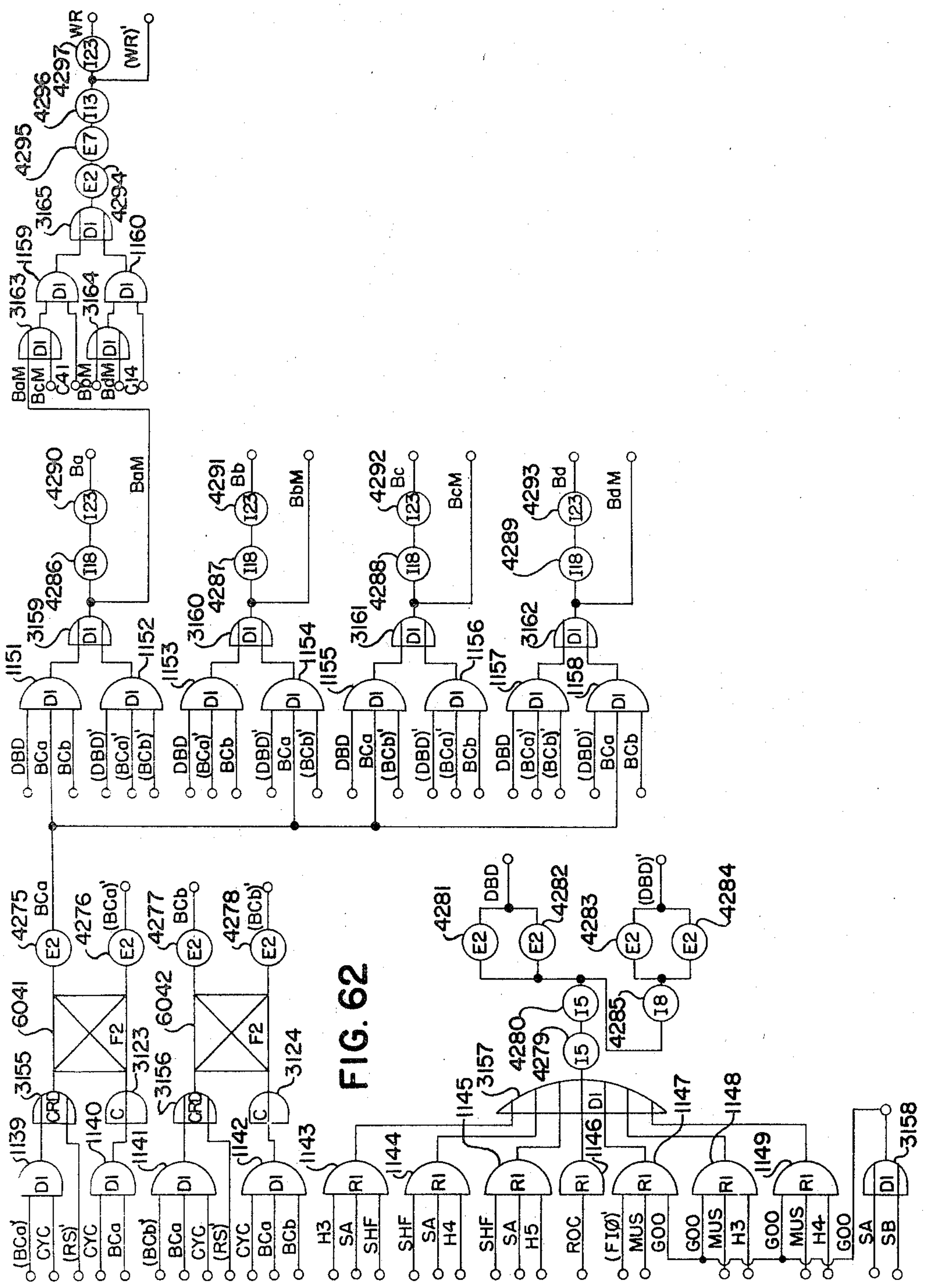
Figure 63:
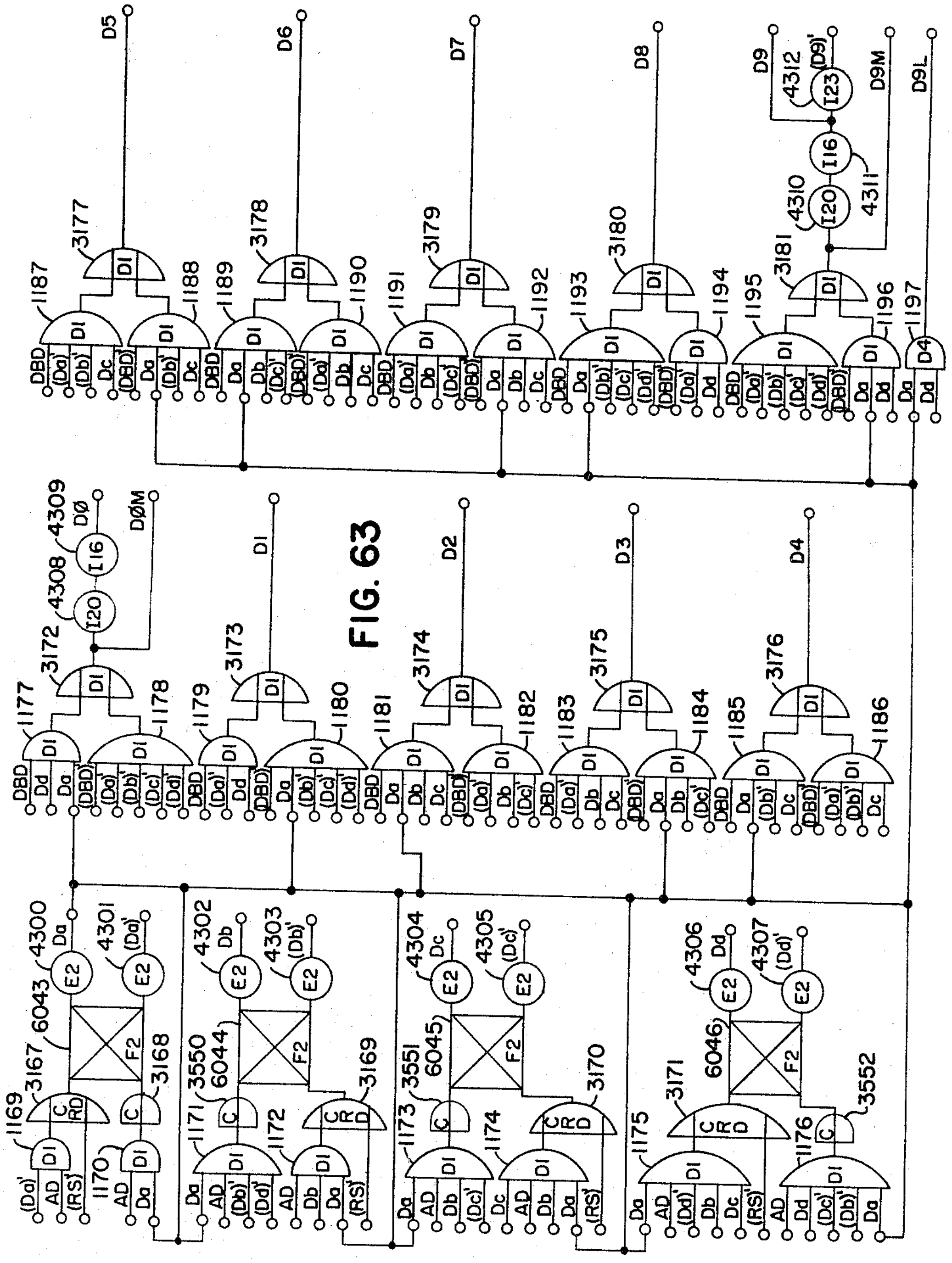
Figure 64:
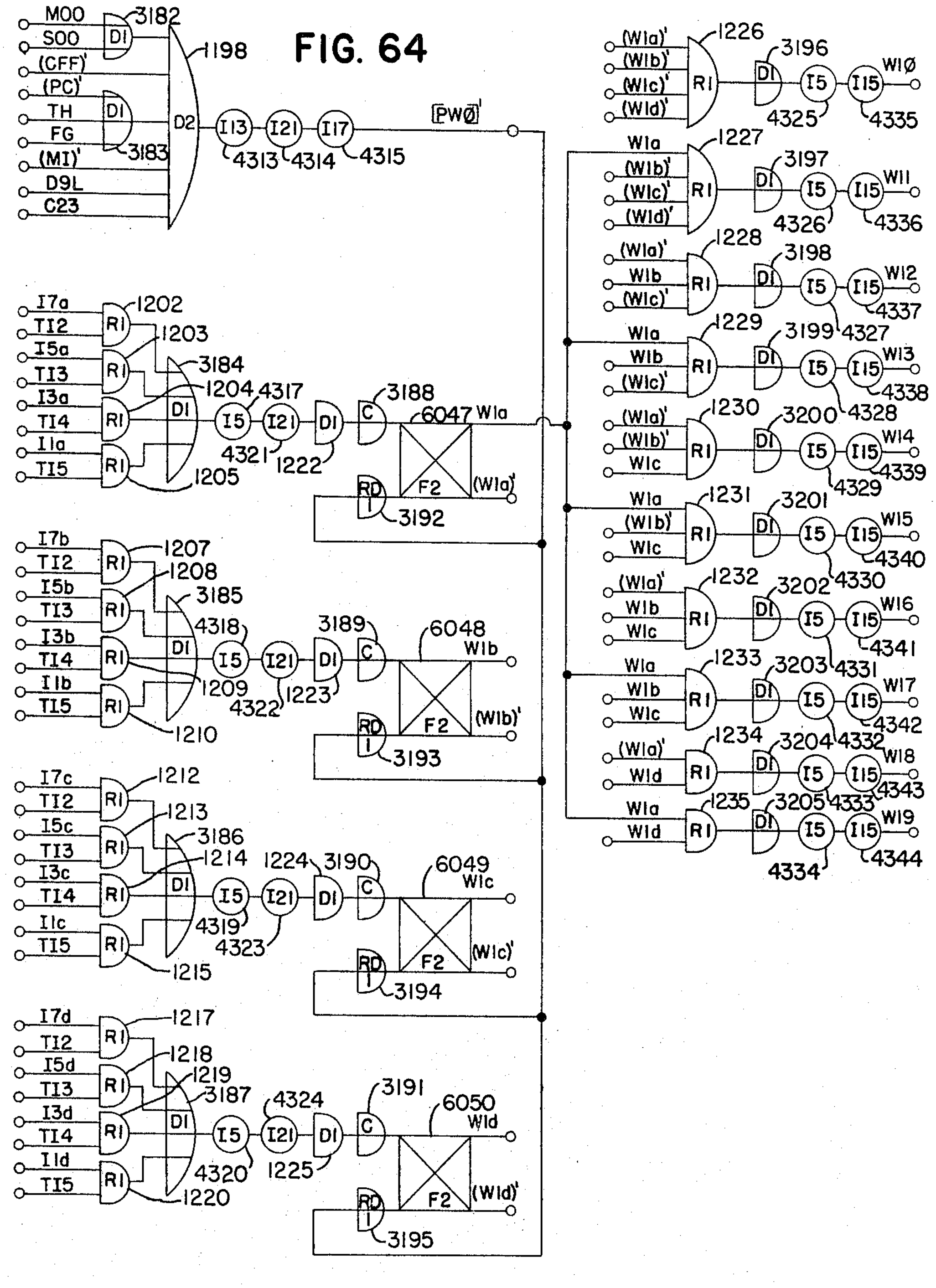
Figure 65:
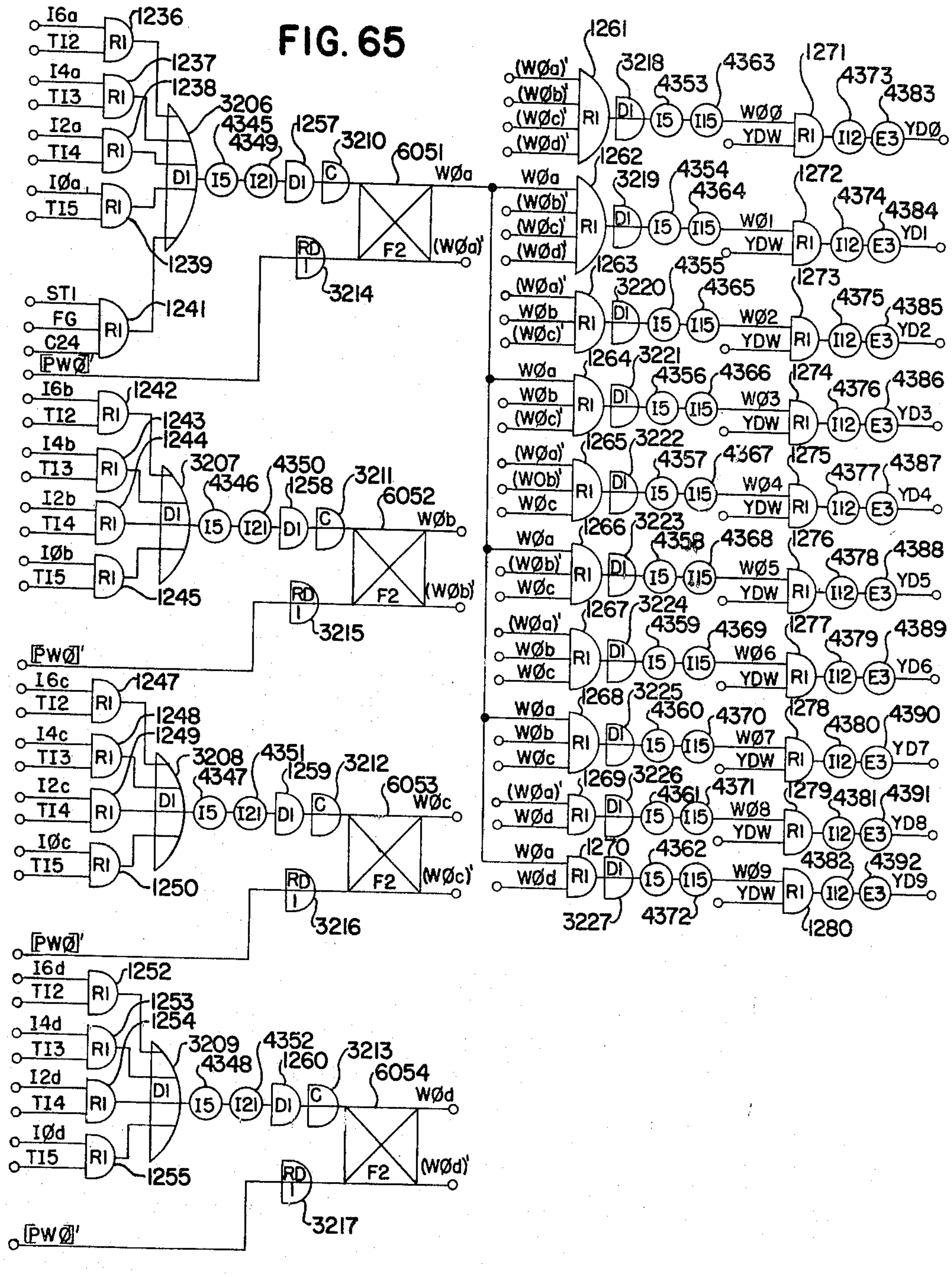
Figure 66:
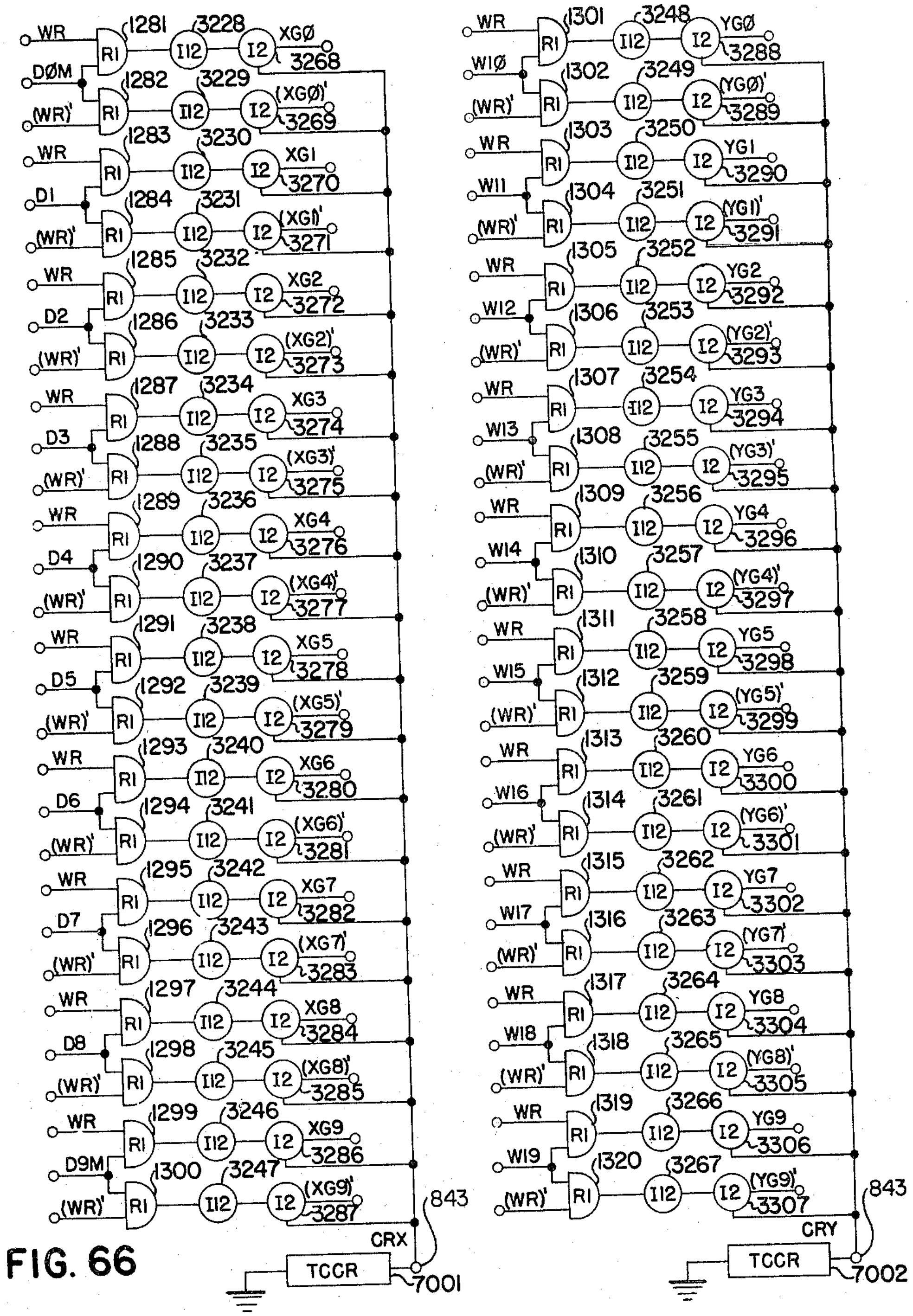
Figures 67A, 67B:
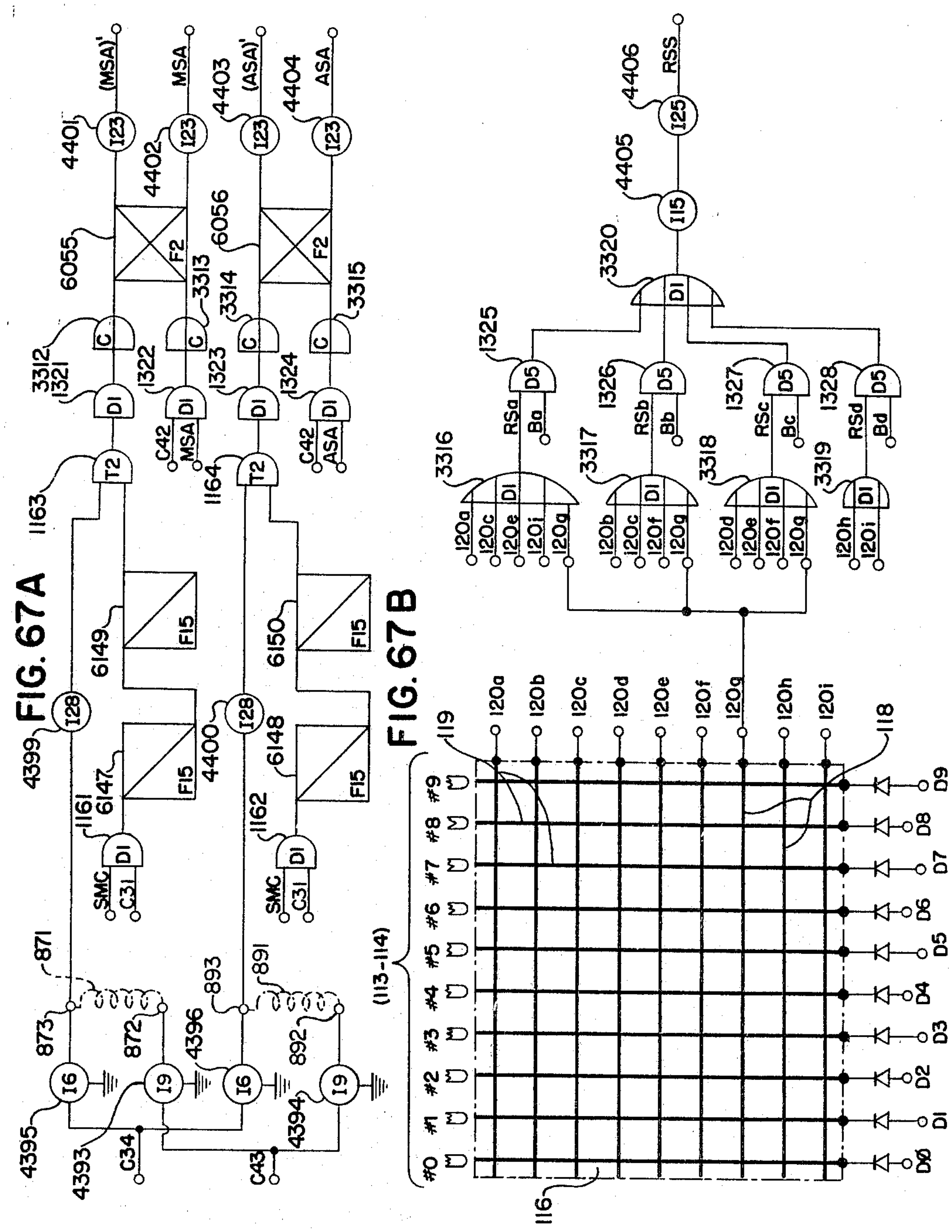
Figure 68:
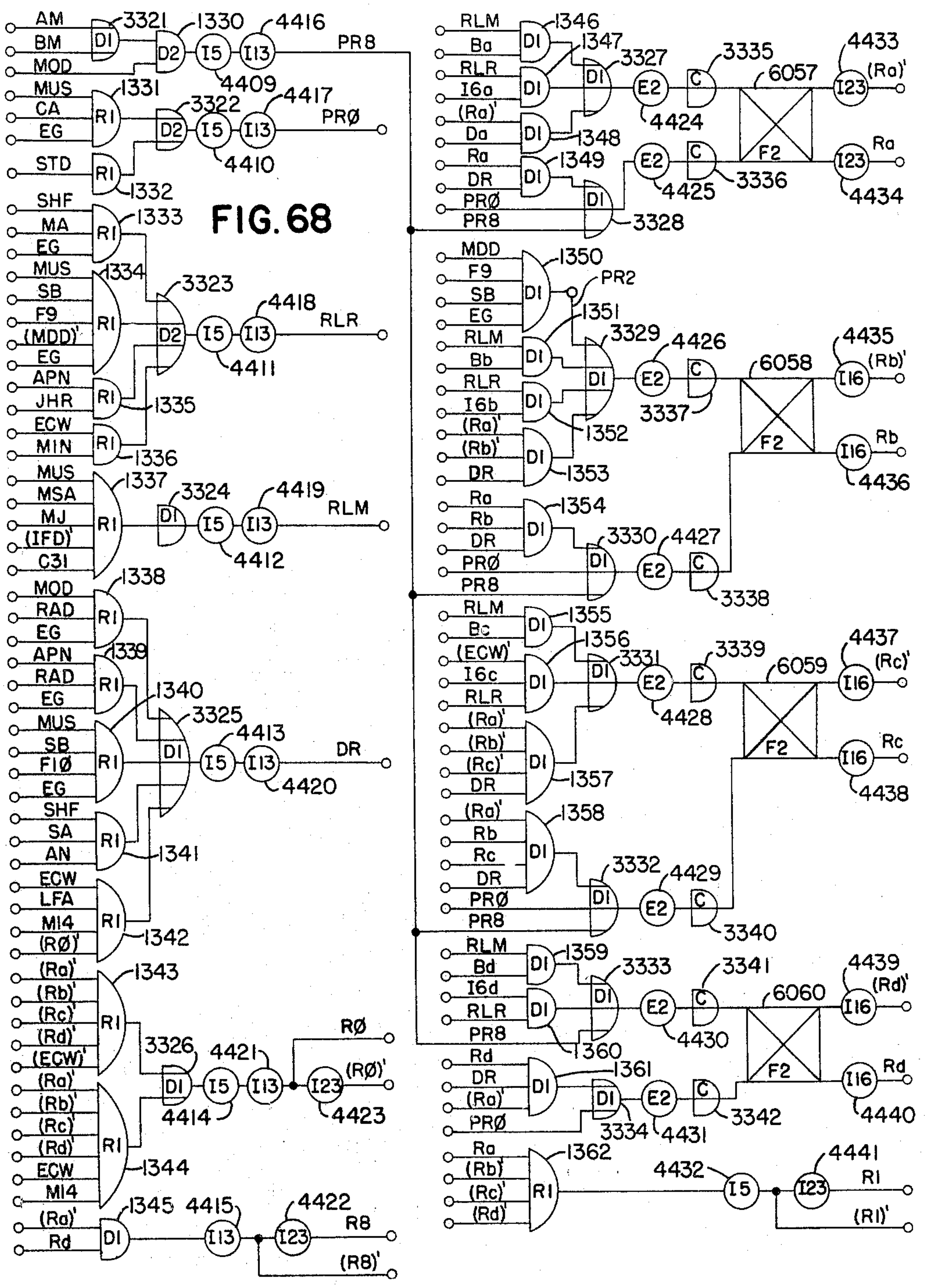
Figure 69:
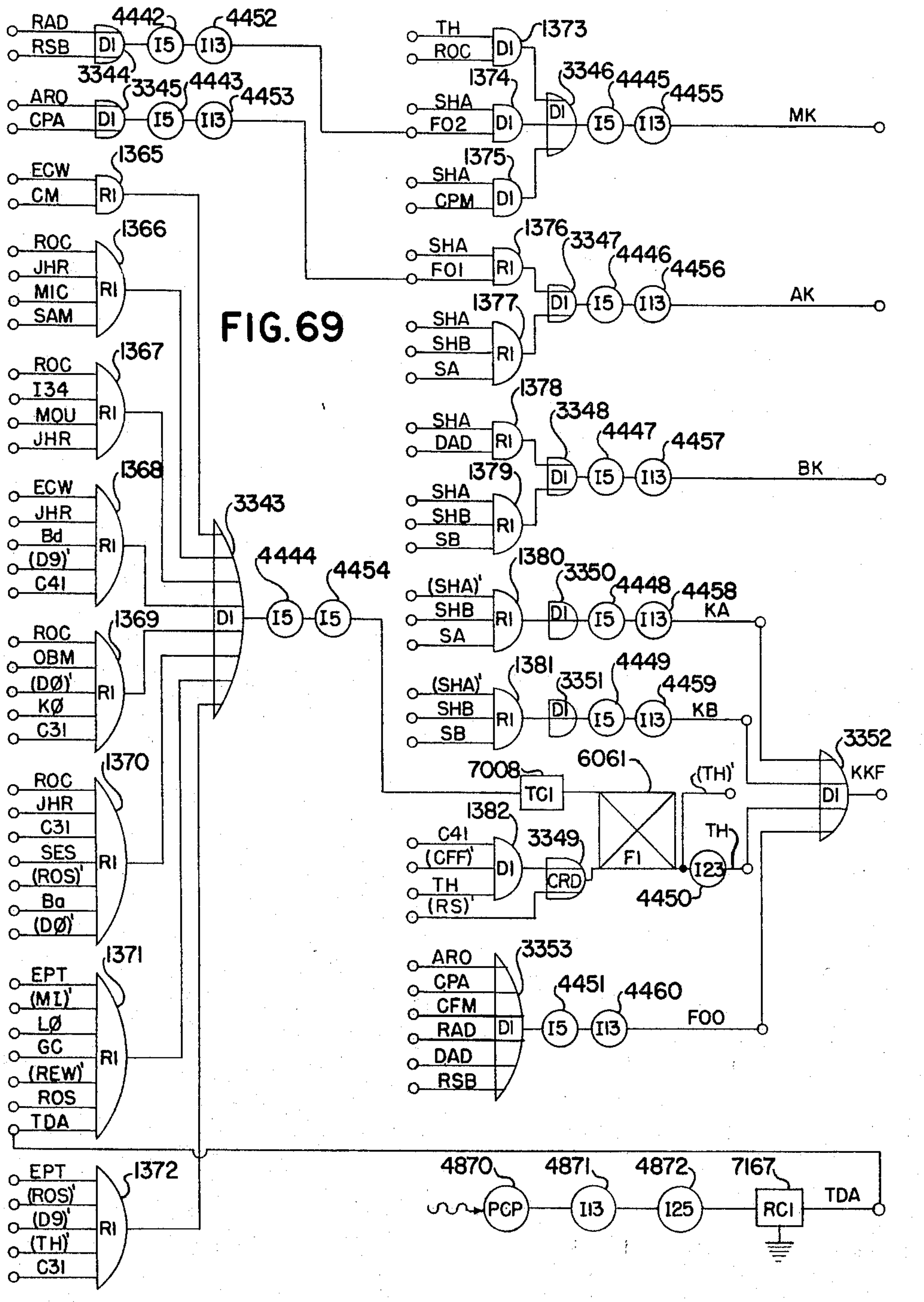
Figure 70:
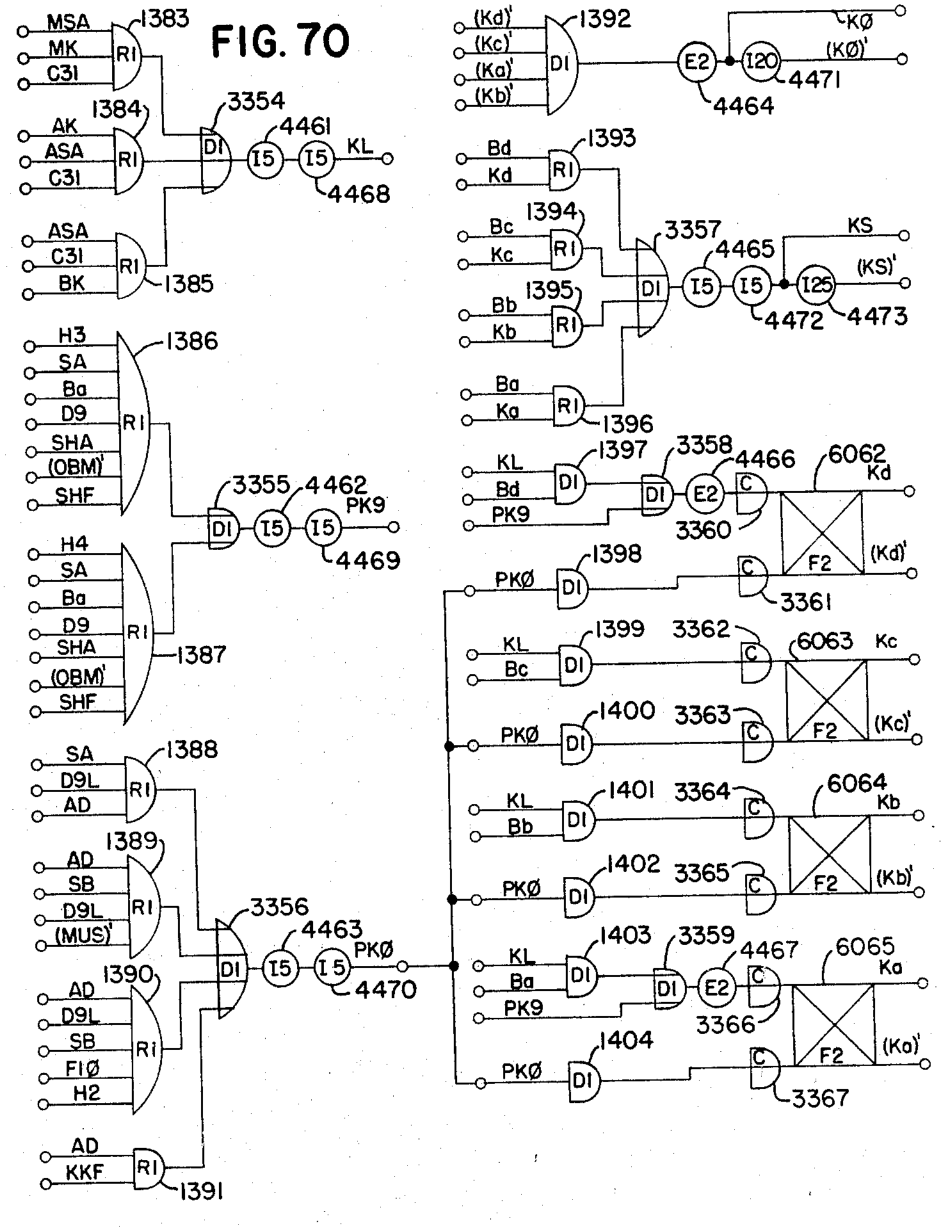
Figure 71:
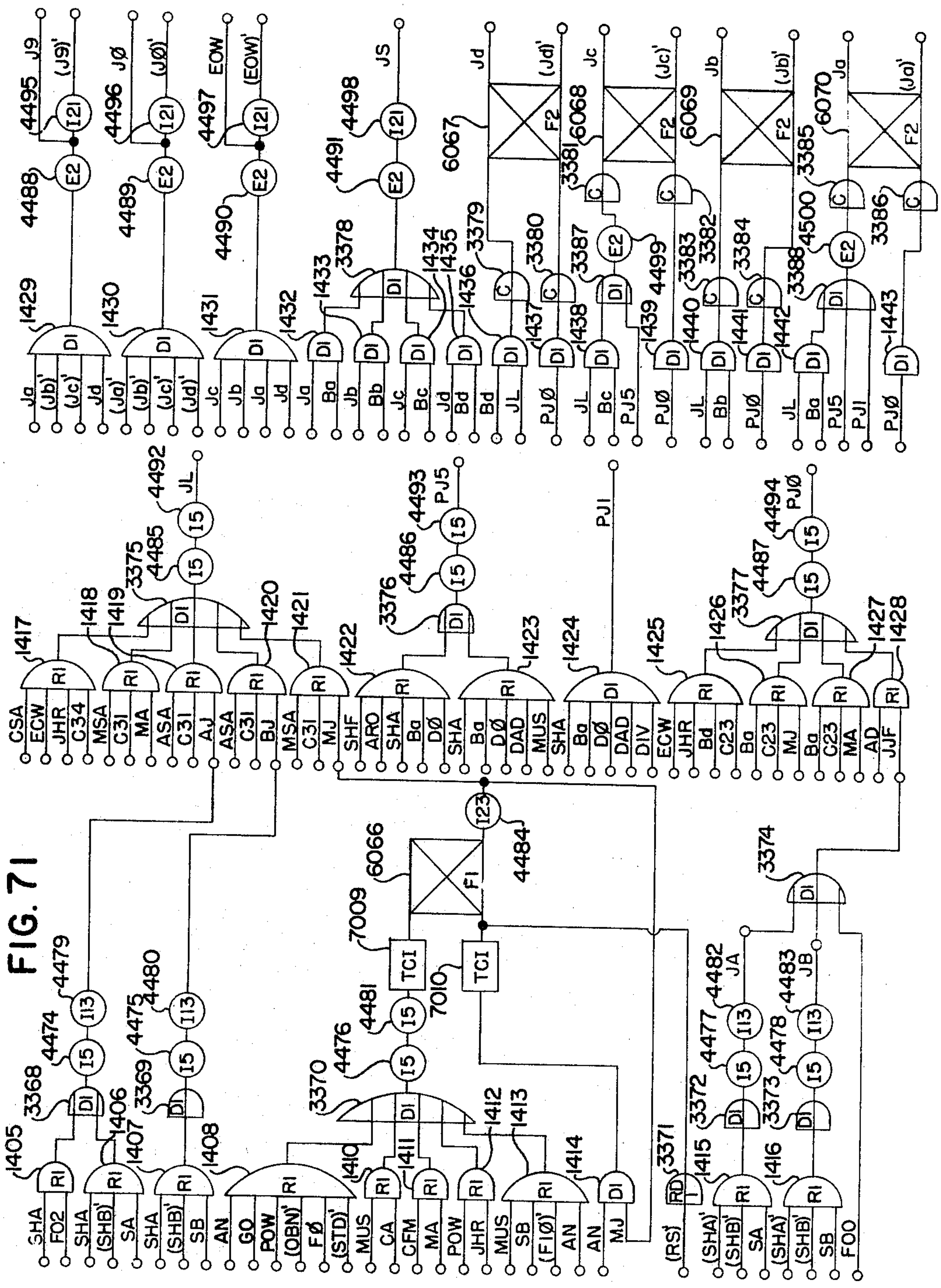
Figure 72:
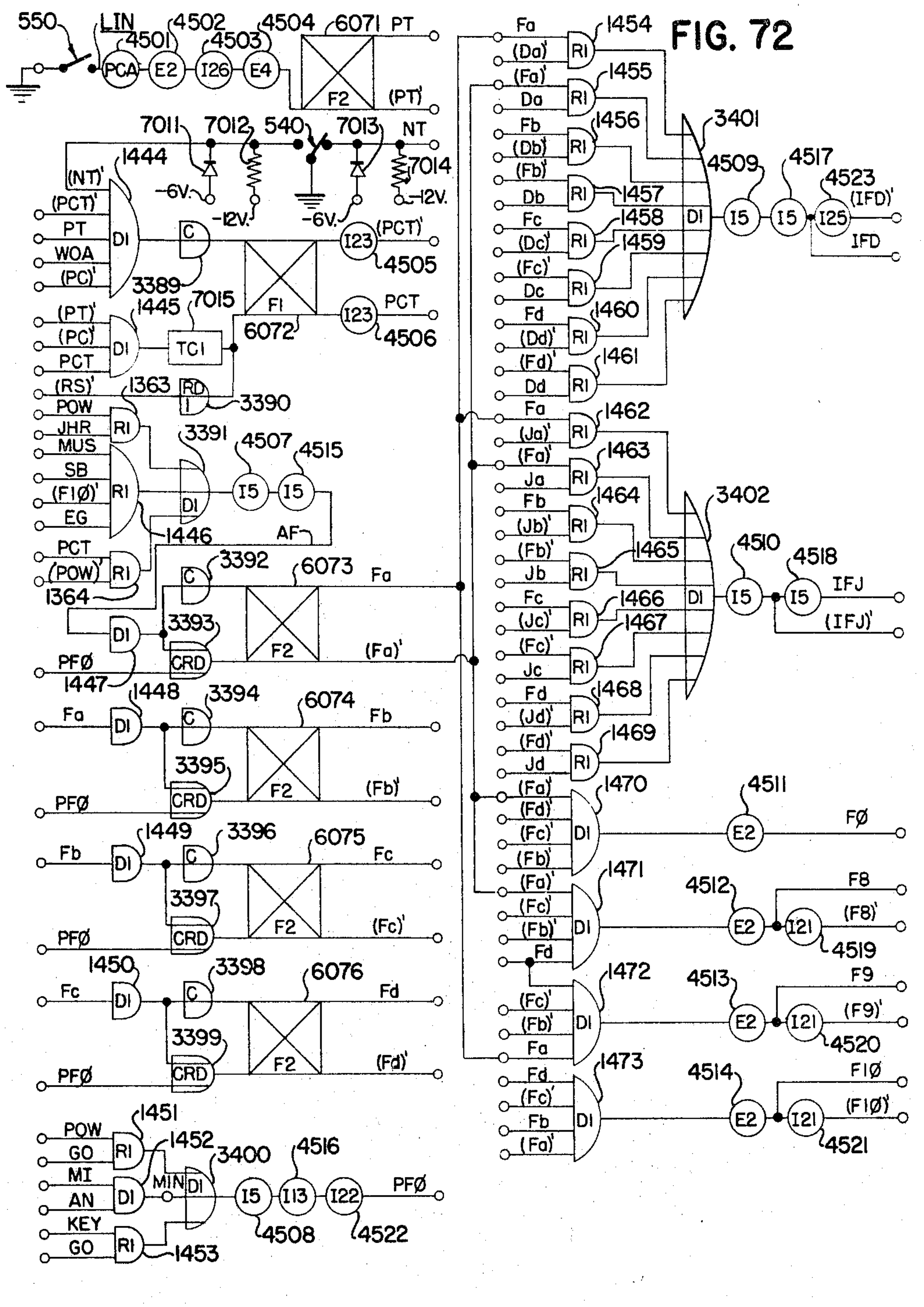
Figure 73:
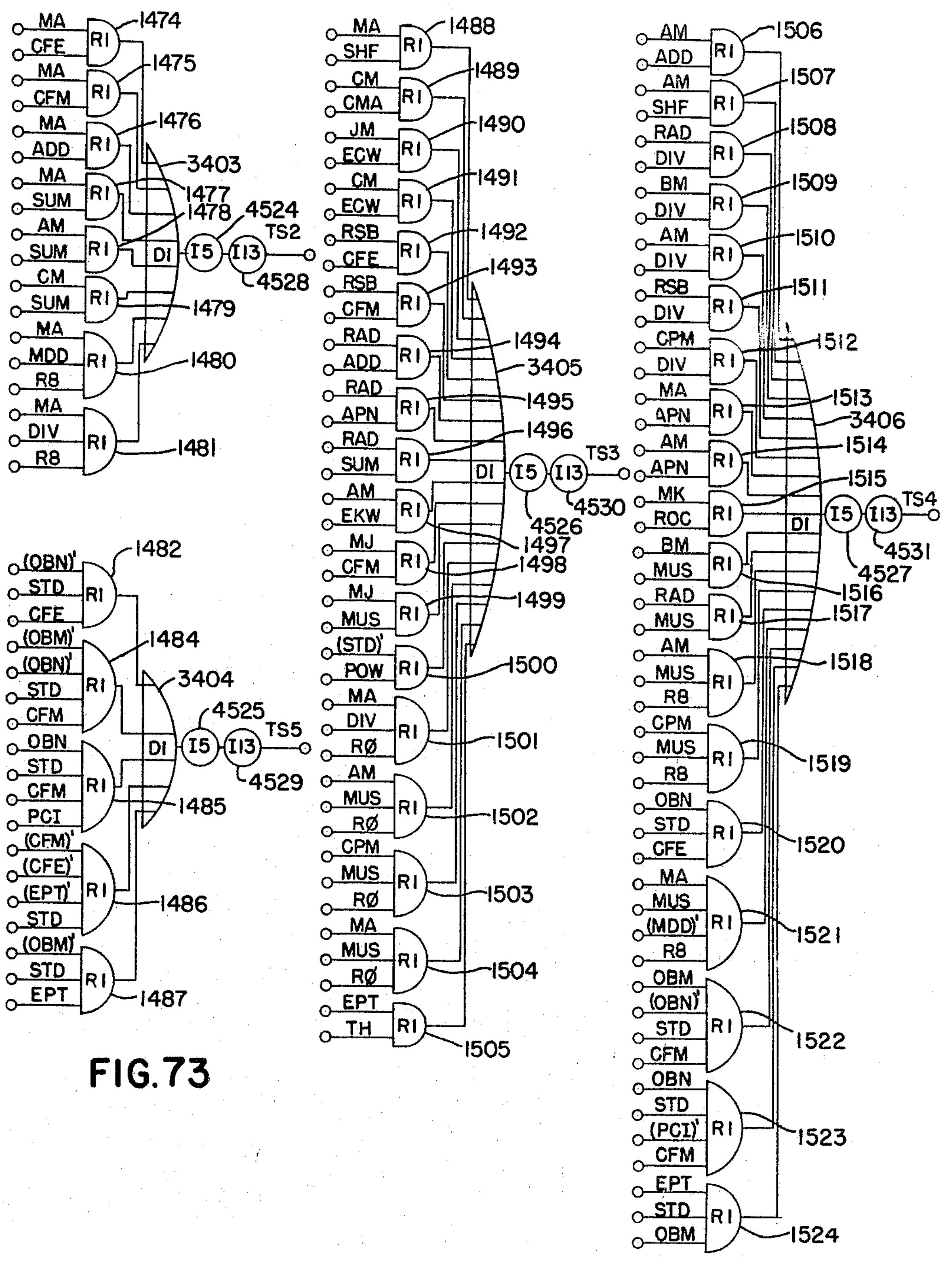
Figure 74:
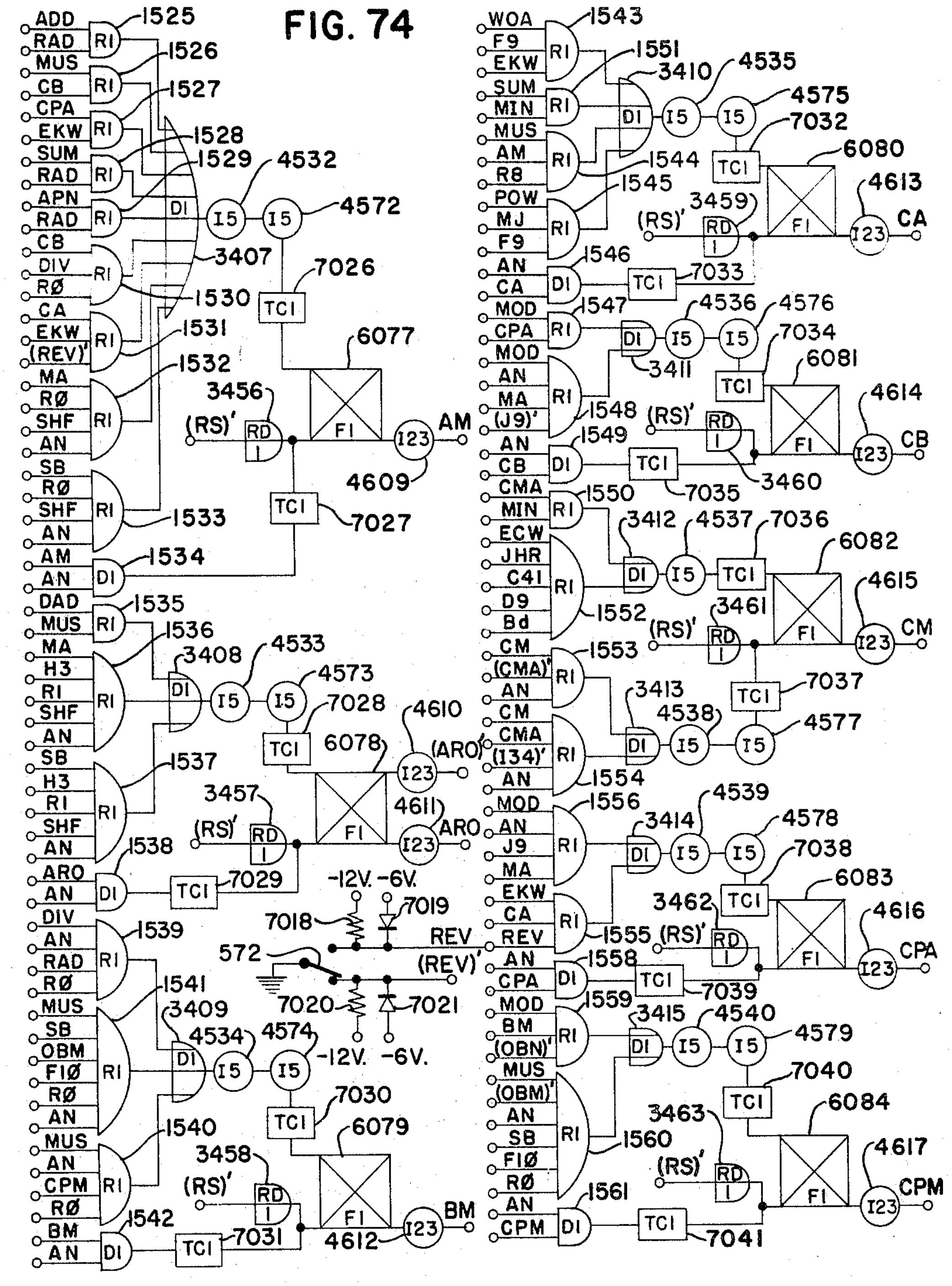
Figure 75:
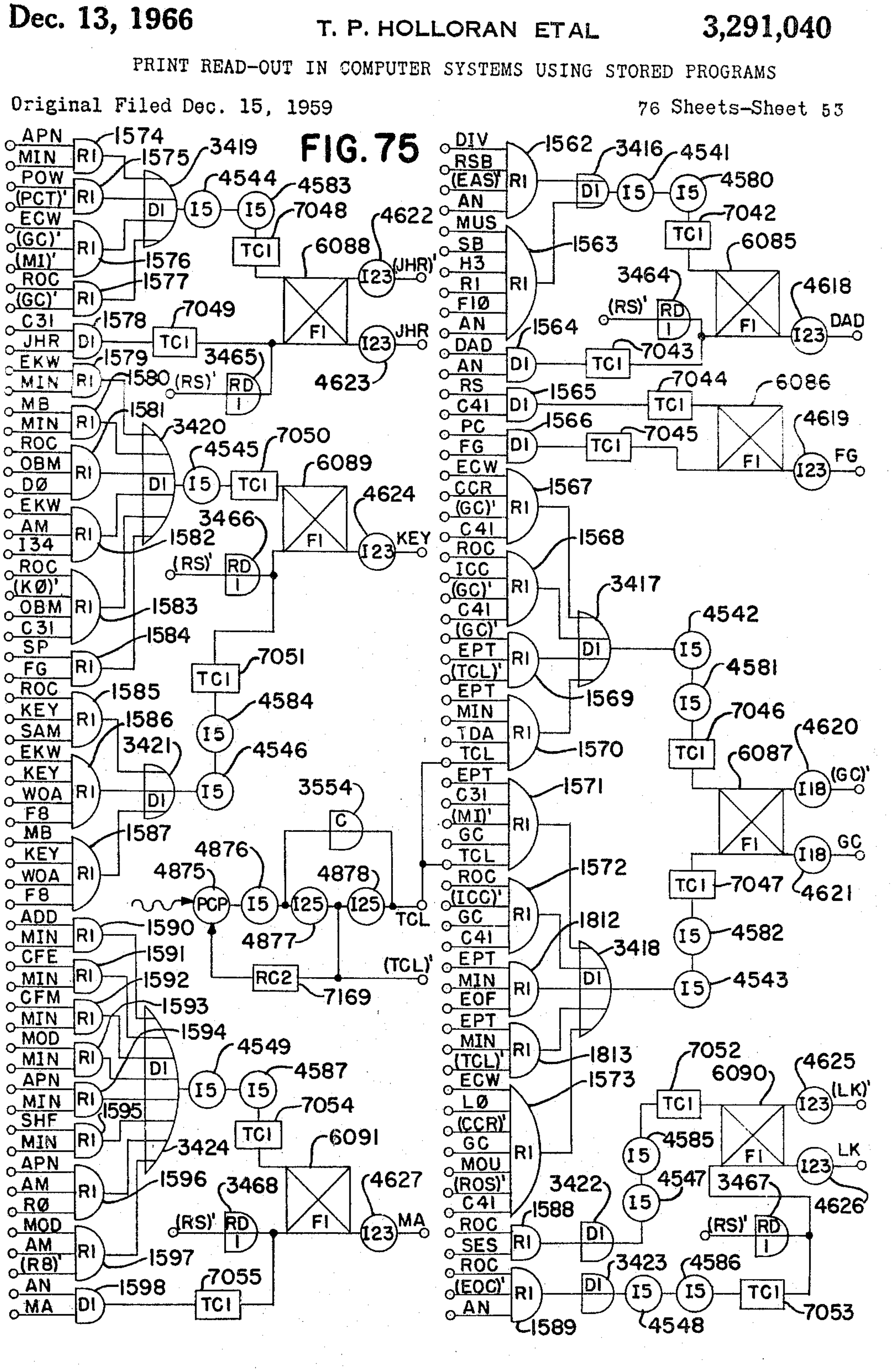
Figure 76:
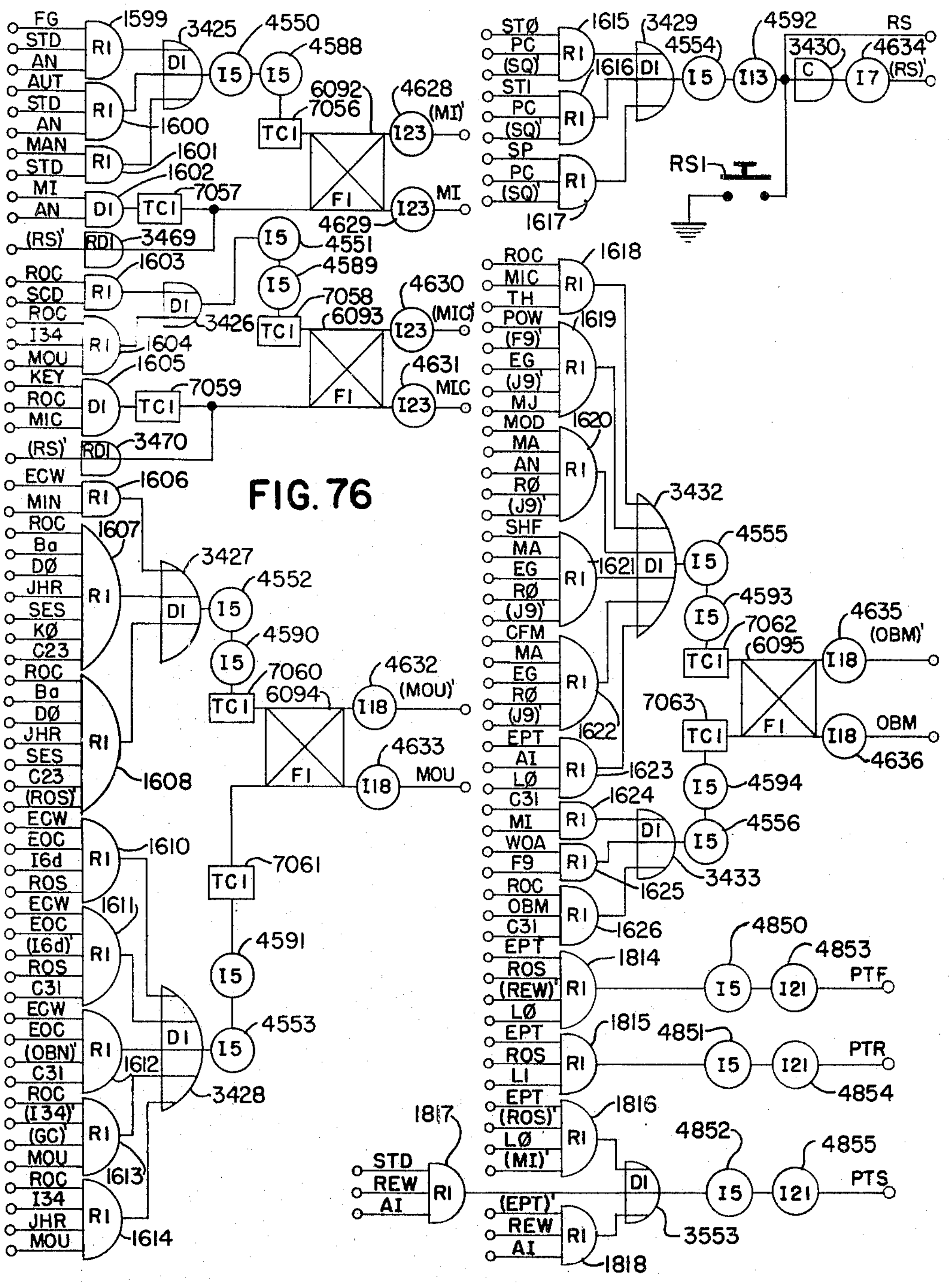
Figure 77:
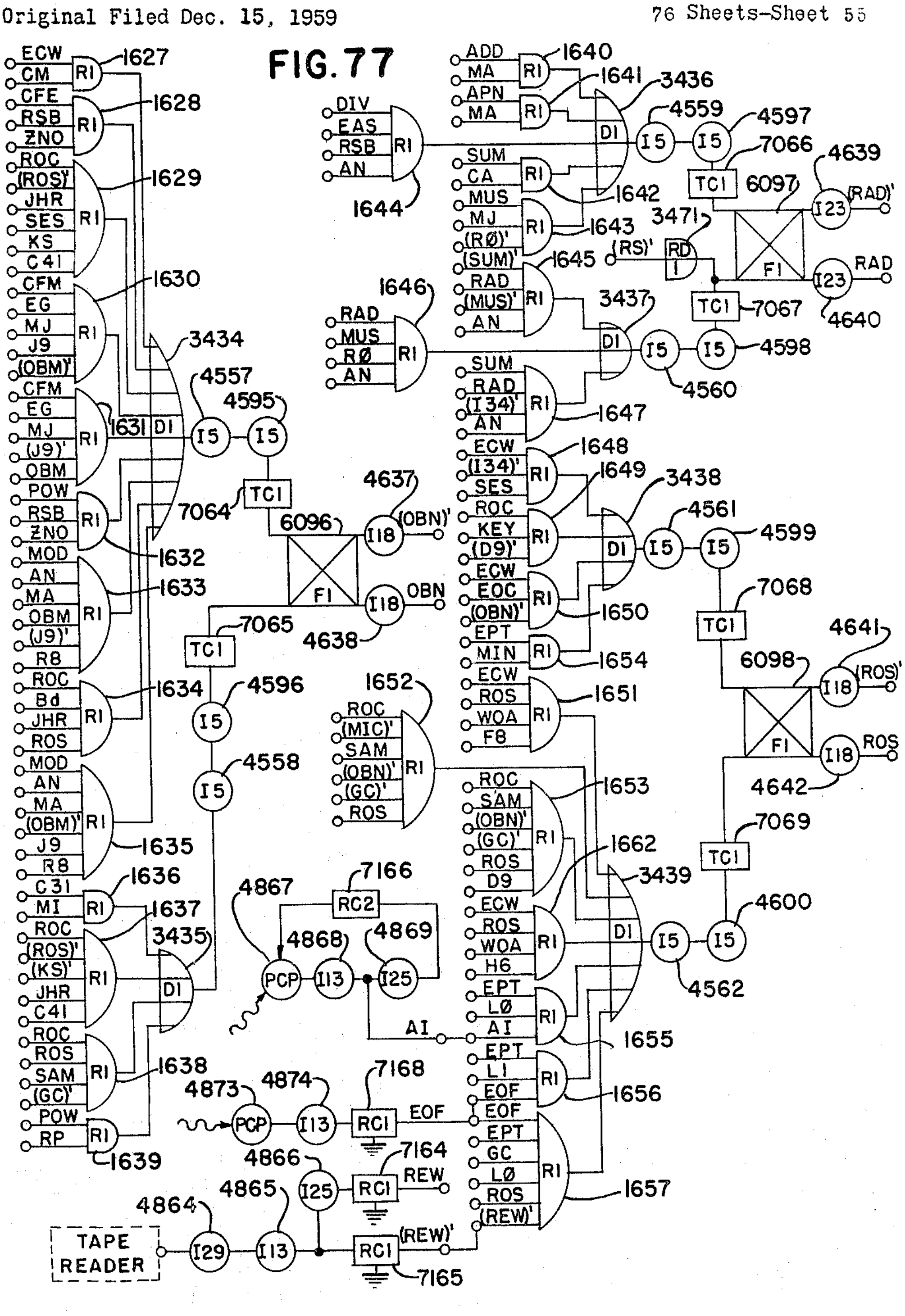
Figure 78:
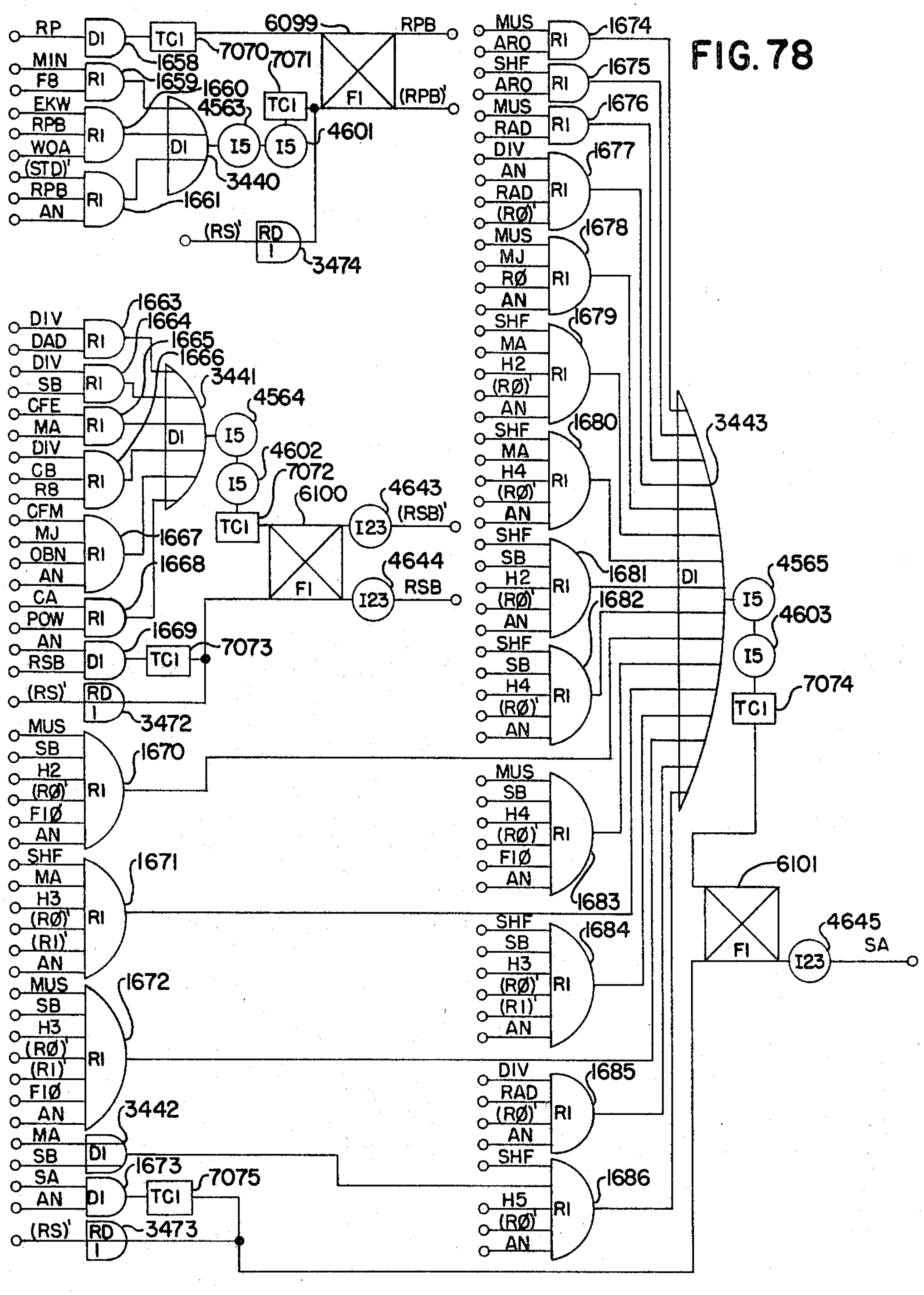
Figure 79:
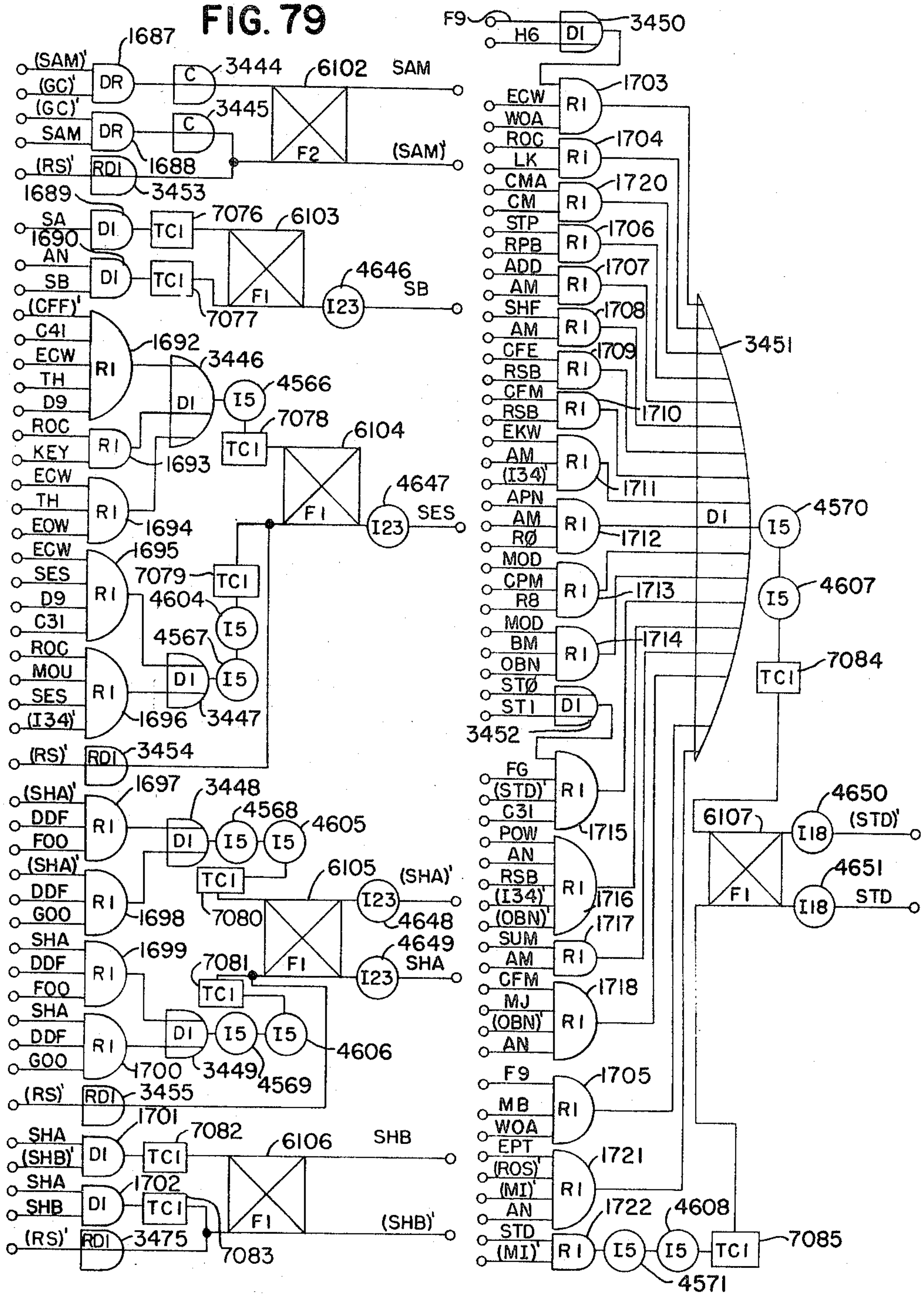
Figure 80:
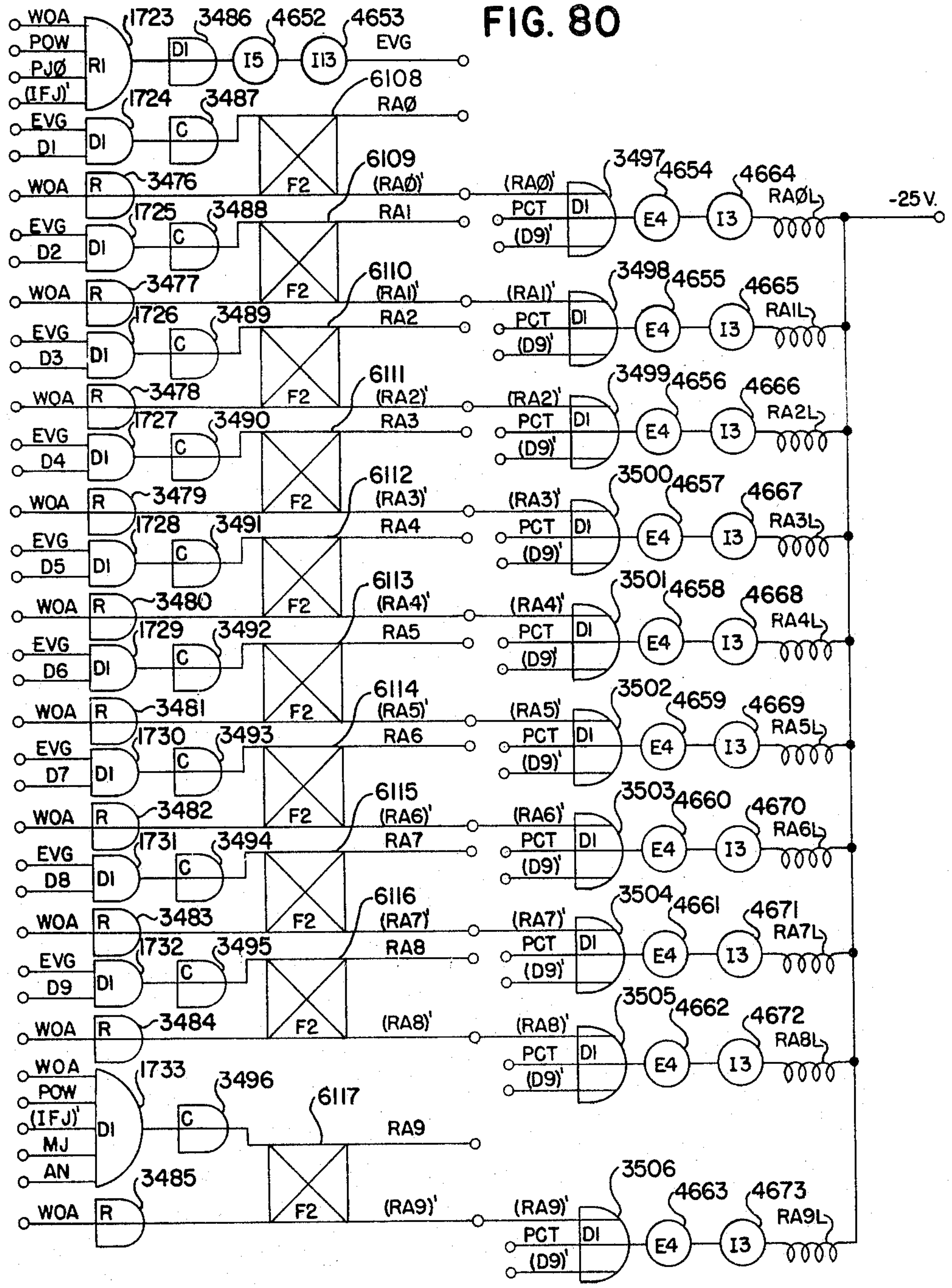
Figure 81:
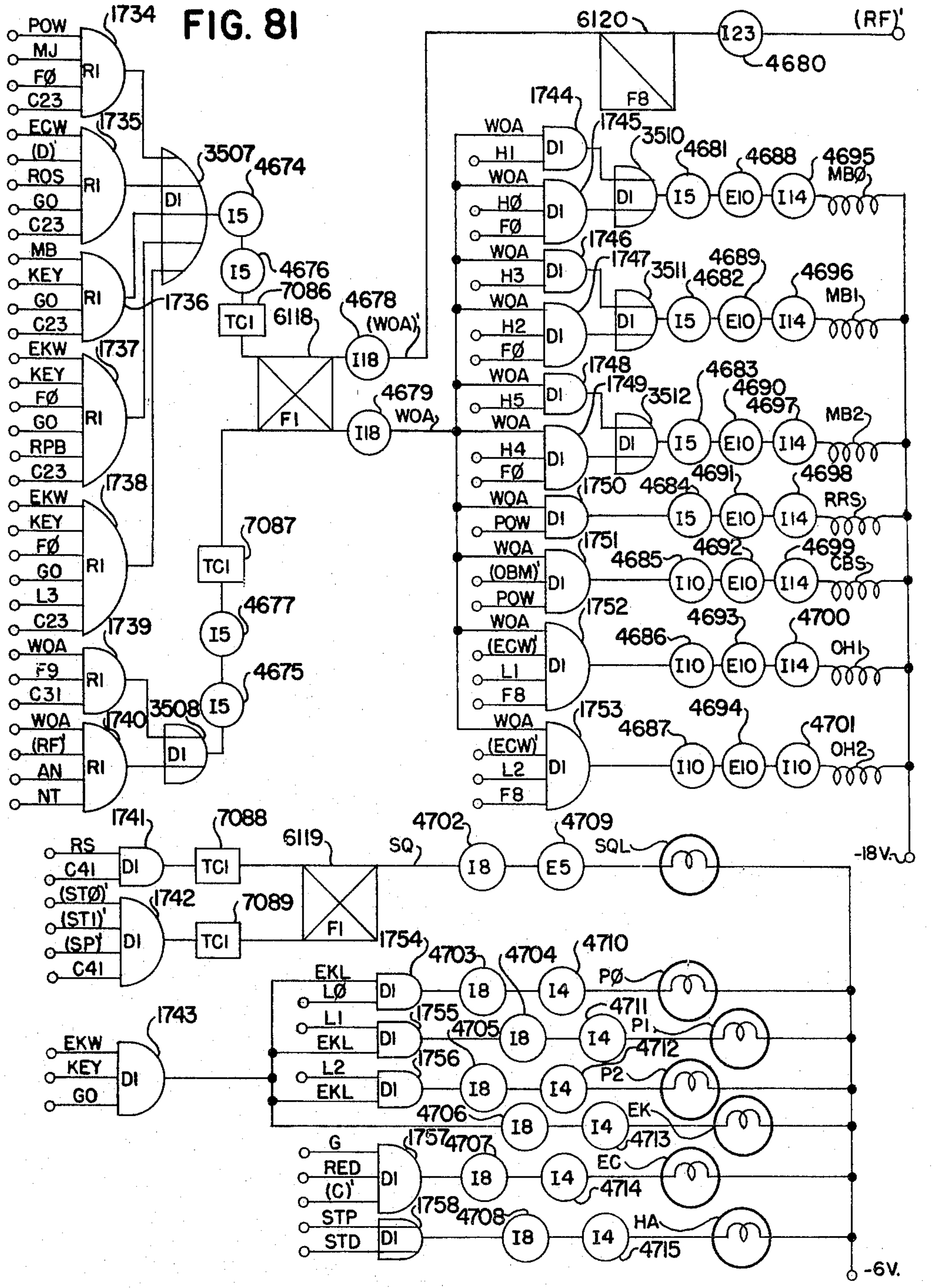
Figure 82:
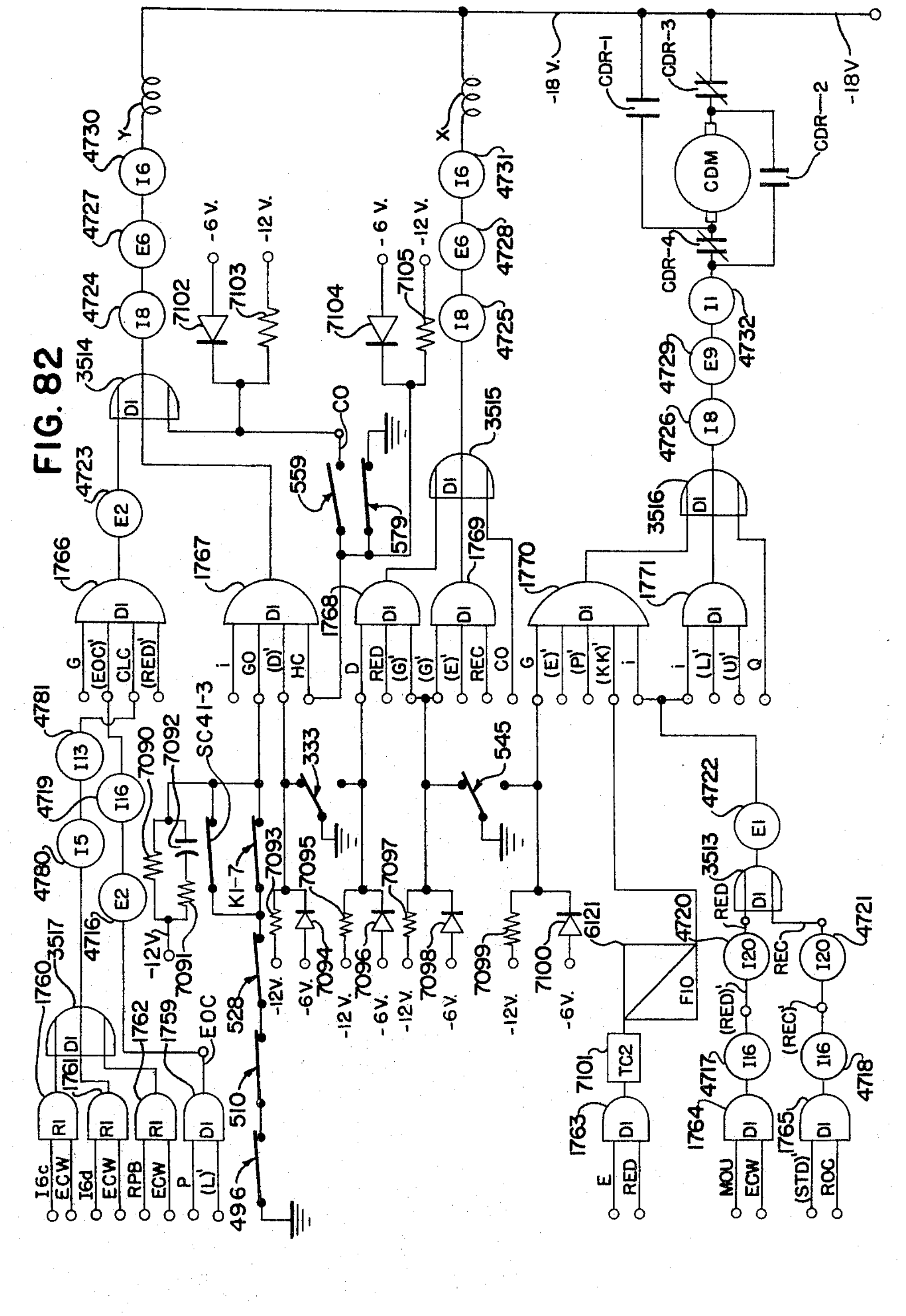
Figure 83:
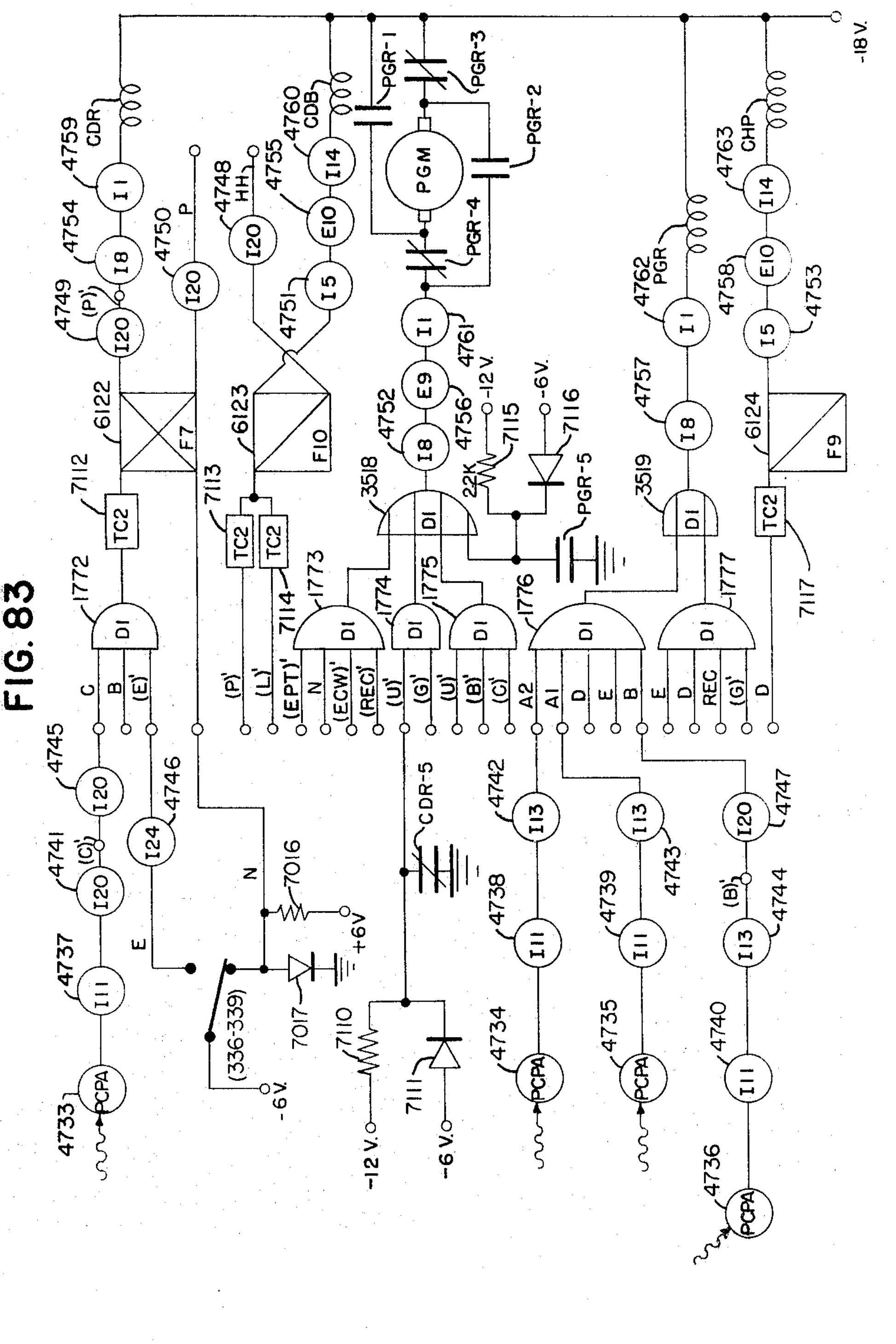
Figure 84:
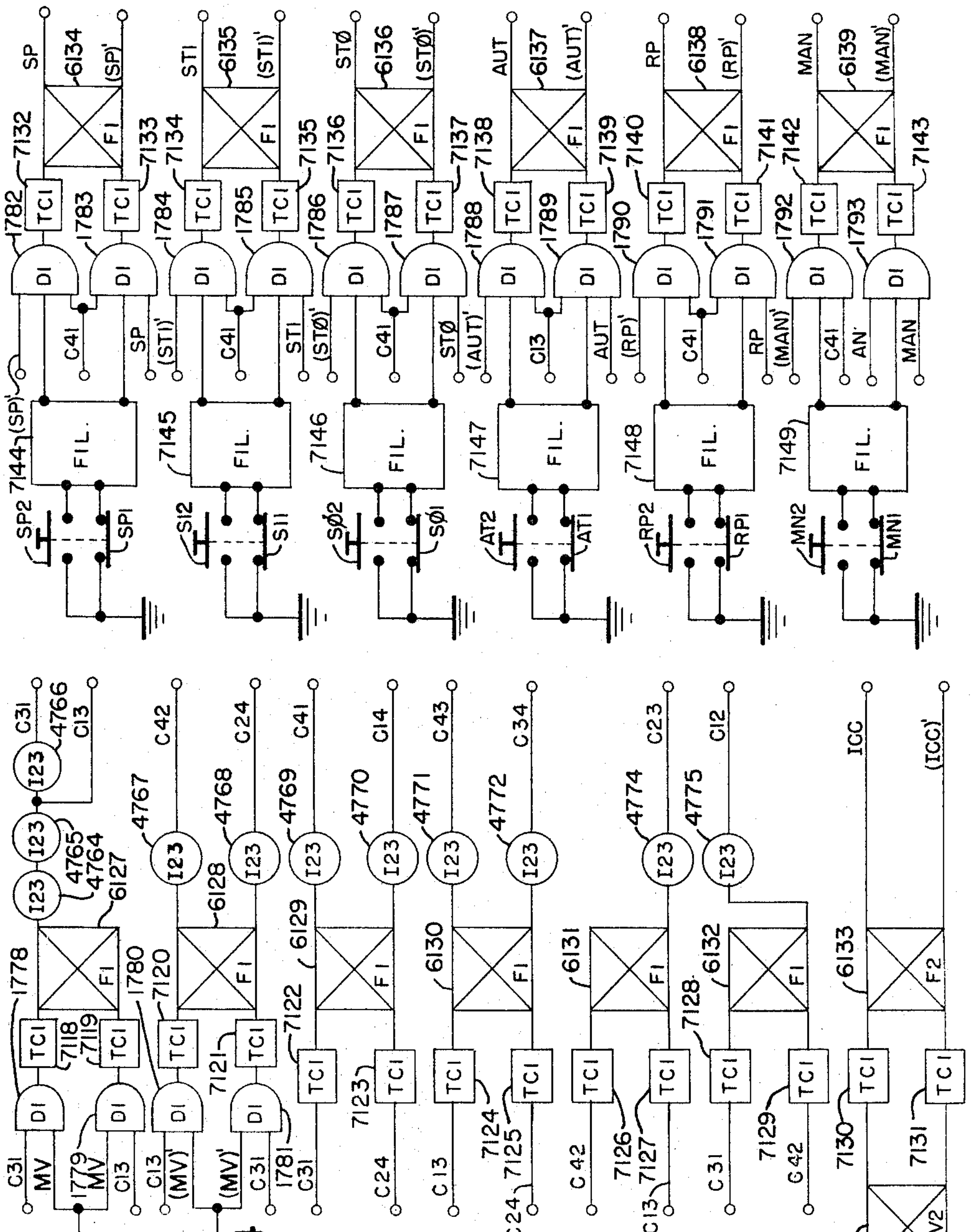
Figure 85:
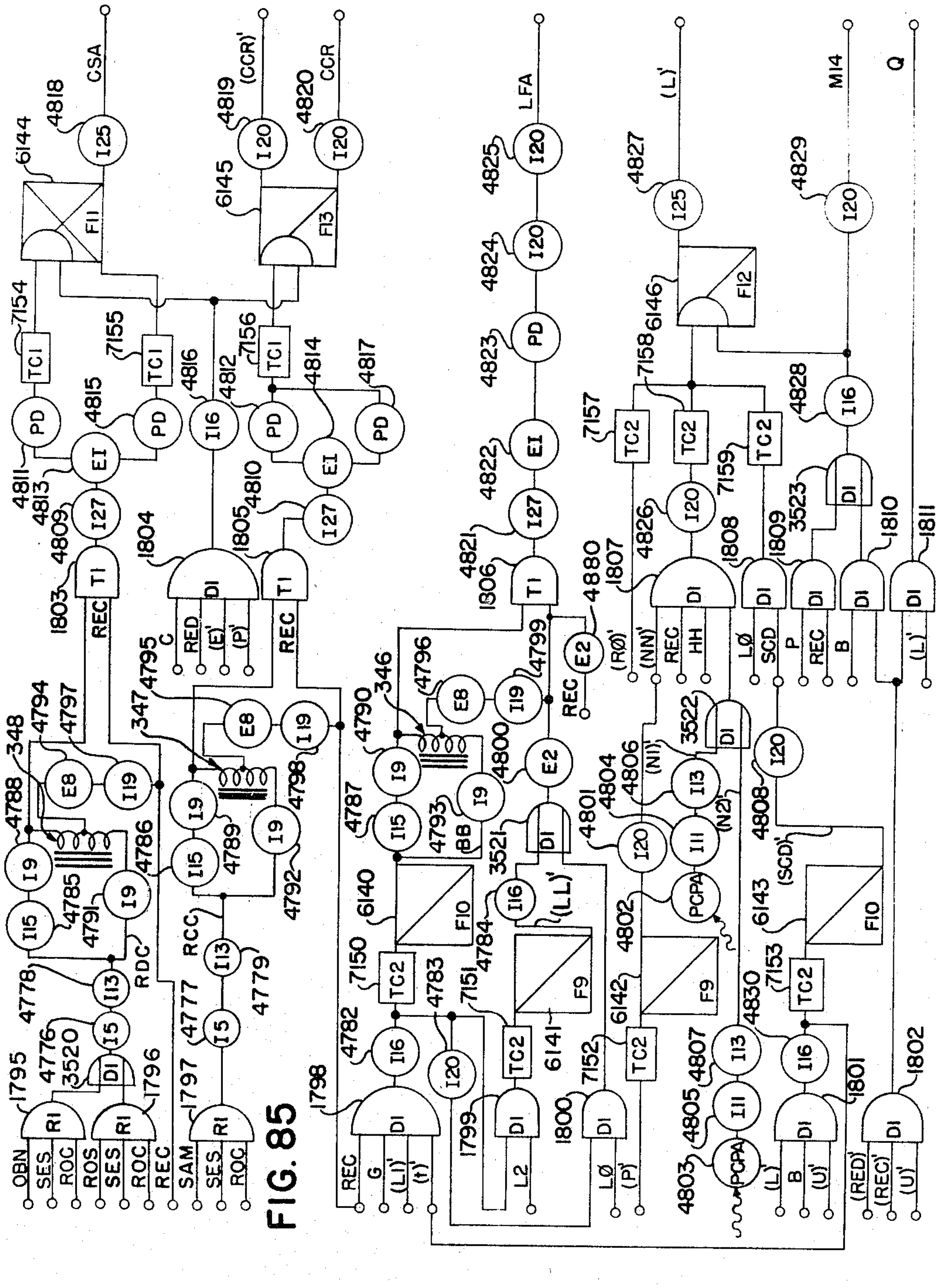
Figure 86:
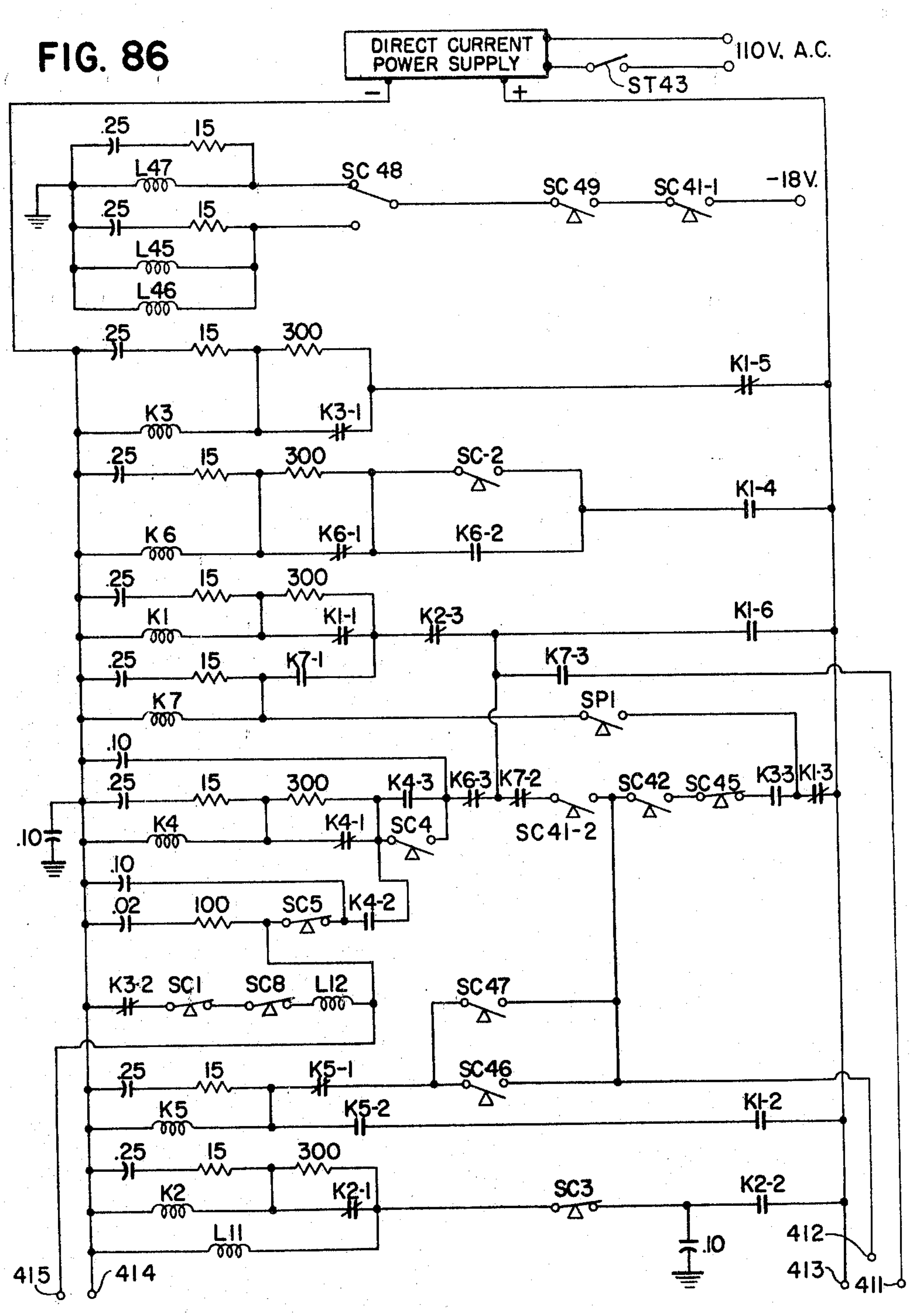
Figure 87A:
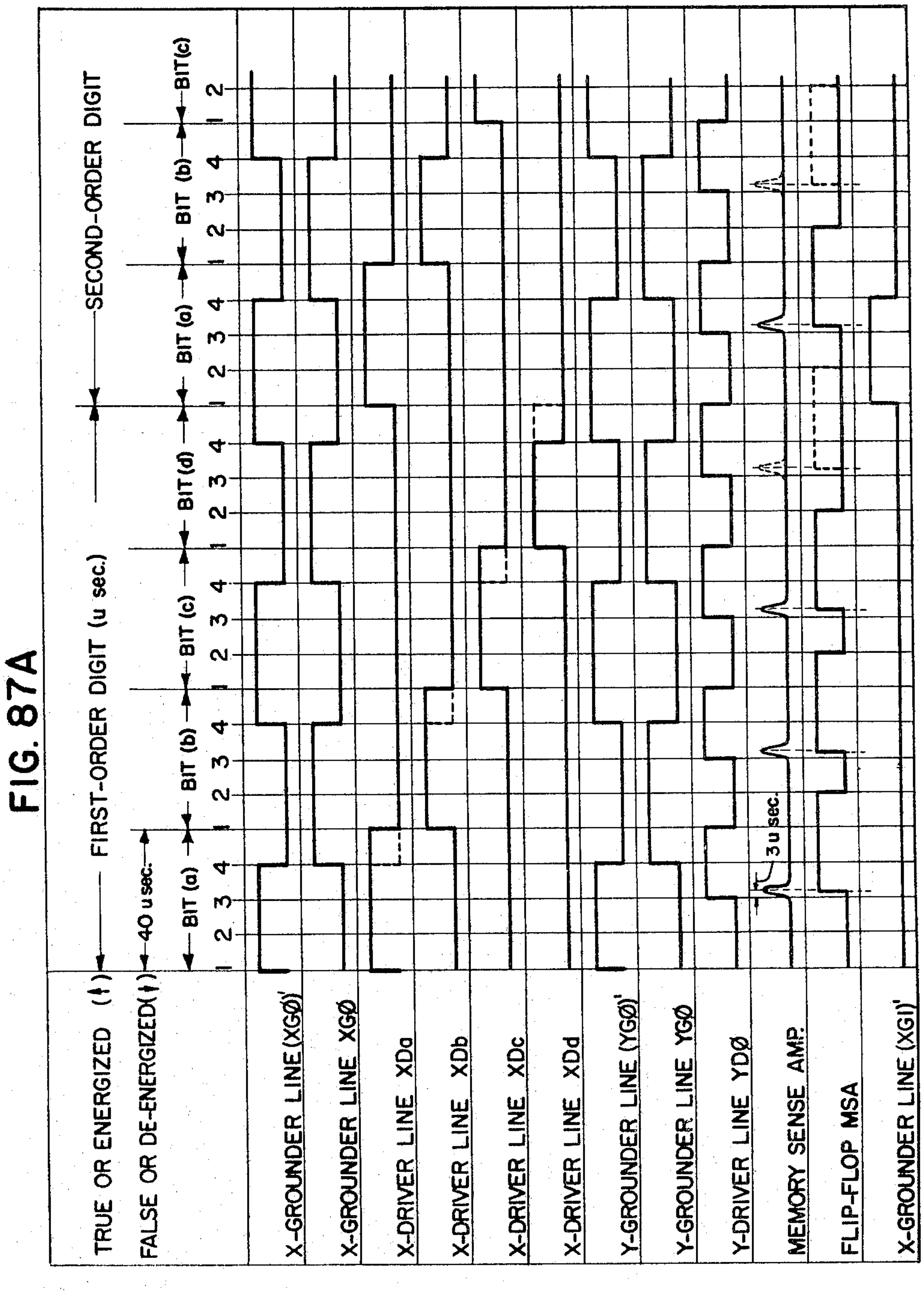
Figure 87B:
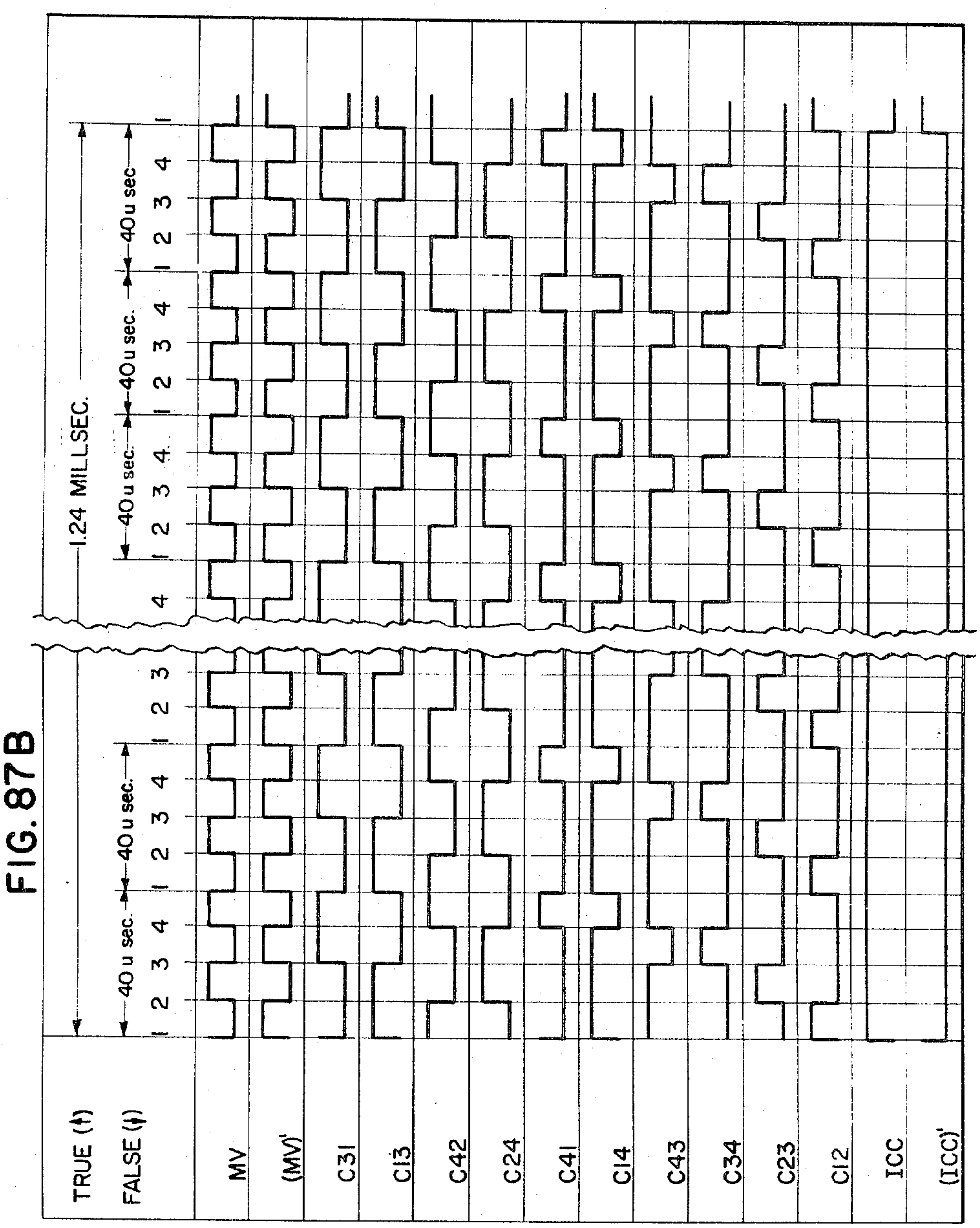
Figure 87C:
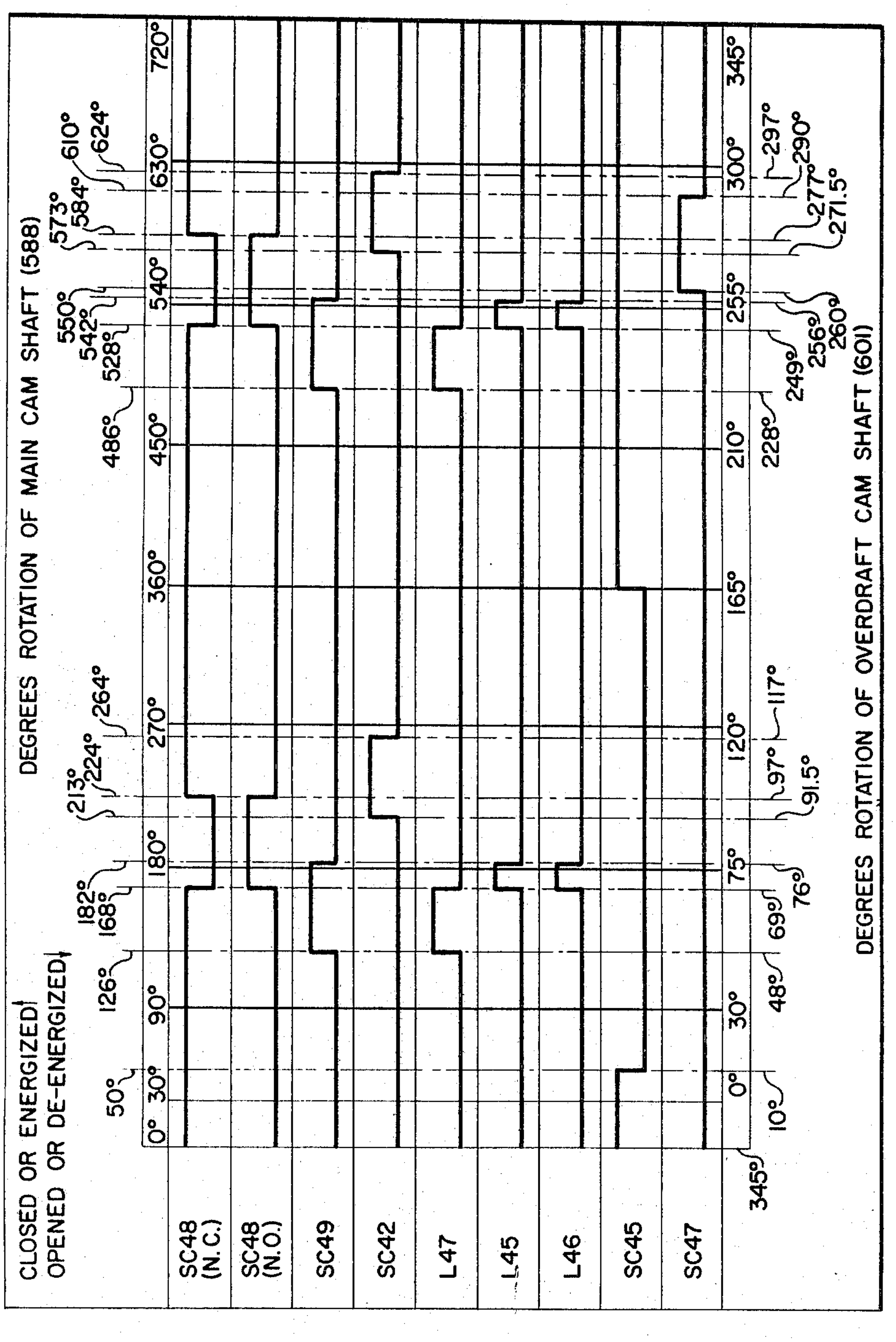
Figure 87D:
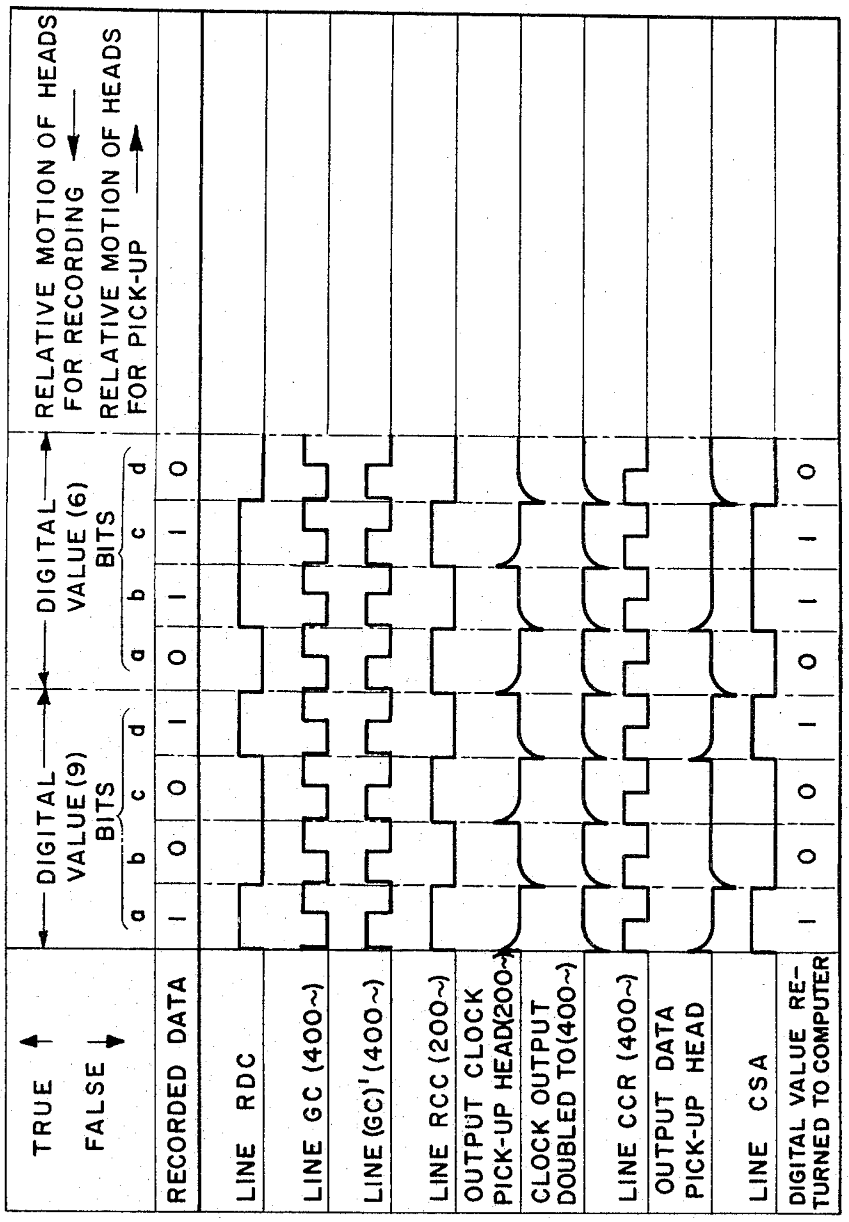
Figure 88A:
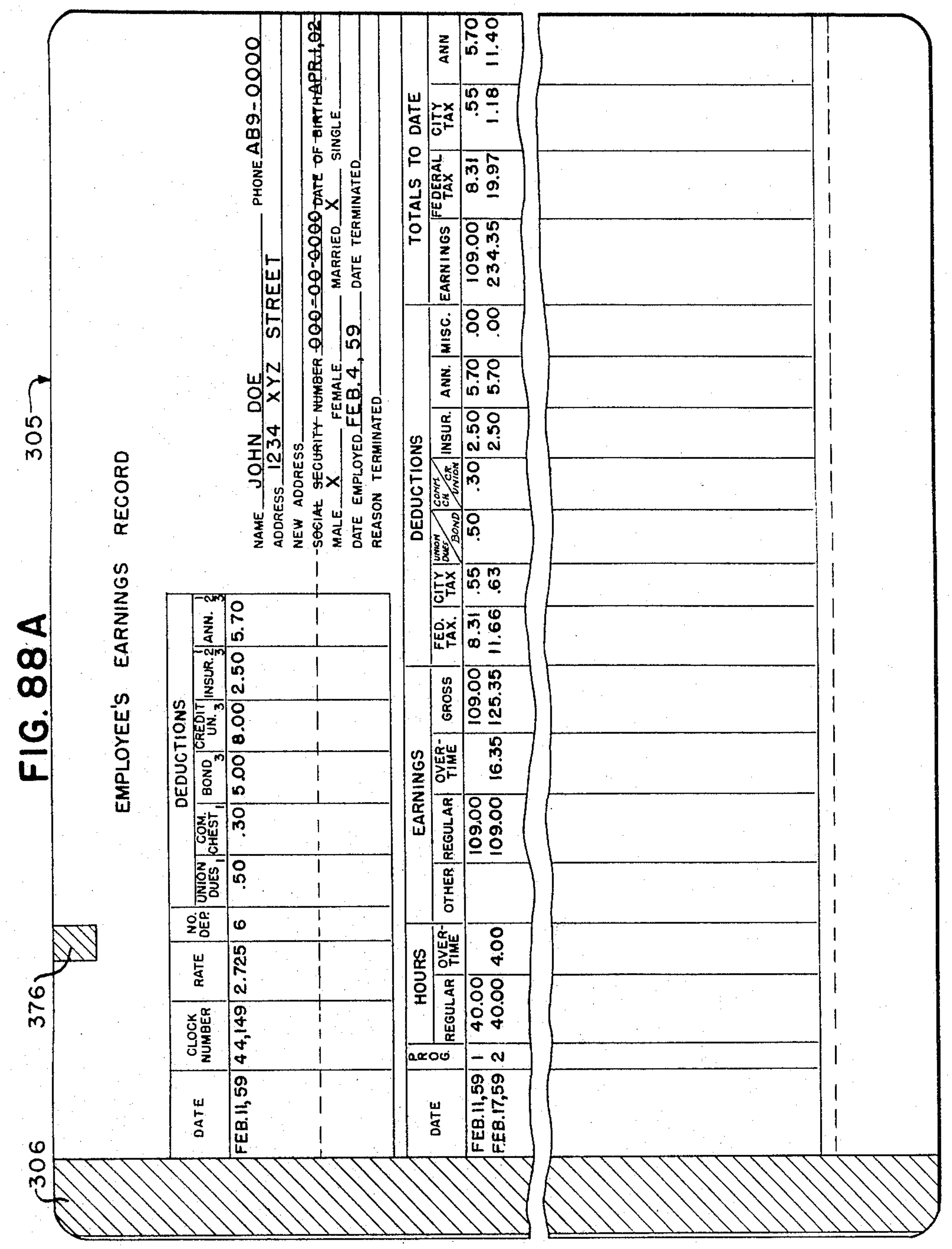
Figure 88B:
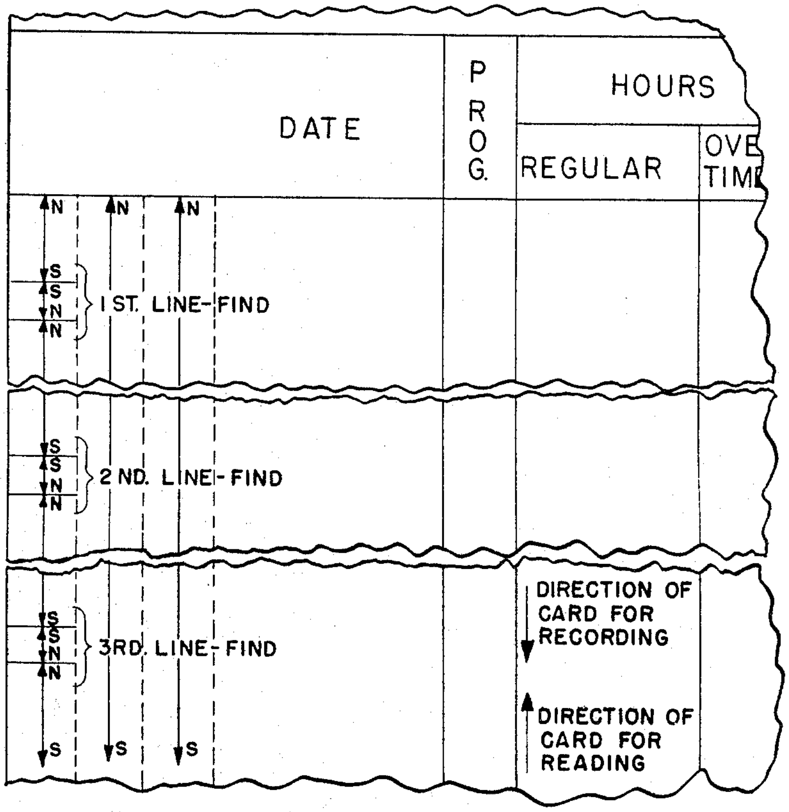
Figure 88C:
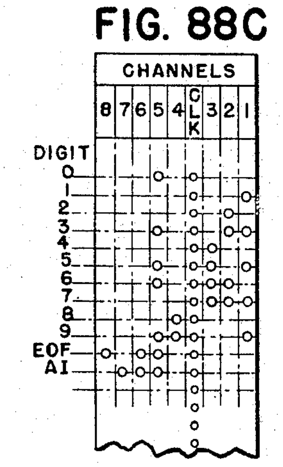
Figure 88D:
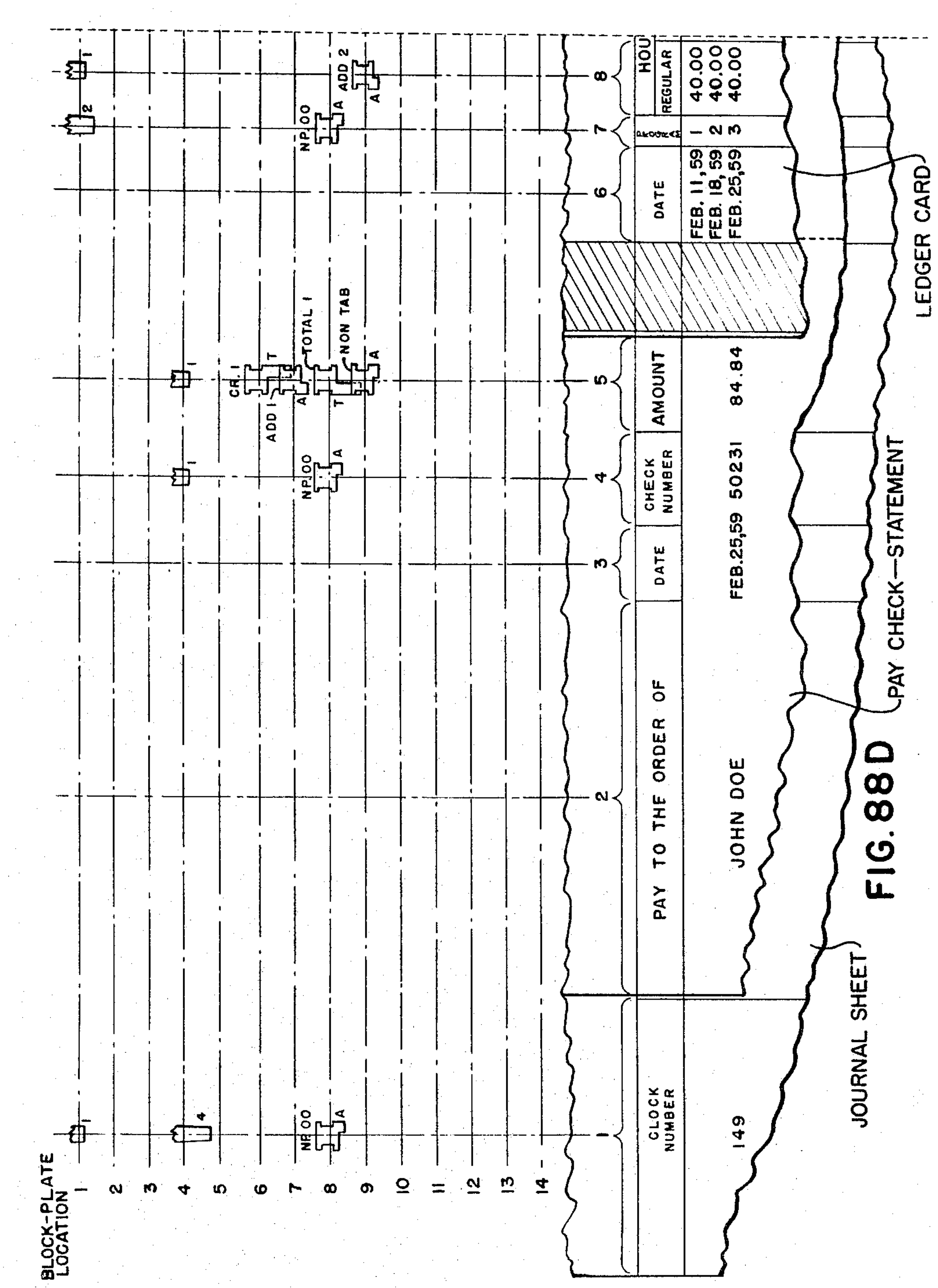
Figure 88E:
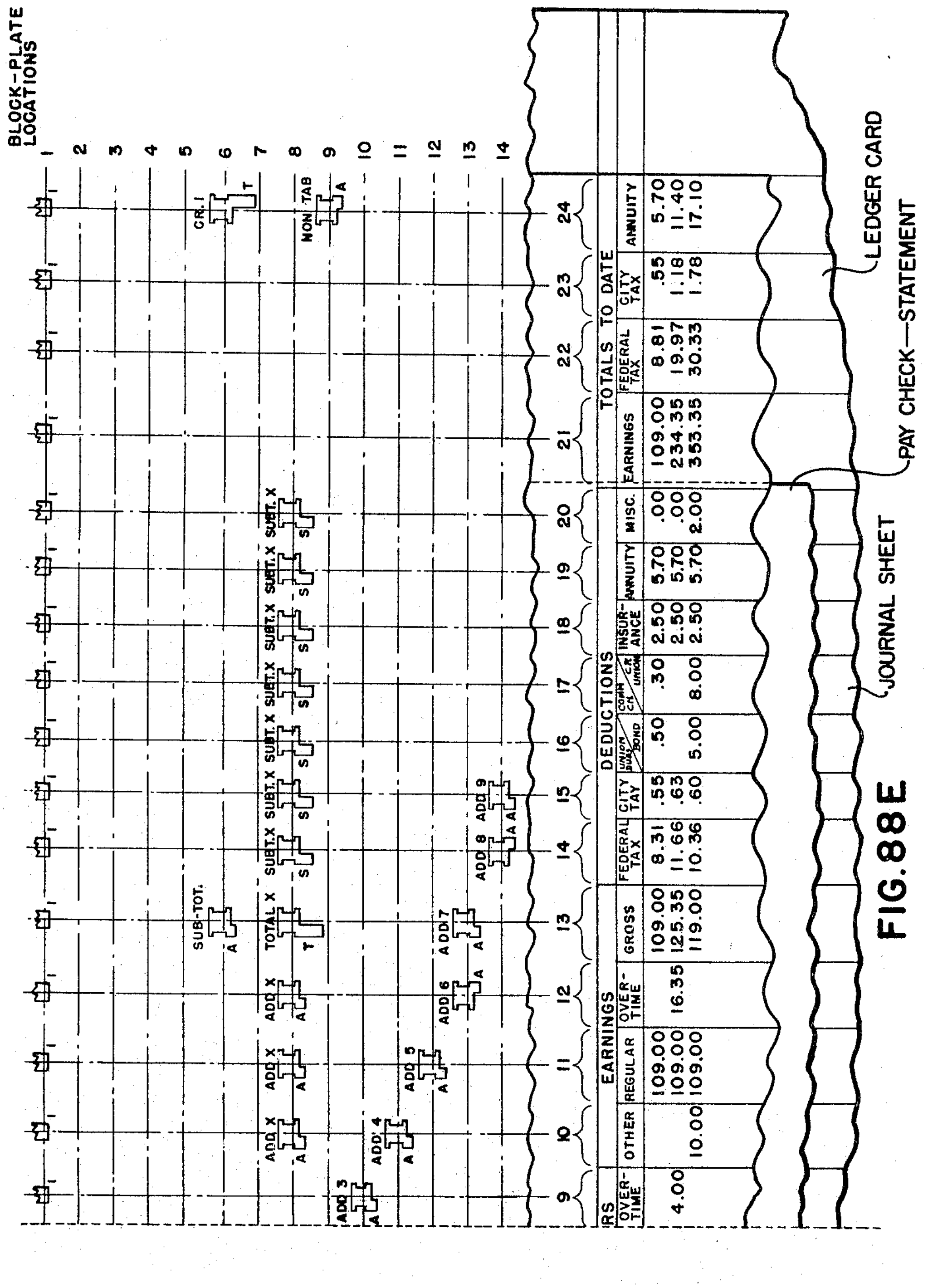
Figures 88F, 88G:
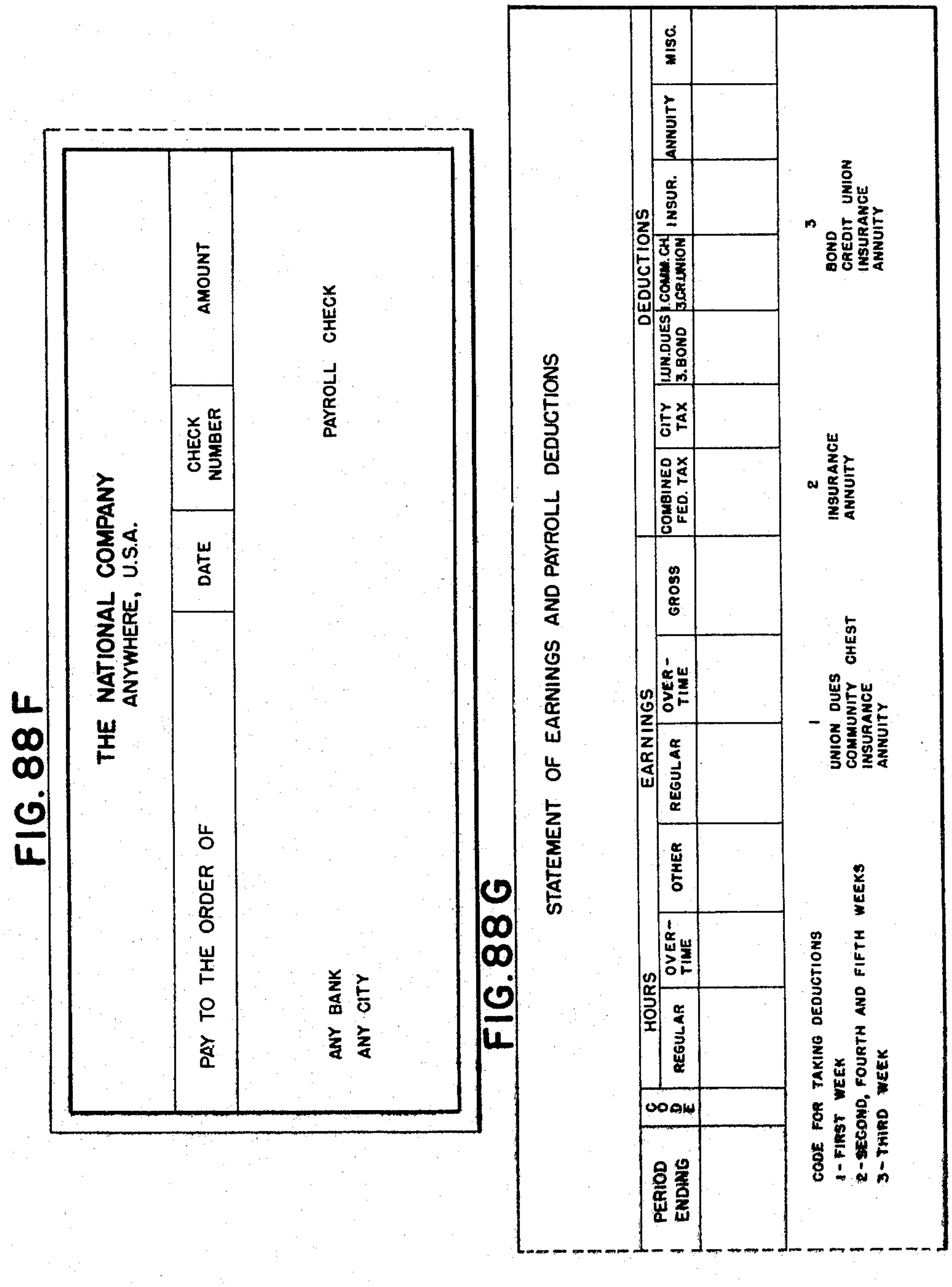
Figure 89A:
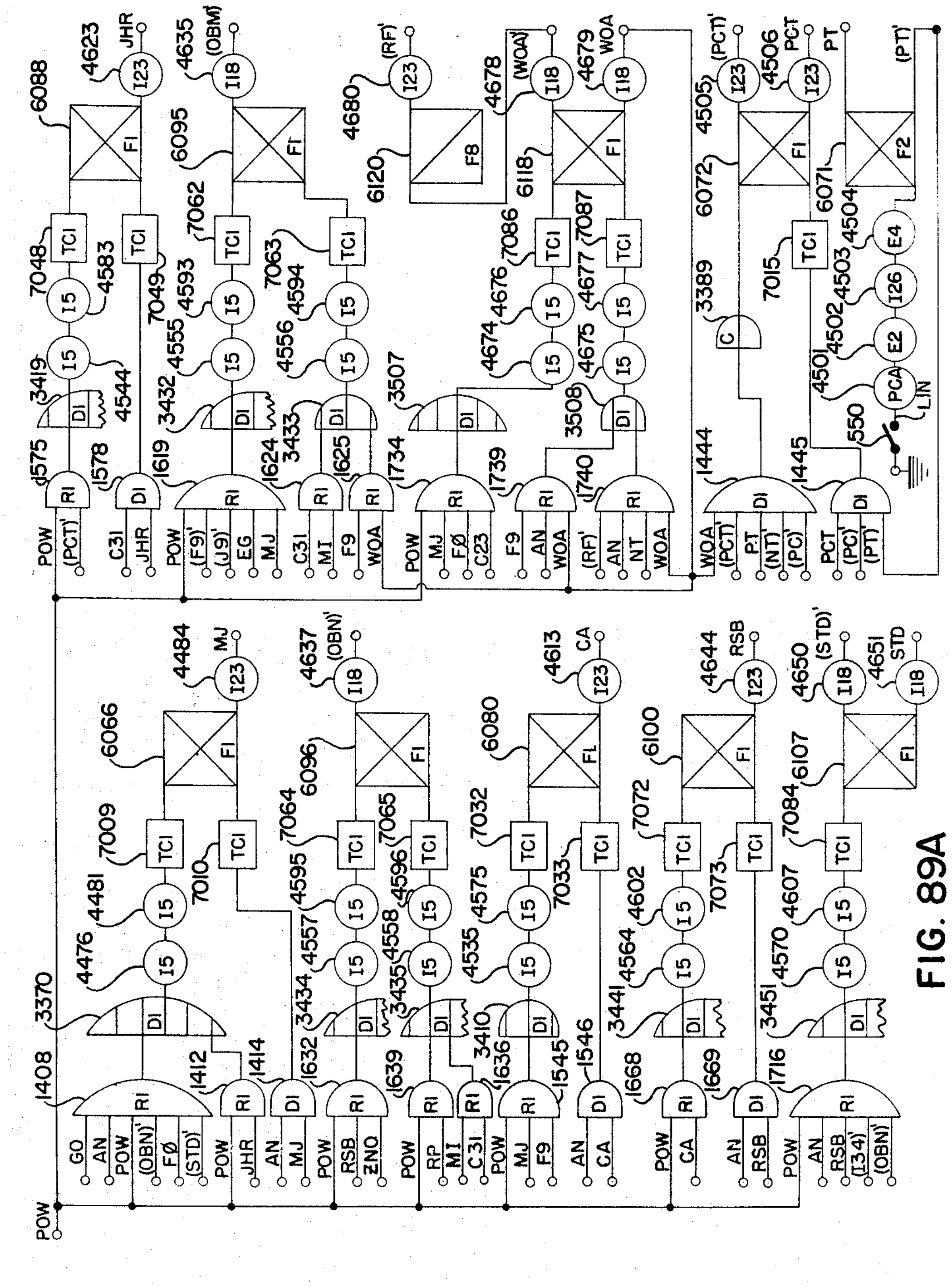
Figure 89B:
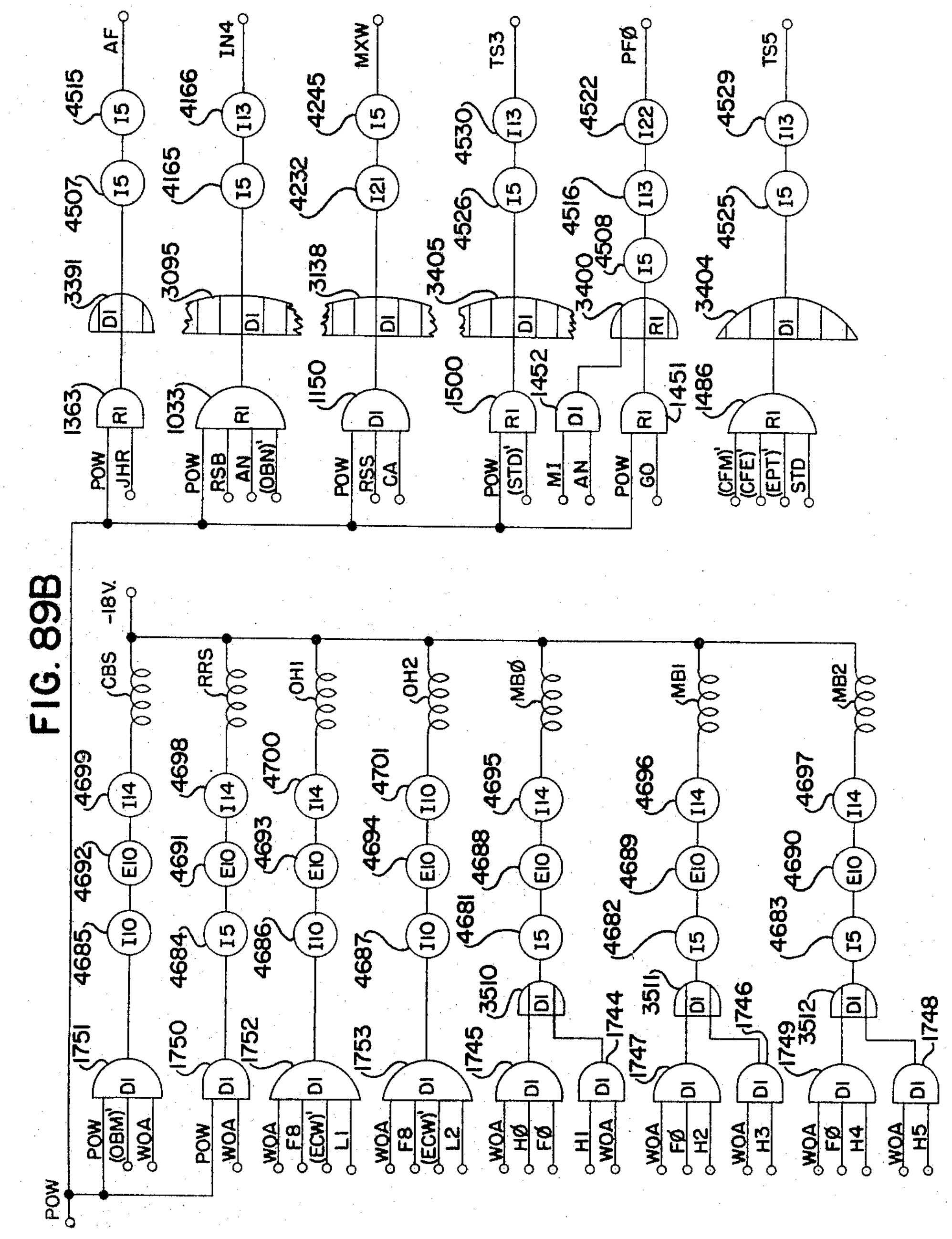
Figure 89C:
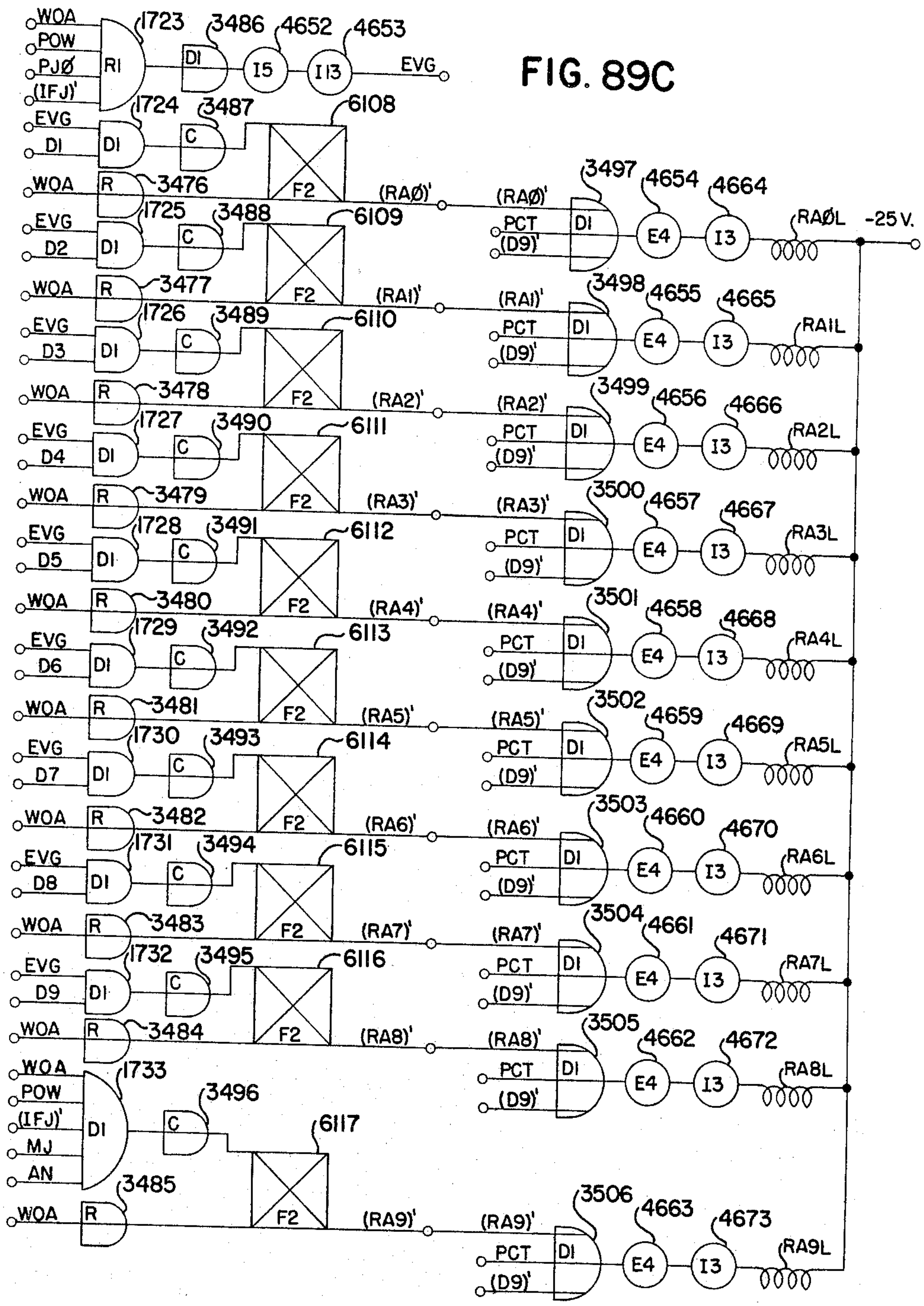

FIG. 17 is a partly cross-sectional view showing the relationship between the ledger card handling equipment and the accounting machine carriage;

FIG. 18 is a partial view of FIG. 17 showing the relationship between the compression rollers, the card-handling platen and the accounting machine platen when the carriage of the accounting machine is open;

FIG. 19 is a partial view of FIG. 17 showing the compression rollers latched against the card-handling platen, and, additionally showing the relative position of the magnetic recording and reproducing heads;

FIG. 20 is a partial view of FIG. 17 showing the construction of the slotted side-plate portion of the accounting machine carriage;

FIG. 21 is a fragmentary cross-sectional view of a portion of the card-handling platen driving mechanism shown in FIG. 14;

FIG. 22 is a plan view, partly in section, of a portion of the card-handling mechanism shown in FIG. 1;

FIG. 23 is a fragmentary cross-sectional view of the ledger card guide assembly shown in FIG. 22;

FIG. 24 is a partial plan view of the rear rack driving means shown in FIG. 17 which is utilized for effecting linear translation of the accounting machine carriage;

FIG. 25 is a fragmentary view, partly in section, of FIG. 24 showing the switching means utilized for detecting home position of the accounting machine carriage;

FIG. 26 is a fragmentary view, partly in section, of the means utilized for preventing a typewriter key on the accounting machine keyboard from being depressed while the accounting machine is carrying-out a cycle of operation;

FIG. 27 is a fragmentary view of the means utilized for manually locking the typewriter carriage-return keys;

FIG. 28A illustrates the rotatable position of the commutator switching means, initially shown in FIG. 14, when the compression rollers are latched with respect to the ledger card drive platen;

FIG. 28B illustrates the rotatable position of the commutator switching means when the compression rollers are unlatched from the ledger card drive platen;

FIG. 29 is a fragmentary cross-sectional view longitudinally taken through the ledger card handling mechanism;

FIG. 30 is a fragmentary cross-sectional view of the solenoid-actuated means shown in FIG. 29 which is utilized for selectively locking the accounting machine carriage in home position;

FIG. 31 is a fragmentary view of the card-drive platen-braking means shown in FIG. 15;

FIG. 32 is a fragmentary view of the solenoid means utilized for automatically unlatching selected low-order ones of the order-hooks of the accounting machine from their respective type-sectors;

FIG. 33 is a side view, partly in section, of one of the magnetic recording and reproducing heads utilized by the computer in accordance with the present invention;

FIG. 34 is a partial side view, partly in section, of the solenoid-actuated type-sector latching and unlatching mechanism;

FIG. 35 is a partial plan view of the solenoid-actuated type-sector latching and unlatching mechanism shown in FIG. 34;

FIG. 36 is a fragmentary cross-sectional view of the composite magnetic recording and reproducing head assembly utilized by the computer;

FIG. 37 is a fragmentary view, partly in section, of a portion of the linkage of the overdraft control mechanism of the accounting machine;

FIG. 38 is a side elevational view of a portion of the cycle-initiating motor-bar mechanism of the accounting machine and the solenoid-actuated means utilized for automatically effecting selective operation thereof;

FIG. 39 is a fragmentary view of the solenoid-actuated means which is utilized to selectively prevent an early release of a depressed amount key during an addition or subtraction cycle of operation of the accounting machine;

FIG. 40 is a fragmentary view of the portion of the accounting machine mechanism which is utilized in initiating a total-taking cycle of operation thereof;

FIG. 41 is a fragmentary view of the reverse tabulation mechanism of the accounting machine;

FIG. 42 is a fragmentary view of the switching means shown in FIG. 41 which is utilized in detecting whether or not the accounting machine is in the process of carrying-out a cycle of operation thereof;

FIG. 43 is a fragmentary view of the accounting machine forward-tabulating lever and the switching means associated therewith utilized in detecting whether or not the accounting machine carriage is tabulating over a carriage stop;

FIG. 44A is a fragmentary view of the totalizer reverse key and the mechanism associated therewith;

FIGS. 44B thru 44G are fragmentary views of various cam actuated switching means which are utilized to effect selective energization of the paper tape punching mechanism shown in FIG. 44H;

FIG. 44H is a partial side elevational view of the paper tape punching mechanism utilized by the computer;

FIGS. 45A and 45B, when joined together at the dashed lines, form a simplified block diagram of the computer circuitry;

FIG. 45C is a simplified block diagram of the adder-subtractor portion of the computer circuitry;

FIG. 45D is a simplified block diagram of the paper tape punch control circuitry;

FIGS. 46 thru 51 disclose the schematic circuit diagrams of all of the various building blocks utilized in constructing the circuitry portion of the computer;

FIGS. 52A and 52B, when joined at the dashed lines, form a schematic circuit diagram of the coincident-current magnetic core memory;

FIG. 53 is a portion of the logical diagram of the adder-subtractor circuitry;

FIG. 54 is the remaining portion of the logical diagram of the adder-subtractor circuitry;

FIG. 55 is a logical diagram of section-1 of the instruction register;

FIG. 56 is a logical diagram of the decoder portion of section-1 of the instruction register;

IFG. 57 is a logical diagram of section-2 of the instruction register;

FIG. 58 is a logical diagram of sections 3 and 4 of the instruction register;

FIG. 59 is a logical diagram of section-5 of the instruction register and the compare circuitry relating to sections 3 and 4 of the instruction register;

FIG. 60 is a portion of the logical diagram of the read-write, digit-cycle, word-cycle and subcommand initiating circuitry;

FIG. 61 is an additional portion of the logical diagram of the read-write, digit-cycle, word-cycle and subcommand initiating circuitry;

FIG. 62 is a logical diagram of the bit-counter;

FIG. 63 is a logical diagram of the digit-counter;

FIG. 64 is a logical diagram of the high-order section of the word-selecting register;

FIG. 65 is a logical diagram of the low-order section of the word-selecting register and a logical diagram of the Y-drivers;

FIG. 66 is a logical diagram of the X and Y grounders;

FIG. 67A is a logical diagram of the memory sense amplifiers;

FIG. 67B is a logical diagram of the rack-readout circuitry;

FIG. 68 is a logical diagram of the R-counter;

FIG. 69 is a logical diagram of a portion of the digit-cycle initiating circuitry;

FIG. 70 is a logical diagram of the "K" digit-register and associated circuitry;

FIG. 71 is a logical diagram of the "J" digit-register and associated circuitry;

FIG. 72 is a logical diagram of the F-counter and compare circuitry;

FIG. 73 is a logical diagram of the instruction register transfer circuitry;

FIGS. 74 thru 79 are logical diagrams of the various word-cycle, time-delay and subcommand initiating flip-flops;

FIG. 80 is a logical diagram of the rack-stopping solenoids and flip-flops;

FIG. 81 is a logical diagram of various solenoid control and light indicating circuitry;

FIG. 82 is a portion of the logical diagram of the ledger card handling circuitry;

FIG. 83 is an additional portion of the logical diagram of the ledger card handling circuitry;

FIG. 84 is a logical diagram of the various timing clock and push-button control circuitry;

FIG. 85 is a logical diagram of the magnetic recording reproducing and control circuitry;

FIG. 86 is a schematic diagram of a portion of the tape punch control circuitry;

FIG. 87A is a timing chart illustrating the instantaneous logical states of the various control lines utilized during a memory read-write cycle of operation;

FIG. 87B is a timing chart illustrating the instantaneous logical states of the various synchronizing clock lines;

FIG. 87C is a timing chart illustrating the instantaneous conditions and states of energization of the various switching and solenoid means utilized by the tape punch mechanism;

FIG. 87D is a timing chart illustrating the instantaneous logical states of the various control lines utilized during a magnetic recording and reproduction cycle of operation;

FIG. 88 is a diagrammatic illustration of a portion of the magnetic ledger card utilized by the computer;

FIGS. 89A, 89B and 89C logically illustrate the various portions of the circuitry utilized by the computer in carrying-out a print-out-words (POW) instruction;

Inasmuch as the following description of a physical embodiment of the present invention is of considerable length and complexity, and is essentially divided into a multiplicity of separate sections, the various section headings are herein serially numbered and listed below in order to facilitate immediate reference to the various portions of the specification.

| | | Column |
|---|---|---|
| 1. | General Description of Computer | 5 |
| 2. | Accounting Machine Portion of Computer (General) | 5 |
| 3. | Construction and Mode of Operation of Accounting Machine Portion of Computer | 6 |
| 4. | Magnetic Ledger Card Handling Portion of Computer | 19 |
| 5. | Electromechanical Control Means | 26 |
| 6. | Building Blocks Generally | 36 |
| 7. | Magnetic Core Memory | 36 |
| 8. | X-Drivers | 44 |
| 9. | Bit-Counter | 45 |
| 10. | X and Y Grounders | 46 |
| 11. | Digit Counter | 47 |
| 12. | Y-Drivers | 48 |
| 13. | Word-Selecting Register | 48 |
| 14. | Summary of Word Selection | 49 |
| 15. | Synchronizing Clocks | 50 |
| 16. | Detailed Read-Write Cycle | 51 |
| 17. | Sense-Amplifier Strobe | 55 |
| 18. | Instruction Register Generally | 56 |
| 19. | Section-1 of Instruction Register | 56 |
| 20. | Section-2 of Instruction Register | 58 |
| 21. | Section-3 of Instruction Register | 59 |
| 22. | Section-4 of Instruction Register | 60 |
| 23. | Section-5 of Instruction Register | 61 |
| 24. | Instruction Register Presets | 61 |
| 25. | Summary of Instruction Register | 63 |
| 26. | R-Counter | 63 |
| 27. | F-Counter | 65 |
| 28. | Compare F-Counter and Digit-Counter | 65 |
| 29. | "J" Digit-Register | 65 |
| 30. | Compare F-Counter and "J" Digit-Register | 66 |
| 31. | "K" Digit-Register | 66 |
| 32. | Adder-Subtracter | 67 |
| 33. | Control Counter Generally | 75 |
| 34. | Detailed Description of POW Instructions | 76 |

(1) *General description of computer*

With reference to FIG. 1 of the drawings, the computer constructed in accordance with the present invention is completely transistorized and is adapted to be contained in an ordinary metal office desk, indicated generally as 12. Mounted in the center of the desk is one of the input-output devices for the computer. This particular input-output device is in the form of an accounting machine, indicated generally as 13, which is of the same general type as that shown and described in United States Letters Patent 3,112,394, issued November 26, 1963, to P. B. Clase et al. The electronic computing equipment is contained in both the left-hand and the right-hand sections of the desk while the two bottom drawers of the right-hand section thereof have been retained. One of the drawers is especially adapted for storage of additional "form-bars" for the accounting machine while the remaining drawer is adapted for storage of magnetic "ledger cards" which, together with the form bars, are utilized to program the computer in a manner as will hereinafter be more fully described. The bridge, located in back of the accounting machine and connecting the right-hand and left-hand sections thereof, provides the necessary support for the electrical power supplies for the computer, and which are energized from a normal 110-volt power source. Mounted on the right-hand side of the accounting machine and disposed in front of the carriage portion thereof, is a card handling mechanism, indicated generally as 14, which is utilized in reading and recording magnetic information on the ledger cards. And, disposed on the front of the right-hand section of the desk, is a control panel 15 which supports a portion of the various manually operable electrical controls and indicating lights for the computer.

(2) *Accounting machine portion of computer (general)*

As the accounting machine portion of the computer is of the well-known type substantially as that shown and described in the aforesaid Patent 3,112,394, a detailed description of each of the multitude of variously interconnected mechanisms contained therein is not deemed necessary in order to obtain a full and complete understanding and appreciation of the present invention. However, in order to insure such a full and complete understanding, there will hereinafter be given a brief description of the various keyboard controls, as well as the salient features and functions of the major component parts thereof, along with the minor modifications and additions thereto which have been found necessary in order to adapt the accounting machine as an input-output device for the computer.

(3) *Construction and mode of operation of accounting machine portion of computer*

With reference to FIGURES 3A and 3B, there is shown a greatly simplified cross-sectional view of the accounting machine which is essentially the same as that shown in detail in FIGURES 3A and 3B of said aforementioned Patent No. 2,626,749 and fully described therein. As a repetition herein of such massive detailed description and illustrations is not deemed essential for a full and complete understanding of the present invention, but a portion of its salient mechanical features are illustrated in FIG. 3 for the sake of simplicity. However, enough of its mechanical structure is illustrated herein and a brief description thereof is given in order that the various modifications of the machine made in accordance with the present invention may be fully understood.

Inasmuch as each denominational row of amount keys is identical with the other, a description of the #9 denominational row, shown in FIG. 3A, is believed to suffice for the remaining ones. As shown, each of the nine amount keys of a denominational row is slideably supported for vertical movement by top-plate 40. Each key supports a square stud 41 which is normally disposed on the side of the downwardly projecting stem portion thereof. Located near the center of each key stem is a stud 42 projecting therefrom and which cooperates with a diagonal-walled cam slot 43 formed in control or latching slide 44. Latching slide 44 is supported for lateral movement by rollers 45 and is spring-urged to the right, as viewed, into engagement with stud 42 by suitable springs means not shown. Thus, when one of the amount keys is depressed, slide 44 is forced to the left by stud 42 and into engagement with zero-stop pawl 46. As a result of the engagement, pawl 46 is rotated in a counter-clockwise direction about its pivot 47, thereby releasing block 48 integrally connected to differential actuator or rack 49. With block 48 released, actuator 49 is freed to move to the right toward the rear of the machine until the corresponding shoulder 50, formed thereon, comes into engagement with stud 41 of the depressed key, thus stopping the rack at a lateral position commensurate with the digital value of the key depressed. For example, when the #8 key is depressed, the square stud on the lower end of the stem thereof engages the lowermost shoulder of rack 49 and thereby stops the rack in its #8 digital position, the square stud on the #7 key engages the next higher shoulder, and so on.

The #9 key, however, does not function exactly as do the remaining keys. When the #9 key is depressed, slide 44 is forced to the left, pawl 46 is rotated counter-clockwise, block 48 is released, and rack 49 is permitted to travel the entire distance to the right, during the machine operation, until stopped by projecting bar 51. This extreme position of the rack corresponds to its #9 digital position. If none of the keys of a particular row are depressed, the corresponding rack is not permitted to move and thus remains in its #0 digital position.

All of the racks are guided at the rear ends thereof for straight-line movement during their travel by means of a slotted bar, not shown, which is supported between the side-frames of the machine. Each of the racks associated with a particular amount row of the keyboard is connected by link 54 to an auxiliary rack 55 which is also guided for straight-line sliding movement. It is thus evident that the exact linear translational movement of amount rack 49 is immediately transmitted to its corresponding auxiliary rack 55. With respect to the racks associated with the date and symbol key-banks, no auxiliary rack is provided inasmuch as these banks are used merely for printing purposes and consequently do not have any corresponding totalizer wheels associated therewith. Each of the amount racks is provided with a slot 56 formed on the lower side thereof, for receiving stud 57 mounted on reducer-arm segment 58, which, in turn, is rotatably mounted on reducer arm shaft 59 journaled at either end in the side-frames of the machine. The rightmost lower edge of reducer-arm segment 58 is spring-urged by spring 64 into engagement with leading-frame bar 60 which is supported between a pair of identical leading-frame arms 61, only one of which is shown. Arms 61 are fixedly secured to either ends of reducer-arm shaft 59 and are located just inside the side-frames of the machine. Each of arms 61 is provided with a roller 62 on the lower end thereof which are adapted to engage with bifurcations provided on a cam follower arm, not shown.

When the main cam shaft of the machine is rotated through one revolution by motor 63 mounted on the lower side of the machine base 65, the cam follower arms are first rocked in one direction and then are rocked in the opposite direction so as to effect movement of leading frame 61 first toward the rear of the machine and then back to its original position as shown. As each of reducer-arm segments 58 is spring-urged into engagement with leading-frame bar 60, by means of pin and slot connection 56–57 segment 58 is capable of translating its related amount rack first to the right and then to the left, as viewed. Hence, all of the amount racks are simultaneously urged by spring 64 toward the rear of the machine during the first half of the machine cycle until each is stopped by its respectively depressed key. Thereafter, all of the amount racks are positively restored to their home position, as shown, by means of leading-frame bar 60 coming into direct engagement with arm 58 during the second half of the cycle.

The resulting differential positioning of each amount rack is transmitted to its corresponding type sector 67, by means of link 68 pivotally connected between type sector 67 and segment 58 to rotatably position the type-sector to correspond to the digital position of the amount rack, type-sector 67 being pivotally connected to the upper end of printer arm 69 rotatably mounted on printer shaft 70. Printer arm 69 is normally locked in the position shown by printer release trigger 66, which, when rocked counter-clockwse, releases the printer and permits it to be spring-urged clockwise by spring 75, thereby driving type-sector 67 against the record material placed around platen 71. After type-sector 67 has been substantially positioned during the first half of the machine cycle and leading frame bar 60 has completed its rearward movement, aligner bar 72 is rocked into engagement with the aligning notches formed on the lower end of reducer arm segment 58 so as to precisely align all of the printing sectors in their differentially-set positions. After the printing operation is completed, aligner bar 72 is disengaged from the reducer arm aligning notches thus permitting the racks and type-sectors to return to home position.

In some types of accounting operations, it is desirable that a "zero" is not to be printed when an amount key in a particular amount row is not depressed. Thus, as more clearly shown in FIG. 34, a "zero-elimination" order-hook 76 is pivotally mounted on rod 77 supported in printer framework 52 and is provided with a tooth which co-operates with a corresponding tooth on control plate 78 so as to retain plate 78, arm 69, and hence sector 67 against printing movement even though trigger 66 is rocked counter-clockwise as previously described. There are other times, however, when it is desired that the "zero" be printed when an amount key is not depressed. This is accomplished as follows: As previously described, during the first half of a machine operation the amount racks are moved rearwardly, thereby causing reducer arm segment 58 to be moved out of its home position. This rearward movement causes stud 53, mounted on an extension of segment 58, to cam down the tail of order-hook 76 and thus move the tooth thereof out of engagement with the corresponding tooth on plate 78 and thus permits type-sector 67 to make a printing stroke.

With reference to FIG. 35, there are shown sixteen zero-elimination order-hooks 76 disposed on shaft 77 in a side-by-side relationship with respect to one another, each being associated with a particular type-sector to control the operation thereof as previously described. The first and second ones of order-hooks 76, counting from right to left as viewed, respectively control operation of the first and second ones of type-sectors 67 to allow the printing of symbol designations only. The third order-hook controls operation of the third type-sector which normally prints the first-order or "penny" decimal digit of the amount word having a value from "0" thru "9." The fourth order-hook controls operation of the fourth type-sector which normally prints the second-order or "dime" decimal digit of the amount word with the decimal digit "0" thru "9" being preceded by a decimal point. Thus, by selective control of the third and fourth type-sectors, printing of amounts from .00 to .99 cents are effected. The eighth order-hook controls the printing operation of the eighth type-sector which normally prints the sixth-order or "thousand dollar" decimal digit of the amount word, with each decimal digit "0" thru "9" preceded by a comma. Likewise, the eleventh order-hook controls printing operation of the eleventh type-sector which normally prints the ninth-order or "million dollar" decimal digit of the amount word, with each decimal digit thereof preceded by a common.

Therefore, it is evident that for those zero digits which are to be suppressed, the corresponding order-hook is permitted to lock its corresponding type-sector against a printing movement. Accordingly, for those zero digits which are to be printed, the corresponding order-hooks are rocked out of engagement with their respective type-sectors to permit those sectors to complete their printing operation. Interlocking studs are provided on the upper ends of order-hooks 76 and cooperate with one another in a conventional manner so that a disengaged order-hook effects the simultaneous disengagement of all lower-order order-hooks with respect thereto.

The just described accounting machine is provided with ten conventional add-subtract totalizers, each of which has a capacity of 99,999,999.99. Only six of the ten totalizers are diagrammatically illustrated in FIGS. 3A and 3B and are numbered 1 through 5, and one designated as the "X" totalizer which is used in overdraft operations in a manner to be later described herein. Each of the totalizers includes one gear wheel for each of the denominational orders of the number, with each gear wheel having twenty teeth formed along the periphery thereof. All of the gear wheels of the totalizers are located in a co-planar relationship with respect to amount racks 49 and auxiliary racks 55 and are adapted to be selectively engaged with and disengaged from the rack teeth in order to permit keyboard entries to be transferred therein and to perform the various calculating functions of the machine.

Located beneath the control keys of the keyboard are a plurality of totalizer control slides, not shown, which selectively effect the engagement and disengagement of totalizers #2 through #9 with respect to their respective amount racks. The type of operation to be performed in any of the totalizers, such as add, subtract, total, or non-total, is determined by the distance through which its associated totalizer control slide is permitted to move. The movements of these slides are controlled either by carriage stops, indicated generally as 73 in FIG. 3A, which are mounted on the traveling carriage, indicated generally as 74 in FIG. 3B, or by the control keys located on the left-hand side of the keyboard, as previously described. As a complete understanding of the totalizer control apparatus, necessary to carry out the above-mentioned cycles of operation, is not believed necessary for a full and complete understanding of the present invention, a detailed description thereof is not herein given. However, such a detailed description may be found in the before referred-to Patent 2,626,749, and, consequently, will not be again repeated herein.

In order to provide the computer with the capability of either "sensing," and thereby determining the respective longitudinal positions of the various amount racks, or to selectively arrest movement of the racks to position each in a predetermined one of its ten positions indicative of numerals "0" through "9," a "read-in read-out" device has been devised and attached to the rear of the accounting machine. With additional reference to the plan view of FIGURE 4, the device consists essentially of a pair of side plates 80 vertically disposed on either side and to the front thereof. Side plates 80 are connected together by means of a horizontally disposed mounting-bar 81, affixed by suitable means (not shown) to plate-attaching blocks 79 attached to plates 80. Plates 80 are additionally connected together by rack-solenoid cross-bar 82, affixed thereto by means of screws 83 threaded in either end of cross-bar 82. Mounting-bar 81 is also fixedly secured to the base 65 of the machine (FIG. 3B) by means of screws threaded therein, whereas, cross-bar 82 is additionally fixedly secured to header-bar members 84 of the machine by strap braces 85, respectively affixed thereto by bolts 86 and 87 threaded therein. A second pair of side plates 88 are each secured to one of side plates 80 by screws 89 threaded in plates 80, and are additionally secured to one another by means of horizontally disposed switch-bars 90 affixed normally thereto by means of screws 91 threaded in either end of bars 90.

A printed-switch support member 94 (FIG. 3B), affixed to bars 90 by suitable means not shown, is provided with a pair of vertical projections 95 located on either end thereof, and onto which is secured a horizontally disposed plunger-support member 96 by means of screws 97 (FIG. 4) threaded in projections 95. As shown in FIG. 4, a plurality of identical rack extensions 98 are individually connected by means of pins 99 and spring clips 100 to a different one of the ten auxiliary racks 55 which, when viewed from right to left, respectively represent the low-order digit "0" through the high-order digit "9" of the amount word entered in the keyboard of the accounting machine as previously described. As shown in FIG. 3B, on the uppermost edge of each of rack extensions 98 are formed ten "saw-tooth" shaped rack teeth, indicated generally as 101, each of which, from right to left as viewed, respectively represents one of the ten digital amount positions "0" through "9" of a different one of the amount racks.

In order to obtain "straight-line" travel of the amount racks during movement thereof, each of rack extensions 98 has riveted thereto a switch plunger 102 which is in sliding contact with plunger support member 96 and is guided between guide washers 103 which, in turn, are rotatably supported by screws 104 threaded in support member 96. Vertical movements of the amount racks are prevented by means of a horizontally disposed cross-bar 92, which is affixed to side plates 80 by screws 93 threaded in either end of the bar, cross-bar 92 being fitted in a rectangular slot 108 formed in each of the amount racks. Rack "wobble" is prevented by means of a double-edged comb 109 affixed to the front face of cross-bar 92 by screws 110 threaded therein, comb 109 being inserted in slot 108 of each of the racks in such a manner that each rack is effectively slideably fitted in the space between oppositely disposed teeth of the comb, thus preventing any bending movement of the racks during travel thereof.

When all of the amount racks are traveling from home position toward the rear of the machine in a "setting" direction, it is necessary that all travel in unison with neither lagging nor leading the other. Consequently, a "helper" spring 105 is connected between each of rack extensions 98 and spring bar 106 attached at either end thereof to side plates 88 by suitable means not shown. Each of the springs possesses a "spring-constant" characteristic sufficient to maintain all of reducer arm segments 58 (FIG. 3A) in contact with their respective leading-frame bar 60 during the cycle of operation of the machine. Thus, during the rack-setting operation, all racks simultaneously move in exact alignment during their setting operation.

For reasons to become more apparent hereinafter, it is desired that the various digital positions at which the amount racks have been positioned, be easily determinable by the computer. Consequently, wiper arm assembly, indicated generally as 107, is affixed to and carried by the lower side of each of rack extensions 98. The assembly comprises an angle-bracket 111 welded to rack extension 98, and which supports a laminated body of electrically non-conductive wafers 112 having sandwiched therebetween a pair of flexible, electrically conductive and oppositely disposed wiper blades 113 and 114 which are fixedly secured at one end by means of suitable bolts 115. The opposite ends of wiper blades 113 and 114 are in sliding contact with the upper and lower faces, respectively, of a printed circuitry type of switch board 116 which is secured to support member 94 by means of screws 117 threaded in blocks 90.

With reference to FIGS. 5A and 5B, printed-circuit board 116 consists essentially of an electrically non-conductive support having a plurality of electrical conductors formed on the opposite surfaces thereof by electrodeposition, etching, or other well-known techniques. FIG. 5B is a plan view of the conductor arrangement disposed on the bottom face of board 116, which arrangement comprises ten conductors 119, each positioned parallel to the movement of the amount racks, and thus wiper blades 114, and terminating on the lower side of the board at terminals D$\phi$ through D9, respectively corresponding to a successively higher-order amount rack representation. FIG. 5A is a plan view of the conductor arrangement on the upper face of board 116, which arrangement comprises ten conductors 118 positioned perpendicular to the movement of the amount racks, and thus wiper blades 113, and terminating on the upper side of the board at terminals 120*a* thru 120*j*, respectively corresponding to the ten digital positions "0" thru "9" of the amount racks. As conductors 119 are arranged parallel to the movement of the amount racks, wiper blades 114 are, at all times, in electrical contact with corresponding ones of conductors 119, whereas, wiper blades 113 are, at all times, in electrical contact with one of conductors 118, depending upon, of course, the distance their respective racks have moved in order to get to their present digital location. For example, if the amount rack corresponding to the first-order digit is still at home position, the lowermost one of wipers 113 remain positioned on the first vertical conductor located on the left of board 116, as viewed in FIG. 5A. However, if the amount rack has moved and is now located in its number "1" digital position, wiper blade 113 is then positioned on the conductor located second from the left, and so on, to the tenth vertical conductor upon which wiper blade 113 is positioned when the amount rack is located in its number "9" digital position.

Therefore, as wiper blades 113 and 114 are electrically connected together, in order to "interrogate" the first-order amount rack as to its digital position, for example, it is necessary only to supply a pulse of electrical energy at terminal D$\phi$ on the lower side of board 116. Consequently, the interrogation pulse appears at one of terminals 120*a* thru 120*j* on the upper side of board 116 depending upon, and corresponding to, the digital position of the low-order rack. For example, if the first-order rack is in the number "5" digital position, the interrogation pulse appears at terminal 120*f* on the upper side of board 116. It is now evident that in order to interrogate all of the amount racks as to their respective digital positions, it is necessary only to sequentially supply an electrical impulse to terminals D$\phi$ thru D9, and immediately thereafter a sequence of output pulses appear at output terminals 120*a* thru 120*j*, respectively corresponding to the digital position of each of the ten amount racks. That is, if the first pulse output is at output terminal 120*f*, if the first-order amount rack is located in the number "5" digital position; if the second output pulse appears at output terminal 120*b*, the second-order amount is located in the number "1" digital position, and so on, until the last or tenth output pulse appears at one of the output terminals indicative of the digital position of the tenth-order amount rack.

In order that the computer is capable of controlling the printing operation effected by the accounting machine, it is necessary that suitable means be provided whereby any selected one, or all, of the amount racks of the machine are capable of being stopped at predetermined digital positions under the control of the computer. With reference to FIG. 3B, in addition to the "exploded" view of FIG. 6, such a computer-controlled rack-stopping mechanism consists essentially of a plate 125 attached to the front face of cross-bar 82 by screws 126 threaded therein and essentially extending the entire distance between side plates 80.

It is to be appreciated that essentially there are a total of ten individual rack-stopping mechanisms, each one being identical to the one shown in FIG. 6 which corresponds to and controls positioning of the tenth-order amount rack.

An L-shaped bracket 127 is secured to plate 125 by means of screws 129 threaded in bracket 127 and a rack-stopping solenoid RA9L (corresponding to the tenth-order rack) is affixed to bracket 127 by suitable means not shown. A flat solenoid armature 130 has riveted thereto an L-shaped spring member 128, the horizontally disposed leg portion of spring member 128 being affixed to bracket 127 by means of screws 132 threaded therein, and washer 131 being interposed between the heads of screws 132 and spring member 128. The face of the vertical leg of armature 130 is disposed in close proximity to core 133 of solenoid RA9L and is magnetically attracted thereto each time the solenoid is energized by electrical current being passed through input leads 134 and 135 thereof. Also riveted to the vertical face of armature 130 is an horizontally disposed lever arm 136 having a pair of downwardly depending arms 137 supporting a cylindrical tempered-steel rack-stopping pin 138.

Therefore, it is evident that each time any one of the ten rack-stopping solenoids is selectively energized, the vertical leg of armature 130, corresponding to that particular rack, is attracted toward solenoid core 133, the left end of lever arm 136 is deflected downwardly, and pin 138 is inserted in front of the tooth on rack extension 98 corresponding to the digital position that particular rack is desired to be stopped. Thus, by selectively energizing all ten of rack-stopping solenoids RA$\phi$L–RA9L (FIG. 4) from computer controlled means at particular times during their movement in the setting direction, each of the amount racks is stopped and thus positioned at any digital position from "0" to "9" and each is then effective to control printing of the numerical digit corresponding to the digital position of that particular amount rack as previously described. With the exception of the rightmost one of teeth 101, all of the teeth on rack extension 98 are equally spaced by a distance of approximately five thirty-seconds of an inch. However, in order to provide a suitable clearance of approximately twenty-five thousandths of an inch between rack-stopping pin 138 and the rightmost or "0" digit tooth during insertion of the pin, the spacing between the "0" digit tooth and the adjacent "1" digit tooth is five thirty-seconds less twenty-five thousandths, or approximately .132 inch.

A laminated spring buffer mechanism (FIG. 3B) comprising top, center, and bottom L-shaped leaves 142, 143, and 144, respectively, is affixed to the upper surface of cross-bar 82 by means of screws 145 threaded therein. The lower end of each of the depending leg portions of leaves 142 and 143 has a vertical slot, not shown, centrally formed therein to accommodate lever arm 136 of the rack-stopping mechanism together with rack extension 98, both of which are slidably positioned therein. The width of the slot in leaves 142 and 143 is slightly larger than the greatest thickness of arm 136 or rack 98, but is much smaller than the width projection of depending arms 137. Additionally, the buffer mechanism is so positioned that each end of rack-stopping pin 138 is in close proximity to the front surface of leaf 142. As a result, leaves 142 and 143 provide a support for the backside of pin 138 to absorb the force of the blow exerted by the rack teeth on pin 138 when the rack is suddenly stopped thereby. However, it has been found that when the rack is traveling at maximum velocity in the rearward setting direction and is brought to a sudden stop by pin 138 being inserted in front of one of teeth 101, the lower ends of leaves 142 and 143 are deflected to the right at viewed in FIG. 3B. When the rack is suddenly brought to a standstill, the depending legs of leaves 142 and 143, due to the energy stored therein, attempt to resume their original position. As a result, they tend to overshoot their mark by deflecting to the left and thus attempt to drive the rack in the opposite direction. To minimize this undesirable effect, a screw 146 is slidably mounted in aligned holes formed in leaves 142 and 143 and is threaded in leaf 144. A pressure setting spring 147 is interposed between the head of screw 146 and washer 148 positioned against the front face of leaf 142. Thus, by suitable adjustment of screw 146, a suitable friction damping effect is provided the rack-stopping mechanism and rebounding of the racks is minimized.

As previously described, during a rack setting operation, all non-stopped amount racks travel in unison and in alignment with the other. Consequently, control means have been provided whereby the computer not only detects the corresponding digital positions of all stopped racks, but, in addition, detects the point-by-point digital position of all non-stopped racks. With reference to FIG. 4, an eleventh or timing rack 149 is provided having a construction and mode of operation exactly the same as the just-described amount and auxiliary racks 49 and 55, respectively, with the exception that timing rack 149 is not stopped at any time by a depressed key on the accounting machine keyboard and is not provided with a solenoid-actuated rack-stopping mechanism. Actually, a conventional amount and auxiliary rack are used for this purpose and the row of keys, located on the accounting machine keyboard and which selectively stop that particular rack when depressed, along with the zero stops 46 (FIG. 3A) associated therewith, have been removed. Timing rack 149 is provided with an extension 150 attached thereto by pin 199 and spring clip 100, and is essentially of the same general construction as rack extensions 98 with the exception that rack extension 150 does not have any teeth formed thereon.

With reference to FIG. 7, together with the partial plan view thereof in FIG. 8, a flat and horizontally disposed, timing rack comb 151 is welded to the uppermost face of rack extension 150 and has formed therein eight rectangular shaped slots 152 parallel disposed with respect to one another with their long axes perpendicularly disposed with respect to the direction of movement of rack extension 150. An L-shaped bracket 156 is affixed to the upper surface of cross-bar 82 by means of screws 157 threaded therein, and a cubical block of insulating material 158 is attached to the lower front face of the depending leg of bracket 156 by means of screws 159 threaded in block 158. Block 158 has embedded therein a photocell 160 whose terminals are connected to output terminals 161 and adapted to be energized by leads 162 connected to a suitable source of electrical energy, not shown. A further L-shaped bracket 163 is attached to mounting bar 81 by suitable means, not shown, and has mounted on the horizontal leg portion thereof, a light source 164 which is energized by leads 165 connected to a suitable source of electrical energy, not shown. A horizontally disposed flat plate 166 is fixedly secured to the lower end of block 158 by suitable means, not shown, and is positioned directly below and parallel with respect to timing rack comb 151 intermediate light source 164 and comb 151. Plate 166 has a single rectangular-shaped slot 167 formed therein disposed substantially parallel with respect to, and of sufficient length so as to partially overlap the slots formed in comb 151. It is evident, therefore, that as timing rack 150 is moved from left to right, as viewed, the slots formed in comb 151 sequentially coincide with the slot formed in fixed plate 166, thus sequentially exposing light source 164 to photocell 160.

For the accomplishment of the desired objectives in accordance with the present invention, it is desirable that the sequential alignment of slots 152 and 167, from the rightmost to the leftmost of slots 152, be synchronized with the time at which the non-stopped amount racks simultaneously pass through digital positions number "1" thru "8." For example, at the beginning of a rack-setting operation when all the amount racks are positioned in their number "0" digital positions, the relative positions of slots 152 with respect to slot 167 are as shown in FIG. 8. However, when the non-stopped amount racks are approaching their number "1" digital positions, slot 167 is also approaching alignment with the rightmost one of slots 152; when all non-stopped amount racks are approaching their number "2" digital positions, slot 167 is approaching alignment with the second from the rightmost one of slots 152; and so on, until all non-stopped amount racks are approaching their number "8" digital positions, at which time slot 167 is approaching the eighth or leftmost one of slots 152.

However, as the just-described solenoid-actuated rack-stopping mechanism is not capable of inserting rack-stopping pin 138 (FIG. 6) in front of the desired one of rack teeth 101 in a zero amount of time even after the corresponding solenoid is energized, the computer, hence the solenoid, must be "warned" or notified slightly in advance in order for the rack-stopping mechanism to be effective in stopping its related rack at the desired digital position. For example, it has been empirically determined that, with a rack traveling at an average velocity of approximately twenty inches per second, approximately one-tenth of an inch is sufficient anticipation for the rack-stopping mechanism. Consequently, as the tooth pitch of the amount racks is approximately equal to five thirty-seconds of an inch, slots 167 and 152 are in substantial alignment approximately two-thirds of a digital position ahead of the non-stopped amount racks. However, as the amount racks start with an initial velocity of "zero" and are therefore traveling at a relatively low velocity when passing through digital positions number "1" and number "2," and also as the spacing between the first and the second ones of rack teeth 101 is approximately twenty-five thousandths of an inch less than the pitch of the remaining teeth, as previously mentioned, the distance between the slots formed in comb 151, at the rightmost end thereof, are much less than the distance between the slots formed in the leftmost end thereof.

Ideally, the slot spacing should approximate the curve-plot of rack velocity vs. time. However, due to various loading conditions of the amount racks occurring during the setting operation thereof, the exact spacing between slots are empirically determined. Such an empirical determination is as follows: a satisfactory distance between slot 167 and the first one of slots 152, counting from right to left and when in a "0" digit position, is .045 inch; a satisfactory distance between the second and the third ones of slots 152 is .162 inch; and the consecutive distances between the remaining adjacent ones of slots 152 are .164, .153, .157, .153 and .139 inch, respectively corresponding to slot distances 3–4, 4–5, 5–6, 6–7, and 7–8; a slot width of .030 inch has been found satisfactory.

With reference to FIG. 3B, there is shown a mechanical type of memory device which is utilized by the computer to temporarily store indications of the digital positions of each of the amount racks at the end of the previously-initiated rack-setting operation. The device then operates suitable output means in the form of a conventional card or paper tape punching mechanism which makes a permanent record of all of the sequential digital positions at which the amount racks were stopped during a programming or computing operation.

Such a memory device consists essentially of a horizontally disposed upper switch-basket, indicated generally as 170, and a horizontally disposed lower switch basket located directly below switch-basket 170 and indicated generally as 171. Upper switch-basket 170 consists essentially of a substantially flat, rectangular-shaped and horizontally disposed board 172 composed of a suitable electrically non-conductive material, such as fiber-board or the like, and affixed to the underside of cross-bars 173 by means of screws 174 threaded therein. Cross-bars 173, in turn, are affixed to side plates 88 by means of screws 175 which are threaded in the ends of bars 173 as shown more clearly in FIG. 4. Board 172 is provided with ten equally spaced and rectangular shaped slots 176, the long axis of each slot being in axial alinement with the direction of movement of a different one of the amount racks. A column of ten pairs of equally spaced and metallic spring-clips 177 are fixedly secured to an electrically non-conductive mounting block 178 and collectively form a unitary assembly of the upper switch-basket. As shown more clearly in FIG. 12, the lower end of each pair of spring-clips 177 making up a column is "snapped in" and held by the same one of the rectangular slots formed in board 172. With reference back to FIG. 3B, each column of spring-clips is disposed directly above and oriented parallel with respect to the direction of movement of a corresponding amount rack, and the spring-clips within the column are spaced in a manner such that each pair is positioned with respect to another pair to correspond to a different one of the ten digital positions of that particular amount rack. Each of the spring-clips has connected thereto an electrical conductor forming a part of input-output cable 179 which is electrically connected in a manner to be more fully described hereinafter.

Lower switch-basket 171 consists essentially of a substantially flat, rectangular-shaped and horizontally disposed upper shelf-plate 180 and lower shelf-plate 181 held in position by vertically disposed back and front side-plates 182 and 183, respectively, in a parallel relationship with respect to one another. Shelf plates 180 and 181 are provided with a plurality of apertures individually through which is slidably disposed a lower electrically-conductive spring-clip member 184. Spring-clip members 184 are arranged in equally-spaced columns and rows and are positioned so that each of the lower spring-clip members is disposed directly below one of upper spring-clip members 177, as shown more clearly in the fragmentary view of FIG. 12. With reference to FIG. 9, the lower spring-clip members are arranged in ten equally-spaced columns which are designated, from right to left, #0 through #9 and are oriented in axial alignment with respect to the movement of and respectively corresponding to one of the amount racks previously designated as the first-order digit rack thru the tenth-order digit rack. Each of the ten lower spring-clip members within a column is equally spaced with respect to one another and are positioned in rows, each of which corresponds to one of the ten digital positions of the amount racks. With reference to FIG. 12, two pair of upper and lower spring-clip members 177 and 184, respectively, are taken from columns #8 and #9 and shown for illustrative purposes only. As shown, each of lower spring-clip members 184 within each column is guided for vertical movement only by means of common shaft 185 riding in an elongated slot 186 which is formed in the lower end of member 184. Each of spring-clip members 184 within a row are spring-urged downwardly by means of spring 187 which is interlaced between rods 188. Rods 188 are affixed at their ends to side-plates 182 and 183 (FIG. 9) and pins 189 are carried by spring-clip members 184. An elongated bale 190 is rotatably mounted on shaft 191 affixed at its ends to side plates 182 and 183 (FIG. 9) and is spring-urged by spring 192 in a clockwise direction, as viewed, into engagement with each of lower spring-clip members 184 which are located in the same column.

Therefore, each time spring-clip member 184 is deflected upwardly, bale 190 is first rocked counter-clockwise by cam surface 169, and then is rocked clockwise by spring 192 when cam surface 169 passes the end-most projection of bale 190. Thereafter, bale 190 engages the lower-most portion of cam surface 169 and locks spring-clip member 184 in its upwardly deflected position, as shown by the dotted lines, and thus effects a short-circuit of upper spring-clips 177. However, if a different one of the lower spring-clip members, located in the same column, is subsequently deflected upwardly, bale 190 is again rocked counter-clockwise and the lower clip member, which was previously held in a locked position, is returned to its lowermost position by means of spring 187. However, the subsequently deflected lower clip member is locked in its upwardly deflected position by subsequent clockwise rotation of bale 190, as before. It is therefore seen that only one of the lower spring-clip members in each column is permitted to be locked in an upwardly deflected position at any one time due to the fact that a subsequently deflected lower clip member releases all previously deflected lower clip members located in the same column.

With reference to FIGS. 9 and 10, lower switch basket 171 is provided with a shaft 193 on either end thereof which rides in an elongated slot 194 formed in arms 195 and 196. Arms 195 and 196 are fixedly secured to either end of shaft 197 journaled in side-plates 88. On the right-hand extension of shaft 197, as viewed, is fixedly secured arm 198 having a slot formed in the end thereof, the slot being engaged by pin 199 carried by the rotatable armature 200 of an electrically-operated solenoid designated L46 and which is mounted on side-plate 88 by means of bolts 201. Solenoid L46 is a conventional commercially-available rotary type which, when energized, the armature thereof is caused to be rotated in a clockwise direction, and, when de-energized, the armature is spring urged in a counter-clockwise direction back to its initial starting position. Mounted on left side-plate 88 by means of bolts 202 is a second electrically-actuated solenoid designated L45 which is identical in construction as previously described solenoid L46. Rotatable armature 203 of solenoid L45 carries a pin 204 which engages an elongated slot formed on the end of arm 195.

With reference to FIG. 3B, lower switch-basket 171 is spring urged upwardly, as viewed, by suitable springs, not shown, and normally rests in the position as shown. However, when solenoids L45 and L46 are simultaneously energized, shaft 197 is rocked clockwise and basket 171 is lowered to a position sufficient to engage the lowermost end of one of spring-clip members 184 in each of the ten columns with a corresponding raised cam surface 205 which is formed on the top side of the rightmost end of each of the ten switch plungers 102 which are individually affixed to the end of one of rack extensions 98. Consequently, one of spring-clip members 184 in each of the ten columns engages cam 205 on its corresponding amount rack, by means of plunger 102, in a manner such that all of the engaged clip members, one in each column, are latched in an upwardly deflected position as previously described. When solenoids L45 and L46 (FIG. 9) are both de-energized, switch basket 171 is spring urged upwardly and consequently all of the latched clip members 184 are thereby brought into engagement with, and thus short-circuits, corresponding ones of upper spring-clip members 177. As shown, clip member 184, corresponding to the number "0" digital position of its particular amount rack, is illustrated as being in engagement with clip member 177 which is located in the number "0" digit position in its particular column. However, had the amount rack been in its number "9" digital position, the rightmost one of clip members 184, that is, the one located in the number "9" digital position, would have been deflected upwardly instead of the lower clip member located in the number "0" digital position as shown.

With reference to FIGS. 9 and 11, a C-shaped bracket 206 is riveted or otherwise secured to either end of mounting board 180 and is provided with a slot 207 into which slidably fits a vertically oriented rod 208. Rod 208 is held fixedly secured by means of set-screw 209 threaded in bracket 210 which, in turn, is fixedly secured to side-plate 88 by means of screw 211 threaded in the end of bracket 210. Consequently, it is seen that the desried vertical movement of lower basket 171 is insured at all times.

In some instances, operation of the card or paper tape punching mechanism is required only when the accounting machine carriage is in certain columnar positions corresponding to the columnar format of the ledger cards or business forms in the carriage thereof. Consequently, operation of the punching mechanism is additionally controlled by means of a plurality of switches located at the back of the traveling carriage which are actuated by a plurality of adjustable stops removably mounted on a rear form-bar located on the back of the carriage. Such a carriage-position switch mechanism is of the same general type as that shown and described in copending application Serial No. 567,411, filed February 23, 1956, by Edgar H. Sonnanstine, Jr., and assigned to the same assignee as the instant application. Consequently, a detailed description thereof is not deemed necessary to be again given herein in order to obtain a full understanding and appreciation of the present invention.

Briefly, however, with reference to FIG. 17, the mechanism includes a substantially C-shaped rear form-bar 212 removably mounted on suitable brackets, not shown, which are secured to the lower rear framework of the carriage, the rear form-bar being essentially of the same general construction as the front form-bar which is similarly attached to the front of the carriage. Rear form-bar 212 is slidably supported between rollers 213 and extends substantially the full length of the carriage. Removably secured to the rearward face of form-bar 212 are a plurality of plates 214 which are disposed along the length thereof in predetermined positions corresponding to the columnar format of the business forms to be inserted into the carriage of the accounting machine.

Each of plates 214 is provided with two parallel and vertically disposed columns of holes formed therein, not shown, one predetermined hole or holes in each column having inserted therein one of switch operating studs 215 and 216. With reference to the plan view of FIG. 13, stud 215 is adapted to coact with one of a plurality of switch plungers 217 arranged in a left-hand row, whereas, stud 216 is adapted to coact with one of a plurality of switch plungers 218 arranged in a right-hand row. The total number of switch plungers 217 and 218 are equal to the total number of columnar holes formed in plate 214, and each plunger is disposed directly opposite a different one of the holes, and, consequently, directly opposite any stud inserted therein. As shown, plungers 217 and 218 are slidably mounted in a shiftable framework, which, together with plungers 217 and 218, constitutes a switch basket similar to previously described switch basket 171 shown in FIGS. 3B and 9. Each of the plungers has an enlarged rearward end, or lower end as viewed, having parallel side surfaces which fits snugly between and is guided for movement by suitable slotted guide rods 219. The forward, i.e., upper, end of each of the plungers is slotted to snugly embrace a suitably slotted guide rod 220, guide rods 219 and 220 being fixedly secured at their ends to top plate 221 and a bottom plate, not visible, which are slotted to receive guide rod 222 to form a shiftable framework for supporting plungers 217 and 218. A substantially V-shaped actuating lever 223 is pivotally mounted on stud 224 and has the end of the upper arm thereof pinned to upper plate 221 and also to the lower plate, not shown, by means of pin 225 which is fixedly secured between the upper and lower plates. The end of the remaining arm of lever 223 is slotted to receive stud 226 carried by the rotatable armature of an electrically-actuated, rotary solenoid L47 which is of the same general construction as those previously described.

When solenoid L47 is energized, the armature thereof is rotated in a counter-clockwise direction, as viewed, thereby causing stud 226 to rock lever 223 in a clockwise direction to shift the switch basket upwardly until a selected one of each of the upper ends of plungers 217 and 218 respectively engage studs 215 and 216. Consequently, as a result of such engagement, predetermined ones of plungers 217 in the left-hand row, and predetermined ones of plungers 218 in the right-hand row, are both depressed and latched in their downwardly deflected positions, and, additionally simultaneously release selected ones of previously depressed and latched plungers. When solenoid L47 is de-energized, the switch basket is spring-urged back to its initial starting position. As a result of the basket return, the electrically non-conductive tip 228, carried on the lower end of each of the plungers, engage and thus deflect downwardly the topmost ones of a plurality of switch blades 229 which are arranged in twenty rows with each row corresponding to a different one of plungers 217 and 218. When the uppermost one of switch blades 229 is deflected downwardly, all of the switch blades in that particular column are electrically connected together until solenoid 227 is again energized to move the switch basket upwardly, as viewed, as previously described.

A substantially V-shaped arm 153 is pivotally mounted on stud 154 and supports a roller on the upper end thereof which is adapted to engage a projection of plate 214, as shown in dotted lines, to rock arm 153 counterclockwise, as viewed, and effect actuation of a switching mechanism, indicated generally as SC41, in a well known manner.

With reference to FIGS. 44B and 44D, cam actuated switching means have been provided to effect selective energization of solenoids L45 and L46 (FIG. 9) and L47 (FIG. 13) at predetermined times and in a predetermined sequence, in addition to effecting selective energization of a suitable paper tape punching mechanism in a manner to be described hereinafter. It is to be noted that FIG. 44D is essentially a fragmentary view of the main cam shaft mechanism of the accounting machine portion of the present computer which is illustrated in FIG. 44 of the previously referred-to Patent 2,626,749 and fully described therein.

Briefly, however, the main cam shaft (588) of the accounting machine extends transversely across the machine beneath base 65 and is journaled at either end in roller bearings 589, only one of which is shown, mounted in brackets 590 secured to the under side of base 65 by means of screw 591 threaded therein. Even though not illustrated in FIG. 44D, cam shaft 588 has secured thereto a plurality of cams which are utilized for controlling various machine functions in a manner fully described in Patent 2,626,749. In accordance with the present invention, however, a pair of plate cams 592 and 593 are affixed to either side of a split hub 594 by means of screws 595 threaded therein. Hub 594, in turn, is fixedly secured to shaft 588 by means of screws 596. As shown more clearly in FIG. 44B, a flat plate 597 is secured to depending projections formed on the underneath side of base 65 by means of screws 598 threaded therein. A mounting frame 599, in turn, is fixedly secured to the bottom side of plate 597 by means of screws 600 threaded therein and is adapted to have fixedly secured to the depending leg thereof, by suitable means not shown, a plurality of switches SC42, SC48, and SC49.

As diagrammatically illustrated in FIG. 44G, and, as shown by the timing chart of FIG. 87C, for reasons to become more apparent hereinafter each time main cam shaft 588 of the machine is rotated clockwise through an arc of 126 degrees from the starting position as shown in FIG. 46B, cam 592 engages the movable arm of switch SC49 such that the normally-opened contacts thereof are closed thereby; when the main cam shaft is rotated 168 degrees clockwise from the starting position as shown, cam 592 additionally engages the movable arm of switch SC48 such that the normally-opened contacts thereof are closed and the normally-closed contacts thereof are opened thereby; when the main cam shaft is rotated 182 degrees, the movable arm of switch SC49 is released by cam 592 and the normally-opened contacts thereof resume their initial opened condition; a 213 degree clockwise rotation of the main cam shaft causes cam 593 to engage the movable arm of switch SC42 such that the normally-opened contacts thereof are closed thereby; a 224 degree clockwise rotation of the main cam shaft causes the movable arm of switch SC48 to be released by cam 592 such that the normally-opened and the normally-closed contacts of switch SC48 are allowed to resume their initial conditions; and, a 264 degree clockwise rotation of the main cam shaft causes the movable arm of switch SC42 to be released by cam 593 such that the contacts thereof are allowed to resume their initial conditions.

As previously mentioned, due to the incorporation of an overdraft control mechanism in the accounting machine portion of the present computer, true negative totals are permitted to be selectively printed-out from any of the totalizers therein, all of which is fully described in the previously referred-to Patent 2,629,749. With reference to the fragmentary view of FIG. 44F, which essentially corresponds to FIG. 47 of the just referred-to patent, the overdraft control mechanism includes an overdraft cam shaft 601 extending transversely across the machine beneath base 65 and is journaled in brackets 602, only one of which is shown, which are secured to the underneath side of base 65 by means of screws 603 threaded therein. Secured to overdraft shaft 601 is a spur gear 604 which disconnectably engages a similar spur gear, not shown, mounted on main cam shaft 588 (FIG. 44D). As fully described in the just referred-to patent, the pitch diameter of overdraft gear 604 is twice that of the similar gear mounted on the main cam shaft of the machine, thereby causing overdraft cam shaft 601 to be rotated at one-half the speed of main cam shaft 588 when the latter is rotated during a machine cycle.

In accordance with the present invention, a pair of leaf switches, indicated generally as SC45 and SC47, are insulated from and fixedly secured to bracket 605 by means of screws 606 threaded therein, bracket 605 being fixedly secured to bracket 602 by suitable means not shown. Rotatably mounted on a stud 607 (FIGS. 44C and 44E) affixed at one end to bracket 605, are a pair of cam follower arms 608 and 609 which are respectively spring biased in a clockwise direction, as viewed in FIGS. 44C and 44E, by means of springs 610 and 611. Fixedly secured to overdraft cam shaft 601 are a pair of cams 612 and 613 which are properly positioned on shaft 601 so as to engage rollers 614 and 615 respectively carried by cam follower arms 608 and 609. Respectively affixed to the upper end of each of arms 608 and 609 is one of a pair of insulating tips 616 and 617 which are adapted to respectively engage leaf switches SC45 and SC47.

With additional reference to the timing chart of FIG. 87C, when main cam shaft 588 is rotated 30 degrees from the initial starting position thereof, overdraft cam shaft 601 is engaged thereto and is thereafter rotated at one-half the speed of the main cam shaft. Thereafter, each time overdraft shaft 601 is rotated 10 degrees counter-clockwise from its starting position as shown in FIG. 44C, cam follower arm 608 is permitted to be rocked clockwise by spring 610 due to the decreased diameter of cam 612 being presented to roller 614. Thus, when arm 608 is rocked clockwise, the normally-closed contacts of leaf switch SC45 are opened thereby. Each time overdraft shaft 601 is rotated 165 degrees counter-clockwise from its initial starting position, an increased diameter of cam 612 is presented to roller 614, and, consequently, cam follower arm 608 is rocked counter-clockwise and thereby closes the contacts of switch SC45.

With additional reference to FIG. 44E, each time overdraft shaft 601 is rotated 260 degrees counter-clockwise from its starting position as shown, the maximum diameter of cam 613 is presented to roller 615, and, consequently, cam follower arm 609 is deflected counter-clockwise such that the normally-opened contacts of leaf switch SC47 are closed thereby. However, each time the overdraft shaft is rotated 290 degrees counter-clockwise from its starting position, the minimum diameter of cam 613 is presented to roller 615 to allow arm 609 to be rocked clockwise by spring 611, which, in turn, allowed the contacts of switch SC47 to resume their undeflected positions as shown.

(4) *Magnetic ledger card handling portion of computer*

With reference back to FIG. 1, a magnetic ledger card handling mechanism, indicated generally as 14, is mounted on the rightmost side of the just-described accounting machine portion of the computer, and is adapted to cooperate with the accounting machine to automatically effect insertion of leader cards in the carriage thereof and to automatically effect ejection of the ledger cards when the carriage is within approximately two inches of its extreme right-hand position, as shown. The card handling mechanism is normally enclosed by a front cover 231, which supports a smooth surface and horizontally disposed table 232, onto which ledger cards are sequentially placed prior to their insertion into the accounting machine carriage.

With reference to FIG. 14, there is shown a front view of the card handling mechanism with cover 231 and table 232 removed. The mechanism comprises a vertically disposed left side-plate 233, a vertically disposed right side plate 234, a vertically disposed back side-plate 235, a vertically disposed front side-plate 236, and a diagonally disposed bottom side-plate 237, all of which are connected together by suitable means, not shown, to form the basic support structure for the mechanism. The leftmost end of bottom side-plate 237 is affixed to the lowermost end of left side-plate 233 by suitable means, not shown, side-plate 233 being affixed to the rightmost bottom side of the accounting machine frame 65 by means of bolts 238 threaded therein. The leftmost side of back side-plate 235 is affixed to the right-hand extension of a rail 240, which normally supports the rearward portion of the accounting machine carriage, by means of screws 239 threaded in the rail 240. A platen 241 is journaled in the uppermost ends of side plates 233 and 234, and is also journaled in hubs 242 and 243, which are respectively welded or otherwise affixed to side-plates 233 and 234. The platen 241 is substantially identical in construction to conventional accounting machine platens and comprises essentially a centrally disposed metallic hub 244 projecting from either ends thereof. The hub 244 supports a metallic tube, not shown, which is provided with a layer of rubber, or the like, facing material 245 concentrically disposed thereabout.

Means are provided to effect the desired automatic rotational movement of the card handling platen 241 in order that the ledger cards, which are previously in contact with the uppermost surface thereof, are driven thereby into operative engagement with the accounting machine platen. Such means essentially comprises an electrically-operated card driving motor (CDM) which is mounted on the innermost surface of side-plate 234 by means of screws 247 threaded in the end bracket of the card drive motor, as shown in the fragmentary view of FIG. 31. The output shaft 248 of motor (CDM) extends through bracket 234 and is rotatably supported at its extended end by mounting bracket 249, which is fixedly secured in a spaced parallel relationship with respect to bracket 234 by means of posts 250 interposed therebetween. One end of each of the posts 250 is welded or otherwise affixed to bracket 234, whereas the opposite ends thereof are fixedly secured to plate 249 by means of screws 251 individually threaded therein. Freely mounted on the motor shaft 248 are a pinion gear 252 and a conventional friction clutch mechanism, indicated generally as 253, which comprises a pair of metallic washers having a fiber washer interposed therebetween and glued or otherwise affixed to the innermost face of one of the metallic washers. A knurled friction-adjustment knob 254 is threaded on the motor shaft 248 intermediate friction clutch 253 and plate 249. Thus, by rotational adjustment of the knob 254, a predetermined amount of torque is transmitted from the motor shaft 248 to the pinion gear 252 in a well-known manner. With additional reference to FIG. 31, the pinion gear 252 meshes with an idler gear 255, which, in turn, meshes with a spur gear 256 affixed to one end of shaft extension 257 by means of set screw 258 threaded in gear 256. With reference to FIG. 21, the opposite end of the shaft extension 257 is connected to the hub 244 of the platen 241 by means of a set screw 259 in the hub 244.

Therefore, it is evident that rotational movement of a predetermined torque is imparted to the card drive platen 241 by the card drive motor (CDM) through a friction clutch mechanism and a gear train interposed therebetween. However, for reasons to become more apparent hereinafter, it is desirable that rotational movement of the card drive platen 241 be immediately arrested at predetermined times. Consequently, a fast-acting electrically-operated card drive braking means has been provided and comprises a braking solenoid, indicated generally by the reference character (CDB), which is attached to the outermost surface of the side plate 234 directly opposite the idler gear 255, by suitable means not shown. The idler gear 255 is freely mounted on a longitudinally movable armature shaft 263 in such a manner that when solenoid (CDB) is de-energized, the card drive motor (CDM) is permitted to rotate the platen 241 in a normal manner. However, when the solenoid (CDB) is energized, the idler gear 255 is pulled inwardly, or to the left as viewed, and thereby locked against further rotational movement. Due to the normal action of the friction clutch 253, any and all undesirable effects created by rotor inertia of motor (CDM) are precluded when platen 241 is suddenly brought to a standstill even though the motor is momentarily energized after the braking action occurs.

As shown in FIG. 1, the traveling paper carriage, for the before-described accounting machine, consists of a framework which includes a pair of end housings 264. With reference to FIG. 17, the end housings 264, only one of which is shown, are supported in a spaced and parallel relationship with respect to each other by means of an S-shaped cross-bar 265, an L-shaped cross-bar 266, and a C-shaped carriage-rack rail 267, to which both of the end housings are secured by suitable means, not shown. The cross-bars 265 and 266 are fixedly secured directly to the end housings 264, whereas the rack rail 267 is fixedly secured at either end thereof to a bracket 268 by suitable means, not shown, the bracket 268 being bonded to a rubbed block 269 which, in turn, is bonded to a second bracket 270 secured to end housing 264 by means of screws 271 threaded therein.

The thus-constituted carriage frame is supported for transverse sliding movement on the accounting machine frame by means of a tube 272 secured to the under side of the cross-bar 266 by suitable connecting members 273. The tube 272 rides in and is horizontally supported by a series of grooved ball-bearing rollers 274, which are rotatably secured to the back-rail 240. Vertical and sidewise movement of tube 272 is prevented by means of a plurality of conically-shaped ball-bearing rollers, not shown, which are mounted on either side of and in engagement with the tube 272. The forward portion of the carriage is supported by means of ball-bearing rollers 275, which are received within a groove formed in the cross-bar 267. The rollers 275, in addition to being rotatably supported by a vertically disposed frame-plate on the accounting machine, not shown, are also rotatably supported on the front side-plate 236. The accounting machine carriage is yieldably driven in either direction by suitable fluid driving means (including motor 63, FIG. 3A), operatively connected to a driving gear 277 which engages a carriage-drive pinion rack 276 fixedly secured to the cross-bar 265.

With additional reference to FIG. 20, a substantially V-shaped guide-plate 278 is fixedly secured to the innermost side of each of the end housings 264 and has formed therein an elongated slot 279, in which rides a pin 280 affixed to an end-plate 281. A rectangularly-shaped front feed chute 282 extends the full width of the carriage and is secured at either end thereof to both of the end-plates 281. On the lowermost side of the accounting machine carriage, there is rotatably supported a square shaft 283 (FIG. 17) and a bail 284, each operatively connected together and operatively connected to the lowermost end of the side-plates 281 in such a manner that when the carriage open key ("CARR. OPEN," FIG. 2) is depressed, rail 284 is deflected counter-clockwise, as viewed. Consequently, arm 285 (FIG. 16), and hence shaft 283, are both freed to be rocked counter-clockwise and thereby allow the lowermost ends of the side-plates 281 to be deflected downwardly and around the accounting machine platen 71. When the shaft 283 is rocked counter-clockwise (FIG. 17), lower compression rolls 288, carried thereby, are moved out of engagement with the platen 71. Due to the positional locations of the slots 279 in the side-plates 278 and pins 280 riding therein, when the lowermost ends of the side-plates 281 are deflected downwardly and around the platen 71, the front feed chute 282 is lowered into the position shown in FIG. 18, thereby completing normal opening of the accounting machine carriage in the manner more fully shown and described in the before-referred-to Patent No. 2,626,749. When the accounting machine carriage is open and the card-drive latched in a driving position, as will later be described, a suitable ledger card is permitted to be driven downwardly to the left of chute 282, as viewed, between paper guide plate 289 and the bottom side of platen 71, and into paper guide channel 291. Thereafter, closing of the carriage engages the compression rolls 288 with the platen 71 to secure the ledger card prior to the unlatching of the card-drive mechanism, as, again, will later be described.

In accordance with the present invention, an elongated housing 292, extending substantially the full length of the carriage, as shown in FIG. 1, is pivotally mounted at either end thereof to the topmost side of the side-plates 281 by means of a pivot 293, the housing 292 having affixed at either end thereof brackets 290 shown in FIG. 20. A second pin 294 is affixed to each of the brackets 290 and rides in a second elongated slot 295, which is formed in each of the side-plates 278 just above the slot 279, as shown more clearly in FIG. 20. A plurality of compression rolls 296 are rotatably supported by brackets 297 affixed to a shaft 298, which is operatively supported by the housing 292. The compression rolls 296 project through suitable openings formed in the front face of the housing 292, as more clearly seen in FIG. 1.

During the just-described carriage opening operation when the lower end of each of brackets 281 is deflected in a path down and around platen 71, bracket pin 280 and housing pin 294, respectively riding in slots 279 and 295, separate from the other. Therefore, when front chute 282 is in the position shown in FIG. 18, housing 292 is tilted by a further amount, and, consequently, compression rolls 296 are positioned in close proximity to card-handling platen 241, the relative positions of pins 280 and 294 being shown in FIG. 20 in their moved positions by dotted lines. With reference to FIG. 19, the amount of tilt of housing 292 is limited by a pair of arms 299, each connected at opposite ends of, and projecting through, housing 292 as shown. The depending end of each of arms 299 respectively support a stud 300. Thus, when housing 292 is in the position shown in FIG. 18, stud 300 engages the large diameter portion of one of a pair of cams 301 which are rotatable about shaft 257 and are disposed at either end of platen 241 as shown in FIG. 14. When cams 301 are simultaneously rotated counter-clockwise, as viewed and by suitable means to be described hereinafter, both of studs 300 are engaged thereby to further tilt housing 292 in a counter-clockwise direction and thereafter latch all of compression rolls 296 firmly against platen 241 as illustrated in FIG. 19. It is therefore obvious that as long as compression rolls 296 are latched against card-drive platen 241, paper guide 282–292 is prevented from being raised to the position shown in FIG. 20.

Therefore, when compression rolls 296 are latched against card-drive platen 241, card-drive motor (CDM) (FIG. 14) is energized and platen 241 is thereby rotated in a clockwise direction, as viewed in FIG. 19, the front edge of a ledger card, indicated as reference numeral 305 and normally resting on table 232 as shown in FIG. 22, is automatically driven between the lowermost side of front feed chute 282 and the uppermost sides of paper guides 302 and 303, thence between the lowermost side of platen 71 and the uppermost side of paper-guide 289 (FIG. 17), and thereafter into chute 291.

By reversing card drive motor (CDM) and driving the ledger card outwardly to a predetermined position, bail 284 is rotated clockwise thereby positively driving compression rolls 288 into engagement with platen 71 by suitable means not shown. Unlatching of upper compression rollers 296 allows paper-guide 282–292 to raise to the position shown in FIG. 17. Consequently the ledger card is automatically positioned by paper guide strips 302 for a subsequent posting operation.

With reference to FIGS. 14 and 16, means for selectively rotating latching cams 301 comprises an electrically-operated motor (PGM) mounted on vertically disposed bracket 310 by screws 311 threaded in the end housing of the motor, bracket 310, in turn, being secured to front side-plate 236 by means of screws 312 threaded in bracket 310. The output shaft of motor (PGM) projects through bracket 310 and has affixed thereto spur gear 313 in mesh with a second spur gear 314. Gear 314 is fixedly secured to a hollow shaft 315 rotatably mounted on shaft 316 which is journaled in bracket 310 and right side-plate 234. A second hollow shaft 317 is also rotatably mounted on shaft 316 and has spur gear 318 affixed on the end thereof adjacent side-plate 234. Gear 318 meshes with the rightmost one of spur gears 319 affixed to either end of shaft 320 which is journaled in side-plates 233 and 234 and disposed parallel with respect to platen 241. Gears 319 individually mesh with one of spur gears 321 which are rotatably mounted on a projection of each of side-plates 233 and 234, as illustrated in FIG. 21 with respect to side-plate 234.

Each of spur gears 321 is fixedly secured to one of cams 301, by suitable means not shown, each of which is individually rotatably supported by the projection of one of side-plates 233 and 234. As shown in FIG. 14, a coil spring 324 surrounds oppositely disposed end portions of hollow shafts 315 and 317 and either end thereof is affixed to shafts 315 and 317 by means of screws 322 and 323, respectively, threaded therein.

Therefore, it is seen that rotational movement of the rotor of latching motor (PGM) is transmitted to both of latching cams 301 by way of gears 313, 314, spring 324, and gears 318, 319, and 321. As latching cams 301 are positively stopped by latching pins 300, as previously described in connection with FIG. 19, adverse effects of rotor inertia of the latching motor are eliminated by spring 324 even though the motor may momentarily be energized after the latching operation is completed.

With reference to FIG. 16, control means have been provided for selectively energizing the latching motor to effect the previously described latching and unlatching operation of the compression rollers with the card drive platen. The control means consist essentially of an L-shaped bracket 327 fixedly secured at one end to front side-plate 236 by means of screws 328 threaded in bracket 327. A substantially V-shaped member 329 is pivotally mounted at its center to the opposite end of bracket 327 by means of pin 330 and is spring-urged in a clockwise direction, as viewed, by means of spring 331. The leftmost leg of member 329 is in contact with lever arm 332 which actuates the plunger of microswitch 333 affixed to the frame of the card handling equipment, by suitable means not shown.

Thus, during a normal carriage opening operation of the accounting machine, as previously described, paper guide housing 292, in reaching the position shown in FIG. 18, rocks member 329 in a counter-clockwise direction, as viewed. When deflected counter-clockwise, member 329 releases the plunger of microswitch 333 to thereby permit energization of the paper guide motor (PGM, FIG. 14) and thus initiates counter-clockwise rotation of cams 301 to complete the latching operation as previously described.

Additional commutator type of control means have been provided to effect selective de-energization of the paper guide motor upon completion of the latching operation. With additional reference to FIG. 14, such control means consist essentially of a flat C-shaped electrically non-conductive support member 334 concentrically disposed about hollow shaft 317 and supported by side-plate 234 by means of posts 335 interposed therebetween and respectively connected thereto by suitable means, not shown. Affixed to the inside face of member 334 are four circumferentially disposed flexible metallic brushes 336, N, E, and 339 which are adapted to engage the face surface of commutator 340 concentrically disposed about, and affixed to hollow shaft 317. As shown in FIGS. 28A and 28B, the face of commutator 340 consists of a layer of electrically non-conductive material designated 341 having embedded therein a C-shaped electrically-conductive commutator bar 342.

When paper guide 282–292 is in the position as shown in FIG. 18 and compression rolls 296 are adjacent to, but not latched against, card drive platen 241, brushes 339 and E are electrically connected together by commutator bar 342, as shown in FIG. 28B. However, when paper guide motor PGM is energized, cam 301 (FIG. 19) is rotated counter-clockwise to complete the latching operation as previously described. When the latching operation is completed, commutator 340, thence commutator bar 342, will have been rotated counter-clockwise to the position as shown in FIG. 28A, and, as a result, brushes N and 336 are electrically connected together by commutator bar 342 to effect de-energization of the paper guide motor in a manner to be more fully described hereinafter. With reference to FIG. 14, solenoid actuated reversing relays, designated by the reference characters (PGR) and (CDR), are each mounted on bracket 342 affixed to lower end-bracket 237, and are respectively utilized to control the directions of rotation of paper guide motor (PGM) and card drive motor (CDM), as will later be described.

As previously mentioned, in the mechanization of record keeping and accounting procedures, it is desirable to utilize a ledger card having historical, current, and fixed data recorded thereon in both machine readable and human readable languages. With reference to FIG. 108A, there is illustrated a machine-readable ledger card 305 which is adapted to be utilized in accordance with the present invention. Accordingly, ledger card 305 is provided with a vertical strip of ferromagnetic material 306 coated along the left margin of the face surface thereof, the magnetic strip being effectively divided into three magnetically isolated vertical channels which are each adapted for selective recording of information therein.

With reference to FIG. 19, a magnetic read-write assembly, indicated generally as 343, is supported by bracket 344 affixed to left side-plate 233 of the card handling mechanism and is so positioned that the magnetic strip on each ledger card passes over the top thereof each time a card is fed into or out of the accounting machine carriage. A metallic leaf spring 345 is interposed between paper guide 282 and the top of read-write assembly 343 in such a manner that each ledger card is guided thereunder, and, consequently the magnetic strip on each ledger card is, at all times, lightly pressed against the top face of assembly 343 to insure consistent magnetic recording and reproduction characteristics, and for other well-known reasons.

As shown in FIG. 36, magnetic read-write assembly 343 comprises three encapsulated read-write heads 346, 347, and 348, which are equally-spaced from and disposed parallel with respect to one another. As shown in FIG. 33, each magnetic head comprises two substantially flat and generally C-shaped ferromagnetic pole pieces 349 and 350 having their lower legs abutting and their upper legs separated by a uniform air gap of approximately .005 inch. Each leg is respectively encompassed by one of a pair of serially-connected and inductively-aiding coils 351 and 352, each wound with approximately 600 turns of suitably electrically-insulated wire. The junction of coils 351 and 352 is connected to output terminal 353, whereas the remaining ends thereof are respectively connected to output terminals 354 and 355.

The air-gaps of magnetic read-write heads 346–348 are lengthwise aligned with the other, are properly positioned as shown in FIG. 19 so as to be contiguously disposed with respect to the magnetic strip of the ledger card passing thereover, and are lengthwise oriented substantially perpendicular with respect to the travel of the magnetic strip to effect longitudinal magnetic recording thereon.

In order to insure that the ledger card is properly aligned and fed into the card handling equipment by the operator, various photoelectric sensing means are incorporated into the control circuitry thereof. With reference to FIG. 22, a substantially rectangular-shaped ledger card guide assembly, indicated generally as 360, is affixed to the topmost surface of table 232, by suitable bolts 361 threaded therein, and extends substantially along the leftmost side thereof. As shown more clearly in the cross-sectional view of FIG. 23, guide assembly 360 comprises a pair of flat and rectangular-shaped plate section 362 and 363, one mounted on top of the other, and a pair of flat and rectangular-shaped half-plate sections 364 and 365 disposed side-by-side with respect to one another and on the underneath side of plate 363; the thickness of plate 365 is less than the thickness of plate 364 by an amount equal to at least the thickness of a ledger card for reasons to become more apparent hereinafter. With reference to FIG. 29, plates 362 and 363 have suitable bores formed therein which form enclosures for housing photocells (PCA1) and (PCA2) whose sensitive areas are oriented downwardly and are properly positioned so as to respectively receive radiant energy from light sources 366 and 367, the radiant energy first passing through slots 368 and 369 formed in table 232.

In operation, photocells (PCA1) and (PCA2) normally respectively receive radiant energy from, and are thereby energized by light sources 366 and 367. However, when the operator of the computer desires to effect proper insertion of a ledger card in the carriage of the accounting machine, in a manner previously described, the ledger card is first placed on the table of the card handling equipment, face down and bottom first as shown in FIG. 22. The ledger card then is inserted in the slot formed between the lowermost side of plate 365 and the topmost side of table 232, as shown by the dotted line in FIG. 23, until the leftmost vertical edge of the ledger card is oriented flush against the front face of plate 364. At this time, the radiant energy as seen by each of photocells (PCA1) and (PCA2) is cut-off and, consequently, both of the photocells are thereby de-energized. Photocells (PCA1) and (PCA2) are connected in an electrical control circuit in such a manner, as will later be described, such that when they are both de-energized, paper guide motor (PGM, FIG. 14) is permitted to thereafter be de-energized.

Additional photoelectric means is utilized to initiate energization of the paper-guide motor when the leading or bottom edge of the ledger card has been placed in a certain prescribed position with respect to card-drive platen 241 after certain other prescribed conditions, not yet described, have been met. As shown in FIG. 22, a groove 370 is circumferentially formed in platen 241 and in this groove is mounted an inverted and substantially V-shaped acrylic and transparent plastic rod having independent and disconnected leg portions 371 and 372, as shown in FIG. 17. A light source 373 is mounted on bracket 236 and is disposed at the lowermost end of leg portion 371, whereas, a photoelectric cell (PCS) is also mounted on bracket 236 with the light-sensitive area thereof disposed adjacent the lowermost end of leg portion 372.

Photoelectric cell (PCB) is normally de-energized, however, when the leading edge portion of the ledger card is positioned by the operator on top of the card-drive platen 241 adjacent the upper junction of leg portions 371 and 372, radiant energy from light source 373 is first projected upwardly through leg portion 371 and out of the uppermost end thereof. Thereafter, the radiant energy is reflected downwardly by the leading edge portion of the ledger card through leg portion 372, and, consequently, impinges the active area of, and thus energizes photocell (PCB). When photocell (PCB) is energized, assuming the before-mentioned prescribed conditions are met, paper guide motor (PGM) is energized and thereby rotate latching cams 301 (FIG. 19) in a counter-clockwise direction, as previously described, to latch upper compression rolls 296 against card drive platen 241 with the leading edge of the ledger card fixedly secured therebetween.

After the lapse of a time delay of approximately one-quarter of a second following energization of paper guide motor (PGM), card drive motor CDM (FIG. 14) is thereafter energized and thereby rotates the card drive platen to automatically feed the ledger card into the accounting machine carriage in such a manner that the magnetic strip thereof is passed over read-write heads 346–348 (FIG. 19), thereby effectively establishing three information channels in the magnetic strip which are disposed parallel with respect to one another and extend substantially the entire length of the left margin of the ledger card.

Photoelectric means are also utilized to selectively energize suitable electronic amplifiers associated with each of magnetic pick-up heads 346–348 at a predetermined time substantially coincidental with the first passage of the leading edge of the ledger card over the read-write assembly. Accordingly, leg portion 371 is provided with a branch leg portion 374 through which radiant energy from light source 373 is directed. A slot 375 is formed in paper guide 303 and a photoelectric cell, designated (PCC), is mounted at the side of, and in substantially parallel alignment with respect to branch portion 374, the light-sensitive area thereof being oriented substantially co-planar with the uppermost end of leg portion 374.

In operation, photocell (PCC) is normally de-energized. However, when the leading edge of the ledger card is adjacent slot 375 in paper guide 303, the radiant energy from light source 373 is first directed upwardly through leg portion 374 and out of the uppermost end thereof through slot 375. Thereafter, the radiant energy is reflected by the leading edge portion of the ledger card and thereby projected downwardly and onto the sensitive area of photocell (PCC) to effect the desired energization of the amplifiers associated with pick-up leads 346–348.

Photocell (PCB) is also utilized to detect the time at which the ledger card has been driven to a predetermined position in the card handling equipment and to initiate, at that time, reversal of the card-drive motor to effect ejection of the ledger card or to effect positioning of the card in the accounting machine carriage, depending upon the "instructions" previously given to the computer as will later be seen. For these purposes, as seen in FIG. 22, ledger card 305 is provided with a dark area or "reversal spot" 376 which is located in the top marking thereof in alignment with photocell (PCB). Consequently, when reversal spot 376 is adjacent the junction of arms 371 and 372, radiant energy from light source 373 is absorbed by the dark area thereof and photocell (PCB) is thus de-energized to initiate the desired reversal of the card-drive motor.

(5) *Electromechanical control means*

As will fully be described hereinafter, various control means are utilized by the computer to allow automatic insertion of a ledger card into the accounting machine carriage only when the carriage is resting approximately two inches from its maximum right-hand position, as shown in FIGURE 1; this position will be referred to hereinafter as the "home" position of the carriage. As it is necessary that the accounting machine carriage remain in home position during operation of the card handling equipment, locking means are utilized to selectively lock and unlock the carriage while in home position.

With reference to FIG. 29, an L-shaped bracket 380 is welded or otherwise secured to back side-plate 235 and pivotally supports cam 381 at the lowermost end thereof by means of pin connection 382. Connecting rod 383 is slidably mounted in a bore formed in bracket 380 and plate 235, and is pivotally connected at one end thereof to the upper leftmost portion of cam 381 by means of pin connection 384. Spring 385, disposed about rod 383, is interposed between collar 386 affixed to rod 383 and bracket 380, thus spring-biasing rod 383 to the left as viewed. The remaining end of rod 383 is pivotally connected to the lowermost end of latch 387 by means of pin connection 388, the uppermost end of cam 387 being pivotally connected to bracket 389 by means of pin connection 390. Bracket 389 is fixedly secured to plate 391 which, in turn, is fixedly secured to plate 236 by means of screws 392 threaded therein. Fastened to bracket 391 by means of nuts 393, is an electrically-actuated rotary type solenoid (CHP) which is substantially identical in construction as the solenoid designated L46 which was previously described with respect to FIG. 9. A cylindrical-shaped plunger housing 395 is fixedly secured to bracket 391 by means of screws 396 threaded in the side of housing 395. As shown more clearly in FIG. 30, slidably mounted in the bore formed in housing 395 is a rod-shaped plunger 397 which is spring-biased upwardly, as viewed, by means of spring 398 disposed thereabout and interposed between the shoulder formed on the upper end thereof and the bottom of the bore formed in housing 395. Threaded on the end of plunger 397 is a truncated conical member 399 which is normally engaged by projection 400 formed on the lowermost end of latch 387.

Thus, when the accounting machine carriage is in home position and a carriage opening operation is initiated by counter-clockwise rotation of bail 284, as previously described, cam 381 is engaged by bail 284 and is rocked clockwise thereby. Clockwise rotation of cam 381 shifts connecting-rod 383 laterally to the right and thereby disengages latch projection 400 from member 399, and thus permits spring 398 to deflect plunger 397 upwardly into engagement with the teeth formed on the lowermost side of carriage rack rail 267, thereby locking the accounting machine carriage in home position. When it is desired to selectively unlock the machine carriage, solenoid (CHP) is selectively energized and consequently an off-set pin 404, carried by the rotary armature thereof, engages member 399 and deflects plunger 397 downwardly to a point where it is again latched by latch projection 400. After solenoid (CHP) is de-energized, plunger 397 remains latched in its downwardly deflected position, if bail 284 has previously been restored to the position shown in FIG. 29, until another carriage opening operation is initiated.

Figure 2:
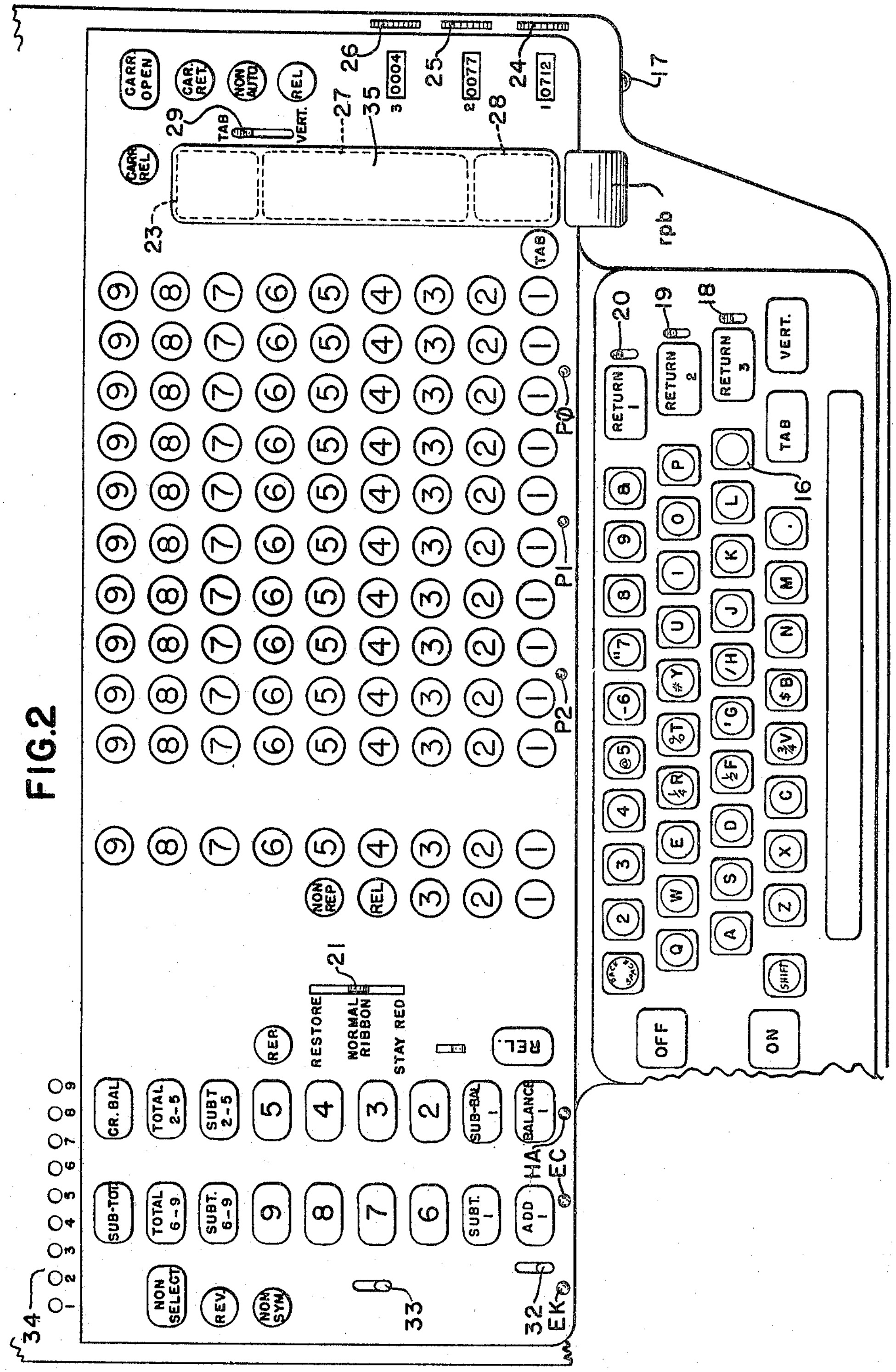
FIG. 2 is a plan view of the keyboard of the accounting machine portion of the computer.

As previously mentioned with respect to FIG. 2, upper, middle and lower motor-bars 23, 27 and 28, respectively, are enclosed by cover 35 and are thereby rendered non-accessible to the operator of the machine. With reference to FIG. 38 there is shown a side-elevational view of the motor-bars along with a portion of the cycle-initiating mechanism associated therewith. FIG. 38 essentially corresponds to FIG. 119 of the before referred-to Patent 2,626,749, and, as a full and complete description of each of the various motor-bar mechanisms is available therein, a further detailed description thereof is not deemed essential for a full and complete understanding and appreciation of the present invention.

However, in accordance with the present invention, key stems 401 thru 403 of motor-bars 23, 27, and 28, respectively, are respectively operated by the rotary armature of electrically-actuated solenoids (MBϕ), (MB1), and (MB2) by means of linkages 407 thru 409, respectively connected therebetween and extending through suitable openings formed in base 65 of the accounting machine. Solenoids (MBϕ), (MB1), and (MB2) are each affixed to bracket 410 which is bolted to the underneath side of base 65 and are essentially of identical construction as the previously described rotary-type solenoid (L46) shown in FIG. 9. Thus, it is evident that by selectively energizing one of the motor-bar solenoids for a predetermined time, the corresponding motor-bar is automatically depressed for a corresponding predetermined time and thereby initiates either a "touch" or a "hold" operation which, in turn, selects a predetermined cycle of operation of the accounting machine, as previously described.

With reference to FIG. 35, a pair of rotary-type electrically-actuated solenoids (OH1) and (OH2), substantially of identical construction as those previously described, are each mounted on one of brackets 417 and 418 by means of nuts 419 and 420, respectively; brackets 417 and 418, in turn, are secured to suitable flanges, depending from the underneath side of frame 52, by means of screws 421 and 422, respectively threaded therein. As shown more clearly in FIGS. 32 and 34, the rotatable armatures of solenoids (OH1) and (OH2) are individually provided with a projecting leg 424 and 423, respectively, which, as shown in FIG. 35, are adapted to respectively engage the tails of the eighth and the eleventh ones of order-hooks 76, counting from right to left. As previously described, the eighth and eleventh order-hooks, respectively control the operation of the eighth and the eleventh ones of type sectors 67 which respectively print the sixth and ninth-order digits of the amount row, with each digit printed being followed by a comma.

Thus, by selective energization of solenoid (OH1), the armature thereof is rotated counter-clockwise, as viewed in FIG. 32, to unlatch all order-hooks, from the third to and including the eighth one, from their respective type-sectors. Likewise, by selective energization of solenoid (OH2), the armature thereof is rotated counter-clockwise, as viewed in FIG. 34, to unlatch all order-hooks, from the third to and including the eleventh one, from their respective type-sectors.

As previously described in connection with FIGS. 16 and 17, during a carriage opening operation, square shaft 283 is normally rocked counter-clockwise by arm 285 and thus effects the disengagement of lowermost compression rolls 288 from the accounting machine platen 71. However, for reasons to become more apparent hereinafter, means have been provided for selectively preventing the lower compression rolls from being disengaged from the platen. As shown in FIG. 16, a rotary-type electrically-actuated solenoid (X), of substantially identical construction as those previously described, is mounted on an L-shaped bracket 426 by means of nuts 427, bracket 426, in turn, being fixedly secured to back side-plate 235 by means of screws 428 threaded in bracket 426. An S-shaped bracket 429 is fixedly secured to back side-plate 235 by means of screws 430 threaded in the foot of bracket 429. As shown in FIG. 15, bracket 429 slidably supports a rectangular-shaped slide 431 by means of studs 432 extending through elongated slots formed in slide 431 and affixed to bracket 429. Slide 431 is normally spring-biased to the right, as viewed, by means of spring 438 connected between pin 433 carried by slide 431 and block 434 welded or otherwise secured to plate 435 of the machine frame.

When slide 431 is in its normal position, as shown in FIG. 15, a projection on the uppermost side of the rightmost end thereof is directly underneath a projection formed on arm 285, as further shown in FIG. 16. Consequently, counter-clockwise rotation of arm 285 is thereby prevented and thus the lower compression rolls are maintained in engagement with platen 71. However, when solenoid (X) is selectively energized, pin 436, carried by the rotatable armature thereof, engages flange 437 formed on the lowermost side of the left end of slide 431 opposite arm 285, as viewed in FIG. 15, and thus deflects slide 431 to the left and thereby removes the obstruction from beneath arm 285 to permit the arm to be rocked counter-clockwise when desired. When solenoid (X) is de-energized, spring 438 urges slide 431 back toward its home position as shown.

In the just-described accounting machine, it is possible to take a true negative total from any one of the totalizers numbered "one" through "nine" inclusive, due to the incorporation therein of an overdraft control mechanism. By the use of this mechanism, the machine is caused to automatically operate through two cycles of operation. On the first machine cycle, the negative amount, which at this time is in a complementary form, is taken from the selected totalizer and is subtracted from the cleared X-totalizer, thereby causing the true negative total to be set up on the wheels of the latter totalizer. During the second machine cycle, the total is taken from the X-totalizer and the selected totalizer is "non-added," thereby causing the absolute value of the negative total or credit balance to be printed-out. Hence, at the end of the overdraft operation, the selected totalizer is cleared, as is also the X-totalizer, and the absolute value of the credit balance is printed on the record material. If desired, a sub-total of the negative amount may be taken instead of the total, thereby leaving the selected totalizer in the same condition at the end of the overdraft operation, as it was at the beginning.

Therefore, when it is desired to take a total or a sub-total from one of the totalizers and overdraft indicators 34 (FIG. 2) visually indicate that the number held by the particular totalizer is a negative amount, in addition to depressing the proper totalizer-selecting key and the credit balance key, the total key pertaining to the particular totalizer involved must also be depressed. If a sub-total operation is desired, the sub-total key must be depressed in addition to the previously-mentioned keys, so as to cause the negative amount to be placed back into the totalizer. Thereafter, the proper motor-bar is depressed so as to put the machine through a two-cycle credit balance operation and thus cause the absolute value of the negative amount to be printed-out.

With reference to FIG. 37, there is shown a fragmentary view of a portion of the overdraft control mechanism linkage which is fully shown in FIG. 22 of the aforementioned Patent 2,626,749. However, due to the fact that the overdraft control mechanism is fully shown and described in the aforementioned patent, it is believed that but a brief description thereof is necessary to herein be presented in order to make readily apparent the significance of the modifications thereof made in accordance with the present invention.

As shown, the lower end of overdraft pitman 442 extends through an opening formed in base 65 of the accounting machine and is pivotally connected to bell-crank lever 443, the bell-crank lever being rotatably mounted on rod 444 which is secured to the under side of base 65 by suitable means not shown. The remaining arm of bell-crank 443 is provided with a stud 445 which cooperates with a slot formed in the upper edge of overdraft trip-arm 446, trip arm 446 being rotatably supported on overdraft cam shaft 447 which is journaled in brackets 448 secured to the bottom side of base 65. Trip arm 446 has a notch formed on the end thereof which is normally urged by spring 449 into engagement with stud 450 carried by the lower end of lever 451. Lever 451 is pivotally mounted on rod 444 and has rotatably pinned to the lowermost end thereof, roll 452 which is urged by spring 449 toward the periphery of a plate cam, not shown, which, in turn, is secured to overdraft cam shaft 447.

Consequently, as the credit balance key ("CR. BAL.", FIG. 2) is operatively connected to the uppermost end of pitman 442, manual depression of the credit balance key causes pitman 442 to be depressed at the beginning of the cycle of operation of the machine. When pitman 442 is depressed, bell-crank 443 is rocked clockwise, thereby causing stud 445 to rock overdraft trip-arm 446 counter-clockwise and thus release lever 451 to the urgency of spring 449. Due to the action of spring 449, lever 451 is rocked clockwise to engage roll 452 with the periphery of a plate cam, mentioned above, to effect the carrying-out of the remainder of the cycle of operation, as fully described in the aforementioned Patent 2,626,749. Near the end of the second cycle of operation, a high point on the plate cam effects re-engagement of stud 450 with the notch formed on the end of overdraft trip-arm 446, thus completing the cycle of operation.

In accordance with the present invention, means are provided for automatically effecting selective depression of overdraft pitman 442 to automatically initiate the previously-described overdraft cycle of operation. Such means includes a rotary-type electrically-actuated solenoid (CBS) which is essentially of identical construction as those previously described. Solenoid (CBS) is mounted on bracket 454 by means of nuts 455, bracket 454 being fixedly secured to the under side of base 65. The rotatable armature of solenoid (CBS) is provided with an extension 456 which engages roller 457 pinned to the end of bell-crank 443. Consequently, each time solenoid (CBS) is energized, bell-crank 443 is rocked clockwise and thus initiates a credit balance cycle of operation, thereby automatically effecting a print-out of negative numbers under the electronic control of the computer, as will be more fully described hereinafter.

With reference to FIG. 38, when the carriage throat shaft 458 is rotated counter-clockwise, as viewed, control plate 459, fixedly secured to shaft 458, is also rocked counter-clockwise, thereby tripping a carriage throat clutch mechanism, not shown, thus causing the throat mechanism to be operated by a power shaft, all in a manner fully described in the referred-to Patent 2,626,749.

In accordance with the present invention, a rotary-type electrically-actuated solenoid (Y), essentially of identical construction as those previously described, is fixedly secured to bracket 461 by suitable means, not shown. Bracket 461 is fixedly secured to bracket 462 by means of screws 463 threaded therein, bracket 462, in turn, being fastened to the under side of base 65 by means of screws 464 threaded therein. The rotatable armature of solenoid (Y) is effectively connected to control plate 459 by means of linkage 465 connected therebetween. Consequently each time solenoid (Y) is energized, plate 459 is rocked counter-clockwise, as before. As a result, the carriage throat clutch is tripped thereby, as mentioned before, and the opening and closing of the carriage of the accounting machine is automatically effected solely under control of the computer.

In order to initiate a total-taking operation as previously described, it is necessary that the zero stop pawls 46 (FIG. 3A) be rocked counter-clockwise to release the differential actuators 49 and permit rearward movement thereof. During the rearward movement of the actuators, selected ones of the totalizers are rotated in a reverse direction until stopped by suitable "add" tripping pawls, not shown, to thereby position the differential actuators 49 and the printing sectors 67 in accordance with the amount indicated by the rotatable positions of the totalizer wheels. In order to initiate an addition or subtraction operation, the zero stop pawls 46 are removed by depression of the amount keys, as previously described. In total-taking operations, however, no amount keys are depressed, and thus it is necessary to utilize other means for releasing the actuators from the zero stop pawls.

With reference to the fragmentary view of FIG. 40, which is fully illustrated in FIG. 36 of the previously mentioned Patent No. 2,626,749 and fully described therein, means are provided for moving the key release slide 470 at the outset of the machine cycle, thereby causing the stud 471, affixed to the upper end thereof, to deflect the plate 472 clockwise, as viewed. The plate 472 is fixedly secured to the shaft 473, as is the plate 474, which supports a stud 475 on the opposite end thereof. Therefore, when the plate 472 is deflected clockwise, the plate 474 is likewise deflected clockwise, thereby causing the stud 475 to act against the uppermost surface of the cam 476, which is provided on each of the control slides 44, thereby moving the slides toward the rear of the machine and thus releasing the zero stop pawls 46, as described in connection with FIG. 3A. At the same time, the studs 475 cooperate with suitable cam projections, not shown, which are provided on the latching slides in the amount key banks, so as to release any amount keys which may have accidentally been depressed prior to the initiation of the total-taking cycle of operation. Consequently, the square studs 41 on the lowermost end of the key stems are withdrawn and thus are prevented from coacting with the shoulders 50 on the differential actuators 49, and, therefore, are not permitted to stop the actuators in positions other than those dictated by the amounts standing on the totalizer wheels.

The actuation of the key release slide 470 near the beginning of the machine cycle, rather than near the end thereof, is accomplished by means of a key release latch 477, pivotally mounted on a stud 478, which is carried by the rear end of the slide 470. The rear end of the latch 477 is formed into a hook 479, which engages a stud 480, mounted in a depending arm of a lever 481, which, in turn, is pivotally mounted between the side frames of the machine. The lever 481 is operatively connected to a roller, not shown, which engages a cam mounted on the main cam shaft of the machine. Hence, when the main cam shaft is rotated in one direction, the latch 477 is deflected to the left, as viewed, by the stud 480, and thus the key release slide 470 is operated for the before-mentioned purpose.

In order to prevent the just-described early key release from occurring during an addition or subtraction operation, the selecting slides for the various totalizers are each provided with suitable abutments, not shown, which overlie the bail 484 when the slides are located in their total-taking positions. As partially illustrated and as shown more clearly in FIG. 39, the bail 484 is secured at its ends to a shaft 485 journaled at either end in the side walls of a bracket 486. Although not shown, the shaft 485 is operatively connected to be rocked clockwise, as viewed in FIG. 40, by the main cam shaft of the machine. Consequently, a stud 487, mounted in an arm 488, which is pinned to the right-hand end of the shaft 485, deflects the key release latch 477 counter-clockwise, thereby uncoupling the hook 479 from the stud 480 and thus preventing early release of the amount keys. However, if any of the totalizer control slides is located with its abutment positioned above the bail 484, clockwise rotation of the shaft 485 is prevented, and the key release latch 477 remains coupled to the stud 480, so as to bring about an early release of the amount keys.

With reference to FIG. 39, in accordance with the present invention, means are provided for automatically bringing about an early release of the amount keys by the provision of an electrically-actuated solenoid (RRS) secured to a bracket 490 by means of screws 491 threaded in the frame thereof, the bracket 490, in turn, being fixedly secured to the bracket 486 by means of screws 492 threaded therein. A substantially Z-shaped armature 493 of the solenoid (RRS) is pivotally mounted on a pin 494 in such a manner that, each time the solenoid (RRS) is energized, the rightmost leg of the armature 493, as viewed, is moved upwardly to present an obstruction to the bail 484. Consequently, clockwise rotation of the bail 484 is prevented, even though there are no totalizer control slides which are located with their abutments positioned above the bail 484, as previously described.

As will be described more fully hereinafter, there are certain "instructions" which are utilized and carried out by the computer and which effect a different cycle of operation of the accounting machine portion thereof. For proper control of the accounting machine portion, however, it is necessary that means be provided to "sense" the states or conditions of the various portions of the machine either before, during, or after a cycle of operation thereof. Such means include a plurality of switches located at various appropriate places within the machine and will, at this time, briefly be described only as to their location and function, together with their manner of actuation. The following to-be-described switches, along with the just-described electrical components such as the photocells, solenoids, etc, will hereinafter again be described in connection with their actual incorporation into the electrical control circuitry of the computer.

For example, neglecting for the moment the tape-punching mechanism, there are three switches which are utilized in a logically "ANDED" combination to indicate by their closure when depression of a particular motor bar will cause a cycle of operation of the accounting machine. With reference to FIG. 38, a bell crank or "able arm" 497 is pivoted about a stud 498 and, in a manner fully described in the aforementioned Patent No. 2,626,749, is operatively connected to the various mechanisms of the motor bars 23, 27, and 28 in such a way that, when deflected in a clockwise direction, as viewed, all motor bars are disabled and thus rendered ineffective. The able arm 497 is deflected clockwise when a key on the accounting machine keyboard is partially depressed, when the carriage is off a stop and the "non-select" key is not depressed, when the carriage is returning, when the electrical power to the accounting machine driving means is turned off by the ON-OFF switch, when the machine is in a cycle of operation, or when a motor bar is depressed. In order to detect the condition of the able arm 497, a switch 496 is fixedly secured to the side frame of the machine by suitable means, not shown, and is adapted to have its movable arm 499 actuated by linkage 500, which is connected to the upper end of the able arm. Normally, the contacts of the switch 496 are closed; however, when the able arm 497 is deflected clockwise for reasons previously mentioned, the contacts of the switch 496 are opened, thereby indicating that the motor bars are disabled.

In order to enable the accounting machine to perform its record-keeping functions, the traveling paper carriage is adaptable to be tabulated from one columnar position to another columnar position, while traveling in either a forward or a reverse direction, so as to enable amounts to be printed in the proper column of the record-keeping form. The tabulation control mechanism utilized is extremely flexible in character and is selectively controlled either from special keys on the keyboard, from the motor bars, or from the stops of the traveling paper carriage itself.

Consequently, as the able arm does not disable the motor bars during a carriage tabulation cycle, it is therefore possible to manually hold the carriage over a carriage stop, even though the carriage is attempting to tabulate, and thereafter depress a motor bar, thereby initiating a machine cycle. Therefore, to prevent the electrical controls for the computer from initiating a depression of a particular motor bar while the carriage is tabulating over a carriage stop, a switch, shown in FIG. 43 as 510, is utilized to sense a carriage tabulation cycle. As shown, the forward tabulation lever 501 is rotatably and slidably supported by means of an elongated slot formed therein cooperating with a frame stud 502 secured to an angle bar 503. The lever 501 is normally urged to the right, as viewed, by means of a spring 504 and is further urged in a clockwise direction about the stud 502 by means of a spring 505. The action of the springs 504 and 505 is resisted by a square stud 506, which lies beneath the right-hand end of the lever 501 and is secured to the rear face of the carriage support plate 503. The stud 506 cooperates with a shoulder 507 formed on the lever 501 and thereby prevents the lever 501 from being moved either to the right or to be rotated under the influence of the springs 504 and 505.

In operation, when tabulation is initiated depressed, among other things not pertinent hereto, the lever 501 is first lifted off the stud 506 and is thereafter moved to the right by the spring 504 and rocked clockwise by the spring 505, to free the carriage for movement and to effect completion of the tabulation cycle. Upon completion of the carriage tabulation cycle, the lever 501 is restored to the position shown.

To sense a tabulation cycle, an extension 508 is pivotally connected at one end to the end of the lever 501 and is rotatably and slidably mounted by means of an elongated slot formed therein cooperating with a stud 509 mounted in the support plate 503. A switch 510 is mounted on the support plate 503 in such a manner that the contacts thereof are opened by extension 508 due to the clockwise movement of the lever 501, thus indicating that the carriage is operating in a tabulating cycle.

As previously mentioned in connection with FIG. 38, all previously-mentioned conditions being met, the contacts of the switch 496 are closed by the able arm 497 after the machine has progressed through approximately seventy-five percent of its cycle of operation. Consequently, another switch is utilized to indicate when the machine cycle has been sufficiently completed to the extent that depression of a motor bar will cause another cycle of operation. With reference to FIG. 41, there is shown a slide 513, which controls the reverse tabulation mechanism of the accounting machine and may therefore be referred to as the "reverse tabulation" slide which initiates the return of the carriage. The slide 513 is provided with elongated slots by means of which it is slidably mounted on suitable studs, not shown, which, in turn, are mounted on an auxiliary frame plate of the machine. The slide 513 is resiliently urged toward the front of the machine, or to the left, as viewed, by means of a spring 514, but is normally retained in its rearward position, against the urgency of the spring 514, by means of a rod 515, secured to the upper end of a lever 516. The lever 516 is pivotally mounted on a stud 517, which is secured to the auxiliary frame plate, and its lower end is pivotally connected to the forward end of a link 518. The rear end of the link 518 is pivotally connected to the upper end of a follower arm 519, which is rotatably mounted on a shaft 520 and is provided with rolls 521 and 522, which respectively cooperate with a pair of companion cam plates 523 and 524, secured to the main cam shaft 525 of the accounting machine.

Hence, during each cycle of operation of the accounting machine, the cam shaft 525 is rotated clockwise, as indicated by the arrow, and thereby deflects the follower arm 519 clockwise to the position indicated by the dash-dot line. Consequently the link 518 is shifted to the right, and the lever 516 is deflected counter-clockwise thereby and thus moves the rod 515 to the front of the machine. Consequently, the slide 513 is permitted to be moved forwardly under the influence of the spring 514 and to be differentially positioned under the control of the motor bars. The lever 516 also carries an aligner bar 526, which is adapted to engage aligner notches 527 formed on the lowermost edge of the slide 513, so as to align the slide firmly in the position which it has assumed while being sensed by a feeling mechanism, which, again, is fully shown and described in Patent No. 2,626,749. Upon completion of the cycle of operation, the follower arm 519 is deflected counter-clockwise to again engage the rod 515 with the slide 513, as shown.

In order to sense whether the machine is in home position ready for another cycle of operation or whether the machine, at the moment, is in the process of carrying out a cycle of operation, the switch 528 is utilized and is fixedly secured to a bracket 529 by means of nuts 530. The bracket 529, in turn, is fixedly secured to a bracket 531 by means of screws 532 threaded therein, bracket 531 being secured to the base 65 of the machine by suitable means, not shown. As shown more clearly in FIG. 42, the link 518 is provided with a stud 533, which is adapted to engage a roller 534, rotatably carried by the actuator of the switch 528. Consequently, when the machine is in home position, as shown in FIG. 41, the stud 533 is in engagement with the roller 534, and the contacts of the switch 528 are thereby closed, indicating that the machine is ready to start another cycle of operation. However, when the machine starts to initiate another cycle of operation, the pressure exerted by the stud 533 on the roller 534 is relieved, and the contacts of the switch 528 are opened thereby.

The three just-described switches 496, 510, and 528 do not detect when a motor bar is disabled due to one of the item counters being off home position, or when one of the manual counter control keys is partially depressed. Consequently, even though the collective closure of the three switches 496, 510, and 528 indicates that a motor bar is permitted to be depressed by the computer, yet the motor bar may still be disabled mechanically. In fact, if a motor bar were to be depressed at this particular time, it is possible that the electronic control portion of the computer would receive an indication that the accounting machine portion thereof had started into a cycle of operation, whereas, in actuality, the machine did not even start to cycle.

To avoid the necessity of many additional switches to detect why the accounting machine portion of the computer did not cycle, a single switch is utilized to detect when the machine did not cycle, regardless of the reasons why it did not cycle. Consequently, if the accounting machine portion does not cycle, for some reason or another, after the electronic portion of the computer has effected depression of a motor bar, the electronic portion "senses" the fact that the machine did not cycle and thereafter continually effects periodic depression of the motor bar until the machine finally cycles.

With reference to FIG. 26, a flat plate 537 is secured to a shaft 538, which is journaled in the side frames, not shown, of the electric typewriter portion of the accounting machine. Also secured to the shaft 538 is an arm 539, which is operatively connected to the accounting machine mechanism in such a manner that, each time the accounting machine starts into a cycle of operation, the arm 539 is rocked counterclockwise, as viewed, and thereby positioned as indicated by the dot-dash line. However, when the lever 539 is rocked counter-clockwise, the plate 537 is thereby moved into blocking position between the typewriter keys to prevent a typewriter key from being depressed while the machine is carrying out a cycle of operation. Upon completion of a cycle of operation, the lever 539 resumes its position, as shown.

Thus, in order to sense whether a cycle of operation is being carried out, a switch 540 is fixedly secured to the base 65 by means of screws 541 threaded therein, and is positioned so that a roller 542, carried by the actuator thereof, is engaged by the lever 539 when the lever is in a raised position and the contacts of the switch 540 are operated thereby. As will be more fully described hereinafter, the contacts of the switch 540 are operated in the range of 50 to 200 milliseconds after a motor bar solenoid has been energized if the machine has started into a cycle of operation. Upon energization of a motor bar solenoid, the corresponding motor bar is depressed thereby, as previously described. After a time lapse of approximately 250 milliseconds after the motor bar solenoid is energized, the condition of the switch 540 is sampled. If the contacts of the switch 540 are not found to be operated, the motor bar solenoid is de-energized and thereby allows the depressed motor bar to resume its normal position. When the motor bar has resumed its normal position, such that re-depression thereof may cause a machine cycle, the corresponding motor bar solenoid is allowed to be re-energized to again repeat the sequence of operations.

As previously described with respect to FIG. 17, square shaft 283 is rocked counter-clockwise, as viewed, to effect the disengagement of lower compression rollers 288 and platen 71. With reference to FIG. 19, arm 542 is fixedly secured to the underneath side of shaft 283 by means of screws 543 threaded therein and engages actuating lever 544 of switch 545 which is fixedly secured to bracket 546 by means of screws 547 threaded therein, bracket 546 being fixedly secured to bracket 236 by means of screws 548 threaded therein. When square shaft 283 is rocked counter-clockwise, its contacts are operated, thus indicating that lower compression rolls 288 (FIG. 17) are out of engagement with platen 71.

With reference to FIG. 41, switch 550 is fixedly secured to bracket 551 by means of screws 552 threaded therein. Bracket 551 is fixedly secured to bracket 553 by means of screws 554 threaded therein, whereas bracket 553 is fixedly secured to the base 65 of the machine by means of screws 555 threaded therein. Switch 550 is positioned so that the contacts thereof are effectively operated by follower arm 519 during the time that the follower arm is rocked clockwise into engagement with the actuator 556 thereof, as shown by the dot-dash line, thus indicating that the accounting machine is in the process of carrying out a cycle of operation such that aligner bar 72 is in engagement the notches formed on the lower end of arm 58 (FIG. 3A), as previously described.

Also shown in FIG. 41 is a portion of the linkage utilized by the accounting machine carriage opening and closing mechanism, which is fully shown and described in connection with FIG. 139 of the before-referred-to Patent No. 2,626,749. Even though not fully shown in FIG. 41, lever 557 is pivotally mounted on stud 558 and has its leftmost end operatively connected to carriage open key "CARR. OPEN" (FIG. 2) in such a manner that depression thereof causes lever 557 to be rocked counter-clockwise.

In accordance with the present invention, switch 559 is fixedly secured to bracket 553 by means of screws 560 threaded therein and has its roller-type actuator 561 in engagement with the rightmost end of lever 557. Consequently, when lever 557 is rocked counter-clockwise, the contacts of switch 559 are actuated thereby, thus indicating that the operator desires the carriage to be opened.

With reference to FIG. 44A, there is shown a fragmentary view of the particular mechanism controlled by stops on the traveling paper carriage for selecting the totalizers for addition, subtraction, or total-taking operation, the mechanism being fully shown and described with respect to FIG. 56 of the before-referred-to Patent No. 2,626,749. Briefly, however, stem 564 of totalizer reverse key "REV" also shown in FIG. 2, carries a stud 565, which cooperates with the bifurcated end of lever 566. Lever 566, in turn, is pivotally mounted on stud 567 secured to partition plate 568 and has a depending arm, which cooperates with a stud 569, mounted in an arm 570, which, in turn, is loosely journaled on a shaft 571. Thus, when the reverse key "REV" is depressed, arm 570 is rocked counter-clockwise, as viewed, and thereby effects reversal of the add and subtract selection mechanism of the totalizers from the carriage stops, as fully described in the above-referred-to patent.

In accordance with the present invention, switch 572 is fixedly secured to bracket 573 by means of screws 574, bracket 573 being fixedly secured to partition plate 568 by means of screws 575 threaded therein. Switch 572 is properly positioned in such a way that its roller-type actuator 576 is deflected by stud 569 and thus operates the contacts thereof each time the reverse key "REV" is depressed.

In addition, a rectangularly-shaped slot 562 is formed in the partition plate 568 and is properly oriented to have slidably disposed therein a square stud 563 projecting from the lowermost end of key stem 564. An elongated arm 577 has one end thereof pivotally supported by a screw 578 threaded in the partition plate 568 and has supported on its opposite end a pair of studs 585, which are disposed above and below the square stud carried by the key stem 564. Also supported on the opposite end of the arm 577 is an electrically non-conductive stud 586, which is adapted to engage the movable arm 587 of a switch mechanism, indicated generally as SC46, which, in turn, is supported by the plate 568 by suitable means, not shown.

Therefore, each time the reverse key "REV" is depressed, the square stud on the lowermost end of the stem thereof deflects the arm 577 clockwise, as viewed, and, consequently, the movable contacts of the switch SC46 are actuated by stud 586. When the reverse key is released and allowed to assume the position shown, the movable contacts of switch SC46 are likewise allowed to assume their normal positions, as shown.

With reference to FIGS. 24 and 25, there is shown a partial plan view of the rear rack 276 and the driving gear means 277, which were previously described in connection with FIG. 17, for effecting linear translation of the accounting machine carriage. However, in order to sense the home position of the accounting machine carriage, a switch 579 is fixedly secured to the plate 240 by screws 580 and, as more clearly shown in FIG. 25, is so positioned that its roller-type actuator 581 is adapted to be engaged by a stud 582, depending from the lower side of the rack 276, each time the carriage is in home position. Consequently, the normally-opened contacts of the switch 579 are closed as long as the carriage is in home position and are opened as soon as the carriage leaves home position.

With reference to FIG. 27, manually-operable means are provided to selectively lock the typewriter carriage-return keys, numbered (1) through (3). Such means comprises essentially a substantially flat plate 583, which is normally spring-urged to a position under the key stems, as shown, to prevent depression thereof. However, when lever 584 is moved forward, or to the right as viewed, its tail end cams the plate 583 outwardly to permit selective depression of the keys.

(6) *Building blocks generally*

Before going into a detailed description of the individual units making up the electrical circuitry of the computer shown by the block diagram thereof in FIG. 45, there will now be briefly mentioned the building blocks with which these individual units and interconnections therebetween are constructed. A building block is herein defined as a structure which is basic to the operation of the individual units of the computing system, and is used repeatedly in the system for amplification, logic, or other control purposes. By establishing a set of building blocks and understanding the rules for their interconnection, such a complex computing system as that heretofore generally described is more readily understood. The building blocks that are of particular importance are inverters (FIG. 46), amplifiers (FIG. 47B), triggers (FIGS. 49 and 50), and logical circuits such as "ANDS" (FIG. 48) and "ORS" (FIG. 47A), etc.

As the particular building blocks used are well-known in the art and form no part of the present invention and are described in detail in the referred-to Patent 3,112,-394, a detailed description thereof will not again be duplicated herein.

(7) *Magnetic core memory*

As previously mentioned, binary information is magnetically stored in the computer in a ferrite core memory. The core memory consists of a multiplicity of toroidally-shaped cores which possess a substantially square magnetic hysteresis-loop characteristic. Each core has an outside diameter of .080 inch and an inner diameter of .050 inch, and is approximately .025 inch thick. It is well known to those skilled in the art that, due to the fact that the ferrite core possesses a substantially square hysteresis-loop characteristic, it therefore has two stable states of magnetic remanence, each of which is respectively indicative of a binary "one" and a binary "zero." If a current-carrying conductor is threaded through the hole in the core, current in one direction through the conductor causes the core to be permanently magnetized in one direction, whereas current flow in the opposite direction through the conductor causes the core to be permanently magnetized in the opposite direction. Thus, a core is permanently magnetized in one direction or the other, depending upon the direction of current flow in the conductor threaded through the hole in the core. To summarize, when a core is magnetized in one direction, it represents a binary "one," and when the core is magnetized in the other direction it represents a binary "zero." Four cores are utilized as a group to collectively represent a single decimal digit, although, with the use of the binary form of notation, each group of four cores could possibly represent a number from "0" to "15." However, in the present computer, only the numbers "0" through "9" are actually stored in the memory.

In order to reverse the magnetic remanence of the core from a binary one to a binary zero notation, or from a binary zero to a binary one by reversing the direction of magnetization thereof, a magnetomotive force of approximately three hundred and sixty milliampere turns is required at 25 degrees centigrade. This is obtained by the equivalent of passing 360 milliamperes of current through a single conductor threaded through the aperture of the core. A magnetomotive force of one half this value—i.e., 180 milliampere-turns—does not appreciably disturb the magnetic remanence of the core.

After a core has been magnetized in a predetermined direction to represent a binary "one" or a binary "zero," it remains in that state of magnetic remanence indefinitely. The magnetic remanence state of the core is reversed only by a "full-amplitude" current impulse passing through the conductor threaded through the core. However, at certain predetermined times, it is necessary to "read" or determine the state of magnetic remanence of each core. Therefore, an additional conductor or "sense wire" is also threaded through the core aperture, so that, whenever the magnetic state of the core is changed from a binary "zero" to a binary "one" representation, or from a binary "one" to a binary "zero" representation, a voltage impulse is induced in the "sense wire" indicative of the reversal of magnetic remanence of the core. Thus it is seen that an impulse is induced in the "sense wire" only when the magnetic state of the core is reversed. In order to determine whether a particular core has been previously magnetically conditioned to represent a binary "one" or a binary "zero," a full-amplitude current of approximately 360 milliamperes is sent through the first-mentioned conductor in a direction to "set" the core to a binary "zero" representation. However, if the core had been previously set to a binary "zero" representation, a voltage impulse is not induced in the "sense wire." However, if the core was previously in a binary "one" representation, its magnetic remanent state is reversed, and, consequently, a voltage impulse is induced in the "sense wire" indicative of the reversal of the magnetic state of the core. After the magnetic state of the core is sensed, however, its magnetic state is immediately hereafter indicative of a binary "zero" representation regardless of its initial state. It is therefore necessary to restore the core to its original magnetic state normally by sensing a full-amplitude current impulse through the first-mentioned conductor to set the core back to a binary "one" representation if the core was previously in that particular state.

The core memory, utilized by the instant computer, has a capacity of one hundred ten-decimal-digit numbers which are hereinafter termed "words." Due to the fact that a negative word is stored in the memory as a positive complement, there is no need for a binary sign bit, as is conventional in most computers. A word is selectively stored in the memory in one of a hundred different locations which are called "addresses" and which are numbered from φφ through 99. In addition to the one hundred normal addresses, there are two additional addresses labeled "A" and "B." The words stored in addresses φφ through 99 not only represent arithmetic data, but also represent "instructions" which are utilized by the computer to dictate the sequence of operations therein. The words previously stored in addresses φφ through 99 of the memory may be changed by instructions given by the computer; however, the words located in addresses A and B are used by the computer to store intermediate results during arithmetic computations and cannot be changed directly by instructions.

With reference to FIGS. 52*a* and 52*b*, there is schematically shown the ferrite core memory utilized by the present computer. Such a memory comprises four thousand and eighty type N–400–080 ferrite cores at present manufactured by the assignee of the instant application.

The ferrite cores of the memory are selectively arranged in a pattern of rectangularly-shaped configuration having one hundred two vertical columns and forty horizontal rows thereof. The first one hundred columns, as viewed from left to right, respectively represent memory address locations φφ through 99, whereas the two remaining rightmost columns respectively represent address locations A and B. In each of the columns, from the topmost to the bottommost core, the forty cores are arranged in a succession of ten groups, with each group containing four cores. Each group of four cores is representative of a decimal digit of a predetermined order, whereas all of the groups of a particular column collectively represent all of the orders of a word ten decimal digits in length. Each of the ten successive decimal digits of the word located in any address is respectively identified as the "first-order" digit through the "tenth-order" digit, where the first order is the lowest or "penny" digit and the tenth order is the highest order digit of the number or word. The four cores used to store the first-order digit of a word which is residing in an address in the memory are located in the first row through the fourth row, counting from bottom to top. The four cores used to store the second-order digit of the word are located immediately above in the fifth through the eighth rows; in the drawing, only the fifth and eighth rows are shown, rows six and seven being omitted for the sake of simplicity. The four cores used to store the third-order digit are located immediately above in rows nine through twelve, where rows nine and twelve are the only ones illustrated, rows ten and eleven being omitted for the reasons just mentioned. The location of each higher-order digit progresses upward, as just described, so that the tenth or highest-order digit is located at the top of the column in the last four rows shown; i.e., thirty-seven through forty. Therefore, it is seen, the maximum storage in each memory address is a ten-digit number which will hereinafter be called a "word," the lowest-order digit thereof being located at the bottom of each address and the highest-order digit thereof being located at the top of each address.

As the instant computer utilizes the well-known "binary-coded decimal-digit" system of numerical representation, each of the four cores in a group making up a particular order decimal digit of the word is known as a "binary-bit." The binary-bits are consecutively labeled (*a*), (*b*), (*c*), and (*d*), where bit (*a*) is the lowest-order bit represented by the magnetic state of the cores located in rows #1, #5, #9, and #37, and bit (*d*) is the highest-order bit represented by the magnetic state of the cores located in rows #4, #8, #12 . . . and #40. As previously mentioned, each group of four cores is capable of representating a particular order numerical digit having a value from "0" through "9." For example, to represent a decimal digit having a value of "0," all of the four cores in a group are selectively set to binary bit representations (0000); for a decimal digit having a value of "1," the cores are set to (0001) binary bit representations; a decimal digit having a value of "2," the cores are set to bit representations (0010); a "3" is represented by (0011); "4" by (0100); "5" by (0101); "6" by (0110); "7" by (0111); "8" by (1000); and finally, to represent a decimal digit having a value of "9," the cores are sequentially set to binary bit representations (1001).

To illustrate, supposing that the word 0000000695 is stored in memory at address φφ. In the leftmost vertical column, the four lowermost cores, indicated by reference numerals 885 through 888, are respectively conditioned to collectively represent binary bits (0101) indicative of the first-order digit "5." In other words, core 885, representative of binary bit "*a*," is set to binary "1"; core 886, representative of binary bit "*b*," is also set to binary "0"; core 887, representative of binary bit "*c*," is set to binary "1"; and, finally, core 888, representative of bit "*d*," is set to binary "0" representation. Collectively, the magnetic state of cores 885 through 888 represents the penny digit "5." The next group of four cores, located directly above group 885 through 888, are set to binary bit representations (1001) and collectively represent the second-order decimal digit "9." The next group of four cores are set to binary bit representations (0110), collectively representing the third-order decimal digit "6." All of the remaining cores in address $\phi\phi$ are individually set to binary "0" representations. Thus, with the nonsignificant decimal digits removed, the word becomes "695."

In one mode of operation, when a column of cores is to be "read out" to determine the word stored in that particular memory address, the cores are sequentially read, one at a time, starting with the core at the bottom of the address and concluding with the core at the top of the address. For example, in address $\phi\phi$, core 885 is read first to produce the binary value of bit "*a*" of the first-order digit; core 886 is read next to produce bit "*b*" of the first-order digit; core 887 is read next to produce bit "*c*"; and core 888 is next read to produce bit "*d*" of this digit. The next four bits, representing the second-order digit, are successively read out, and the remainder of the bits for successive higher-order digits are thereafter sequentially read out in the same sequence, concluding with bit "*d*" of the tenth-order decimal digit.

After a core has been read out, it is generally desired to restore the core to its original magnetic state as before being read. That is, after each bit-representing core is read out, if the core was originally set to represent a binary "1," the core is returned to the "1" state following reading thereof. Therefore, following the reading of each bit, a predetermined unit of time is permitted to lapse before the next bit is read out; it is during this time lapse that the core, just read, is returned to the "1" state if it had previously been set to that state.

For the sake of simplicity of the following description, the vertical or column orientation of the memory will hereinafter be termed the "Y" direction, and the horizontal or row orientation will hereinafter be termed the "X" direction.

Even though, in reality, each of the memory cores has five conductors threaded therethrough for purposes to be more fully described hereinafter, only three of these conductors are to be considered at this time in describing a mode of operation of the memory in terms of the electrical schematic diagram thereof shown in FIG. 52. The first of the three just-mentioned conductors is a "sense winding" 871, which starts at terminal 872 at the lower left corner of the memory and is alternately threaded through each row of cores bounded by addresses $\phi\phi$ through 99. As shown, sense winding 871 is successively threaded from left to right through all of the cores of the first row, is threaded from right to left through the cores of the second row, from left to right through the third row, and alternately continues on from row to row. Finally, sense winding 871 is threaded from right to left through the topmost or fortieth row of cores, and terminates at terminal 873. All of the cores in address $\phi\phi$ are threaded in the "Y" direction by common current-carrying conductor 878, which is shown positioned to the left within the apertures thereof. Also, all of the cores located in the first row bounded by address $\phi\phi$ and address "B" are threaded in the "X" direction by a common current-carrying conductor 879, which is shown centrally positioned within the apertures thereof, address "B" being the rightmost one of the memory addresses.

It will now be assumed that it is desired to read out the contents of address $\phi\phi$. Thus, in order to read bit "*a*" of the first-order decimal digit of the word stored in address $\phi\phi$, a half-amplitude or "half-select" current impulse is delivered to conductor 878, and, simultaneously therewith, a half-select current impulse is present in conductor 879. The two half-select impulses are in such directions that the magnetomotive forces associated therewith are additive in the region of core 885, with the resultant force being of sufficient magnitude to magnetically saturate the core in a direction indicative of a binary "zero." Due to the fact that core 885 is the only core in the entire memory that has received the necessary magnetomotive force to cause a reversal of its magnetic state, all of the remaining cores essentially remain magnetically undisturbed. It is known that whenever the state of magnetic remanence of any one of the memory cores is reversed, a voltage impulse is induced thereby in sense winding 871. However, due to the fact that in the present memory only one core at a time is sensed, there is no ambiguity as to which core was responsible for the impulse induced in the sense winding.

Therefore, if core 885, whose magnetic state is indicative of bit "*a*" of the first-order digit of the number, is storing a binary "1," its magnetic state is reversed by the coincidental "X" and "Y" read impulses, and, consequently, a voltage impulse appears between terminals 872–873 of the sense winding 871, indicating that core 885 was previously storing a binary "1." If core 885 had previously been storing a binary "0," however, a voltage impulse does not appear across the output terminals of the memory sense winding, thus indicating a binary "0" storage.

After core 885 has been read, its magnetic state is thereafter indicative of a binary "0," as previously mentioned. Thus, if the magnetic state of the core was indicative of a binary "0" before being read, there is no need for "resetting" the core after it is read. However, if the state of the core was indicative of a binary "1" before being read, it is often necessary to "reset" the core to a binary "1" representation after it has been read. To do this, the directions of both of the current impulses applied through the "X" and "Y" conductors are effectively reversed simultaneously. This causes a corresponding reversal of the additive magnetomotive force in the vicinity of the core, which reverses the magnetic state thereof. Again, as only a half-select current impulse is applied to each of the "X" and "Y" conductors, core 885 is the only core in the entire memory that is magnetically affected thereby.

Now that core 885 has been read and afterwards reset to its initial state, core 886 is read next to determine the binary value of the bit "*b*" of the first-order digit of the word. Again, a half-select current impulse is applied in the "Y" direction to conductor 878, and, essentially, a half-select current impulse is simultaneously applied in the "X" direction to the conductor of the second row corresponding to 879. As before, both half-select currents are in such directions to effect storage of a binary "0" in core 886. If the state of core 886 was indicative of a "1" before being read, the current in each of the "X" and "Y" conductors threaded therethrough is reversed to reset core 886 to "1" after it is read. This reading and writing sequence of operation is sequentially continued from core to core until all forty cores of address have been read and thereafter restored to their respective magnetic states.

The just-described combined reading and writing cycle of operation of each core is hereinafter called a "read-write" cycle. The time required to complete a read-write bit cycle in the instant computer is approximately 40 microseconds. During the first 30 microseconds of the read-write cycle, the core is set to a binary "0" representation; during the remaining 10 microseconds of the cycle, the core is often reset to a binary "1" representation if it was originally in that state. However, if the core was originally in a binary "0" state before being read, there is no resetting operation necessary during the last 10-microsecond interval. Therefore, to read out an entire ten-digit word from an address in memory requires a total time of 40×40, or 1,600, microseconds.

Due to the fact that, in the present memory, it is not desired to reverse the current flow in a conductor, an additional conductor is individually threaded in the "X" direction through each of the rows of cores. This is illustrated by conductor 880, shown threaded through the cores of the first row and disposed parallel with respect to conductor 879, previously described. By the same token, an additional conductor is also individually threaded in the "Y" direction through the cores of each of memory addresses ϕϕ through 99, and also addresses "A" and "B." This conductor is illustrated by conductor 881, shown threaded through the cores of address ϕϕ and disposed parallel with respect to conductor 878, previously described. Thus, two conductors are threaded in the "X" direction and two conductors are threaded in the "Y" direction through each of the cores of the memory; each of the four wires transmits current in only one direction, as will be shown hereinafter. The fifth wire through memory cores in addresses ϕϕ through 99 is sense wire 871, heretofore described. A separate sense winding 891, which originates at terminal 892 and terminates at terminal 893, is alternately threaded, in one direction and then the other, through the forty rows of cores making up memory addresses "A" and "B" in the same manner as memory sense winding 871.

Before attempting to give a more detailed description of the memory, it is to be appreciated that each of the rows of cores, from the first to the fortieth row, is connected in a same circuit configuration with respect to the others. Likewise, each of the columns of cores, from addresses ϕϕ through 99 and including addresses "A" and "B," is also of the same circuit configuration with respect to the others. Thus, a description and full comprehension of the mode of operation of address ϕϕ with respect to the first row of cores for producing bit "*a*" of the first-order digit of the word stored in address ϕϕ should suffice for the remaining bits of that digit, and also the remaining digits of that word. As the mode of operation of address ϕϕ is exactly the same as that of the remaining memory addresses, a further description of the remaining addresses, again, would result only in unnecessary repetition. It is also to be appreciated that, in an attempt to simplify the schematic representation of the memory as shown in FIG. 52, addresses ϕϕ through ϕ9 are consecutively shown, reading from the extreme left to the right; addresses 1ϕ and 19 are shown next, with addresses 11 through 18 being omitted, as indicated by the vertical "break" in the drawing between addresses 1ϕ and 19; following in sequence are addresses 2ϕ, 29, 3ϕ, 39, 4ϕ, 49, 5ϕ, 59, 6ϕ, 69, 7ϕ, 79, 8ϕ, 89, and 9ϕ through 99, and finally addresses "A" and "B"; addresses 21–28, 31–38, 41–48, 51–58, 61–68, 71–78, and 81–88 are omitted. Starting from the bottom of the drawing, the first four rows are shown which make up the low-order digit of the word stored in memory; rows #5 and #8 are shown next with rows #6 and #7 omitted as indicated by the horizontal "break" in the drawing between rows #5 and #6; following in sequence are rows #9, #12, #13, #16, #17, #20, #21, #24, #25, #28, #29, #32, #33, #36, and #37 through #40; rows #10–#11, #14–#15, #18–#19, #22–#23, #26–#27, #30–#31, and #34–#35 are omitted.

With particular attention directed to the first row of cores, on emergence from the rightmost end of the first row of cores, conductor 880 is connected to conductor 882, which passes below the first row and is connected at its opposite end to line XD*a*, located at the bottom left corner of the memory. The leftmost end of conductor 879 also is connected to line XD*a*, and its opposite end is connected to the cathode of one of crystal diodes 876, its anode being connected to line XGϕ; and, finally, the remaining left end of conductor 880, on emergence from the leftmost end of the first row or cores, is connected to the cathode of one of crystal diodes 877, whose anode is connected to line (XGϕ)′.

Whenever line XD*a* is activated, that line is effectively connected to a source of potential of approximately −12 volts. Thus, if line XGϕ is simultaneously activated therewith, that line is effectively connected to terminal 843 of a temperature-compensated current regulator, of the type previously described with respect to FIG. 51*g*, so that a half-select drive current impulse flows from line XGϕ through diode 876 from right to left through conductor 879 and out at line XD*a*. However, if line (XGϕ)′ is simultaneously activated instead of line XGϕ, line (XGϕ)′ is effectively connected to terminal 843 of the current regulator, so that a half-select current impulse from line (XGϕ)′ flows through diode 877, thereafter bows from left to right through the upper loop of conductor 880, and is returned to line XD*a* by way of conductor 882. Consequently, it is seen that, when line XD*a* is activated, the half-select drive impulse flows in one of two directions through the cores of the first row, depending upon whether XGϕ or (XGϕ), was simultaneously activated with line XD*a*.

The electrical connections for rows #2 through #4, respectively representing bits "*b*," "*c*," and "*d*" of the first-order digits of the words stored in memory, are exactly the same as for row #1, the anodes of the four crystal diodes 877 each being connected to line (XGϕ)′ and the anodes of the four crystal diodes 876 being connected to line XGϕ. When line XD*b* is activated, the line is effectively connected to a potential source of −12 volts, as was line XD*a*. Thus, when line XGϕ is activated simultaneously with XD*b*, the half-select current impulse flows from right to left through the cores of the second row; if (XGϕ)′ is activated instead of XGϕ, a half-select current impulse flows from left to right through the cores of the second row. By the same token, if XD*c* and XGϕ are simultaneously activated, a half-select current impulse flows from right to left through the third row of cores; a simultaneous activation of XD*c* and (XGϕ)′ effectively causes a reversal of current flow through the third row of cores. Finally, XD*d* and XGϕ, or XD*d* and (XGϕ)′ operate together to effectively send a half-select impulse from right to left or from left to right, respectively, through the fourth row of cores in the same manner as just described.

As just described, the first four of diodes 877 (i.e., the ones respectively associated with rows #1 through #4) have their anodes connected together and returned to lines (XGϕ)′. The second group of four diodes 877, associated with rows #5 through #8, of which only rows #5 and #8 are illustrated, all have their respective anodes connected to line (XG1)′. The anodes of the third group of diodes are each connected to line (XG2)′, the anodes of the fourth group being connected to (XG3)′, and so on up the column, with the anodes of the tenth group of diodes 877 being connected to line (XG9)′. Also, as shown, the left end of each of the conductors corresponding to 879 and 882 associated with rows #1, #5, #9, #13 . . . #33, and #37, which rows successively correspond to bit "*a*" of each successive-order decimal digit of the word stored in memory, are connected together and returned to line XD*a*. Likewise, although not fully illustrated, the left end of each of the conductors corresponding to 879 and 882 but associated with rows #2, #6, #10, #14 . . . #34, and #38, which rows successively correspond to bit "*b*" of each successive-order decimal digit of the word in memory, are connected together and returned to line XD*b*. By the same token, although not fully illustrated, the left end of each of the conductors corresponding to 879 and 882 but associated with rows #3, #7, #11, #15 . . . #35, and #39, which rows successively correspond to bit "*c*" of each successive-order decimal digit of the word in memory, are connected together and returned to line XD*c*. And finally, the left end of the conductors corresponding to 879 and 882 but associated with rows #4, #8, #12, #16 . . . #36, and #40, which rows successively correspond to bit "*d*" of each successive-order decimal digit of the word in memory, are connected together and returned to line XD*d*.

With respect to the vertically-disposed column of diodes located to the right of address "B" and indicated as 876, the first bottom group of four diodes thereof associated with rows #1 through #4 each has its anode connected to line XGϕ; the second group of four diodes 876 located directly above the first group have their anodes returned to common line XG1; the anodes of the third group of diodes 876 are connected to line XG2, and so on, with the anodes of the last four diodes 876 at the top of the column and associated with rows #37 through #40 being connected to common line XG9.

Referring to the lowermost row of diodes 874 located below row #1, counting from left to right, the anodes of the first ten of diodes 874 respectively associated with addresses ϕϕ through ϕ9 are connected to line YGϕ. With respect to the next group of diodes 874 located immediately to the right of the first group of diodes and respectively associated with addresses 11 through 19, of which only addresses 11 and 19 are illustrated and addresses 12 through 18 are omitted, their anodes are connected to line YG1; the anodes of the third group of diodes 874 respectively associated with addresses 20 through 29 are connected to line YG2; and so on, with the anodes of the last group of ten diodes 874, respectively associated with addresses 9ϕ through 99, being connected to line YG9. With respect to the upper row of diodes 875, which are located directly above row #40, the first group of ten diodes which are respectively associated with addresses ϕϕ through 99 have their anodes connected to line (YGϕ)′ in the same manner as the lower row of diodes 874. The anodes of each successive group of ten diodes 875, counting from left to right, are respectively connected to lines (YG1)′ through (YG9)′.

To complete the electrical connections to memory addresses ϕϕ through 99, the upper ends of vertical conductors corresponding to 878 and 883, which are respectively associated with addresses ϕϕ, 1ϕ, 2ϕ, 3ϕ . . . 8ϕ, and 9ϕ, are connected to line YDϕ. The upper ends of vertical conductors corresponding to 878 and 883, which are respectively associated with addresses 01, 11, 21, 31 . . . 81, and 91, are connected to line YD1. Only addresses ϕ1 and 91 of this group are illustrated, the remaining addresses of this group being omitted for simplicity purposes. Likewise, the upper ends of vertical conductors 878 and 883, which are respectively associated with addresses ϕ2, 12, 22, 32 . . . 82, and 92, are connected to line YD2. This sequence of connections continues from lines YD3 through YD9, where YD9, is connected to vertical conductors corresponding to 878 and 883, which are respectively associated with addresses ϕ9, 19, 29, 39 . . . 89, and 99.

To summarize: Selective energization of line YDϕ essentially selects all addresses whose lower-order digit is a "0"; YD1 essentially selects all addresses whose low-order digit is a "1"; YD2 essentially selects all addresses whose low-order digit is a "3"; and so on from YD3 through YD9, where YD9 essentially selects all addresses whose low-order digit is a "9." Forgetting about "prime-notations" for the present, selective energization of line YGϕ essentially selects all addresses whose high-order digit is a "0"; YG1 essentially selects all addresses whose high-order digit is a "1"; YG2 essentially selects all addresses whose high-order digit is a "2"; and so on from YG3 to YG9, where selective energization of line YG9 essentially selects all addresses whose high-order digit is a "9." Thus, suppose that it is desired to select a particular address; say address 9ϕ. To accomplish this, YDϕ is energized corresponding to the low-order digit "0" of the address, and, simultaneously therewith, YG9 is energized corresponding to the high-order digit "9" of the address. Thus, when YDϕ and YG9 are simultaneously energized, a binary "1" representative half-select current flows upwardly from line YG9 through all of the cores in address 9ϕ and out at line YDϕ. To select address 99, YD9 and YG9 are energized simultaneously.

As far as "prime notations" are concerned, it is to be pointed out at this time that throughout the electrical circuitry of the computer signal lines bearing a "prime" notation—i.e., (XGϕ)′ and (YGϕ)′ et al.—essentially have diametrically opposite states or energization conditions to their respective "primeless" counterparts; i.e., XGϕ, YGϕ, et al. For example, lines (YGϕ)′ through (YG9)′ are effective to selectively send a half-select drive-current impulse downwardly through any one of addresses ϕϕ through 99 to "half-select" a particular address to a binary "0" representation, whereas lines YGϕ through YG9 are effective to send a half-select impulse upwardly through any one of the same respective addresses to "half-select" that particular address to a binary "1" representation. It is also to be appreciated at this point that, when the state of a signal line bearing a "prime" notation is de-energized or is FALSE, the "primeless" signal line counterpart is respectively "energized" or is TRUE, and vice versa. In other words, when one is energized, the other is de-energized; when one is TRUE, the other is FALSE, etc.

In the "X" direction of the memory, line XD*a* selects those ten rows corresponding to bit "*a*" of each order decimal digit of the word; line XD*b* selects those ten rows corresponding to bit "*b*"; line XD*c* selects the ten rows corresponding to bit "*c*"; and, finally, line XD*d* selects the final ten rows corresponding to bit "*d*" of each order decimal digit of the word. Lines (XGϕ)′ through (XG9)′ are effective to send a half-select drive-current impulse from left to right through any one of rows #1 through #40 to "half-select" a particular row to a binary "0" representation, whereas lines XGϕ through XG9 are effective to send a half-select impulse from right to left through any one of the same respective rows to "half-select" that particular row to a binary "1" representation.

Thus, combining "X" and "Y" selection of the memory, in order to store a binary "1" representation in a core, say core 885 as an example, which is located at the junction of row #1 and address ϕϕ, lines YDϕ, YGϕ, XD*a* and XGϕ are all simultaneously energized. To store a binary "0" representation therein, lines YDϕ, (YGϕ)′, XD*a*, and (XGϕ)′ are all effectively energized simultaneously. To store binary information in core 886, line XD*b* is energized instead of line XD*a*. The manner of "X" and "Y" selection of addresses "A" and "B" is exactly the same as the manner of selection of memory addresses ϕϕ through 99. Consequently, further detailed description thereof is not deemed necessary.

Before proceeding further with the description of the logical control circuitry of the computer, it is to be pointed out that an attempt has been made to simplify and thus alleviate the inherent complexity of the schematic representation in order to facilitate a full and complete understanding of the circuitry, both as to its organization and as to its mode of operation. For example, throughout the drawings, all input lines are appropriately labeled and are positioned to the leftmost side of the various building blocks previously described, and various output lines thereof also are appropriately labeled and are positioned to the rightmost side of the building blocks. However, for illustrative purposes only, but a selected few of the input and output lines are actually shown connected. It is, of course, to be understood that, in order to obtain a full and complete electrical circuit diagram of the computer, it first is necessary to substitute the appropriate type of building block circuitry (taken from FIGS. 46 through 51) for each of the correspondingly-labeled building blocks which are logically illustrated throughout the drawings. Afterwards, all like-labeled lines (whether input lines, output lines, or otherwise) are to be connected together, thus forming a complete circuit diagram from the schematic representation thereof.

(8) *X-drivers*

With reference to the lower right-hand section of FIG. 60, there are schematically illustrated four "X-drivers," which are utilized to selectively energize input lines XD*a* through XD*d*, previously described in connection with the core memory shown in FIG. 52. Each of the X-drivers comprises a two-input logical AND of type "R1," an inverter amplifier of type "I12," and an emitter follower amplifier of type "E3," each connected in cascade with respect to the others. More specifically, the X-driver for bit "*a*" includes logical AND 1108, inverter 4237, and emitter follower 4250; the X-driver for bit "*b*" comprises logical AND 1109, inverter 4238, and emitter follower 4251; the X-driver for bit "*c*" comprises logical AND 1110, inverter 4239, and emitter follower 4252; and, finally, the X-driver for bit "*d*" comprises logical AND 1111, inverter 4240, and emitter follower 4253.

During a read-write cycle of operation for reading a word from an address in memory, line SMC goes TRUE for 1600 microseconds to allow line XDW to effectively "condition" the selected X-driver to effectively be turned "ON" at, and for, the proper amount of time. At 40 microseconds intervals, lines B*a*M through B*d*M sequentially go TRUE for a period of 40 microseconds each, and then respectively go FALSE. Consequently, at the beginning of the read-write cycle, output line XD*a* is energized, and a potential of approximately −12 volts appears thereon. Line XD*a* stays energized for a maximum period of 40 microseconds and then is de-energized. Forty microseconds after line XD*a* was first energized, output line XD*b* is energized for a maximum period of 40 microseconds, and then is de-energized. Forty microseconds after line XD*b* was first energized, line XD*c* is energized for a maximum period of 40 microseconds. Finally, 40 microseconds after line XD*c* was first energized, line XD*d* is energized for a maximum period of 40 microseconds, lines XD*a* through XD*d* of FIG. 60, of course, being identical to lines XD*a* through XD*d* of FIG. 52, as previously stated. Thus it is evident, as a maximum total time of 160 microseconds is required to read each diget out of memory, that a maximum time of 1600 microseconds is required to read a ten-digit number out of a particular address in memory.

(9) *Bit-counter*

The bit-counter, logically shown in the upper portion of FIG. 62, includes two type "F2" flip-flops 6041 and 6042, connected as a scale-of-four binary counter, and is utilized to select the binary bit of the word to be read out of an address in memory during a read-write cycle, as illustrated in the block diagram of FIG. 45. When the computer is first turned "ON," or when pushbutton RS1 (FIG. 76) is actuated, flip-flops 6041 and 6042 are unconditionally set TRUE by reset line (RS)′ going FALSE. That is, the states of flip-flops 6041 and 6042 are such that reference output lines BC*a* and BC*b*, respectively therefrom, are TRUE, and prime output lines (BC*a*)′ and (BC*b*)′ are both FALSE.

The bit-counter usually counts in a forward direction, as will be shown later. However, there are times when the bit-counter is required to effectively count in a reverse direction. When counting in a reverse direction, the read-write word cycle begins be reading out the high-order bit of the high-order digit; i.e., bit "*d*" of digit #9. The signal which provides for this reverse operation of the bit-counter comes from line DBD. When line DBD is TRUE (line (DBD)′ thus being FALSE), the bit-counter counts in a reverse direction. Conversely, when line DBD is FALSE (line (DBD)′ thus being TRUE), the bit-counter counts in a forward direction.

If it be desired that the bit-counter is to count in a forward direction, lines (DBD)′, BC*a*, and BC*b* must first be TRUE. Therefore, as all three inputs to logical AND 1158 are simultaneously TRUE, lines B*d* and B*d*M are also TRUE, the remainder of output lines B*a* through B*c* and B*a*M through B*d*M being FALSE. When input line CYC goes from TRUE to FALSE, the prime inputs to both of flip-flops 6041 and 6042 go from TRUE to FALSE. Consequently, both flip-flops 6041 and 6042 change state, so that lines BC*a* and BC*b* go FALSE and lines (BC*a*)′ and (BC*b*)′ go TRUE. As lines (DBD)′, (BC*a*)′, and (BC*b*)′ are now TRUE, all of the inputs to logical AND 1152 are simultaneously TRUE, and thus output line B*a* is TRUE, with the remaining outputs B*b* through B*d* being FALSE. When line CYC goes from FALSE back to TRUE, the state of both flip-flops remains unchanged. However, when line CYC again goes from TRUE to FALSE, the reference input to flip-flop 6041 goes from TRUE to FALSE. At this time, lines BC*a* and (BC*b*)′ are TRUE, and lines (BC*a*)′ and BC*b* are both FALSE. Thus, as inputs (DBD)′, BC*a*, and (BC*b*)′ of logical AND 1154 are simultaneously TRUE, output line B*b* is TRUE, and remaining outputs B*a*, B*c*, and B*d* are FALSE. When line CYC goes from TRUE to FALSE a third time, all input lines to logical AND 1156 are simultaneously TRUE, and output line B*c* is likewise TRUE, with lines B*a*, B*b*, and B*d* being FALSE. Finally, when CYC goes from TRUE to FALSE a fourth time, line B*d* is TRUE, with lines B*a* through B*c* being FALSE.

To summarize, only readout line B*d* is initially set TRUE when the computer is first turned "ON" or when pushbutton RS1 (FIG. 76) is actuated; the remaining readouts, B*a* through B*c*, are FALSE. At this time, for each successive occurrence of a TRUE-to-FALSE reversal of line CYC, the bit-counter is incremented by a count of one binary bit. Thus, with four such reversals of line CYC, the bit-counter counts B*a*, B*b*, B*c* and back to B*d*. When the bit-counter is to count backwards, line DBD is rendered TRUE instead of line (DBD)′. Consequently, at this time, line B*a* instead of line B*d* is TRUE; remaining lines B*b* through B*d* are FALSE. Thereafter, for each successive occurrence of a TRUE-to-FALSE reversal of line CYC, the counter is decremented by a count of one bit. Thus, with four such reversals of line CYC, the bit-counter counts B*d*, B*c*, B*b*, and back to B*a*. It is to be appreciated, of course, that lines B*a*M through B*d*M are at all times of the same state as lines B*a* through B*d*, respectively. It is also to be appreciated, as before stated, that lines B*a*M through B*d*M of FIG. 62 are respectively identical to lines B*a*M through B*d*M of FIG. 60 and anywhere else they may appear in the computer circuitry.

(10) *X and Y grounders*

In the left portion of FIG. 66, there are diagrammatically shown two sets of ten X-grounders, one set of ten represented by output lines XG$\phi$ through XG9, and the other represented by output lines (XG$\phi$)′ through (XG9)′. Each of the twenty X-grounders comprises a serially-connected network of a two-input logical AND of type "R1," an inverter amplifier of type "I12," and an inverter amplifier of type "I2." The emitter electrodes of inverters 3268 through 3287 are connected together and returned via line CRX to output terminal 843 of temperature-compensated current regulator 7001, which has previously been shown and described in detail in connection with section (*g*) of FIG. 51.

The mode of operation of each of the X-grounders is somewhat straightforward. When both inputs to any one of logical AND's 1281 through 1300 are simultaneously TRUE, that particular AND circuit effectively causes a constant-current operating potential of approximately −10 volts to be applied to its respective output lead; i.e., one of leads XG$\phi$ through XG9 or (XG$\phi$)′ through (XG9)′.

The Y-grounders shown in the right section of FIG. 66 are of essentially identical circuit configuration to the just-described X-grounders, and, as their mode of operation is also essentially the same as that of the X-grounders, a detailed description thereof would result in unnecessary repetition. The prime difference between the X- and Y-grounders is that lines WR and (WR)′ are individually ANDED with lines D$\phi$M, D1 through D8, and D9M for the X-grounders and individually ANDED with lines W1φ through W19 for the Y-grounders, lines DφM, D1 through D8, and D9M being the output leads of a digit counter to be described next.

(11) *Digit counter*

With reference to FIG. 63, there is shown a scale-of-ten binary counter, herein called a "digit counter," which is utilized, among other purposes, to select a particular order digit of the word stored in an address in memory. The digit counter includes four type "F2" flipflops 6043 through 6046 effectively connected in cascade in a manner such that, each time line AD goes from TRUE to FALSE, the following takes place: flipflop 6043 changes state; except during a so-called "recycling" mode of operation, which will be described hereinafter, flipflop 6044 changes state if the state of line D*a* goes from TRUE to FALSE; flipflops 6045 changes state if the state of line D*b* goes from TRUE to FALSE; and flipflop 6046 changes state if the state of line D*c* goes from TRUE to FALSE.

For example, for a count of "0," flipflops 6043 through 6046 are in a FALSE state; that is, their states are such that lines D*a* through D*d* are FALSE and lines (D*a*)′ through (D*d*)′ are all TRUE. If it is desired for the digit counter to count in a forward direction (i.e., 0, 1, 2, 3 . . . 7, 8, 9), line (DBD)′ is selectively set TRUE. After flipflops 6043 through 6046 are set FALSE, all of the inputs to logical AND 1178 are simultaneously TRUE. Thus, readout line Dφ is also TRUE and thereby represents a count of "0." Thereafter, the first time line AD goes from TRUE to FALSE, flipflops 6043 changes state, and line D1, at that time, is the only readout line that is TRUE, thus indicative of a count of "1." The second time line AD goes from TRUE to FALSE, flipflops 6043 and 6044 both change states, so that line D2 is TRUE, with the remaining readout lines being FALSE. The counting continues until a count of "9" has been reached, as indicated by lines D*a* and D*d* being TRUE. Thereafter, the next time line AD goes from TRUE to FALSE, flipflops 6043 and 6046 both change state, so that lines D*a* through D*d* are thereafter FALSE and lines (D*a*)′ through (D*d*)′ are thereafter TRUE, thus representing the original count of "0."

When the computer is first turned "ON," or when pushbutton RS1 (FIG. 76) is actuated, the digit counter is preset to a count of "9" by reset line (RS)′ going from TRUE to FALSE. There is no need to preset the digit counter to "9" at any other time, as it is always returned to a count of "9" at the conclusion of every "word cycle" or "sub-command," which are to be described hereinafter.

To summarize: the ten readout lines Dφ through D9 individually and sequentially go from FALSE to TRUE, representing counts from "0" through "9" respectively. That is, line Dφ is TRUE when the digit counter is at a count of "0," line D1 is TRUE when the digit counter is at a count of "1," etc. When the digit counter counts in a forward direction, it starts at a count of "9," and for each successive TRUE-to-FALSE change of state of line AD, output line Dφ goes TRUE, and, thereafter, a successively higher-order readout line goes TRUE, the remaining readout lines, of course, being FALSE in each instance.

At certain times, it is desirable to read a word out of memory in reverse order by starting with the tenth-order digit thereof. In this instance, flipflops 6043 through 6046 still essentially count in a forward direction, however; only the manner of decoding the outputs thereof is changed. Such a change is made simply by causing line DBD to be TRUE instead of line (DBD)′. When line (DBD)′ is TRUE, the digit counter counts in a forward direction; however, when line DBD is TRUE, the digit counter starts at a count of "0." Thereafter a succession of TRUE-to-FALSE transitions of line AD produces a retrogressive count of 9, 8, 7, 6 . . . 1 and back to 0.

As illustrated in the block diagram of FIG. 45, readout lines Dφ through D9 are also utilized by the computer for various control purposes, in addition to memory digit selection. In addition to the read-out lines following the forward-reverse logic, there is an additional readout line D9L, which is TRUE each time lines D*a* and D*d* are simultaneously TRUE, regardless of whether the digit counter is operating in a forward or a reverse direction.

(12) *Y-drivers*

In the rightmost section of FIG. 65 there are shown ten Y-drivers, whose output lines are respectively labeled YDφ through YD9. Each driver includes a serially-connected network comprising a two-input type "R1" logical AND, a type "I12" inverter, and a type "E3" emitter follower amplifier. As previously described, by selective energization of line YDφ, all addresses whose low-order digit identification is a "zero" are effectively "selected"; i.e., addresses φφ, 1φ, 2φ . . . 8φ, and 9φ; by selective energization of line YD1 all addresses ending in a "one" are effectively selected; i.e., 11, 21, 31 . . . 81, and 91; by selective energization of line YD2, all addresses ending in a "two" are effectively selected; and so on with line YD9 effectively selecting all addresses ending in a "nine"; i.e., addresses φ9, 19, 29 . . . 89, and 99. Selective energization of lines YDφ through YD9 is effected by logically ANDING line YDW with each of lines Wφφ through Wφ9 which originate at the decoder portion of the low-order digit section of a "word-selecting" register next to be described.

(13) *Word-selecting register*

The word-selecting register is a two-digit register which is utilized to temporarily store a two-decimal-digit number representing the address location of the word in memory from which reading is to take place. That is, the word located in memory at the address corresponding to the number stored in the word-selecting register will be the next word read out upon occurrence of a read-write work cycle. The word-selecting register includes eight type "F2" flipflops, four of which effectively store, in binary-coded form, the low-order digit, and the remaining four effectively store, in binary-coded decimal form, the high-order digit of the address-representing number stored therein.

With reference to FIG. 65, the four flipflops which are utilized to store the low-order decimal digit of the number in the word-selecting register are 6051 through 6054. Flipflop 6051 effectively stores low-order bit "*a*," flipflop 6052 effectively stores second-order bit "*b*," flipflop 6053 effectively stores the third-order bit "*c*," and flipflop 6054 effectively stores the fourth or high-order bit "*d*" of the low-order decimal digit of the number.

Output lines Wφ*a* through Wφ*d* and (Wφ*a*)′ through (Wφ*d*)′ from flipflops 6051 and 6054 are connected as inputs to a decoder network comprising ten type "R1" logical ANDS 1261 through 1270, which are individually cascaded with a type "D1" logical OR, a type "I5" inverter, and a type "I15" inverter. Thus, when the low-order section of the word-selecting register is storing a count of "zero," output lines Wφ*a* through Wφ*d* are FALSE, and lines (Wφ*a*)′ through (Wφ*d*)′ are TRUE. As all of the input lines to logical AND 1261 are simultaneously TRUE, output line Wφφ is TRUE, indicative of the "zero" storage in flipflops 6051 through 6054. In a like manner, it is seen that only one of output lines Wφφ through Wφ9 of the decoder is TRUE at any given instant, and a TRUE state of each is indicative of a corresponding one of decimal digits "0" through "9" being stored in the low-order section of the word-selecting register.

There are two "presets" for the word-selecting register. The first preset is by means of selective energization of line (PWφ)′, which unconditionally presets the word-selecting register to "00." The second preset is by means of selective energization of line ST1, which presets the word-selecting register to "01" representation as indicated by a TRUE state of line Wφ1, lines Wφφ and Wφ2 through Wφ9, of course, being FALSE. However, both the low-order section and the high-order section of the word-selecting register must first be set to zero via line (PWφ)′ in order for line ST1 to be effective to preset the word-selecting register to "01." The reason for this is that, as shown, line ST1 is effective only in presetting the state of flipflop 6051 and does not affect the states of the remaining flipflops of both sections of the word-selecting register.

With reference to FIG. 64, the four flipflops which are utilized to store the high-order decimal digit of the number stored in the word-selecting register are 6047 through 6050. The state of flipflop 6047 represents the low-order bit "*a*," the state of flipflop 6048 represents the second-order bit "*b*," the state of flipflop 6049 represents the third-order bit "*c*," and the state of flipflop 6050 represents the fourth or high-order bit "*d*" of the decimal digit. Output lines W1*a* through W1*d* and (W1*a*)′ through (W1*d*)′ from flipflops 6047 through 6050 are connected as inputs to a decoder network comprising ten type "R1" logical ANDS 1226 through 1235, which are individually cascaded with a type "D1" logical OR, a type "I5" inverter, and a type "I15" inverter. As in the low-order section of the word-selecting register, as previously mentioned, its high-order section is also unconditionally preset to "zero" by line (PWφ)′, which presets the reference outputs of flipflops 6047 through 6050 FALSE.

Included in the high-order section of the word-selecting register are ten readouts which decode the decimal digit representation as represented by the states of flipflops 6047 through 6050, the readouts being by way of output lines W1φ through W19. For example, when the high-order digit in the word-selecting register is a "0," only line W1φ is TRUE. Line W11 is TRUE only when the high-order digit is a "1," and so on, so that line W19 is TRUE only when the high-order digit is a "9." The ten output lines W1φ through W19 are each logically ANDED with each of lines WR and (WR)′, as shown in FIG. 66, to selectively energize the Y-grounders which effectively select the high-order digit of the address in memory of the word to be read out upon occurrence of the next read-write cycle.

(14) *Summary of word selection*

There has now been shown and described the mode of selection of a particular string or addresses of cores and how a particular binary bit of a particular digit of the word is selected during a read-write cycle of operation. However, in summary, the word-selecting register effectively stores a two-digit decimal number which corresponds to the address in memory that is to be effected during the next read-write cycle. Even though there are, in fact, only twenty readout lines Wφφ through W19 for the word-selecting register, in combination they effectively function as one hundred readouts. In other words, one of lines W1φ through W19 is TRUE, indicative of the high-order digit of addresses φφ through 99. At the same time, one of lines Wφφ through Wφ9 is TRUE, indicative of the low-order digit of the address. As an illustrative example, address 96 is represented by lines W19 and Wφ6 simultaneously being TRUE; address 48 is represented by lines W14 and Wφ8 simultaneously being TRUE, and so on. Thus, a half-select current is allowed to flow in the "Y" direction only in the vertical string of cores located in the address corresponding to the number stored in the word-selecting register. The number in the word-selecting register remains therein during the entire time the ten-digit word is being read out of memory. Other suitable means have been provided for selecting addresses "A" and "B," as will later be seen.

The bit and digit counter combination determines which row of cores is to receive a half-select current impulse during a read-write cycle. That is, the output of the bit counter determines which bit is to be read out—i.e., bit "*a*," "*b*," "*c*," or "*d*," and the digit counter determines which order digit is to be read out. For example, if the bit counter is at "*a*" and the digit counter at "1," a half-select current impulse is permitted to flow only through the row of cores corresponding to the low-order bit of the second-order digit. If the bit counter is at "*d*" and the digit counter at "9," a half-select current impulse is permitted to flow only through the row of cores corresponding to the high-order bit of the tenth-order digit, and so on.

(15) *Synchronizing clocks*

Before going into a detailed description of a complete read-write cycle of a word stored in a particular address in memory, it is deemed desirable, at this point, to briefly describe the various "clocks" which are utilized by the computer for synchronization purposes, to insure the proper sequence of data handling and transfer.

Figure 50:
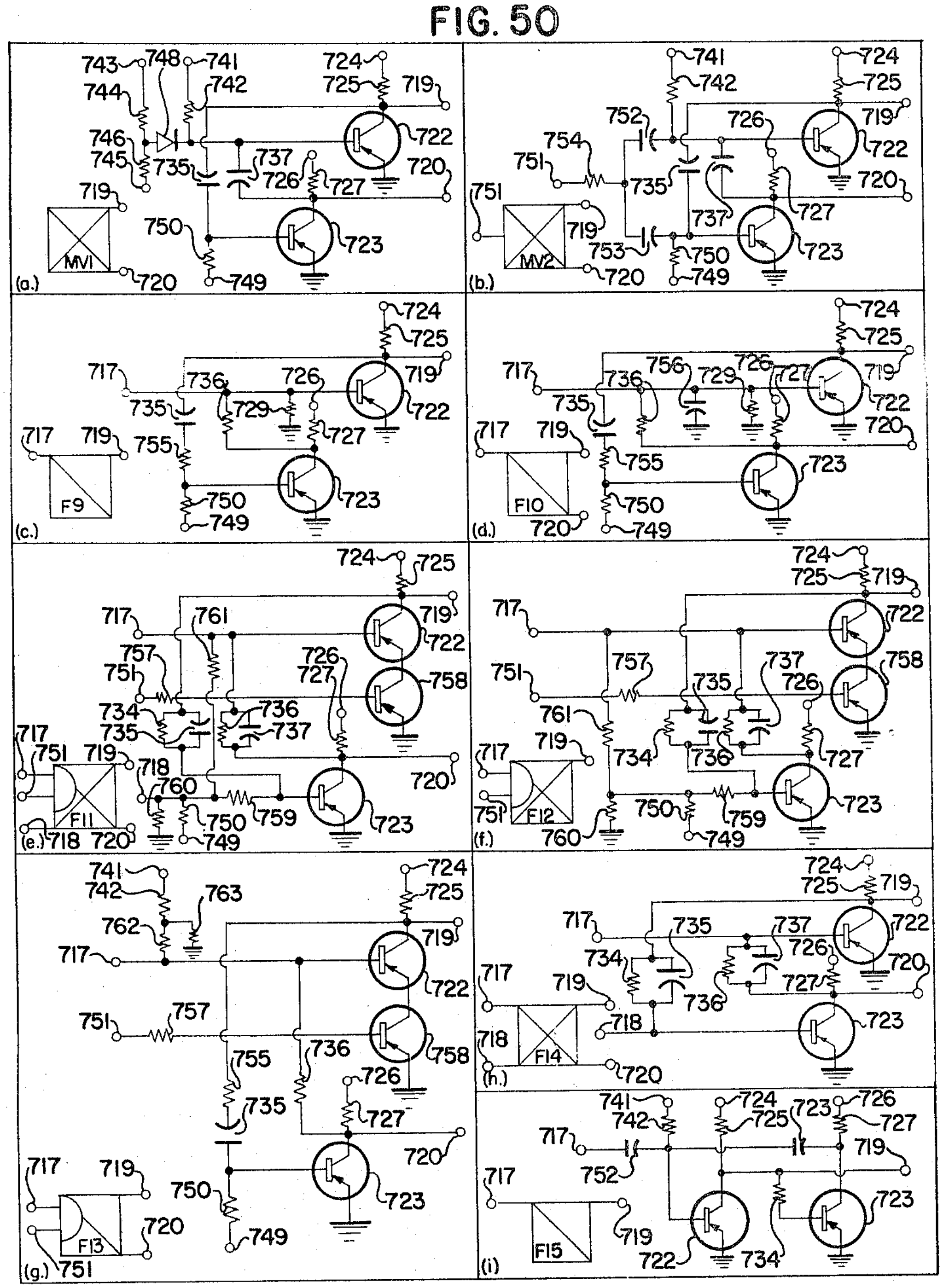
Figure 51:
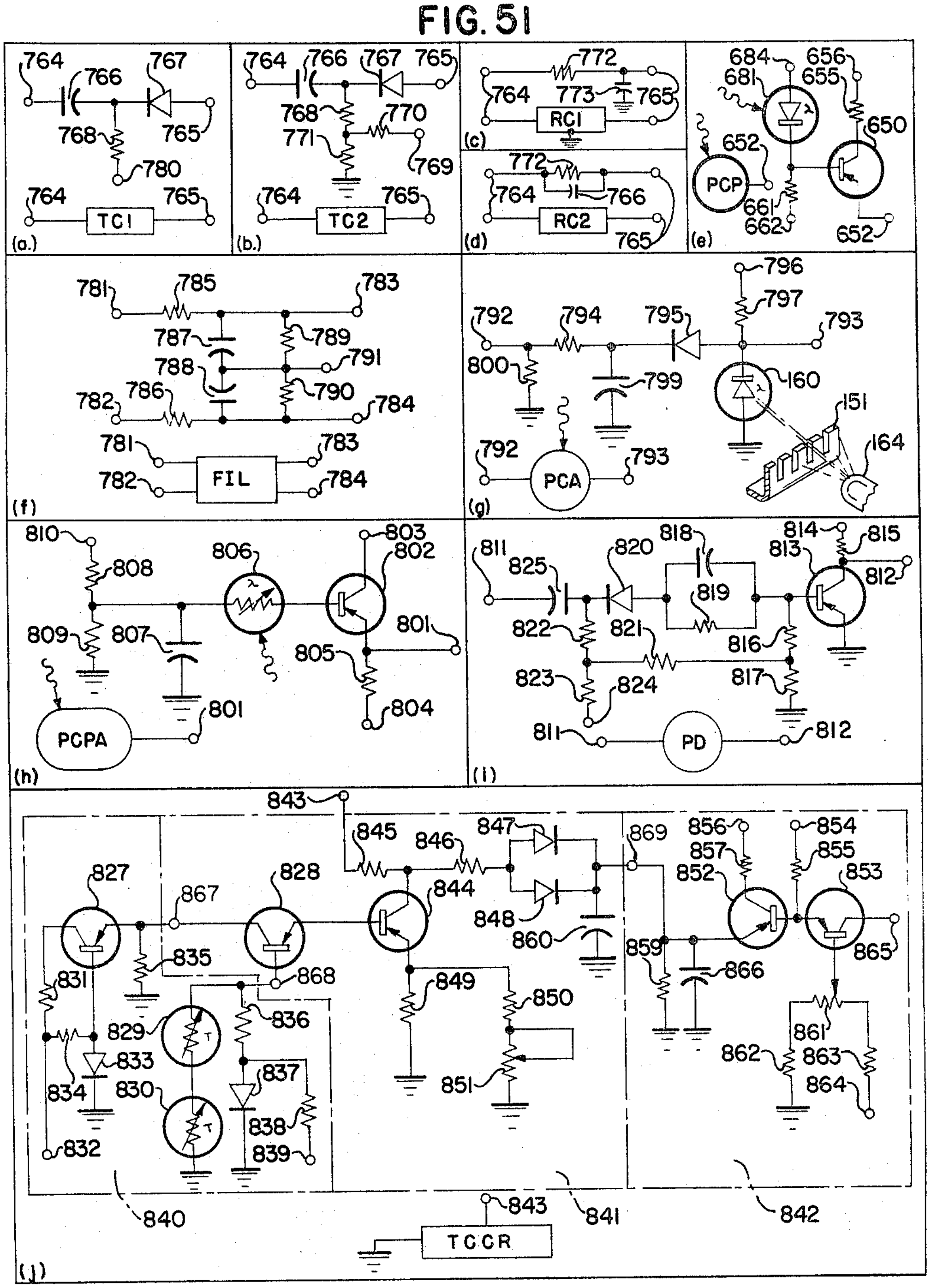

With reference to FIG. 84, a 50-kilocycle multivibrator 6125, substantially identical to the one heretofore shown and described in connection with section (*a*) of FIG. 50, has the reference output thereof essentially connected, through AND gates 1778 and 1779, to both the reference and the prime inputs of flip-flop 6127. As multivibrator 6125 is essentially a 50 kc. square-wave generator, the signal voltage appearing on the reference output lead MV thereof is as shown by the topmost waveform in FIG. 87B. If at "TIME-1" the state of line MV is reversed from TRUE to FALSE, the state of line MV reverses from FALSE back to TRUE ten microseconds later at "TIME-2." Ten microseconds later, at "TIME-3," the state of line MV again reverses from TRUE to FALSE, and so on. As heretofore mentioned, the state of line (MV)′ is effectively 180 degrees out of phase with the state of line MV.

If it is assumed that directly preceding TIME-1 the states of lines MV and C31 are both TRUE, as shown, at TIME-1 the reference input to flipflop 6127 is reversed from TRUE to FALSE. Consequently, flipflop 6127 is triggered so that the state of line C31 is rendered FALSE and the state of line C13 is rendered TRUE. At TIME-3, when the state of line MV again is reversed from TRUE to FALSE, the state of line C31 is rendered TRUE and the state of line C13 is rendered FALSE. This sequence of events is continually repeated during operation of the computer.

At TIME-2, the state of line (MV)′ is reversed from TRUE to FALSE, and, consequently, flipflop 6128 is triggered so that the state of line C42 is thereby rendered FALSE and the state of line C24 is thereby rendered TRUE. At TIME-4, when the state of line (MV)′ again reverses from TRUE to FALSE, the states of lines C42 and C24 are reversed. At TIME-1, when the state of line C31 reverses from TRUE to FALSE, flipflop 6129 is triggered so that the state of line C41 is thereby rendered FALSE, and, simultaneously therewith, the state of line C41 is rendered TRUE. Thirty microseconds later, the state of line C24 reverses from TRUE to FALSE. Therefore, at TIME-4, flipflop 6129 is reset to its initial state, so that immediately thereafter the state of line C41 is rendered TRUE and the state of line C14 is simultaneously rendered FALSE.

As shown, output lines C31, C13, C42, and C24 are variously connected as inputs to flipflops 6129 through 6132 to provide suitably phased clock pulses on output lines C41, C14, C43, C34, C23, and C12. It is to be noted that the highest-order numeral designation thereof denotes the time at which the state of that particular line is rendered TRUE and the lowest-order numeral designation denotes the time at which the state of that particular line is rendered FALSE. For example, the state of line C41 is rendered TRUE at each TIME-4 and FALSE at each TIME-1, the state of line C23 is rendered TRUE at each TIME-2 and FALSE at each TIME-3, and so on.

The 400-cycle multivibrator 6126 has a "period" of approximately 1.24 milliseconds. Consequently, due to the synchronizing action with respect to the state of line C41, as heretofore described in connection with section (*b*) of FIG. 50, the state of line ICC is rendered TRUE and the state of line (ICC)′ is rendered FALSE at TIME-1; approximately 1.24 milliseconds thereafter, at TIME-1, the state of line ICC is rendered FALSE and the state of line (ICC)′ is rendered TRUE. Again, approximately 1.24 milliseconds thereafter, at TIME-1, the state of line ICC again is rendered TRUE and the state of line (ICC)′ is again rendered FALSE. As this sequence of events is continually repeated during operation of the computer, it is evident that the output from the 400-cycle multivibrator 6126 is effectively synchronized with the output from the 50 kc. multivibrator 6125.

(16) *Detailed read-write cycle*

With reference to FIG. 60, during a complete read-write cycle of a word stored in a particular address in memory, line SMC is TRUE for a period of 1600 microseconds, and line MYW is TRUE for a period of 1650 microseconds. Therefore, as all the inputs to logical AND 1096 are simultaneously TRUE at TIME-3, line YDW also goes TRUE at TIME-3 and stays TRUE for a period of 20 microseconds until TIME-1; at TIME-1, line YDW goes FALSE and stays FALSE for 20 microseconds until TIME-3; at TIME-3 line YDW again goes TRUE, and so on. Thus, it is seen, at TIMES 1 and 3, line YDW goes FALSE and TRUE, respectively, for periods of 20 microseconds each. This is done to permit one of Y-driver output lines YDϕ through YD9 (FIG. 65) to be selectively energized for a period of 20 microseconds by selected ones of output lines Wϕϕ through Wϕ9 of the decoding portion of the low-order section of the word-selecting register, as will more fully be described hereinafter.

As previously described in connection with FIG. 66, selected pairs of Y-grounder output lines YGϕ–(YGϕ)′, YG1–(YG1)′ . . . YG9–(YG9)′ are conditioned at predetermined times by a corresponding one of output lines W1ϕ through W19 of the decoding portion of the high-order section of the word-selecting register (FIG. 64), a selected one of each pair being selectively energized by one of lines WR and (WR)′. As shown in FIG. 66, lines WR and (WR)′ alternately effect energization of only one of the Y-grounder output lines. That is, only one of the Y-grounder output lines is energized at any given time; when that particular Y-grounder output line is de-energized, another Y-grounder output line is energized, and so on. This is clearly illustrated in the timing chart of FIG. 87A, which is to be referred to, from time to time, during the following detailed description of a complete read-write cycle.

It will be assumed that it is desirous to read a word out of memory address ϕϕ, that the reading operation is to begin with the lowermost core in address ϕϕ, and that all data read out is to be re-stored in address ϕϕ. Thus, to begin the reading operation, lines (WR)′ and W1ϕ (FIG. 66) simultaneously go TRUE, thereby energizing Y-grounder output line (YGϕ)′ at TIME-1, as shown in the just-mentioned timing chart of FIG. 87B. Simultaneously therewith, lines XDW and B*a*M (FIG. 60) go TRUE, thereby energizing X-driver output line XD*a* at TIME-1. Also simultaneously therewith, lines DϕM and (WR)′ (FIG. 66) are TRUE to energize X-grounder output line (XGϕ)′ also at TIME-1. Consequently, as both the X-driver, XD*a*, and the X-grounder (XGϕ)′ (FIG. 52A) are simultaneously energized at TIME-1, a current impulse of half-select magnitude (approximately 180 ma.) flows from left to right through the bottom row of cores to "half-select" each of the cores in the row toward a binary "zero" representation, as previously described, the binary value of the low-order bit of the first-order digit of the word stored in memory address ϕϕ being represented by the initial state or direction of magnetization of core 885, as before stated.

Twenty microseconds later, at TIME-3, line YDW (FIG. 60) goes TRUE to effect energization of Y-driver output line YDϕ (FIG. 65). Thus, as the Y-driver output line YDϕ and Y-grounder output line (YGϕ)′, shown in FIG. 52A, are both, for the first time, simultaneously energized at TIME-3, a current impulse of half-select magnitude (approximately 180 ma.) flows downwardly through the leftmost column of cores to "half-select" each of the cores in address ϕϕ toward a binary "zero" representation. As the magnetic fields produced by the two half-select currents are additive in the region of core 885 only, immediately following TIME-3 core 885 is the only core in the entire memory that is magnetically set to a binary "zero" representation at this time. If it is assumed that core 885 previously was in a magnetic remanent state representative of a binary "one," the state of magnetization of the core is reversed immediately following TIME-3. Consequently, with respect to terminal 872, a negative-going output pulse is induced in memory sense winding 871 (FIG. 52) having a peak amplitude occurring approximately 3 microseconds after TIME-3.

The negative-going output pulse induced in memory sense winding 871 renders memory sense amplifier 4399 (FIG. 67A) conductive during presence thereof, so that the uppermost input to logical AND 1163 goes TRUE during presence of the pulse from memory, as shown in FIG. 87. Assuming that the signal on the lowermost input to AND 1163 from flipflop 6149 is also TRUE, both of the common-load transistors making up AND 1163 (FIG. 48*j*) are rendered non-conductive, so that the signal applied to the reference input of flipflop 6055 goes FALSE approximately 3 microseconds after TIME-3 and flipflop 6055 is triggered thereby, so that output line MSA goes TRUE, indicating that a binary "one" had previously been stored in core 885 (FIG. 52); output line (MSA)′, when TRUE, indicates that the core was previously storing a binary "zero."

At TIME-4, line (WR)′ goes FALSE (FIG. 66) and line WR goes TRUE. Therefore, X and Y-grounder lines (XGϕ)′ and (YSϕ)′ are both de-energized, and simultaneously therewith, X and Y-grounder lines XGϕ and YGϕ are energized. As core 885 (FIG. 52A) was previously storing a binary "one," X and Y-driver output lines XD*a* and YDϕ remain energized, and, consequently, a full-select current impulse flows through the core in the opposite direction to "re-set" the core back to its initial binary "one" state immediately following TIME-4.

However, if the core had been initially storing a binary "zero," instead of a binary "one," a voltage impulse would not have been induced in the memory sense winding, and, consequently, output line MSA (FIG. 67A) remains FALSE instead of going TRUE, thus indicative of the binary "zero" storage in core 885. In that instance when line MSA remains FALSE, line MXW (FIG. 60) likewise remains FALSE, and, consequently, not all of the inputs to logical AND 1098 are TRUE, as before. As a result, line XDW goes FALSE and causes X-driver output line XD*a* to be de-energized. This is illustrated in FIG. 87 by the dotted portion of the output signal representation of X-driver line XD*a* between TIME-4 and TIME-1 for bit "*a*." X-driver line XD*a* now being de-energized at TIME-4, a binary "one" representing half-select current flows through core 885 in the "Y" direction only, and, consequently, the core is not "reset" to a binary "one" state, but, instead, remains in its initial binary "zero" state.

It is to be noted that, during a read-write cycle, half-select current is first applied in the "X" direction for a period of 20 microseconds—i.e., from TIME-1 to TIME-3—before a coincidental half-select current is applied in the "Y" direction through the core being "read." One reason for operating the computer memory in this manner is due to the physical placement of memory sense winding 871 (FIG. 52). Due to the fact that the sense winding is oriented parallel with respect to the conductors threaded through the core in the "X" direction, when a half-select current is first applied in the "X" direction, a voltage impulse is induced in the sense winding even though the magnetic state of each core remains unchanged. In fact, the amplitude of this voltage may be from ten to fifteen times greater than the amplitude of the voltage induced in the sense winding due to a "change-of-state" of one of the cores. Consequently, it is desirable to allow sufficient time to lapse after application of a half-select current in the "X" direction so that this unwanted voltage impulse is dissipated and thus alleviate any undesirable effect therefrom.

Another reason for this 20-microsecond delay is that a half-select current through a core causes a noise impulse to be induced in the sense winding especially if the previous half-select current through the core was in the opposite direction. The amplitude, of this noise impulse is, in most instances, approximately 7 millivolts per core and requires from ten to fifteen microseconds to be dissipated. As there are 100 cores in the "X" direction per row, and, as the noise from all of the cores in each row is additive, the total maximum amplitude of the noise impulse is approximately 700 millivolts.

In an attempt to simplify the description and to insure a complete understanding of the inherent complexity of the mode of operation of the computer memory, it has been assumed to this point that all of the cores making up memory addresses $\phi\phi$ through 99 and addresses "A" and "B" are magnetized in the same direction to represent either a binary "one" or a binary "zero." However, in the actual operation of the computer memory, this is not the case, the reasons for which are as follows:

As previously described with respect to FIG. 52, memory sense winding 871 is sequentially threaded in the same direction through every other one of the forty rows of cores making up the entire memory. Thus, if every core in the memory were magnetically set in the same direction to represent, say, a binary "one," opposite polarity output pulses are induced in the memory sense winding during a read-write cycle, all of which pulses individually represent a binary "one" storage in the respective core. For example, the cores making up the odd-numbered rows are responsible for output pulses of one polarity indicative of a binary "one" storage, whereas the cores making up the even-numbered rows are responsible for output pulses of an opposite polarity also indicative of a binary "one" storage.

Also, as previously mentioned, it has been found that a subsequently-applied half-select current impulse through a core causes a noise impulse to be induced in the sense winding if the previously-applied half-select current impulse through the core was in the opposite direction to the subsequently-applied half-select current impulse; however, the subsequently-applied half-select current impulse through the core causes a much smaller amplitude noise impulse to be induced in the sense winding if the subsequently-applied half-select current impulse is in the same direction as the previously-applied half-select current impulse.

Therefore, to alleviate the need for sensing amplifiers which must be responsive to input impulses of opposite polarity, and also, during reading of a particular core, in order to subsequently apply a half-select current impulse therethrough in the "Y" direction, which is in the same direction as the half-select current impulse previously applied in the "Y" direction therethrough during writing of a previously-read core, it has been found desirable during the operation of the memory of the present computer for all of the cores making up the odd-numbered rows to be magnetically set in one direction to represent storage of a binary "one" and for all of the cores making up the even-numbered rows to be magnetically set in the opposite direction to represent storage of a binary "one." Consequently, during a read-write cycle of operation, binary "one" signifying impulses of the same polarity are induced in the memory sense winding, and thus the sense amplifiers need only be responsive to single polarity impulses; and, also, much smaller amplitude noise impulses are induced in the sense winding during the reading operation.

With the foregoing in mind, the next portion of the read-write cycle will be described and directed to bit "*b*" of the low-order digit of the word stored in address $\phi\phi$.

Now that core 885 (FIG. 52A) has been read and then "reset" to repersent its initial binary "one" storage, line CYC (FIG. 61) goes from TRUE to FALSE at the following TIME-1, measured with respect to bit "*b*." As previously described in detail with respect to the bit counter shown in FIG. 62, when line CYC goes FALSE for the second time, line B*a*M goes FALSE, line B*b*M goes TRUE, and lines B*c*M and B*d*M remain FALSE. As line XDW (FIG. 60) also goes TRUE at TIME-1, X-driver output line XD*a* is de-energized and output line XD*b* is energized at TIME-1, as shown in FIG. 86. As line YDW (FIG. 60) goes FALSE at each TIME-1, Y-driver output line YD$\phi$ (FIGS. 65 and 52A) is de-energized, and, consequently, the half-select current in the "Y" direction through the cores of address $\phi\phi$ is thereby not permitted to flow. However, as X-grounder line XG$\phi$ (FIG. 52B) remains energized during TIME-1, and as X-driver line XD*b* is energized for the first time at TIME-1, a half-select current flows from right to left through core 886 to "half-select" the magnetic state of core 886 indicative of a binary "zero." It is to be noted that the half-select current in the "X" direction through core 885 flowed from left to right, instead of right to left, to magnetically "half-set" core 885 toward a binary "zero" representation. Thus, it is seen, the half-select read current flows in one direction through the cores in the even-numbered rows and in the opposite direction through the cores in the odd-numbered rows.

At TIME-2, flipflop 6055 (FIG. 67A) is reset by line C42 so that output line MSA is thereafter FALSE. At TIME-3, line YDW (FIG. 60) goes TRUE to again effect energization of line YD$\phi$ (FIG. 65). Thus, as Y-driver output line YD$\phi$ and Y-grounder line YG$\phi$ (FIG. 52) are both simultaneously energized at TIME-3, a current impulse of half-select magnitude flows upwardly through core 886 to cause "full-selection" of the magnetic state of core 886 to a binary "zero" representation. If it is assumed that the magnetic state of core 886 is indicative of a binary "one," the state of magnetization of the core is reversed immediately following TIME-3, and, consequently, a negative-going impulse is again induced in memory sense winding 871 (FIG. 52) with respect to terminal 873, approximately three microseconds after TIME-3, as before.

As before, the negative-going impulse induced in memory sense winding 871 causes the reference input to flipflop 6055 to go FALSE shortly after TIME-3, and, consequently, flipflop 6055 is triggered so that line MSA is TRUE, indicating that a binary "one" had previously been stored in core 886. At TIME-4, line (WR)′ goes FALSE (FIG. 66) and line WR goes TRUE. Consequently, X and Y-grounder lines XG$\phi$ and TG$\phi$ are both de-energized, and, simultaneously therewith, lines (XG$\phi$)′ and (YG$\phi$)′ are energized. As core 886 was previously storing a binary "one," X and Y-driver output lines XD*b* and YD$\phi$ remain energized for ten microseconds longer to effect "resetting" of core 886 back to its initial binary "one" state immediately following TIME-4.

The previously-described sequence of events is now repeated with respect to cores 887 and 888 and also with respect to the remaining ones of the forty cores making up address $\phi\phi$. In the illustrative example given, as evidenced by the presence and absence of memory sense amplifier pulses (FIG. 87A), the binary number stored in cores 885 through 888, corresponding to low-order bit "*a*" through the high-order bit "*d*," is "0111," thus indicating that the low-order digit of the word stored in address ϕϕ is a "seven."

To summarize: Alternate cores of each memory address are magnetically set in one direction to represent a binary "one," whereas the remaining cores in the address are magnetically set in the opposite direction to represent a binary "one." When the core representing bit-*a* of the low-order digit is read (i.e., core 885), a half-select "read" current in the "X" direction flows to the right through core 885 at the first TIME-1. At TIME-3, a half-select read current in the "Y" direction flows downwardly through core 885 at the first TIME-3 to magnetically set core 885 toward binary "zero." If the core was originally storing a binary "one," its magnetic state is therefore reversed, and a negative-going voltage pulse is induced in memory sense winding 871, which causes the half-select currents in the "X" and "Y" directions through core 885 to be reversed to magnetically reset core 885 to binary "one" at TIME-4. At the second TIME-1, a half-select current flows to the left in the "X" direction through core 886. At the second TIME-3, a half-select current flows upwardly through core 886 to magnetically set core 886 to binary "zero." If core 886 was originally storing a binary "one," a second negative-going potential impulse is induced in the memory sense winding to cause the half-select currents in the "X" and "Y" directions through core 886 to be reversed to reset core 886 to binary "one" at the second TIME-4. As before stated, this sequence of events is sequentially repeated from the lowermost to the uppermost of the cores making up address ϕϕ.

(17) *Sense-amplifier strobe*

With reference to FIG. 67A, inverter 4393 is effectively connected in series with memory sense winding 871, and inverter 4395 is effectively connected in parallel with respect to the memory sense winding. As shown, inverter 4395 is rendered non-conductive from TIME-3 to TIME-4 by line C34, and inverter 4393 is rendered conductive from TIME-3 to TIME-4 by line C43. Thus, as inverter 4395 is non-conductive during the time each of the memory cores is being read, the inverter exerts essentially no effect on sense winding 871; however, as inverter 4393 is conductive during the time each core is being read, the lower end of sense winding 871—i.e., terminal 872—is effectively grounded thereby during that time to complete the circuit therethrough. From TIME-4 to TIME-3, sense winding 871 is effectively open-circuited by inverter 4393 and effectively short-circuited by inverter 4395, thus rendering sense winding 871 non-effective at all times except for the time interval during which reading of a memory core is to take place.

As previously described with respect to FIG. 87A, if a binary "one" was previously stored in the core being read, the output of a memory sense amplifier is TRUE after a time lapse of approximately three microseconds after TIME-3. Thus, to prevent undesirable noise impulses from entering the system, the output of sense amplifier 4399 is sampled, or "strobed," for a period of approximately three microseconds, starting approximately three microseconds after each TIME-3. Strobing is effected by a three-microsecond one-shot flipflop 6147, which is triggered at TIME-3, by line C31, so that the prime output thereof goes FALSE at TIME-3, and remains FALSE for a period of three microseconds, after which time the prime output thereof returns to a TRUE condition. The prime output of flip-flop 6147 is connected to the reference input of a three-microsecond one-shot flipflop 6149, so that, after a time lapse of three microseconds after TIME-3—i.e., when the prime output of flipflop 6147 goes TRUE—the reference output of flipflop 6149 goes TRUE and stays TRUE for a period of three microseconds, after which time the reference output thereof goes FALSE. Therefore, the lowermost input line to logical AND 1163 goes TRUE only after a time lapse of three microseconds after TIME-3, and stays TRUE for a period of only three microseconds.

As previously described, memory addresses "A" and "B" (FIG. 52B) have a common sense winding 891 separate from the main memory sense winding 871. Memory addresses "A" and "B" have a common pair of Y-grounder lines (ABG)′ and ABG and separate Y-driver lines AAD and BBD (FIG. 60), which function in the same manner as the just-described Y-grounder and Y-driver lines for memory addresses ϕϕ through 99. Thus, it is possible to read and write in only one of memory addresses "A" or "B" at any given time, the same as for memory addresses ϕϕ through 99. However, as addresses "A" and "B" have a separate sense winding from addresses ϕϕ through 99, a word from either of addresses ϕϕ through 99 may be read out simultaneously with the word being read out of address "A" or "B." Because of the common X-driver and X-grounder lines, it is not possible to write separate words in both a memory address and either of addresses "A" or "B." However, the same word may be written in both addresses. As shown in FIG. 67A, the output of "A" and "B" sense amplifier 4400 is strobed by single-shot flipflops 6148 and 6150 in exactly the same manner as memory sense amplifier 4399, as was just described in detail. The strobed signals from sense amplifier 4400 operate a transistor logical AND 1164, which triggers flipflop 6056 in response to a negative-going impulse from "A" and "B" sense winding 891. As the complete read-write cycle of operation of addresses "A" and "B" is, for all practical purposes, exactly the same as the just-described read-write cycle for memory addresses ϕϕ through 99, a description thereof would only result in an undue repetition, which is not deemed necessary for a full understanding of the mode of operation thereof in view of the just-described read-write cycle for memory addresses ϕϕ through 99.

(18) *Instruction register generally*

While the computer is in the process of carrying out the instruction specified by one of the just-described instruction words, that particular instruction word is effectively stored in an "instruction register." With reference to FIGS. 45A and 45B, the instruction register (I) is effectively divided into five sections, 1 through 5, where section-1 is capable of storing the two highest-order digits and section-5 is capable of storing the two lowest-order digits of the ten-digit instruction word. Each of the five sections is effectively divided into a high-order and a low-order digit-register, each of which is utilized to store a particular-order decimal digit of the instruction word in binary-coded-decimal form. For example, digit-register (I9) effectively stores the highest or tenth-order decimal digit of the instruction word; digit-register (I8) effectively stores the ninth-order decimal digit of the instruction word; and so on, so that digit-register (Iϕ) stores the lowest or first-order decimal digit of the instruction word.

(19) *Section-1 of instruction register*

With reference to FIG. 55, section-1 of the instruction register is logically illustrated as including five flipflops, 6001 through 6005, whose states of energization collectively represent, in binary-coded decimal form, each of the previously-described instruction code numbers "ϕϕ" (EKW) through "17" (EPT). As the high-order digit of each of the instruction code numbers is either a "one" or a "zero," only one flipflop (6005) is necessary to store the high-order digit of the code. However, as the low-order digit of the code may be any of the digits "zero" through "nine," four flipflops (6001 through 6004) are necessary to represent the value of the low-order digit thereof.

As previously described with respect to FIGS. 67A and 86, output line MSA from the memory sense amplifier flipflop 6055 is either TRUE or FALSE, depending upon whether a binary "1" or a binary "0" had just previously been read out of memory during read-write cycle of operation. If a binary "1" had just been read out of memory, the state of line MSA goes from FALSE to TRUE approximately 3 microseconds after TIME-3 and stays TRUE until the next TIME-2, at which time the state of line MSA returns FALSE. If a binary "0" had just been read out of memory, the state of line MSA remains unchanged; i.e., FALSE.

Thus, after presetting section-1 of the instruction register to "00" by effecting a TRUE-to-FALSE change of state of line (PIφ)', suppose that an ADD instruction word was originally stored in a particular address in memory and it is desired to take this word from memory and store it in the instruction register. As the code designation for an ADD instruction is "08," the digit to be stored in the high-order digit register (I9) of section-1 of the instruction register is a "zero," and the digit to be stored in the low-order digit register (I8) thereof is an "eight." Consequently, as binary-bit "*a*" of the low-order digit of the code designation is first to be read out of memory, line B*a* is TRUE, and, as a word is to be transferred from memory to the instruction register, line MI is likewise TRUE, as will be seen later. However, in this example, as the binary value of bit "*a*" of the low-order digit of the code designation is "zero," line MSA remains FALSE, and therefore output lines (I8*a*)' and I8*a* are TRUE and FALSE, respectively. When bit "*b*" is to be read out of memory, only the line B*b* from the bit counter is TRUE, while lines B*a*, B*c*, and B*d* are FALSE. As the binary value of bit "*b*" is likewise "zero," output lines (I8*b*)' and I8*b* remain TRUE and FALSE, respectively. When bit "*c*" is to be read out of memory, only line B*c* from the bit counter is TRUE. As the binary value of bit "*c*" is also "zero," output lines (I8*c*)' and I8*c* remain unchanged. When the high-order bit "*d*" is to be read out of memory, only line B*d* from the bit counter is TRUE. As the binary value of bit "*d*" is now a "one," when line C41 goes TRUE at TIME-4, all the inputs to logical AND 963 are TRUE, and, consequently, line B*d*L likewise goes TRUE at TIME-4. As the high-order digit of the code designation is next to be read in this particular example, only line D8 from the digit counter is TRUE at this particular instance. Therefore, the reference input to flipflop 6004 goes TRUE at TIME-4. At TIME-1, the reference input thereto goes FALSE, so that the states of output lines (I8*d*)' and I8*d* are reversed. That is, line (I8*d*)' goes FALSE, and line I8*d* goes TRUE.

It is seen, therefore, that the states of energization of flipflops 6001 through 6004 collectively represent the binary number "1000," which, in turn, represents the decimal digit "eight." As the value of bit "*a*" of the tenth-order digit is "0," the state of energization of flipflop 6005 represents the "zero" value of the tenth-order digit of the instruction word.

With reference to FIG. 56, all of the output lines from section-1 of the instruction register are connected as inputs to an "instruction-code readout" having a multiplicity of output lines which are selectively energized by logical combinations of the five flipflops of section-1 of the instruction register and individually correspond to a selected one of instruction words EKW (00) through EPT (17). Ignoring, for the moment, those output lines bearing a "prime" notation, only one of the remaining output lines is TRUE at any given instance; the particular line that is TRUE is dependent upon, and corresponds to, the particular code number stored in section-1 of the instruction register. There are, however, certain exceptions, which are to be noted hereinafter. Thus, in the preceding example, a "08" being stored in section-1 of the instruction register causes the state of output line ADD to be TRUE, all the remaining output lines being FALSE. It is, therefore, to be appreciated that, for an "enter-keyboard-words" command (code 00), only line EKW is TRUE; for a "print-out-words" command (code 01), line POW is TRUE; and so one, so that output line EPT is TRUE, indicative of the "enter-punched-tape" command (code 17). The simplified logical equations for the eighteen readout lines of the decoder are as follows:

| Abb. of Command | Code No. | Logical Equation | | | | | |
|---|---|---|---|---|---|---|---|
| EKW | 00 | =(I9a)' | (I8d)' | (I8c)' | (I8b)' | (I8a)' | ICR |
| POW | 01 | =(I9a)' | (I8d)' | (I8c)' | (I8b)' | I8a | ICR |
| ECW | 02 | =(I9a)' | | (I8c)' | I8b | (I8a)' | ICR |
| ROC | 03 | =(I9a)' | | (I8c)' | I8b | I8a | ICR |
| SHF | 04 | =(I9a)' | | I8c | (I8b)' | (I8a)' | ICR |
| CMA | 05 | =(I9a)' | | I8c | (I8b)' | I8a | ICR |
| MB | 06 | =(I9a)' | | I8c | I8b | (I8a)' | ICR |
| STP | 07 | =(I9a)' | | I8c | I8b | I8a | ICR |
| ADD | 08 | =(I9a)' | I8d | | | | ICR |
| SUB | 09 | = | | | | I8a | ADD |
| SUM | 10 | = I9a | (I8d)' | (I8c)' | (I8b)' | (I8a)' | ICR |
| APN | 11 | = I9a | (I8d)' | (I8c)' | (I8b)' | I8a | ICR |
| MDD | 12 | = | | | | (I8a)' | MUS |
| MUS | 13 | = I9a | | (I8c)' | I8b | | ICR |
| DIV | 14 | = I9a | | I8c | (I8b)' | (I8a)' | ICR |
| CFM | 15 | = I9a | | I8c | (I8b)' | I8a | ICR |
| CFE | 16 | = I9a | | I8c | I8b | (I8a)' | ICR |
| EPT | 17 | = 19a | | I8c | I8b | I8a | ICR |

For reasons to be set forth hereinafter, it is to be noted that line ADD is TRUE whenever either a "08" or a "09" is stored in section-1 of the instruction register, i.e., for either an "add" or a "subtract" command; however, line SUB is TRUE only for a "subtract" command, i.e., "09." In addition, line MUS is TRUE when either a "12" or a "13" is stored in section-1 of the instruction register, i.e., for either a "multiply-dollar-decimal" or a "multiply-and-shift" instruction; however, line MDD is TRUE only for a "multiply-dollar-decimal" command, i.e., code "12." An additional readout is provided by line MOD, which is essentially a logical OR of lines MUS and DIV and which signifies that either a multiplication or a division operation is being carried out.

(20) *Section-2 of instruction register*

Figure 57:
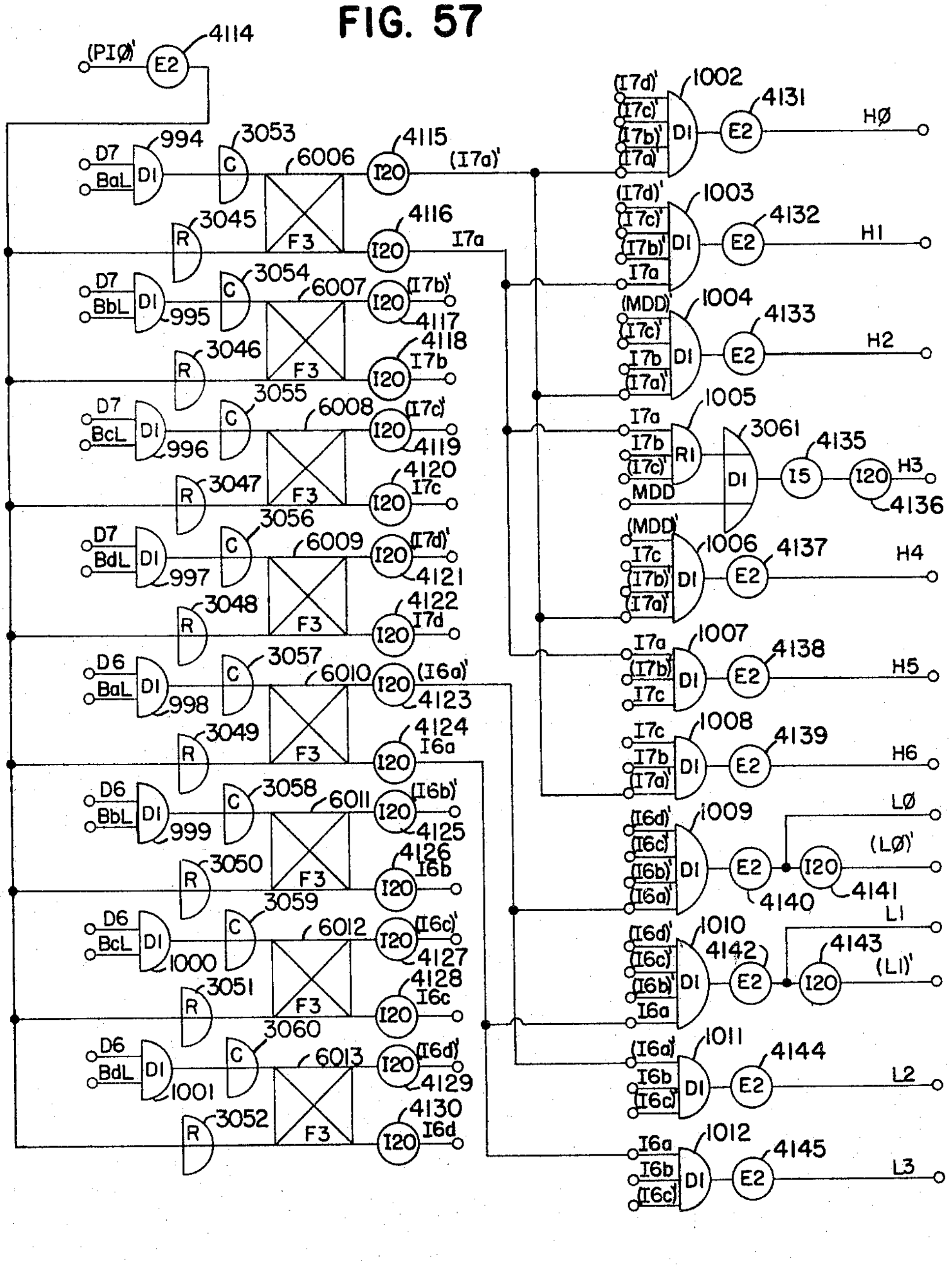

With reference to FIG. 57, section-2 of the instruction register includes eight flipflops, 6006 through 6013, which store the seventh and eighth-order digits of the instruction word. As previously mentioned with respect to that part of the foregoing description relating to the "Instruction Word Format," section-2 of the instruction register is utilized to store the address of either the first or the second operands, the destination address, or a special code, depending upon the particular instruction. A decoder for the high-order digit-register of section-2 is provided with seven readout lines Hφ through H6 to respectively indicate a digit having a value "zero" through "six" being stored in the high-order digit-register; the decoder for the low-order digit-register is provided with readout lines Lφ through L3, which respectively indicate a digit having a value of "zero" through "three" being stored in the low-order digit-register.

For example, in an instruction calling for a particular motor bar operation of the accounting machine portion of the computer, readout lines Hφ through H6 indicate which motor bar should be depressed and what type of depression is desired—i.e., "touch" or "hold"—in carrying out a "shift" instruction (SHF–04), and readout lines H2 through H5 indicate the direction and type of shift desired. The simplified logical equations for each of readouts Hφ through H6 are as listed below. It is to be noted, however, as shown in the logical circuit diagram of FIG. 57, that readout lines H2 and H4 cannot go TRUE during a "multiply-dollar-decimal" instruction (MDD–12), while readout line H3 is permitted to go TRUE unconditionally.

| | | | | |
|---|---|---|---|---|
| Hϕ=(I7*d*)′ | (I7*c*)′ | (I7*b*)′ | (I7*a*)′ | |
| H1=(I7*d*)′ | (I7*c*)′ | (I7*b*)′ | I7*a* | |
| H2= | (I7*c*)′ | I7*b* | (I7*a*)′ | (MDD)′ |
| H3= | (I7*c*)′ | I7*b* | I7*a* | + MDD |
| H4= | I7*c* | (I7*b*)′ | (I7*a*)′ | (MDD) |
| H5= | I7*c* | (I7*b*)′ | I7*a* | |
| H6= | I7*c* | I7*b* | (I7*a*)′ | |

Readout lines Lϕ through L3 not only are utilized in an "enter-card-words" instruction (ECW–02) but also are utilized in any of the instructions which call for a particular motor bar operation, such as "enter-keyboard-words" (EKW–00) and "print-out-words" (POW–01). For an EKW and a POW command, readout lines Lϕ through L3 selectively indicate the particular decimal point lamp on the keyboard that is to be illuminated and/or the particular "order-hook" solenoid that is to be energized. The simplified logical equations for readout lines Lϕ through L3 are as given below:

| | | | |
|---|---|---|---|
| Lϕ=(I6*d*)′ | (I6*c*)′ | (I6*b*)′ | (I6*a*)′ |
| L1=(I6*d*)′ | (I6*c*)′ | (I6*b*)′ | I6*a* |
| L2= | (I6*c*)′ | I6*b* | (I6*a*)′ |
| L3= | (I6*c*)′ | I6*b* | I6*a* |

It is to be noted that output lines **I7*a* through I7*d* of the high-order digit-register of section-2 of the instruction register are respectively connected as an input to one of flipflops 6047 through 6050 of the high-order section of the word-selecting register previously described with respect to FIG. 64. It is also to be noted that output lines I6*a* through I6*d* of the low-order digit-register of section-2 of the instruction register are respectively connected as an input to flipflops 6051 through 6054 of the low-order section of the word-selecting register previously described with respect to FIG. 65, all of which may more clearly be seen by reference to the block diagram shown in FIG. 45. Thus, as lines I7*a* through I7*d* of FIG. 64 and lines I6*a* through I6*d*** of FIG.65 are each logically ANDED with line TI2, which originates in FIG. 61, after the word-selecting register is preset to "00" by effecting a TRUE-to-FALSE reversal of the state of line (PWϕ)′, the high- and low-order digits stored in section-2 of the instruction register are permitted to respectively be simultaneously transferred directly into the high- and low-order digit positions of the word-selecting register by effecting selective energization of line TI2, selective energization of line TI2, therefore, effecting the transfer of the contents of section-2 of the instruction register into the word-selection register.

(21) *Section-3 of instruction register*

As previously mentioned, section-3 of the instruction register normally stores either a destination address or the address of one of the operands. With reference to the left-hand portion of FIG. 58, section-3 of the instruction register comprises eight flipflops, 6014 through 6021, flipflops 6014 through 6017 being a part of the high-order digit-register (I5) and flipflops 6018 through 6021 being a part of the low-order digit-register (I4) thereof, as illustrated in the block diagram of FIG. 45. The two digit-registers (I4) and (I5) are interconnected in such a manner that, when so combined, they function essentially as a binary-coded-decimal counter which is capable of effectively counting from 00 to 99 in units of "one."

To accomplish this, flipflops 6018 through 6021 of digit-register (I4) are connected together to collectively function as a "powers-of-two" binary counter that increments one unit each time the state of line IN4 changes from TRUE to FALSE. After a count of "nine" (binary 1001) is reached, digit-register (I4) recycles back to "zero" (binary 0000) on the next change of state of line IN4 from TRUE to FALSE. Flipflops 6014 through 6017 of digit-register (I5) are connected together to also collectively function as a "powers-of-two" binary counter that effectively increments by one unit each time digit-register (I4) recycles from "nine" back to "zero." Thus, it can be said, a four flipflop powers-of-two forward-counting binary counter is one in which a change of state of the reference output of any or all of the four flipflops from a TRUE state to a FALSE state causes a corresponding reversal of the state of the next succeeding high-order flipflops. Therefore, each flipflop effectively "divides" the reference output of the succeeding low-order flipflop by a division of "two."

With all four flipflops of each of digit-registers (I4) and (I5) connected in a conventional manner, each of the registers would normally count from "zero" (binary 0000) to "fifteen" (binary 1111) and then return to "zero" to again start the count cycle. However, in the instant case, digit-register (I4) includes a logical AND gate 1067 (FIG. 59), which detects a count of "nine" being held by digit-register (I4), a count of "nine" (binary 1001) being indicated by a TRUE state of each of the amplified reference outputs of flipflops 6018 and 6021. Thus, it is evident that, when reference output lines **I4*a* and I4*d* are both simultaneously TRUE, output line I49 from gate 1067 (FIG. 59) is likewise TRUE each time the counter reaches a count of "nine," line (I49)′, of course, being FALSE at that particular moment. As line (I49)′ is FALSE only during a count of "nine," the state of the prime input to flipflop 6019 (FIG. 58) is prevented from being changed from TRUE to FALSE during the next succeeding TRUE-to-FALSE change of state of line I4*a*. Consequently, lines I4*b* and I4*c* remain FALSE. At the same time, a logical AND (1029) of lines I49 and IN4 effectively returns the state of line I4*d* back to FALSE, thus returning digit-register (I4) to "zero," whereby output lines I4*a* through I4*d* are FALSE, indicative of binary 0000. Each time the state of line I4*d* goes from TRUE to FALSE—i.e., when digit-register (I4) recycles—the state of flipflop 6014, thence the state of output line I5*a*, is reversed thereby. It is to be noted, however, that digit-register (I5) is not recycled when a count of "nine" is reached therein, as in the case of digit-register (I4**).

With reference to FIGS. 64 and 65, lines **I5*a* through I5*d* and I4*a* through I4*d* of section-3 of the instruction register are each logically ANDED with line TI3 in such a manner that, after the word-selecting register has previously been preset to "00," the contents of section-3 of the instruction register is transferred to the word-selecting register by effecting a TRUE-to-FALSE change of state of line TI3**.

(22) *Section-4 of instruction register*

Section-4 of the instruction register, as previously mentioned, is utilized to store either the address of one of the operands, the address of the result, or the address of an alternate instruction. As shown in FIG. 58, and also in the block diagram of FIG. 45, the fourth section of the instruction register includes a high-order digit-register (I3) comprising four electrically-interconnected flipflops 6022 through 6025, and a low-order digit-register (I2) likewise comprising four electrically-interconnected flopflops 6026 through 6029. Each of digit-register (I2) and (I3) independently operates essentially as a power-of-two binary counter. However, instead of being capable of counting in a forward direction as digit-registers (I4) and (I5) of section-3, digit-registers (I2) and (I3) are connected in such a manner as to collectively count in a reverse direction, in units of "one," from 99 to 00 for each succeeding TRUE-to-FALSE change of state of line DE2. Consequently, it can be said that each flipflop in such a forward-counting register is essentially a scale-of-two binary counter which effectively "divides" by two the reference output binary notation of a successive low-order flipflop, whereas each flipflop in such a reverse counting register effectively "divides" by two the prime output binary notation of a successive low-order flipflop.

With flipflops 6026 through 6029 of digit-register (I2) interconnected in a conventional manner to function as a reverse counter, digit-register (I2) would then normally count backwards in units of "one" until a "zero" count (binary 0000) is reached, and then would return to a count of "fifteen" (binary 1111) to start the count cycle again. However, in the instant case, digit-register (I2) includes a logical AND gate 1066 (FIG. 59), which detects a count of "zero" condition of digit-register (I2), a count of "zero" (binary 0000) being indicated by a FALSE state of each output lines I2*a* through I2*d* from flipflops 6026 through 6029, respectively, or by a TRUE state of each of prime outputs (I2*a*)′ through (I2*d*)′. Thus, when all of lines (I2*a*)′ through (I2*d*)′ are simultaneously TRUE, output line I2ϕ from gate 1066 (FIG. 59) is likewise true each time the digit-register reaches a count of "zero," line (I2ϕ)′, of course, being FALSE at that particular moment. As line (I2ϕ)′ is FALSE only during a count of "zero," the state of the prime input flipflop 6027 is prevented from being changed from TRUE to FALSE during the next succeeding TRUE-to-FALSE change of state of line (I2*a*)′. Consequently the states of lines (I2*b*)′ and (I2*c*)′ remain TRUE. Simultaneously therewith, a logical AND of lines DE2 and I2ϕ (1041) effectively returns the state of line I2*d* back to TRUE, thus returning digit-register (I2) to a count of "nine," whereby output lines I2*a* and I2*d* are TRUE and lines I2*b* and I2*c* are FALSE, indicative of binary 1001. Each time the state of line (I2*d*)′ changes from TRUE to FALSE—i.e., when digit-register (I2) recycles back to a count of "nine"—the state of flipflop 6022, thence the state of line I3*a*, is reversed thereby. It is to be noted that digit-register (I3) is not recycled when a count of "zero" is reached, as in the case of digit-register (I2).

With reference to FIGS. 64 and 65, the reference output lines from section-4 of the instruction register are each logically ANDED with line TI4 in such a manner that the contents of section-4 of the instruction register is transferred to the word-selecting register by effecting selective energization of line TI4, assuming, of course, that the word-selecting register is initially preset to "00."

(23) *Section-5 of instruction register*

As previously mentioned, section-5 of the instruction register stores the address of the next regular instruction and, as shown in FIG. 59, comprises eight flipflops 6030 through 6037, flipflops 6030 through 6033 being included in high-order digit-register (I1) and flipflops 6034 through 6037 being included in low-order digit-register (Iϕ). Digit-registers (I1) and (Iϕ) are of conventional circuit configuration and indicate, in binary-coded decimal form, the value of the decimal digit stored therein, and, consequently, a more detailed description thereof is not deemed necessary.

With reference to FIGS. 64 and 65, output lines I1*a* through I1*d* and Iϕ*a* through Iϕ*d* from section-5 of the instruction register are each logically ANDED with line TI5 in such a manner that the contents of section-5 of the instruction register is transferred to the word-selecting register simply by effecting a TRUE-to-FALSE change of state of line TI5, assuming, of course, that the word-selecting register is initially preset to "00," as before stated with respect to sections 2 through 4 of the instruction register.

(24) *Instruction register presets*

There are two "preset" lines for the instruction register, which are utilized to preset each section thereof to thereafter be representative of a specific two-digit numerical designation. For example, section-1 of the instruction register (FIG. 55) is preset to "00" by effecting a TRUE-to-FALSE change of state of line (PIϕ)′, which presets the state of output lines I9*a* and I8*a* through I8*d* FALSE, indicative of "00"; section-2 of the instruction register (FIG. 57) is simultaneously preset to "00" by line (PIϕ)′, which presets a FALSE state of output lines I7*a* through I7*d*, and I6*a* through I6*d*, also indicative of "00"; section-3 (FIG. 58) is also simultaneously preset to "00" by line (PIϕ)′, which presets the states of output lines I5*a* through I5*d*, and I4*a* through I4*d*, FALSE, indicative of "00"; each of the digit-registers of section-4 (FIG. 58) is, however, simultaneously preset to binary 1111 by a TRUE-to-FALSE change of state of line (PIϕ)′, which presets the states of output lines I3*a* through I3*d* TRUE, indicative of binary 1111, and presets the states of output lines I2*a* through I2*d* TRUE, also indicative of binary 1111; and section-5 (FIG. 59) is simultaneously preset to "00" by line (PIϕ)′, which presets the states of output lines I1*a* through I1*d* and Iϕ*a* through Iϕ*d* FALSE, indicative of "00."

From the foregoing, it is seen that selective energization of preset line (PIϕ)′ causes each section of the instruction register to be preset to "00," with the exception of section-4, each section of which is preset thereby to binary 1111. In other words, the reference outputs of all the flip-flops in sections 1, 2, 3, and 5 of the instruction register are preset FALSE, whereas the reference outputs of the flipflops of section-4 thereof are preset TRUE by (PIϕ)′ prior to the "loading" of a word from memory into the instruction register. The reason for this type of preset is that, due to the previously-described decrementing ability of section-4, it has been found expedient, circuitwise, to first preset the reference output of each of the flipflops of section-4 to a TRUE representation and then reverse the state of each particular reference output whenever its corresponding binary bit from memory is "zero," contra to presetting the reference outputs FALSE and then reversing the state of each when the corresponding bit from memory is a binary "one." However, to avoid confusion, and for the purpose of convenience in the following description, the above presetting technique of the instruction register by line (PIϕ)′ will, nevertheless, be hereinafter referred to as presetting the instruction register to "zero."

With reference to FIG. 58, the second preset line PRB is a logical AND (1045) of lines SP and FG and is utilized to preset section-4 of the instruction register to "99" after the instruction register has previously been preset by line (PIϕ)′. The purpose for such a preset is to be covered hereinafter.

As previously described with respect to the memory sense amplifiers shown in FIG. 67 and the wave-form chart of FIG. 86, each time a binary "one" is read out of memory, the state of line MSA is changed from FALSE to TRUE at a time approximately three microseconds after TIME-3, and then its state returns to FALSE at the next succeeding TIME-2. Thus, with reference to FIG. 55, it is seen that from TIME-4 to the next succeeding TIME-1 during a "memory-to-instruction-register" word-cycle in which line MI is TRUE for approximately 1600 microseconds, line B*a*L is TRUE if the binary bit "*a*" just read out of memory is a "one," otherwise line B*a*L remains FALSE; during the next succeeding time interval of ten microseconds from TIME-4 to TIME-1, line B*b*L is TRUE if the binary bit "*b*" just read out of memory is a "one," otherwise line B*b*L remains FALSE; during the next succeeding time interval, line B*c*L is TRUE if binary bit "*c*" just read out of memory is a "one," otherwise line B*c*L remains FALSE; and, during the next succeeding ten-microsecond time interval from TIME-4 to TIME-1, line B*d*L is TRUE if binary bit "d" just read out of memory is a "one," otherwise line B*d*L remains FALSE.

As shown in FIG. 59, lines B*a*L through B*d*L are each individually ANDED with the low-order read-out line Dϕ of the previously-described digit counter (FIG. 63) and then respectively connected to the reference inputs of flipflops 6037–6034 of the low-order digit-register (Iϕ) of section-5 of the instruction register; lines B*a*L through B*d*L are also individually ANDED with the second-order read-out line D1 of the digit-counter and then respectively connected to the reference inputs of flipflops 6033–6030 of the high-order digit-register (I1) of the fifth section of the instruction register. Thus, if it is assumed that the instruction word stored in memory address φφ is to be transferred into the instruction register, the state of flipflop 6037 is first "set" in a manner to be indicative of the magnetic state of core 885 (FIG. 52A), forty microseconds later the state of flipflop 6036 is "set" indicative of the magnetic state of core 886, forty microseconds later flipflop 6035 is "set" indicative of the state of core 887, and so on, until the first eight binary bits of the word in address φφ are effectively stored in section-5 of the instruction register, the first four bits, of course, representing the low-order digit and the second set of four bits representing the second-order digit of the word in address φφ.

Input lines B*a*L through B*d*L are similarly ANDED with the remaining output lines D4 through D9 from the digit counter to effect transfer of the corresponding digits of the word in memory and subsequent storage thereof in sections 1 through 3 of the instruction register. For example, in section-3 (FIG. 58) are stored the fifth- and sixth-order digits, in section-2 (FIG. 57) are stored the seventh- and eighth-order digits, and in section-1 (FIG. 55) are stored the ninth- and tenth-order digits of the word located in address φφ. As previously described, the reference output from each of flipflops 6022 through 6029 (FIG. 58) of section-4 of the instruction register is initially preset TRUE just prior to a memory-to-instruction-register word transfer. Thus, if the binary bit just read out of memory is a "zero," line (MSA)′ remains TRUE, and, consequently, output line S4L is rendered TRUE from TIME-4 to TIME-1. Therefore, assuming that low-order bit "*a*" of the third-order digit is a "zero," the prime input to flipflop 6026 goes from TRUE to FALSE at TIME-1 approximately forty microseconds after the state of flipflop 6030 (FIG. 59) is "set" indicative of bit "*d*" of the second-order digit of the word in address φφ; a TRUE-to-FALSE reversal of the prime input to flipflop 6026, of course, "sets" the state thereof so that output line I2*a* is rendered FALSE, indicative of binary "zero." The remaining bits of the third and fourth order digits are sequentially stored in section-4 in the same manner as just described.

(25) *Summary of instruction register*

In summary, the instruction register is provided with a binary "bit" serializer at the input of each digit-register thereof and also is provided with a serializer on a digit-by-digit basis for sequentially selecting each of the ten digit-registers thereof, starting with the lowest-order digit-register and ending with the highest-order digit-register thereof. Consequently, by means of a "memory-to-instruction-register" transfer instruction, the word stored in memory is transferred into the instruction register, digit by digit, starting with the low-order digit thereof, the low-order digit being stored in digit-register (Iφ) of section-5 and the high-order digit being stored in digit-register (I9) of section-1 of the instruction register.

As previously described, and as illustrated in the block diagram of FIGS. 45A and 45B, the digit stored in a selected one of low-order digit-registers (Iφ), (I2), (I4), or (I6) is selectively stored in the low-order digit-register (Wφ) of the word-selecting register, and, simultaneously therewith, the digit stored in a selected one of high-order digit-registers (I1), (I3), (I5), or (I7) is selectively stored in the high-order digit-register (W1) of the word-selecting register. Additionally, the low-order digit of section-2 of the instruction register is selectively stored in an "R-counter," which is next to be described in detail.

(26) *R-counter*

With reference to FIG. 68, there is logically illustrated a reverse-counting counter, hereinafter termed "R-counter," which includes four interconnected flipflops 6057 through 6060. The R-counter operates essentially in the same manner as low-order digit-register (I2) of section-4 of the instruction register, previously described in detail, in that it is a single digit counter capable of counting in a binary-coded-decimal code in a reverse digital order. For example, if the R-counter is initially at a count of "nine," on each occurrence of a TRUE-to-FALSE change of state of line DR, the R-counter is effectively decremented by one decimal digit until a count of "zero" is reached. However, as no recycling of the R-counter is provided, on the next subsequent change of state of line DR the R-counter is returned to a count of binary 1111, instead of binary 1001 as in digit-register (I2). The two presets provided for the R-counter are preset line PRφ, which presets the counter to "zero" by causing the states of flipflops 6057 through 6060 to be such that each of the reference outputs thereof is FALSE (hereinafter known as setting a flipflop "FALSE"), and preset line PR8, which presets the counter to "eight" by setting flipflop 6060 TRUE and setting flipflops 6057 through 6059 FALSE.

Any single decimal digit, from "zero" to "nine," is selectively loaded into the R-counter from two different sources. For example, the digit stored in the low-order digit-register (I6) of section-2 of the instruction register is transferred into the R-counter by means of selective energization of line RLR. However, prior to loading, all four flipflops 6057 through 6050 of the R-counter are first preset FALSE by means of preset line PRφ. Thereafter, the state of each flipflop is selectively set by line RLR to correspond to the state of the corresponding flipflop in digit-register (I6) of the instruction register. Thus, if digit-register (I6) were storing the numeral "six," so that flipflops 6011 and 6012 (FIG. 57) were TRUE (flipflops 6010 and 6013 being FALSE), when the state of line RLR is rendered FALSE after being TRUE for at least twenty microseconds, both of flipflops 6058 and 6059 (FIG. 68) are simultaneously set TRUE. Therefore, it is evident that any digit from "zero" to "nine" is selectively transferred from digit-register (I6) to the R-counter.

After the R-counter has previously been preset to "zero" by line PRφ, any digit being read out of memory is selectively stored in the R-counter by effecting sequential energization of line RLM simultaneously with one of output lines B*a* through B*d* from the bit-counter (FIG. 62). Thus, the bit-counter operates as a so-called "serializer" at the input of the R-counter to effect selective setting of the states of the four flipflops therein to correspond to the four binary bits being sequentially read out of memory and corresponding to the particular memory digit to be stored in the R-counter.

The R-counter is used in various of the instructions for different purposes. For example, in a "shift" instruction, the R-counter is first loaded with the low-order digit stored in section-2 of the instruction register, which digit specifies the number of places the word in memory is to be shifted. After the entire word has been shifted one digital order, the R-counter is effectively decremented by one decimal digit by line DR and then is essentially "checked" to determine if the R-counter is at a count of "zero." In that way, the R-counter is used to serve as an indication as to the remaining number of digital orders the word is to be shifted. In a division operation, suppose that it is necessary to perform a series of subtraction operations during which eight shift operations of both the quotient and the remainder is required. In this instance, the R-counter is initially preset to a count of "eight" and thereafter decremented by one decimal digit after each shifting operation is completed, until a count of "zero" is reached. In other words, the R-counter counts downwardly from "eight" and thus keeps a record of the number of shifts remaining. In a "multiply-and-shift" instruction, the R-counter is sequentially loaded with each one of the digits of the multiplier word in memory. The R-counter then controls the number of times that the multiplicand is added into an accumulating register, and signifies when the required numbers of additions have been performed. In a "multiply-and-shift" or a "multiply-dollar-decimal" instruction, the R-counter is utilized to record the number of times that the product has been shifted, and, as a result, determines the number of shifting operations remaining to be completed.

The R-counter is capable of providing three logically-derived readout signals from output lines Rφ, R1, and R8. Among other purposes, the states of readout lines Rφ and R1 are respectively utilized during a "shift" operation to indicate when the R-counter is at a count of "zero" or "one"; the state of readout line Rφ is utilized during both multiply instructions to indicate a "zero" count of the R-counter; and readout line R8 is utilized during all multiply and divide instructions, during which time the R-counter is effectively recording the progress of the instruction as it is being carried out.

(27) *F-counter*

With reference to FIG. 72, there is logically illustrated a single-digit forward-counting counter, hereinafter termed "F-counter," which includes four electrically-interconnected flipflops 6073 through 6076. The specific mode of operation of the F-counter is essentially the same as that of the previously-described high-order digit-register (I5) of section-3 of the instruction register (FIG. 58), and, consequently, a detailed description is not deemed necessary for a full and complete understanding thereof. Like digit-register (I5), the F-counter is capable of counting from "zero" to "fifteen" and then recycling to a count of "zero."

Prior to a mathematical computation, the F-counter is generally preset to "zero" by means of a FALSE-to-TRUE change of state of preset line PFφ. Thereafter, on each successive TRUE-to-FALSE change of state of line AF, the F-counter is incremented from a "zero" count and advanced by one decimal digit for each change of state of line AF. It is to be noted, however, that selective energization of line PFφ presets the F-counter back to "zero" regardless of the count held therein. The F-counter is provided with four readout lines, Fφ, F8, F9, and F1φ, which respectively indicate a count of "zero," "eight," "nine," and "ten" thereof.

(28) *Compare F-counter and digit-counter*

With reference to the upper right-hand portion of FIG. 72, the states of output lines F*a* through F*d* and (F*a*)′ through (F*d*)′ from the F-counter are logically compared with respect to the states of output lines D*a* through D*d* and (D*a*)′ through (D*d*)′ from the digit-counter, previously described with respect to FIG. 63. Thus, the state of output line (IFD)′ is TRUE whenever the digital count of the F-counter is equal to the digital count of the digit-counter; however, the state of output line (IFD)′ is FALSE as long as there is inequality between the contents of the F-counter and the digit-counter.

(29) *"J" digit-register*

With reference to the lower right-hand portion of FIG. 71, there is logically illustrated a digit-register, hereinafter termed "J" digit-register, which includes four electrically-interconnected flipflops 6067 through 6070 collectively capable of storage of any number from binary 0000 through an including binary 1111. The "J" digit-register is selectively preset to "zero" by effecting a TRUE-to-FALSE change of state of input line PJφ. Thereafter, the states of flipflops 6067 through 6070 are selectively conditioned to collectively represent either of decimal digits "one" or "five" by effecting a TRUE-to-FALSE change of state of a corresponding one of input lines PJ1 and PJ5.

The "J" digit-register is capable of being loaded, via line JL, with any digit previously stored in any one of memory addresses φφ through 99, or addresses A or B, or, as will be seen later, with a digit magnetically read from a ledger card. However, prior to loading the "J" digit-register, each of the flipflops therein is effectively preset to "zero." Thereafter, the states of flipflops 6070, 6069, 6068, and 6067 are sequentially conditioned to respectively correspond to a different one of the four binary bits which are sequentially read from memory or the ledger card in the following manner: As illustrated in FIG. 71, output line MSA from the memory sense amplifier flipflop 6055 (FIG. 67) for addresses φφ through 99, output line ASA from the memory sense amplifier flipflop 6056 for addresses A and B (FIG. 67), and output line CSA from the ledger card sense amplifier flipflop 6144 (FIG. 85), essentially are each logically ANDED, via line JL, with each of output lines B*a* through B*d* from the bit-counter (FIG. 62). Consequently, if bit "*a*" of the digit is a binary "one," the state of the reference output of flipflop 6070 is rendered TRUE; if bit "*b*" is a binary "zero," the state of the reference output of flipflop 6069 remains FALSE, and so on.

Logically illustrated directly above flipflops 6067 through 6070 are three additional readout lines Jφ, J9, and EOW, whose individual state of energization is indicative of a particular number stored in the "J" digit register. For example, the state of output line Jφ is rendered TRUE whenever a binary 0000 is stored in the register; the state of output line J9 is rendered TRUE whenever a binary 1001 is stored therein; and a TRUE state of output line EOW is indicative of a binary 1111 being stored therein. In addition to the availability of a parallel type of read-out, the output of the "J" digit-register is also effectively serialized, in that output lines J*a* through J*d* thereof are logically ANDED with the bit-counter output lines B*a* through B*d* via logical AND gates 1432 through 1435, line J*a* being ANDED with line B*a*, line J*b* being ANDED with line B*b*, and so on. The outputs of logical AND gates 1432 through 1435 are logically ORED together and terminate at output line JS. Output line JS, for example, is logically connected as an input line to the "write-control" circuitry (FIG. 60), so that the digit in the "J" digit-register is capable of being selectively stored in any one of memory addresses φφ through 99, or addresses A or B.

(30) *Compare F-counter and "J" digit-register*

With reference to FIG. 72, a compare circuit is illustrated as comprising eight logical AND gates 1462 through 1469, which are logically ORED together and terminate at output lines IFJ and (IFJ)′. The output lines from the "J" digit-register (FIG. 71) and the output lines from the F-counter (FIG. 72) are logically connected to selected ones of AND gates 1462 through 1469 in such a manner that the value of the digit stored in the F-counter is effectively compared with the value of the digit stored in the "J" digit-register. When the two digits are of unequal magnitude, the state of output line IFJ is rendered TRUE. However, when the value of the two digits is of equal magnitude, the state of output line (IFJ)′ is rendered TRUE, indicative of equality.

(31) *"K" digit-register*

In FIG. 70 there is logically illustrated a second digit-register, hereinafter termed "K" digit-register, comprising four electrically-interconnected flipflops 6062 through 6065, which are collectively capable of storage of any number from binary 0000 through and including binary 1111. The "K" digit-register is preset to "zero" by effecting selective energization of line PKφ. Thereafter, the register is selectively preset to binary 1001 by effecting a TRUE-to-FALSE change of state of line PK9.

Like the previously-described "J" digit-register, the "K"

digit-register is capable of being loaded with any digit previously stored in any one of memory addresses ϕϕ through 99, or one of addresses A or B. However, prior to loading, the register is preset to "zero." Thereafter, the states of flipflops 6065, 6064, 6063, and 6062 are sequentially conditioned in the following manner to respectively correspond to a different one of the four binary bits which are sequentially read from memory: Output line MSA from the memory sense amplifier flipflop 6055 for addresses ϕϕ through 99 (FIG. 67) and output line ASA from the memory sense amplifier flipflop 6056 for addresses A and B (FIG. 67) are each essentially logically ANDED, via line KL, with each of the output lines B*a* through B*d* from the bit-counter (FIG. 62). Consequently, if bit "*a*" of the digit just read out is a binary "one," the state of the reference output of flipflop 6065 is rendered TRUE by a change of state of the flipflop; if bit "*b*" is a binary "zero," the state of the reference output of flipflop 6064 remains FALSE, and so on.

Logically illustrated directly above flipflops 6062 through 6065 is an additional readout line Kϕ, whose TRUE state is indicative of binary 0000 being stored in the "K" digit-register. In addition to the availability of a parallel type of read-out, the output of the "K" digit-register is also effectively serialized, in that output lines K*a* through K*d* thereof are each logically ANDED with a corresponding one of bit-counter output lines B*a* through B*d*, via logical AND gates 1393 through 1396, line K*a* being ANDED with line B*a*, line K*b* with B*b*, etc. The outputs of AND gates 1393 through 1396 are logically ORED together and terminate in output line KS, which, in turn, is logically connected as an input line to the "write-control" circuitry (FIG. 60) in such a manner that the digit stored in the "K" digit-register is permitted to be selectively stored in any preselected one of the memory addresses.

(32) *Adder-subtracter*

Before proceeding with a detailed description of the adder-subtracter portion of the computer logically illustrated in FIGS. 53 and 54, a brief description will first be given, setting forth the various salient operations which are sequentially executed in the performance of a simple addition and subtraction mathematical computation; such a description is deemed desirable in expediting and assuring a clear understanding of the various principles involved in the construction and mode of operation of the adder-subtracter unit.

Preceding an "add" instruction (ADD–08), for example, both the addend and augend data words are first stored in memory. To begin the "add" instruction, one of the data words is transferred to address-A, with the second data word remaining in one of memory addresses ϕϕ through 99. Thereafter, the low-order decimal digit of the word in address-A is read out and stored in the "J" digit-register via line ASA, as illustrated in the block diagram of FIG. 45. Simultaneously therewith, the low-order decimal digit of the word remaining in memory is read out and stored in the "K" digit-register via line MSA. The output lines from the "J" and "K" digit-registers are connected as input lines to the adder-subtracter unit in a manner such that the two decimal digits stored therein are effectively added together by the adder-subtracter unit, so that, if the sum is equal to "nine" or less, a "sum" digit and a zero "carry" digit are derived therein. However, if the sum is greater than "nine," a "sum" digit and a "carry" one digit are derived.

Following the addition of the two low-order digits, the sum digit is stored in the low-order digital position of address-A, and the carry digit is stored in a carry flipflop. Next, the second-order digit of the word in address-A is stored in the "J" digit-register, and, simultaneously therewith, the second-order digit of the word remaining in memory is stored in the "K" digit-register. Thereafter, both digits are, in a sense, simultaneously transferred to the adder-subtracter unit, wherein they are added together with the carry digit previously stored in the carry flipflop. If the sum of the two second-order digits plus the carry digit is greater than "nine," a sum digit is obtained and stored in the second-order digital position of address-A, and a carry "one" digit is obtained and stored in the carry flipflop. This sequence of operations is repeated for each digital order of the words until each digit of one of the data words is added to the corresponding digit of the other data word. Following the addition, the sum thereof is located in address-A, Consequently, the final step in the "add" instruction is to store the sum data word in the particular address in memory as previously specified.

A "subtract" instruction (SUB–09) is carried out in essentially the same manner, with the exception that the data word remaining in memory is subtracted from the data word in address-A, rather than being added thereto. More specifically, the first step to be carried out for a "subtract" instruction is to transfer to address-A the minuend which is previously stored in one of memory addresses ϕϕ through 99. As before, the first-order digit of the word in address-A is stored in the "J" digit-register, and, simultaneously therewith, the first-order digit of the data word remaining in memory is stored in the "K" digit-register. Thereafter, the digit in the "K" digit-register is subtracted from the digit in the "J" digit-register, a difference digit is derived therefrom and stored in the low-order digital position of address-A, and the carry digit derived therefrom is stored in the carry flipflop, as before.

Due to the fact that there is no "borrowing" of digits in the present type of computation, the carry digit is added to the next higher-order digit stored in the "K" digit-register rather than being subtracted from the corresponding next higher-order digit in the "J" digit-register. In other words, any carry "one" digit effectively increments the next succeeding digit in the "K" digit-register rather than decrementing the next succeeding digit in the "J" digit-register.

The just-described subtraction operation is sequentially repeated for each of the next successively higher-order digits until the remainder derived from the subtraction operation is in address-A. As in the "add" instruction, the final step in the "subtract" instruction is to copy the remainder data word into the particular address in memory, as previously specified.

From the foregoing, it is evident that the adder-subtracter unit is capable of adding two decimal digits and a carry digit, either "zero" or "one," and to obtain therefrom a decimal sum digit and a new decimal carry digit. The adder-subtracter is also capable of subtracting one decimal digit, plus a carry digit of either "zero" or "one," from a second decimal digit and of obtaining therefrom a decimal remainder digit and a new decimal carry digit.

Essentially, the adder-subtracter unit is an "adder" and a "subtracter" combined into one circuit-sharing unit, the adder portion being selectively capable of individually performing the necessary arithmetic computation whenever an addition operation is required, and the subtracter portion being selectively capable of individually performing the necessary arithmetic computation whenever a subtraction operation is required.

As previously mentioned, the adder-subtracter unit is capable of sequentially performing an addition operation with respect to two binary-coded decimal digits and a decimal carry digit of "0" to "1" magnitude. The magnitude of the sum, derived from such an addition operation, may be as large as "19" (binary 10011). For example, if the digit "9" is added to the digit "9" plus a carry of "1," the sum thereof is "19." Consequently, upon completion of each addition operation, the binary form of the sum is essentially "checked" to determine if the magnitude thereof is equal to decimal "10" or more. If the sum has a magnitude of decimal "10" or more, the amount binary 1010 is effectively subtracted therefrom to obtain a binary-coded sum digit, plus a decimal "1" carry digit. However, if the sum is less than decimal "10," the single sum digit represents the actual sum, and, thus, a carry "0" digit is generated.

In order to add the four binary bits of a digit to the four binary bits of a second digit, corresponding bits of each digit are added together with the previous carry bit, and the carry bit derived from such addition is added to the next successively high-order bit of that particular digital group. The carry bit resulting from the highest-order bit addition of that digital group is added to the low-order bit of the next succeeding digital group. The example, suppose that the digit "5" (binary 0101) is to be added to the digit "4" (binary 0100), the rules for binary addition, of course, being: binary "0" plus binary "0" equals binary "0"; binary "1" plus binary "0" equals binary "1"; binary "0" plus binary "1" equals binary "1"; and binary "1" plus binary "1" equals binary "0" plus a binary "1" carry. Applying the just-mentioned rules for binary addition, binary 0101 plus binary 0100 equals binary 1001, or "9." By the same token, the decimal digit "5" plus the decimal digit "5" equals binary 1010. However, if decimal "10" (binary 1010) is subtracted therefrom, "5" plus "5" also equals binary 0000 plus a binary "1" carry.

Listed below, in "truth-table" form, are representations of input bits "*a*" through "*d*" for each of the digits previously stored in the "J" and "K" digit-registers, together with the carry bit, and the desired output bit for each additive combination thereof, TRUE being denoted by "1" and FALSE being denoted by "0," as before. In this instance, "J*a*" and "K*a*" are representative of the "*a*" bits of the digits in "J" and "K" digit-registers, respectively; "J*b*" and "K*b*" are representative of the "*b*" bits; "J*c*" and "K*c*" are representative of the "*c*" bits; and "J*d*" and "K*d*" are, respectively, representative of the "*d*" bits of the digits in the "J" and "K" digit-registers. "AN*a*" is representative of the binary sum of the "*a*" bits plus the previous digit carry; "PCI" is representative of the previous digit carry; "*pc*" is representative of the bit carry derived from the binary sum of the "*a*" bits plus the previous *t* digit carry; "*q*" is representative of the binary sum of the "*b*" bits plus the previous bit carry; "*qc*" is representative of the bit carry derived from the binary sum of the "*b*" bits plus the previous carry bit; "*r*" is representative of the binary sum of the "*c*" bits plus the previous carry bit; "*rc*" is representative of the bit carry derived from the binary sum of the "*c*" bits plus the previous carry bit; "*s*" is representative of the binary sum of the "*d*" bits plus the previous carry bit; and "*t*" is representative of the bit carry derived from the binary sum of the "*d*" bits plus the previous carry bit.

| (*a*) Bit Addition | | | | | (*b*) Bit Addition | | | | | (*c*) Bit Addition | | | | | (*d*) Bit Addition | | | | |
|---|---|---|---|---|---|---|---|---|---|---|---|---|---|---|---|---|---|---|---|
| Input | | | Output | | Input | | | Output | | Input | | | Output | | Input | | | Output | |
| J*a* | K*a* | PCI | AN*a* | *pc* | J*b* | K*b* | *pc* | *q* | *qc* | J*c* | K*c* | *qc* | *r* | *rc* | J*d* | K*d* | *rc* | *s* | *t* |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 0 | 1 | 0 | 0 | 1 | 0 | 1 | 0 | 0 | 1 | 0 | 1 | 0 | 0 | 1 | 0 | 1 | 0 |
| 1 | 0 | 0 | 1 | 0 | 1 | 0 | 0 | 1 | 0 | 1 | 0 | 0 | 1 | 0 | 1 | 0 | 0 | 1 | 0 |
| 1 | 1 | 0 | 0 | 1 | 0 | 0 | 1 | 1 | 0 | 1 | 1 | 0 | 0 | 1 | 0 | 0 | 1 | 1 | 0 |
| 0 | 0 | 1 | 1 | 0 | 1 | 1 | 0 | 0 | 1 | 0 | 0 | 1 | 1 | 0 | 1 | 1 | 0 | 0 | 1 |
| 0 | 1 | 1 | 0 | 1 | 0 | 1 | 1 | 0 | 1 | 0 | 1 | 1 | 0 | 1 | 0 | 1 | 1 | 0 | 1 |
| 1 | 0 | 1 | 0 | 1 | 1 | 0 | 1 | 0 | 1 | 1 | 0 | 1 | 0 | 1 | 1 | 0 | 1 | 0 | 1 |
| 1 | 1 | 1 | 1 | 1 | 1 | 1 | 1 | 1 | 1 | 1 | 1 | 1 | 1 | 1 | 1 | 1 | 1 | 1 | 1 |

Reducing the above truth tables to the "canonical" form of the logical equations thereof in a well-known manner:

(1) $ANa=(Ja)'Ka(PCI)'+Ja(Ka)'(PCI)'+(Ja)'(Ka)'PCI+JaKaPCI$ (2) $pc=JaKa(PCI)'+(Ja)'KaPCI+Ja(Ka)'PCI+JaKaPCI$ (3) $q=(Jb)'Kb(pc)'+Jb(Kb)'(pc)'+(Jb)'(Kb)'pc+JbKbpc$ (4) $qc=JbKb(pc)'+(Jb)'Kbpc+Jb(Kb)'pc+JbKbpc$ (5) $r=(Jc)'Kc(qc)'+Jc(Kc)'(qc)'+(Jc)'(Kc)'qc+JcKcqc$ (6) $rc=JcKc(qc)'+(Jc)'Kcqc+Jc(Kc)'qc+JcKcqc$ (7) $s=(Jd)'Kd(rc)'+Jd(Kd)'(rc)'+(Jd)'(Kd)'rc+JdKdrc$ (8) $t=JdKd(rc)'+(Jd)'Kdrc+Jd(Kd)'rc+JdKdrc$ Listed below, in "truth table" form, are input bit representations of the sum of the two digits at present stored in the "J" and "K" digit-registers and the carry derived from the previous addition. Also listed are the desired binary coded decimal output plus any output carry, where "AN*a*" through "AN*d*" represent the binary coded output of the sum, and "EAS" represents the decimal carry digit:

| Decimal Numbers | Binary Code of Decimal Numbers (0–19) Decoder Inputs | | | | | Binary Code of Decimal Numbers (0–19) with Decimal Carry Decoder Outputs | | | | |
|---|---|---|---|---|---|---|---|---|---|---|
| | *t* | *s* | *r* | *q* | AN*a* | AN*d* | AN*c* | AN*b* | AN*a* | EAS |
| 0 | 0 | 0 | 0 | 0 | 0 | 0 | 0 | 0 | 0 | 0 |
| 1 | 0 | 0 | 0 | 0 | 1 | 0 | 0 | 0 | 1 | 0 |
| 2 | 0 | 0 | 0 | 1 | 0 | 0 | 0 | 1 | 0 | 0 |
| 3 | 0 | 0 | 0 | 1 | 1 | 0 | 0 | 1 | 1 | 0 |
| 4 | 0 | 0 | 1 | 0 | 0 | 0 | 1 | 0 | 0 | 0 |
| 5 | 0 | 0 | 1 | 0 | 1 | 0 | 1 | 0 | 1 | 0 |
| 6 | 0 | 0 | 1 | 1 | 0 | 0 | 1 | 1 | 0 | 0 |
| 7 | 0 | 0 | 1 | 1 | 1 | 0 | 1 | 1 | 1 | 0 |
| 8 | 0 | 1 | 0 | 0 | 0 | 1 | 0 | 0 | 0 | 0 |
| 9 | 0 | 1 | 0 | 0 | 1 | 1 | 0 | 0 | 1 | 0 |
| 10 | 0 | 1 | 0 | 1 | 0 | 0 | 0 | 0 | 0 | 1 |
| 11 | 0 | 1 | 0 | 1 | 1 | 0 | 0 | 0 | 1 | 1 |
| 12 | 0 | 1 | 1 | 0 | 0 | 0 | 0 | 1 | 0 | 1 |
| 13 | 0 | 1 | 1 | 0 | 1 | 0 | 0 | 1 | 1 | 1 |
| 14 | 0 | 1 | 1 | 1 | 0 | 0 | 1 | 0 | 0 | 1 |
| 15 | 0 | 1 | 1 | 1 | 1 | 0 | 1 | 0 | 1 | 1 |
| 16 | 1 | 0 | 0 | 0 | 0 | 0 | 1 | 1 | 0 | 1 |
| 17 | 1 | 0 | 0 | 0 | 1 | 0 | 1 | 1 | 1 | 1 |
| 18 | 1 | 0 | 0 | 1 | 0 | 1 | 0 | 0 | 0 | 1 |
| 19 | 1 | 0 | 0 | 1 | 1 | 1 | 0 | 0 | 1 | 1 |

Reducing the above truth table to the "canonical" form of the logical equations thereof, and thereafter simplifying, it is seen that:

(9) $ANa=(Ja)'Ka(PCI)'+Ja(Ka)'(PCI)'+(Ja)'(Ka)'PCI+JaKaPCI$

(10) $ANb=q(EAS)'+q'EAS$

(11) $Anc=r(EAS)'+qrs+tq$

(12) $ANd=s(EAS)'+tq$

(13) $EAS=sq+sr+t$

As previously mentioned, the subtracter portion of the adder-subtracter is utilized to perform a subtraction arithmetic operation of two binary-coded decimal data digits and a carry digit, and obtain therefrom a binary remainder digit plus a carry digit. As long as the minuend data digit is larger than or equal to the subtrahend data digit plus the previous carry digit, the value of the remainder digit is between binary 0000 and binary 1001 with no carry digit output. However, should the minuend be less than the subtrahend plus the previous carry, the value of the remainder digit will be between binary 0111 and binary 1111 plus an output carry digit. Therefore, in order to obtain the decimal remainder digit, the binary remainder is subtracted from binary 10000, commonly termed "taking the sixteens complement and ignoring the carries beyond the four low-order bits."

Using the laws of binary subtraction, whereby binary "0" subtracted from binary "0" results in a remainder of binary "0," binary "0" subtracted from binary "1" results in a remainder of binary "1," binary "1" subtracted from binary "1" results in a remainder of binary "0," and binary "1" subtracted from binary "0" results in a remainder of binary "1" plus binary "1" carry, suppose that the decimal digit "5" (binary 0101) is subtracted from decimal digit "9" (binary 1001). In this instance, the remainder is binary 0100 or "4" with no carry. However, decimal digit "8" (binary 1000) subtracted from decimal digit "3" (0011) results in a binary remainder of 1011. Thus, to obtain the decimal remainder digit, the binary remainder of 1011 is subtracted from binary 10000, resulting in a new binary remainder of 0101, representative of the decimal digit "3," and a carry of "1," denoting a negative remainder.

Listed below, in truth table form, are representations of input bits "*a*" through "*d*" for each of the digits stored in the "J" and "K" digit-registers, together with the carry bit and the desired output bit for each combination thereof. As before, "J*a*" and "K*a*" are representative of the "*a*" bits of the digit stored in the "J" and "K" digit-registers, respectively; "J*b*" and "K*b*" are representations of the "*b*" bits; "J*c*" and "K*c*" are representative of the "*c*" bits; and "J*d*" and "K*d*" are representative of the "*d*" bits of the digits respectively stored in the "J" and "K" digit-registers. However, in this instance, "AN*a*" is representative of the remainder obtained from a subtraction of the "*a*" bits; "PCI" is representative of the previous bit-carry; "*pc*" is representative of the bit-carry derived from subtraction of the "*a*" bits; "*q*" is representative of the remainder derived from subtraction of the "*b*" bits; "*qc*" is representative of the bit-carry derived from the "*b*" bit subtraction; "*r*" is representative of the remainder derived from "*c*" bit subtraction; "*rc*" is representative of the bit-carry derived from "*c*" bit subtraction; "*s*" is representative of the remainder derived from "*d*" bit subtraction; and "*t*" is representative of the bit-carry derived from "*d*" bit subtraction.

(20) $s=(Jd)'Kd(rc)'+Jd(Kd)'(rc)'+(Jd)'(Kd)'rc+JdKdrc$

(21) $t=(Jd)'Kd(rc)'+(Jd)'(Kd)'rc+(Jd)'Kdrc+JdKdrc$

Listed below, in truth table form, are input bit representations of the remainder plus carry which are obtained from subtracting the digit stored in the "K" digit-register from the digit stored in the "J" digit-register. Also listed are the desired binary coded decimal output plus any output carry, where "AN*a*" through "AN*d*" collectively represent, in this instance, the binary coded output of the remainder, and "EAS" represents the decimal carry digit obtained from the subtraction operation.

| Decimal Digits | Binary Code of Decimal Numbers "9" through "−10" — Inputs | | | | | Binary Code of Decimal Numbers "9" through "−10" with Decimal Carry — Outputs | | | | |
|---|---|---|---|---|---|---|---|---|---|---|
| | *t* | *s* | *r* | *q* | AN*a* | AN*d* | AN*c* | AN*b* | AN*a* | EAS |
| 9 | 0 | 1 | 0 | 0 | 1 | 1 | 0 | 0 | 1 | 0 |
| 8 | 0 | 1 | 0 | 0 | 1 | 1 | 0 | 0 | 0 | 0 |
| 7 | 0 | 0 | 1 | 1 | 1 | 0 | 1 | 1 | 1 | 0 |
| 6 | 0 | 0 | 1 | 1 | 0 | 0 | 1 | 1 | 0 | 0 |
| 5 | 0 | 0 | 1 | 0 | 1 | 0 | 1 | 0 | 1 | 0 |
| 4 | 0 | 0 | 1 | 0 | 0 | 0 | 1 | 0 | 0 | 0 |
| 3 | 0 | 0 | 0 | 1 | 1 | 0 | 0 | 1 | 1 | 0 |
| 2 | 0 | 0 | 0 | 1 | 0 | 0 | 0 | 1 | 0 | 0 |
| 1 | 0 | 0 | 0 | 0 | 1 | 0 | 0 | 0 | 1 | 0 |
| 0 | 0 | 0 | 0 | 0 | 0 | 0 | 0 | 0 | 0 | 0 |
| −1 | 1 | 1 | 1 | 1 | 1 | 1 | 0 | 0 | 1 | 1 |
| −2 | 1 | 1 | 1 | 1 | 0 | 1 | 0 | 0 | 0 | 1 |
| −3 | 1 | 1 | 1 | 0 | 1 | 0 | 1 | 1 | 1 | 1 |
| −4 | 1 | 1 | 1 | 0 | 0 | 0 | 1 | 1 | 0 | 1 |
| −5 | 1 | 1 | 0 | 1 | 1 | 0 | 1 | 0 | 1 | 1 |
| −6 | 1 | 1 | 0 | 1 | 0 | 0 | 1 | 0 | 0 | 1 |
| −7 | 1 | 1 | 0 | 0 | 1 | 0 | 0 | 1 | 1 | 1 |
| −8 | 1 | 1 | 0 | 0 | 0 | 0 | 0 | 1 | 0 | 1 |
| −9 | 1 | 0 | 1 | 1 | 1 | 0 | 0 | 0 | 1 | 1 |
| −10 | 1 | 0 | 1 | 1 | 0 | 0 | 0 | 0 | 0 | 1 |

Reducing the above truth table to the canonical form of the logical equations thereof and then simplifying to remove redundancies therein, the four bit line and decimal carry representations of the decimal difference are:

(22) $ANa=(Ja)'Ka(PCI)'+Ja(Ka)'(PCI)'+(Ja)'(Ka)'PCI+JaKaPCI$

(23) $ANb=qt'+q't$ or $q(EAS)'+q'EAS$

(24) $ANc=rt'+t(rq'+r'q)$

(25) $ANd=st'+qrs$

(26) $EAS=t$

| (*a*) Bit Subtraction | | | | | (*b*) Bit Subtraction | | | | | (*c*) Bit Subtraction | | | | | (*d*) Bit Subtraction | | | | |
|---|---|---|---|---|---|---|---|---|---|---|---|---|---|---|---|---|---|---|---|
| Inputs | | | Outputs | | Inputs | | | Outputs | | Inputs | | | Outputs | | Inputs | | | Outputs | |
| J*a* | K*a* | PCI | AN*a* | pc | J*b* | K*b* | pc | *q* | *qc* | J*c* | K*c* | *qc* | *r* | *rc* | J*d* | K*d* | *rc* | *s* | *t* |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 0 | 1 | 1 | 0 | 1 | 0 | 1 | 1 | 0 | 1 | 0 | 1 | 1 | 0 | 1 | 0 | 1 | 1 |
| 1 | 0 | 0 | 1 | 0 | 1 | 0 | 0 | 1 | 0 | 1 | 0 | 0 | 1 | 0 | 1 | 0 | 0 | 1 | 0 |
| 1 | 1 | 0 | 0 | 0 | 1 | 1 | 0 | 0 | 0 | 1 | 1 | 0 | 0 | 0 | 1 | 1 | 0 | 0 | 0 |
| 0 | 0 | 1 | 1 | 1 | 0 | 0 | 1 | 1 | 1 | 0 | 0 | 1 | 1 | 1 | 0 | 0 | 1 | 1 | 1 |
| 0 | 1 | 1 | 0 | 1 | 0 | 1 | 1 | 0 | 1 | 0 | 1 | 1 | 0 | 1 | 0 | 1 | 1 | 0 | 1 |
| 1 | 0 | 1 | 0 | 0 | 1 | 0 | 1 | 0 | 0 | 1 | 0 | 1 | 0 | 0 | 1 | 0 | 1 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 |

Reducing the above truth tables to the canonical form of the logical equations thereof:

(14) $ANa=(Ja)'Ka(PCI)'+Ja(Ka)'(Pci)'+(Ja)'(Ka)'PCI+JaKaPCI$

(15) $pc=(Ja)'Ka(PCI)+(Ja)'(Ka)'PCI+(Ja)'KaPCI+JaKaPCI$

(16) $q=(Jb)'Kb(pc)'+Jb(Kb)'(pc)'+(Jb)'(Kb)'pc+JbKbpc$

(17) $qc=(Jb)'Kb(pc)'+(Jb)'(Kb)'pc+(Jb)'Kbpc+JbKbpc$

(18) $r=(Jc)'Kc(qc)'+Jc(Kc)'(qc)'+(Jc)'(Kc)'qc+JcKcqc$

(19) $rc=(Jc)'Kc(qc)'+(Jc)'(Kc)'qc+(Jc)'Kcqc+JcKcqc$

Having essentially derived the logical equations for an adder and a subtracter separately, the next step is to logically combine the two sets of equations thereof and obtain therefrom a circuit sharing adder-substracter unit that is capable of performing an addition mathematical operation when the state of line (SAS)′ is TRUE, and, additionally, is capable of performing a subtraction mathematical operation when line SAS is TRUE.

By comparing the previously-derived non-simplified forms of the logical equations for lines "AN*a*," "*q*," "*r*," and "*s*" for an addition operation (Equations 1, 3, 5, and 7) with (Equations 14, 16, 18, and 20) for a subtraction operation, it is observed that the logical equation for each line is the same in each instance. Thus, whether the adder-subtracter unit is to carry out an addition or a subtraction operation, the sum and the difference digits in the binary answer are also the same in each instance. By comparing the logical equation for line "*pc*" for an addition and a subtraction operation (Equations 2 and 15), it is observed that two terms "$(Ja)'\ Ka\ PCI$" and "$Ja\ Ka\ PCI$" in each equation are identical in each operation and the remaining terms thereof are different, the two like terms obviously being reducible to the simplified term "$Ka\ PCI$." Hence, the logical equation for output line "*pc*" for either an addition or a subtraction mathematical operation is:

$$(27)\quad pc=KaPCI+(Ja)'Ka(PCI)'SAS+(Ja)'(Ka)'PCISAS+JaKa(PCI)'(SAS)'+Ja(Ka)'PCI(SAS)'$$

The logical equations for output lines "*qc*," "*rc*," "*s*," and "*t*," likewise modified in the same manner, are as given below, where:

$$(28)\quad qc=Kbpc+(Jb)'Kb(pc)'SAS+(Jb)'(Kb)'pcSAS+JbKb(pc)'(SAS)'+Jb(Kb)'pc(SAS)'$$

$$(29)\quad rc=Kcqc+(Jc)'Kc(qc)'SAS+(Jc)'(Kc)'qcSAS+JcKc(qc)'(SAS)'+Jc(Kc)'qc(SAS)'$$

$$(30)\quad t=Kdrc+(Jd)'Kd(rc)'SAS+(Jd)'(Kd)'rcSAS+JdKd(rc)'(SAS)'$$

By likewise combining the logical equations for "AN*a*" through "AN*d*" and "EAS" for both an addition operation (Equations 9 through 13) and a subtraction mathematical operation (Equations 22 through 26), it is seen that the combined logical equation for each output line is:

$$(31)\quad EAS=sq+sr+t$$

$$(32)\quad ANa=(Ja)'Ka(PCI)'+Ja(Ka)'(PCI)'+(Ja)'(Ka)'PCI+JaKaPCI$$

$$(33)\quad ANb=q(EAS)'+q'EAS$$

$$(34)\quad ANc=r(EAS)'+trq'SAS+tr'qSAS+qrs(SAS)'+tq'(SAS)$$

$$(35)\quad ANd=s(EAS)'+qrsSAS+tq(SAS)'$$

Therefore, with reference to the logical diagrams of the adder-subtracter unit as illustrated in FIGS. 53 and 54, it is seen that the above-stated logical equations numbered 27 through 35 are satisfied thereby and thus correspond to the circuit configuration thereof.

As an illustrative example of an addition and a subtraction operation being carried out by the just-described adder-subtracter arithmetic unit, suppose that the first-order digit of the addend word located in memory address φφ is a "nine," and the first-order digit of the augend word in address φ1 is a "seven."

To begin an "add" instruction, as previously mentioned, the augend word is first read out of memory address φ1 and stored in address-A. Thereafter, the low-order digit of the augend is sequentially read out of address-A, bit by bit, starting with the low-order binary bit "*a*" thereof, and is sequentially stored, bit by bit, in the "J" digit-register (FIG. 71) via lines ASA and JL. Simultaneously therewith, the addend is sequentially read out of address φφ, bit by bit, starting with the low-order binary bit "*a*" thereof, and is sequentially stored, bit by bit, in the "K" digit-register (FIG. 70) via lines MSA and KL. As the assumed value of the decimal digit stored in the "J" digit-register (FIG. 71) is a "seven" (binary 0111), the state of output line J*d* is FALSE, whereas the states of output lines J*a* through J*c* are each TRUE, the prime output lines of flipflops 6067 through 6070, of course, being of opposite states from the corresponding reference output lines thereof, as previously described. As the assumed value of the decimal digit stored in the "K" digit-register (FIG. 70) is a "nine" (binary 1001), the states of output lines K*d* and K*a* thereof are TRUE, whereas the states of output lines K*b* and K*c* are FALSE.

Reference is now made to that portion of the adder-subtracter unit logically shown in FIG. 54, in addition to periodic reference to the simplified block diagram of the adder-subtracter shown in FIG. 45C. As the low-order bit of the digit stored in each of the "J" and "K" digit-registers is a binary "1," output lines J*a* and K*a* are both TRUE, as just mentioned. Also, as the previous decimal carry is a "0" in this instance, the state of line (PCI)′ is TRUE, and, as an "add" operation is to be carried out, the state of line (SAS)′ is previously rendered TRUE. Therefore, as none of AND gates 956 through 959 have all of the inputs thereto simultaneously TRUE, the state of output line AN*a* is FALSE, indicative of binary "0." Consequently, the sum of the "*a*" bits of the first-order digits in the "J" and "K" digit-registers is "0."

With reference to the "*a*" bit carry circuitry shown in FIG. 53, as the states of lines J*a* K*a*, (PCI)′, and (SAS)′ and TRUE (as previously stated, the states of all of the inputs to AND gate 901 are simultaneously TRUE. Consequently, the state of output line *pc* is TRUE, indicative of a binary "1" carry resulting from addition of the "*a*" bits.

As the "b" bit in the "J" digit-register is a binary "1" and the "*b*" bit in the "K" digit-register is a binary "0," the state of line J*b* is TRUE and the state of line K*b* is FALSE, as previously noted. As none of AND gates 911 through 914 have all of the inputs thereto simultaneously TRUE, the state of output line *q* is FALSE, indicative of binary "0"; consequently, the sum of the "*b*" bits plus the "*a*" bit carry is "0." However, as the states of all of lines J*b*, (K*b*)′, *pc*, and (SAS)′ are TRUE, the states of the inputs to AND gate 917 are simultaneously TRUE. As a result, the state of output line *qc* is TRUE, indicative of a binary "1" carry resulting from addition of the "*b*" bits plus the "*a*" bit carry.

The "*c*" bit in the "J" digit-register being a binary "1" and the "*c*" bit in the "K" digit-register being a binary "0," the state of line J*c* is TRUE and the state of line K*c* is FALSE. As none of AND gates 920 through 923 have all of the inputs thereto simultaneously TRUE, the state of output line *r* is FALSE; consequently, the sum of the "*c*" bits plus the "*b*" bit carry is "0."

As the respective states of lines J*c*, (K*c*)′, *qc*, and (SAS)′ are each TRUE, all of the inputs to AND gate 926 are simultaneously TRUE. Consequently, the state of output line *rc* is TRUE, indicative of a binary "1" carry resulting from addition of the "*c*" bits and the "*b*" bit carry.

The high-order or "*d*" bit in the "*j*" digit-register being a binary "0" and the "*d*" bit in the "K" digit-register being a binary "1," the state of line J*d* is FALSE and the state of line K*d* is TRUE. With reference back to FIG. 54, as none of AND gates 934 through 937 have all of the inputs thereto simultaneously TRUE, the state of output line *s* is FALSE, thus indicating that the sum of the "*d*" bits plus the "*c*" bit carry is a binary "0."

Finally, as the states of both of lines K*d* and *rc* are TRUE, all of the inputs to AND gate 929 are simultaneously TRUE. As a result, the state of output line *t* is TRUE, thus indicating a binary "1" carry resulting from addition of the "*d*" bits plus the "*c*" bit carry.

Therefore, as the state of output line *t* is TRUE and the state of each of output lines *s*, *r*, *q*, and AN*a* is FALSE, the sum of the digit "7" (binary 0111) and the digit "9" (binary 1001) is therefore indicated as being "16," or binary 10000. The binary sum—i.e., 10000—is converted to a binary-coded-decimal form in the following manner: As the state of the single input to AND gate 948 (FIG. 54) is TRUE, the state of output line EAS is TRUE, thus indicative of a decimal "1" carry. Therefore, as the state of each of lines EAS and $(q)'$ is TRUE, the state of output line AN*b* is likewise TRUE, thus indicating that the value of the "*b*" bit of the sum digit is a binary "1." As the state of each of lines $(q)'$, *t*, and (SAS)' is TRUE, all the inputs to AND gate 942 are TRUE, thus rendering output line AN*c* TRUE and thereby indicating that the value of the "*c*" bit of the sum digit is a binary "1." As none of AND gates 945 through 947 have all of the inputs thereto simultaneously TRUE, the state of line AN*d* is FALSE and thereby indicates that the high-order bit "*d*" of the sum digit is a binary "0."

It is now evident that, upon completion of the just-described addition operation of the two decimal digits "7" and "9," the state of output line AN*a* is FALSE, the state of output line AN*b* is TRUE, the state of output line AN*c* is TRUE, and the state o foutput line AN*d* is FALSE. Thus, the states of output lines AN*a* through AN*d* collectively represent the sum digit "6" (binary 0110). As the state of output line EAS is simultaneously TRUE, as before stated, its state is indicative of the decimal "1" carry digit.

Following the just-described addition operation of the two first-order digits taken from the data words stored in address φφ and address A, there is derived thereby a sum digit which is written in the low-order digit position of address-A and a decimal "1" carry digit which is stored in carry flip-flop 6000 (FIG. 53) via line EAS. Thereafter, the second-order digit of the word in address φφ is transferred to the "K" digit-register, and the second-order digit of the word in address-A is transferred to the "J" digit-register. As the output lines from the "J" and "K" digit-registers are connected as input lines to the adder-subtracter unit, as previously described, the two second-order digits are simultaneously "presented" to the adder-subtracter unit, wherein they are added together, along with the decimal "1" carry in flip-flop 6000, in exactly the same manner as just described with respect to the first-order digits of the two data words. The above sequence of operations is sequentially repeated for each higher-order digit until the tenth-order decimal digits have been added and the sum digit stored in the tenth-order digital position of address-A. As previously mentioned, the final step of an "add" instruction is to effect the copying of the sum data word from address-A into the particular memory address as previously specified.

A "subtract" instruction is carried out in essentially the same manner as the just-described "addition" operation, with the exception that prior thereto, the state of line (SAS)', originating in FIG. 53, is selectively rendered TRUE, the state of line SAS, of course, being simultaneously rendered FALSE. Consequently, in the previous example, the adder-subtracter unit now effectively subtracts the word in address φφ from the word in address-A, after which the difference word is transferred from address-A to a particular address in memory as specified.

As the mode of operation of the adder-subtracter unit in carrying out an addition or a subtraction mathematical operation is essentially the same in both instances, in light of the just-described detailed mode of operation with respect to an addition operation, a further detailed mode of operation thereof with respect to a subtraction operation is not deemed necessary in order to insure a full and complete understanding and appreciation of the adder-subtracter portion of the instant computer.

(33) *Control counter generally*

With reference to the upper left-hand portion of FIG. 45A, there is diagrammatically illustrated a "control counter" comprising a multitude of flip-flops and a maze of other electronic control circuitry. As will become more obvious hereinafter, the control counter portion of the computer functions in many ways as a central regulatory means which electronically controls the proper sequence of all data handling and transfer within the computer, and, additionally, controls all communication between the control portion of the computer and the various input-output equipment utilized by the computer. Consequently, due to the inherent complex functional nature of the control counter, it is not readily susceptible of being described as a separate entity as such.

As an example of the foregoing, the first step to be carried out in the execution of each instruction is to read out from memory the next instruction word in the program and store the instruction word in the instruction register. After the instruction word is stored in the instruction register, the two decimal digits stored in section-1 thereof are "examined" to determine the particular type of instruction, or sequence of operations, to be carried out next. For example, as previously described, if the two-digit decimal number in section-1 is an "eleven," an "add-pairs-of-numbers" instruction is carried out, and all data thereafter transferred between data-handling sections of the computer is in accordance with a particular pattern dictated by this instruction.

Each instruction concludes by effecting the storage in the word-selecting register, the address in memory of the next instruction word; the memory address usually is specified in section-5 of the present instruction word, also as previously described. After the address of the next instruction word is stored in the word-selecting register, the computer may immediately read out the next instruction word from memory, or may pause for a predetermined period of time before reading out the instruction. Whether or not the computer immediately proceeds to carry out the next instruction in the program depends upon the particular mode of operation preselected by the operator. If the computer is operating in an "automatic" mode, the next instruction in the program is immediately carried out upon completion of each preceding instruction. However, if the computer is operating in a "manual" mode, all computation stops upon completion of each instruction and is not resumed until either the manual or the automatic-resume-program push-button is depressed. Thereafter, the next instruction word, as specified by the word-selection register, is stored in the instruction register, the two decimal digits in section-1 of the instruction register are examined to determine the particular instruction to be carried out, and the computer then proceeds to carry out that particular instruction.

(34) *Detailed description of POW instructions*

A single POW instruction effects the sequential printing-out of from one to one hundred words which were previously stored in sequentially numbered addresses in memory and may be considered as comprising four distinct phases or groups of subinstructions.

During the first phase, the computer, in a sense, ascertains whether or not depression of a motor bar is capable of initiating a cycle of operation of the accounting machine. As previously described, prior to the machine cycle, each of the ten amount racks is physically located at "home" position, which position corresponds to a digital value of "0." Thus, the selected word in memory is read out and examined digit by digit, starting with the low-order digit thereof, to determine those digits of the word having a value of "0." Simultaneously therewith, the rack-stopping solenoids corresponding to the digital positions of those digits of the word having a value of "0" are energized to prevent any movement of the associated amount racks when a machine cycle is subsequently initiated. Thereafter, the state of a particular sign memory flipflop is selectively conditioned to correspond to the algebraic sign of the word to be printed out. If the algebraic sign of the word to be printed out is negative, credit balance key CR. BAL. (FIG. 2) is effectively depressed via selective energization of credit balance solenoid CBS, as previously described with respect to FIG. 37 and also as shown in FIG. 81.

When a machine cycle is subsequently initiated in order to carry out the first half of a credit balance operation, the word read out from memory is subtracted from the contents of the "X" totalizer, which normally stores a word of all zeros. When the second machine cycle is subsequently initiated in order to carry out the final half of a credit balance operation, a total operation is taken with respect to the "X" totaliser, so that the complement of the word just read out from memory is printed in red, with a "CR" symbol to the right thereof.

Due to the fact that the differentially-set positions of the ten amount racks are determined solely by the computer during the execution of a POW instruction, rather than by a totalizer or by depressed keys on the accounting machine keyboard, it is therefore necessary to automatically release the amount racks and all previously depressed amount keys when a total operation is called for during the execution of a POW instruction. Thus, in order to permit the automatic release of the amount racks and the keys prior to the initiation of a total-taking operation, rack release solenoid RRS (FIGS. 39 and 81) is selectively energized.

During the second phase of the subprogram, the particular motor bar operation specified by the value of the low-order digit in section-2 of the instruction is executed in order to initiate the required machine cycle.

The third phase of the POW instruction begins when the machine starts to cycle, so that the timing rack and all non-stopped amount racks simultaneously begin their travel in a "setting" direction toward the rear of the machine, those amount racks corresponding to the digital positions of the digits of the word having a value of "0" remaining in home position. Each time the timing rack is translated from a position indicative of one digital value to a position indicative of the next higher successively higher-order digital value after leaving home position, each of the digits of the word is essentially "examined" to determine whether its digital value corresponds to the digital value represented by the instantaneous position of the amount racks. If such correspondance exists, all corresponding digital-order rack-stopping solenoids are simultaneously energized and thereby arrest further movement of all corresponding amount racks. After all of the amount racks have been differentially positioned to correspond to the word just read out from memory, a normal printing operation takes place.

During the final phase of a POW instruction, the contents of sections 3 and 4 of the instruction register are compared for equality to determine whether or not there are additional words to be printed out from memory. If there are additional words to be printed out, section-3 of the instruction register is incremented, and the entire sequence of events, just described, is again repeated. Otherwise, the instruction is concluded by effecting the copying into the word-selecting register the address of the next instruction word, which is located in section-5 of the instruction register.

Listed below in somewhat tabular form is a step-by-step description of the various previously described subinstructions to which the computer is sequentially responsive in executing a "POW" instruction:

| Step | Subinstructions | Description |
|---|---|---|
| 1 | MI-0-2 | Copy into the instruction register the next instruction word stored in memory at the address specified by the contents of the word-selecting register; thereafter, if the number thus stored in section-1 of the instruction register is "01", carry out the subinstruction listed in Step-2 of the following POW subprogram. |
| 2 | PFϕ-0-3 | Preset the F-counter to "0"; thereafter, go to Step-3. |
| 3 | GO-0-4 | Go to Step-4 in the subprogram whenever depression of a motor bar will initiate a machine cycle. |
| 4 | AD-0-5 | Increment the digit-counter; thereafter, go to Step-5. |
| 5 | MJ-3-6 | Copy, digit by digit, into the "J" digit-register the word stored in memory at the address indicated by section-3 of the instruction register; thereafter, go to Step-6. |
| 6 | IFJ-27-7 | If the digit in the F-counter is equal to the digit in the "J" digit-register, go to Step-7; otherwise, go to Step-27. |
| 7 | Dϕ-9-8 | Go to Step-8 if the digit-counter is at a count of "0"; otherwise, go to Step-9. |
| 8 | RAϕ-0-27 | Energize the first-order rack-stopping solenoid; thereafter, go to Step-27. |
| 9 | D1-11-10 | Go to Step-10 if the digit-counter is at a count of "1"; otherwise, go to Step-11. |
| 10 | RA1-0-27 | Energize the second-order rack-stopping solenoid; thereafter, go to Step-27. |
| 11 | D2-13-12 | Go to Step-12 if the digit-counter is at a count of "2"; otherwise, go to Step-13. |
| 12 | RA2-0-27 | Energize the third-order rack-stopping solenoid; thereafter, go to Step-27. |
| 13 | D3-15-14 | If the digit-counter is at a count of "3", go to Step-14; otherwise, go to Step-15. |
| 14 | RA3-0-27 | Energize the fourth-order rack-stopping solenoid; thereafter, go to Step-27. |
| 15 | D4-17-16 | If the digit-counter is at a count of "4", go to to Step-16; otherwise, go to Step-17. |
| 16 | RA4-0-27 | Energize the fifth-order rack-stopping solenoid; thereafter, go to Step-27. |
| 17 | D5-19-18 | If the digit-counter is at a count of "5", go to Step-18; otherwise, go to Step-19. |
| 18 | RA5-0-27 | Energize the sixth-order rack-stopping solenoid; thereafter, go to Step-27. |
| 19 | D6-21-20 | If the digit-counter is at a count of "6", go to Step-20; otherwise, go to Step-21. |
| 20 | RA6-0-27 | Energize the seventh-order rack-stopping solenoid; thereafter, go to Step-27. |
| 21 | D7-23-22 | If the digit-counter is at a count of "7", go to Step-22; otherwise, go to Step-23. |
| 22 | RA7-0-27 | Energize the eighth-order rack-stopping solenoid; thereafter, go to Step-27. |
| 23 | D8-25-24 | If the digit-counter is at a count of "8", go to Step-24; otherwise, go to Step-25. |
| 24 | RA8-0-27 | Energize the ninth-order rack-stopping solenoid; thereafter, go to Step-27. |
| 25 | D9-0-26 | When the digit-counter reaches a count of "9", go to Step-26. |
| 26 | RA9-0-27 | Energize the tenth-order rack-stopping solenoid; thereafter, go to Step-27. |
| 27 | D9-4-28 | If the digit-counter is at count of "9", go to Step-28; otherwise, go to Step-4. |
| 28 | OBM(4)-0-29 | Condition the state of line OBM to correspond to the sign of the word just read out from memory; therafter, go to Step-29. |
| 29 | OBM(2)-30-31 | If the state of line OBM is TRUE, go to Step-31; otherwise, go to Step-30. |
| 30 | CBS-0-31 | Energize the credit balance solenoid; thereafter, go to Step-31. |
| 31 | RRS-0-32 | Energize the rack-release solenoid; thereafter, go to Step-32. |
| 32 | Hϕ34-33 | If the high-order digit in section-2 of the instruction register is a "0", go to Step-33; otherwise, go to Step-34. |
| 33 | MBϕ(1)-0-44 | Depress the upper motor bar for a touch operation; thereafter, go to Step-44. |
| 34 | H1-36-35 | If the high-order digit in section-2 of the instruction register is a "1", go to Step-35; otherwise, goto Step-36. |
| 35 | MBϕ(2)-0-44 | Depress the upper motor bar for a hold operation; thereafter, go to Step-44. |
| 36 | H2-38-37 | If the high-order digit in section-2 of the instruction register is a "2", go to Step-37; otherwise, go to Step-38. |
| 37 | MB1(1)-0-44 | Depress the middle motor bar for a touch operation; thereafter go to Step-44. |
| 38 | H3-40-39 | If the high-order digit in section-2 of the instruction register is a "3", go to Step-39; otherwise, go to Step-40. |
| 39 | MB1(2)-0-44 | Depress the middle motor bar for a hold operation; thereafter, go to Step-44. |
| 40 | H4-42-41 | If the high-order digit in section-2 of the instruction register is a "4"; go to Step-41; otherwise, go to Step-42. |
| 41 | MB2(1)-0-44 | Depress the lower motor bar for a touch operation; thereafter, go to Step-44. |
| 42 | H5-0-43 | If the high-order digit in section-2 of the instruction register is a "5", go to Step-43. |
| 43 | MB2(2)-0-44 | Depress the lower motor bar for a hold operation; thereafter, go to Step-44. |
| 44 | L1-46-45 | If the low-order digit in section-2 of the instruction register is a "1", go to Step-45; otherwise, go to Step-46. |
| 45 | OH1-0-48 | When printing occurs, place a comma between rows #5 and #6; if there is no significant digit in rows #6 through #10, print a zero preceding the comma; thereafter, go to Step-48. |
| 46 | L2-48-47 | If the low-order digit in section-2 of the instruction register is a "2", go to Step-47; otherwise, go to Step-48. |
| 47 | OH2-0-48 | When printing occurs, place a comma between rows #8 and #9; if there is no significant digit in rows #9 or #10, print a zero preceding the comma; thereafter, go to Step-48. |
| 48 | PCT-0-49 | When the amount racks are traveling in a "setting" direction, go to Step-49 each time the timing rack changes digital position, and also upon engagement of the printing-liner. |
| 49 | AF-0-50 | Increment the F-counter; thereafter, go to Step-50. |

| Step | Subinstructions | Description |
|---|---|---|
| 50 | F9–51–75 | If the F-counter is at a count of "9", go to Step–75; otherwise, go to Step–51. |
| 51 | AD(1)–0–52 | Increment the digit-counter; thereafter, go to Step–52. |
| 52 | MJ–3–53 | Copy, digit by digit, into the "J" digit-register the word stored in memory at the address specified by section–3 of the instruction register; thereafter, go to Step–53. |
| 53 | IFJ–74–54 | If the digit in the F-counter is equal to the digit in the "J" digit-register, go to Step–54; otherwise, go to Step–74. |
| 54 | Dϕ–56–55 | If the digit-counter is at a count of "0", go to Step–55; otherwise, go to Step–56. |
| 55 | RAϕ–0–74 | Energize the first-order rack-stopping solenoid; thereafter, go to Step–74. |
| 56 | D1–58–57 | If the digit-counter is at a count of "1", go to Step–57; otherwise, go to Step–58. |
| 57 | RA1–0–74 | Energize the second-order rack-stopping solenoid; thereafter, go to Step–74. |
| 58 | D2–60–59 | If the digit-counter is at a count of "2", go to Step–59; otherwise, go to Step–60. |
| 59 | RA2–0–74 | Energize the third-order rack-stopping solenoid; thereafter, go to Step–74. |
| 60 | D3–62–61 | If the digit-counter is at a count of "3", go to Step–61; otherwise, go to Step–62. |
| 61 | RA3–0–74 | Energize the fourth-order rack-stopping solenoid; thereafter, go to Step–74. |
| 62 | D4–64–63 | If the digit-counter is at a count of "4", go to Step–63; otherwise, go to Step–64. |
| 63 | RA4–0–74 | Energize the fifth-order rack-stopping solenoid; thereafter, go to Step–74. |
| 64 | D5–66–65 | If the digit-counter is at a count of "5", go to Step–65; otherwise, go to Step–66. |
| 65 | RA5–0–74 | Energize the sixth-order rack-stopping solenoid; thereafter, go to Step–74. |
| 66 | D6–68–67 | If the digit-counter is at a count of "6", go to Step–67; otherwise, go to Step–68. |
| 67 | RA6–0–74 | Energize the seventh-order rack-stopping solenoid; thereafter, go to Step–74. |
| 68 | D7–70–69 | If the digit-counter is at a count of "7", go to Step–69; otherwise, go to Step–70. |
| 69 | RA7–0–74 | Energize the eighth-order rack-stopping solenoid; thereafter, go to Step–74. |
| 70 | D8–72–71 | If the digit-counter is at a count of "8", go to Step–71; otherwise, go to Step–72. |
| 71 | RA8–0–74 | Energize the ninth-order rack-stopping solenoid; thereafter, go to Step–74. |
| 72 | D9–0–73 | When the digit-counter reaches a count of "9", go to Step–73. |
| 73 | RA9–0–74 | Energize the tenth-order rack-stopping solenoid; thereafter, go to Step–74. |
| 74 | D9–51–48 | If the digit-counter is at a count of "9", go to Step–48; otherwise, go to Step–51. |
| 75 | CA(2)–0–76 | Copy into address-A the word collectively indicated by the condition of the rack readout switches; thereafter, go to Step–76. |
| 76 | RSB–3–77 | Subtract the word located in memory at the address specified by section–3 of the instruction register from the word in address-A and store the remainder in address-A; thereafter, go to Step–77. |
| 77 | OBN(1)–80–78 | If the state of line OBN is TRUE, go to Step–78; otherwise, go to Step–80. |
| 78 | RPB–0–79 | Upon depression of the resume-program bar, go to Step–79. |
| 79 | OBN(3)–0–2 | Preset line OBN to a FALSE state; thereafter, go to Step–2. |
| 80 | I34–81–83 | If the addresses in memory specified by sections 3 and 4 of the instruction register are equal, go to Step–83; otherwise, go to Step–81. |
| 81 | IN4–0–82 | Increment section–3 of the instruction register; thereafter, go to Step–82. |
| 82 | OBM(3)–0–2 | Preset line OBM to a FALSE state; thereafter, go to Step–2. |
| 83 | STD–5–* | Copy the contents of section–5 of the instruction register into the word-selecting register. |

Upon completion of the execution of the previously initiated "MI" word-cycle, during which time the next instruction word is read out from memory and stored in the instruction register, if the two-decimal-digit number stored in section-1 thereof corresponds to the code designation for a POW instruction—i.e., "01"—the state of line POW is rendered TRUE in a manner previously described with respect to FIG. 56, and, consequently, a "print-out-words" instruction is thereafter executed in the following manner:

With reference to FIGS. 89A through 89C, there is logically illustrated therein a composite circuit diagram of particular portions of the computer circuitry utilized in executing a POW instruction. As shown in FIG. 89A, at TIME-1 after the initiating of a "MI" word-cycle, the states of flip-flops 6095 and 6096 are simultaneously reversed, if not already in reversal states, so that lines (OBM)′ and (OBN)′ are respectively rendered TRUE thereby. As shown in FIG. 89B, the state of line PFϕ is rendered FALSE upon completion of the previously-initiated "MI" word-cycle when the state of line AN is rendered FALSE; consequently, the F-counter (FIG. 72) is preset to "0."

It is assumed that, upon initiation of the POW instruction, able arm 497 (FIG. 38) of the accounting machine is in the non-deflected position, as shown, and, consequently, the contacts of switch 496 (FIGS. 38 and 82) are closed, thus indicating that the motor bars are not disabled; that the carriage of the accounting machine is not tabulating over a carriage stop as indicated by a closure of the contacts of switch 510 (FIGS. 43 and 82); that the machine is in home position, so that the contacts of switch 528 (FIGS. 41 and 82) are closed; and that a paper-tape-punching operation is not to be initiated as indicated by a closure of contacts SC41–3 (FIG. 82) of switch SC41 (FIG. 13). The just-mentioned conditions having been satisfied, the state of line GO (FIG. 82) is rendered TRUE, indicating that a cycle of operation of the accounting machine is permitted to be initiated.

Thus, with reference back to FIG. 89A, all of the inputs to logical AND 1408 are simultaneously TRUE just prior to the completion of the previously-initiated "MI" word-cycle. Consequently, when line AN is rendered FALSE upon completion of the previously-initiated "MI" word-cycle, the state of flip-flop 6066 is reversed, so that line MJ is thereby rendered TRUE. With reference to FIG. 89B, line TS3 is rendered TRUE at the beginning of the instruction when line POW is rendered TRUE. Consequently, in response to lines MJ and TS3 being rendered TRUE, a "MJ" word-cycle is thereafter executed, whereby the word stored in memory at the address specified by the contents of section-3 of the instruction register is read out digit by digit, starting with the low-order digit thereof, and stored digit by digit in the "J" digit-register (FIG. 71). At TIME-3 after the initiation of a "MJ" word-cycle, the state of flip-flop 6118 (FIG. 89A) is reversed, so that line WOA is thereby rendered TRUE.

After each of the digits of the word is read out from memory via a "MJ" word-cycle and sequentially stored in the "J" digit-register, the contents of the F-counter and the "J" digit-register are compared for equality in a manner previously described with respect to FIG. 72. However, due to the fact that the F-counter is initially preset to "0," each digit stored in the "J" digit-register is essentially examined in order to determine whether its value is "0." If the digit stored in the "J" digit-register has a value of "0" when the "compare for equality" is made with respect to the contents of the F-counter and the "J" digit-register, the state of line (IFH)′ is rendered TRUE; otherwise, the state of line (IFJ)′ remains FALSE.

With reference now to FIG. 89C, after the state of line WOA is rendered TRUE at the beginning of the "MJ" word-cycle, line EVG experiences a TRUE-to-FALSE reversal of state each time the "J" digit-register is preset to "0" via a TRUE-to-FALSE reversal of state of line PJϕ if the digit previously stored in the "J" digit-register has a value of "0," as indicated by a TRUE state of line (IFJ)′. Consequently, when the digit-counter is at a count of "1," as indicated by a TRUE state of line O1, the state of flip-flop 6108 is reversed, so that line (RAϕ)′ is rendered FALSE if the value of the first-order digit of the word just read from memory is zero. When the digit-counter is subsequently incremented to a count of "2," line (RA1)′ is rendered FALSE by a reversal of state of flip-flop 6109 if the value of the second-order digit of the word is also zero, and so on, until line (RA8)′ is rendered FALSE by a reversal of state of flip-flop 6116 if the value of the ninth-order digit of the word just read out from memory is zero. If the value of the tenth-order digit is zero, as indicated by a TRUE state of line (IFJ)′, the state of flip-flop 6117 is reversed, and line (RA9)′ is rendered FALSE when line AN is rendered FALSE, indicating completion of the "MJ" word-cycle.

It is seen, therefore, that the states of selected ones of lines (RA$\phi$)' through (RA9), corresponding to the digital positions of those digits of the word having a value of zero, are successively rendered FALSE by corresponding reversal of states of flip-flops 6108 through 6117, respectively. Thus, after the digit-counter reaches a count of "9," as indicated by a FALSE state of line (D9)', the outputs from corresponding ones of logical ORS 3497 through 3506 are rendered FALSE when line PCT is subsequently rendered FALSE. Consequently, those ones of rack-stopping solenoids RA$\phi$L through RA9L corresponding to those digital positions of the digits of the word having a value of zero are simultaneously energized and thereafter prevent, in a manner previously described, any movement of the associated amount racks when a machine cycle is subsequently initiated. In other words, after the first "MJ" word-cycle is terminated, all amount racks corresponding to the digital positions of those digits of the word having a value of zero are locked in home position prior to the initiation of a machine cycle.

As previously stated with respect to FIG. 3A, in initiating an addition or a subtraction cycle of operation of the accounting machine, depression of the amount keys causes zero stop pawls 46 to be rocked counter-clockwise and thereby release amount racks 49 for rearward movement when a machine cycle is subsequently initiated. In a total-taking operation, however, no amount keys are depressed. Thus, additional means are utilized in a manner previously described with respect to FIGS. 39 and 40, whereby the zero stop pawls are rocked counter-clockwise, and, additionally, all accidentally-depressed amount keys are released at the beginning of the machine cycle. Consequently, with reference to FIG. 89B, rack-release solenoid RRS is energized when the state of line WOA is rendered TRUE, and thereby allows the just-mentioned additional means to function in the manner previously described.

With reference to FIG. 89A, if the high-order digit of the word just read out from memory and stored in the "J" digit-register is a "9," indicating the complement of a negative number, the state of line (J9)' is rendered FALSE. Thus, at TIME-3 during the last bit time period of the "MJ" word-cycle, when the state of line EG is reversed from TRUE to FALSE, the state of flipflop 6095 remains unchanged, so that line (OBM)' remains TRUE. However, if the algebraic sign of the word just read out from memory is positive, so that line (J9)' is TRUE, the state of line (OBM)' is rendered FALSE at TIME-3 by a change of state of flipflop 6095. Consequently, line (OBM)', in the latter instance, does not remain TRUE for a time period sufficient to allow credit balance solenoid CBS (FIG. 89B) to be responsive thereto. However, if the algebraic sign of the word just read out from memory is negative, so that line (OBM)' remains TRUE, credit balance solenoid CBS is energized for a time period sufficient for normal operation thereof.

As previously described with respect to FIG. 37, as a result of credit balance solenoid CBS being energized, the amount collectively indicated by the differentially-set positions of the amount racks is subtracted, during the first machine cycle, from the "X" totalizer, which normally stores a word of all zeros. During the second machine cycle, a total operation is executed with respect to the "X" totalizer, so that the complement of the word just read out from memory is printed in red, with a "CR" symbol disposed to the right thereof.

As shown in FIG. 89B, when line WOA is rendered TRUE at the beginning of the "MJ" word-cycle, upper motor bar solenoid MB$\phi$ is energized if the high-order digit in section-2 of the instruction register is a "0" or a "1"; middle motor bar solenoid MB1 is energized if the high-order digit in section-2 is either a "2" or a "3"; and lower motor bar solenoid MB2 is energized if the high-order digit is either a "4" or a "5." However, approximately 130 milliseconds after the preselected motor bar is automatically depressed via energization of the corresponding motor bar solenoid, all amount racks not locked in home position are simultaneously translated in a setting direction toward the rear of the machine.

As previously described with respect to FIG. 72 and with respect to the mode of operation of an EKW subprogram, the state of output line PCT is rendered TRUE at each translational position of the timing rack corresponding to a digital value and is rendered FALSE during the time the timing rack is being translated from one position to a successively higher-order digital value position. Therefore, with reference back to FIG. 89A, when the timing and amount racks first begin their translational movement toward the rear of the machine, the state of line (PCT)' is reversed from TRUE to FALSE, and, as a result, the state of flipflop 6088 is reversed, so that line JHR is thereby rendered TRUE. At the following TIME-1, the state of flipflop 6088 is again reversed, and line JHR is thereby rendered FALSE. As shown in FIG. 89B, each time line JHR experiences a TRUE-to-FALSE reversal of state, the state of line AF likewise experiences a TRUE-to-FALSE reversal of state. Thus, the F-counter (FIG. 72) is incremented by a count of "1" each time the racks are simultaneously translated from one position to a successively higher-order digital valued position.

With reference to FIG. 89A, each time the state of line JHR reverses from TRUE to FALSE, the state of flipflop 6066 is reversed, so that line MJ is thereby rendered TRUE; consequently, a "MJ" word-cycle is thereby initiated at the following TIME-1 after each time line PCT is rendered TRUE while the racks are traveling in a setting direction. As just described, during the execution of a "MJ" word-cycle, all of the digits of the word stored in memory at the address specified by the contents of section-3 of the instruction register are sequentially read out, stored in the "J" digit-register, and compared with the digital count of the F-counter.

Thus, during the time the amount racks are being simultaneously translated from home position to their #1 digital positions, the state of line JHR is reversed from TRUE to FALSE, the F-counter is advanced to a count of "1," and, simultaneously therewith, a "MJ" word-cycle is initiated. Consequently, each digit of the word read out from memory is effectively examined to determine whether its value is "1." Thereafter, those ones of rack-stopping solenoids RA$\phi$L through RA9L (FIG. 4) corresponding to the digital positions of those digits of the word having a value of "1" are simultaneously energized to arrest movement of and thus differentially position the corresponding amount racks at the #1 digital valued positions thereof in the same manner as just described.

The above sequence of events is sequentially repeated until all of the ten amount racks are differentially set at those digital valued positions collectively representative of the word just read from memory. It is to be noted, however, that a "MJ" word-cycle is also initiated when the F-counter reaches a count of "9" even though all amount racks not previously stopped are automatically stopped at their high-order digital valued positions. However, with reference to FIG. 89B, when the F-counter reaches a count of "8," as indicated by a TRUE state of line F8, order-hook solenoid OH1 is energized if the low-order digit in section-2 of the instruction register is a "1," whereas order-hook solenoid OH2 is energized if the low-order digit in section-2 is a "2." As previously described with respect to the EKW subprogram, when order-hook solenoid OH1 is energized, all order-hooks from the third to and including the eighth ones are unlatched from their respective type sectors. However, when order-hook solenoid OH2 is energized, all order-hooks from the third to and including the eleventh ones are unlatched from their respective type sectors. As previously described with respect to FIGS. 3A, 41, and 72, when printing aligner bars 72 engage the proper tooth of corresponding ones of the members 58 in order to precisely align each of the type sectors 67 prior to a printing operation, the contacts of switch 550 are closed, so that the state of flipflops 6071 and 6072 are reversed, so that line (PCT)′ is rendered FALSE thereby.

As a result of line (PCT)′ thus being rendered FALSE, the state of flipflop 6088 (FIG. 89A) is again reversed, so that line JHR is again rendered TRUE. Thus, at the following TIME-1 when line JHR is rendered FALSE, line AF (FIG. 89B) experiences a TRUE-to-FALSE reversal of state to effect the advancement of the F-counter from a count of "8" to a count of "9". With reference to FIG. 89B, when the F-counter is incremented from a count of "8" to a count of "9," any previously-energized order-hook solenoid (OH1–OH2) is de-energized. With reference back to FIG. 89A, when line AN is rendered FALSE after the F-counter reaches a count of "9," the state of flipflop 6118 is reversed, so that line WOA is thereby rendered FALSE. With reference now to FIGS. 89B and 89C, as a result of line WOA thus being rendered FALSE, all previously-energized motor bar, rack-release, credit-balance, and rack-stopping solenoids are de-energized and thus rendered ineffective.

With reference to FIG. 89A, when the F-counter reaches a count of "9," as indicated by line F9 being rendered TRUE, the state of flipflop 6080 is reversed, and line CA is thereby rendered TRUE upon completion of the following "MJ" word-cycle, as indicated by line MJ being rendered FALSE. In response to line CA thus being rendered TRUE, a "CA" word-cycle is thereafter executed, whereby the word collectively indicated by the differentially-set positions of the amount racks is read out, in the manner previously described with respect to the EKW subprogram, and thereafter stored in address-A via line MXW (FIG. 89B). Upon completion of the previously-initiated "CA" word-cycle, as indicated by line CA being rendered FALSE, the state of flipflop 6100 (FIG. 89A) is reversed, so that line RSB is thereby rendered TRUE. In response to line RSB thus being rendered TRUE, a "RSB" subcommand is thereafter executed, whereby the word initially read out from the address in memory as specified by the contents of section-3 of the instruction register is subtracted digit from the word just stored in address-A. If each digit of the word just read out from memory is equal in magnitude to the corresponding digit of the word stored in address-A, line ZNO remains FALSE, and, as a result, the state of flipflop 6096 remains unchanged, so that line (OBN)′ remains TRUE. However, if a digit of the word in address-A is not equal to the corresponding digit of the corresponding word in memory, indicating that the word just printed out does not correspond to the word just read out from memory, line ZNO experiences a TRUE-to-FALSE reversal of state, thereby causing the state of flipflop 6096 to be reversed, so that line (OBN)′ is thereby rendered FALSE, thus indicating that a printing error has occurred. When the state of line (OBN)′ is thus reversed from TRUE to FALSE, the state of flipflop 6107 is not reversed by logical AND 1716 to indicate completion of the "POW" subprogram, as is normally the case.

As previously described with respect to FIG. 59, if the contents of section-3 of the instruction register is equal to the contents of section-4 thereof, indicating that there are no other words to be printed out from memory, the state of line (I34)′ is rendered TRUE. Line (I34)′, however, is rendered FALSE if there are additional words to be printed out.

Therefore, with reference back to FIG. 89A, if the word just printed out is equal in magnitude to the word read out from memory, as indicated by a TRUE state of line (OBN)′, and if there are no other words to be printed out, as indicated by a TRUE state of line (I34)′, the state of flipflop 6107 is reversed by the output of logical AND 1716 when line AN experiences a TRUE-to-FALSE reversal of state upon completion of the previously-initiated "RSB" subcommand; consequently, line STD is thereby rendered TRUE, thus indicating the end of the POW subprogram. When line STD is thus rendered TRUE, line TS5 (FIG. 89B) is likewise rendered TRUE. Thus, as previously described with respect to the EKW subprogram, in response to lines STD and TS5 being rendered TRUE, a "STD" subinstruction is thereafter executed, whereby the contents of section-5 of the instruction register is stored in the word-selecting register.

However, if there are additional words to be printed out, line IN4 (FIG. 89B) is rendered FALSE when line AN is rendered FALSE upon completion of the previously initiated "RSB" subcommand. Consequently, section-3 of the instruction register is incremented, and the same "POW" subprogram is again subsequently executed in the same manner as just described. It is to be noted, however, that, even though line STD is rendered TRUE, indicating the end of the "POW" subprogram, section-3 of the instruction register is, nevertheless, incremented via line IN4 regardless of the result of the comparison between the contents of sections 3 and 4 of the instruction register. It is also to be noted that, if a plurality of words stored in sequentially-numbered addresses in memory are to be sequentially printed out during the execution of a single "POW" subprogram, the same motor bar and order-hook solenoids are utilized for each word printed out. However, if a different motor bar or order hook is desired to be utilized, a second "POW" instruction is to be initiated, which specifies the desired combination thereof.

While particular embodiments of the invention have been shown and described in detail, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a machine of the class described, the combination comprising: recording means capable of selectively recording a plurality of characters of a plurality of different kinds on an associated medium with the characters of selected kinds each being recorded in a different order position along a recording line transversely oriented with respect to said medium; a storage device having a plurality of different order storage locations with each storage location corresponding to a different order position along said recording line and adapted to have stored therein a character manifestation corresponding to a character of a particular kind to be recorded on said medium; read-out means associated with said storage device for executing a reproduction cycle of operation with respect to said storage device such that the character manifestations stored at said storage locations thereof are serially reproduced in consecutive order, starting with the character manifestation stored in one extreme order position and ending with the character manifestation stored in the other extreme order position; means for initiating a succession of reproduction cycles of operation of said read-out means with the number of reproduction cycles of operation initiated being related to the number of different kinds of characters to be recorded along said recording line of said medium; means for successively designating a character of a different kind prior to the initiation of each reproduction cycle of operation of said read-out means; and means operatively connected to said recording means and responsive to those character manifestations reproduced during a reproduction cycle of operation of said read-out means which correspond to the character of a designated kind, for causing the character of said designated kind to be recorded in each of those order positions along said recording line which corresponds to a storage location at which the corresponding character manifestation was stored.

2. In a machine of the class described, the combination comprising: printing means capable of selectively printing a plurality of characters of a plurality of different kinds on an associated medium with the characters of selected kinds each being printed in a different order position along a recording line transversely oriented with respect to said medium; a storage device having a plurality of different order storage locations with each storage location corresponding to a different order position along said printing line and adapted to have stored therein a character manifestation corresponding to a character of a particular kind to be printed on said medium; read-out means associated with said storage device for executing a reproduction cycle of operation with respect to said storage device such that the character manifestations stored at said storage locations thereof are serially reproduced in consecutive order, starting with the character manifestation stored in one extreme order position and ending with the character manifestation stored in the opposite extreme order position; means for initiating a succession of reproduction cycles of operation of said read-out means with the number of reproduction cycles of operation initiated being equal in number to at least one less than the number of different kinds of characters to be printed along said recording line of said medium; means for successively designating a character of a different kind prior to the initiation of each reproduction cycle of operation of said read-out means; and means operatively connected to said printing means and responsive to those character manifestations reproduced during a reproduction cycle of operation of said read-out means which correspond to the character of a designated kind, for causing the character of said designated kind to be printed in each of those order positions along said recording line which corresponds to a storage location at which the corresponding character manifestation was stored.

3. In a machine of the class described, the combination comprising: a plurality of differentially positionable recording means capable of recording a plurality of characters of a plurality of different kinds on an associated medium with the characters of selected kinds each being recorded in a different order position along a recording line transversely oriented with respect to said medium, the unique and independent differential position of each of said recording means determining the specific kind of character to be recorded by that particular recording means; an actuator associated with each of said recording means for differentially positioning the corresponding recording means, each of said actuators being independently movable in at least one direction; means for moving all of said actuators in said direction; stop means associated with each actuator for selectively immobilizing said actuator independently of the other actuators at any one of a plurality of differential positions, the differential position at which the individual actuators are immobilized determining the differential positioning of their associated recording means; additional means for determining when the mobile actuators are at each of the differential positions corresponding to a character of a particular kind; a storage device having a plurality of different order storage locations with each storage location corresponding to a different order position along said recording line and adapted to have stored therein a character manifestation corresponding to a character of a particular kind to be recorded on said medium; read-write means associated with said storage device for executing a reproduction cycle of operation with respect to said storage device such that the character manifestations stored at said storage locations thereof are serially reproduced in consecutive order, starting with the character manifestation stored in one extreme order position and ending with the character manifestation stored in the opposite extreme order position; means for initiating a succession of reproduction cycles of operation of said read-write means with the number of reproduction cycles of operation initiated being related to the number of different kinds of characters capable of being recorded along said recording line of said medium by said recording means; and means operatively connected to each of said stop means and responsive to those character manifestations reproduced during a reproduction cycle of operation of said read-write means which correspond to the character of the kind designated by said additional means, for causing each of those mobile actuators which correspond to a storage location at which the corresponding character manifestation was stored to be immobilized at the differential position corresponding to the character of said designated kind.

4. In a machine of the class described, the combination comprising: a plurality of differentially positionable printing means capable of printing a plurality of characters of a plurality of different kinds on an associated medium with the characters of selected kinds each being printed in a different order position along a printing line transversely oriented with respect to said medium, the unique and independent differential position of each of said printing means determining the specific kind of character to be printed by that particular printing means; an actuator associated with each of said printing means for differentially positioning the corresponding printing means, each of said actuators being independently movable in at least one direction; means for moving all of said actuators in said direction; stop means associated with each actuator for selectively immobilizing said actuator independently of the other actuators at any one of a plurality of differential positions, the differential position at which the individual actuators are immobilized determining the differential positioning of their associated printing means; additional means for determining when the mobile actuators are at each of the differential positions corresponding to a character of a particular kind; a storage device having a plurality of different order storage locations with each storage location corresponding to a different order position along said printing line and adapted to have stored therein a character manifestation corresponding to a character of a particular kind to be printed on said medium; read-write means associated with said storage device for executing a reproduction cycle of operation with respect to said storage device such that the character manifestations stored at said storage locations thereof are serially reproduced in consecutive order, starting with the character manifestation stored in one extreme order position and ending with the character manifestation stored in the opposite extreme order positions; means for initiating a succession of reproduction cycles of operation of said read-write means with the number of reproduction cycles of operation initiated being equal to at least one less than the number of different kinds of characters capable of being recorded along said printing line of said medium by said printing means; and means operatively connected to each of said stop means and responsive to those character manifestations reproduced during a reproduction cycle of operation of said read-write means which correspond to the character of the kind designated by said additional means, for causing each of those mobile actuators which correspond to a storage location at which the corresponding character manifestation was stored to be immobilized at the differential position corresponding to the character of said designated kind.

5. In a machine of the class described, the combination comprising: a plurality of differentially positionable recording means capable of recording a plurality of characters of a plurality of different kinds on an associated medium with the characters of selected kinds each being recorded in a different order position along a recording line transversely oriented with respect to said medium, the unique and independent differential position of each of said recording means determining the specific kind of character to be recorded by that particular recording means; an actuator associated with each of said recording means for differentially positioning the corresponding recording means, each of said actuators being independently movable in at least one direction; means for moving all of said actuators in said direction; stop means associated with each actuator for selectively immobilizing said actuator independently of the other actuator at any one of a plurality of differential positions, the differential position at which the individual actuators are immobilized determining the differential positioning of their associated recording means; additional means for determining when the mobile actuators are at each of the differential positions corresponding to a character of a particular kind; a storage device having a plurality of addresses each containing a plurality of different order storage locations with each storage location corresponding to a different order position along said recording line and adapted to have stored therein a character manifestation corresponding to a character of a particular kind to be recorded on said medium; address-selecting means associated with said storage device for obtaining access to any desired address thereof; read-write means associated with said storage device for executing a reproduction cycle of operation with respect to the particular address of said storage device dictated by said address-selecting means, such that the character manifestations stored at the storage locations of said selected address are serially reproduced in consecutive order, starting with the character manifestations stored in one extreme order position and ending with the character manifestations stored in the opposite extreme order position; means for initiating a succession of reproduction cycles of operation of said read-write means with the number of reproduction cycles of operation initiated being related to the number of different kinds of characters capable of being recorded along said recording line of said medium by said recording means; and means operatively connected to each of said stop means and responsive to those character manifestations reproduced during a reproduction cycle of operation of said read-write means which correspond to the character of the kind designated by said additional means, for causing each of those mobile actuators which correspond to a storage location at which the corresponding character manifestations are stored to be immobilized at the differential position corresponding to the character of said designated kind.

References Cited by the Examiner

UNITED STATES PATENTS

| | | | |
|---|---|---|---|
| 2,658,681 | 11/1953 | Palmer et al. | 235—61.6 |
| 2,950,467 | 8/1960 | Hoffman | 340—174 |
| 2,954,731 | 10/1960 | Durand et al. | 101—93RC |
| 2,972,444 | 2/1961 | Phelan | 235—61.9 |

WILLIAM B. PENN, *Examiner.*